US011743375B2

(12) United States Patent
Christie et al.

(10) Patent No.: US 11,743,375 B2
(45) Date of Patent: Aug. 29, 2023

(54) PORTABLE ELECTRONIC DEVICE WITH CONVERSATION MANAGEMENT FOR INCOMING INSTANT MESSAGES

(71) Applicant: Apple Inc., Cupertino, CA (US)

(72) Inventors: Gregory N. Christie, San Jose, CA (US); Marcel Van Os, San Francisco, CA (US); Stephen O. Lemay, Palo Alto, CA (US); Evan Russell Doll, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 17/467,700

(22) Filed: Sep. 7, 2021

(65) Prior Publication Data

US 2022/0141329 A1    May 5, 2022

Related U.S. Application Data

(63) Continuation of application No. 15/960,330, filed on Apr. 23, 2018, now Pat. No. 11,122,158, which is a (Continued)

(51) Int. Cl.
*H04M 1/72436* (2021.01)
*G06Q 10/107* (2023.01)
*H04M 1/67* (2006.01)

(52) U.S. Cl.
CPC ...... *H04M 1/72436* (2021.01); *G06Q 10/107* (2013.01); *H04M 1/67* (2013.01); *H04M 2250/22* (2013.01); *H04M 2250/60* (2013.01)

(58) Field of Classification Search
CPC ............... H04M 1/72436; H04M 1/67; H04M 2250/22; H04M 2250/60; G06Q 10/107
See application file for complete search history.

(56) References Cited

U.S. PATENT DOCUMENTS 4,107,784 A    8/1978 Van Bemmelen
4,433,377 A    2/1984 Eustis et al.
(Continued)

FOREIGN PATENT DOCUMENTS

CN    101046721 A    10/2007
CN    101276255 A    10/2008
(Continued)

OTHER PUBLICATIONS

Notice of Acceptance received for Australian Patent Application No. 2021202815, dated Jun. 16, 2022, 3 pages.
(Continued)

*Primary Examiner* — Jinsong Hu
*Assistant Examiner* — Rui M Hu
(74) *Attorney, Agent, or Firm* — DLA Piper LLP (US)

(57) ABSTRACT

A portable electronic device with a touch screen display displays an incoming message from a party to a user of the device while the device is locked. The device responds to detecting a user request to view the incoming message by immediately displaying a set of messages between the user and the party in a chronological order. While the device is unlocked, if an incoming message is longer than a predefined length the device displays a portion of the incoming message, a view icon, and a long-message indicia. Alternately, if the incoming message is equal to or less than the predefined length, the device displays the entire incoming message and a reply icon. In response to user selection of either the view icon or the reply icon, the device immediately displays a set of messages between the user of the device and the party in a chronological order.

12 Claims, 73 Drawing Sheets

Related U.S. Application Data continuation of application No. 12/163,908, filed on Jun. 27, 2008, now Pat. No. 9,954,996.

(60) Provisional application No. 61/019,293, filed on Jan. 6, 2008, provisional application No. 61/019,292, filed on Jan. 6, 2008, provisional application No. 60/937,993, filed on Jun. 29, 2007, provisional application No. 60/946,969, filed on Jun. 28, 2007.

(56) References Cited

U.S. PATENT DOCUMENTS

| | | | |
|---|---|---|---|
| 4,485,439 A | 11/1984 | Rothstein | |
| 4,513,379 A | 4/1985 | Wilson et al. | |
| 4,555,775 A | 11/1985 | Pike | |
| 4,586,158 A | 4/1986 | Brandie | |
| 4,642,790 A | 2/1987 | Minshull et al. | |
| 4,975,694 A | 12/1990 | Mclaughlin et al. | |
| 5,128,672 A | 7/1992 | Kaehler | |
| 5,146,217 A | 9/1992 | Holmes et al. | |
| 5,276,794 A | 1/1994 | Lamb, Jr. | |
| 5,287,448 A | 2/1994 | Nicol et al. | |
| 5,418,528 A | 5/1995 | Hosack et al. | |
| 5,428,731 A | 6/1995 | Powers, Iii | |
| 5,483,595 A | 1/1996 | Owen | |
| 5,543,781 A | 8/1996 | Ganucheau et al. | |
| 5,617,539 A | 4/1997 | Ludwig et al. | |
| 5,687,216 A | 11/1997 | Svensson | |
| 5,724,985 A | 3/1998 | Snell et al. | |
| 5,758,079 A | 5/1998 | Ludwig et al. | |
| 5,801,700 A | 9/1998 | Ferguson | |
| 5,815,142 A | 9/1998 | Allard et al. | |
| 5,835,084 A * | 11/1998 | Bailey | G06Q 10/107 715/783 |
| 5,854,893 A | 12/1998 | Ludwig et al. | |
| 5,872,521 A | 2/1999 | Lopatukin et al. | |
| 5,875,403 A | 2/1999 | Christal | |
| 5,880,731 A | 3/1999 | Liles et al. | |
| 5,884,039 A | 3/1999 | Ludwig et al. | |
| 5,896,500 A | 4/1999 | Ludwig et al. | |
| 5,917,487 A | 6/1999 | Ulrich | |
| 5,943,049 A | 8/1999 | Matsubara et al. | |
| 5,951,621 A | 9/1999 | Palalau et al. | |
| 5,990,887 A | 11/1999 | Redpath et al. | |
| 6,002,402 A | 12/1999 | Schacher | |
| 6,014,429 A | 1/2000 | Laporta et al. | |
| 6,018,711 A | 1/2000 | French-st. George et al. | |
| 6,084,529 A | 7/2000 | Lee et al. | |
| 6,124,947 A * | 9/2000 | Seo | H04N 1/32657 358/440 |
| 6,169,911 B1 | 1/2001 | Wagner et al. | |
| 6,177,931 B1 | 1/2001 | Alexander et al. | |
| 6,191,807 B1 | 2/2001 | Hamada et al. | |
| 6,216,008 B1 * | 4/2001 | Lee | H04W 88/02 455/466 |
| 6,230,019 B1 * | 5/2001 | Lee | H04W 88/02 455/412.2 |
| 6,232,966 B1 | 5/2001 | Kurlander | |
| 6,237,025 B1 | 5/2001 | Ludwig et al. | |
| 6,256,663 B1 | 7/2001 | Davis | |
| 6,268,859 B1 | 7/2001 | Andresen et al. | |
| 6,292,473 B1 * | 9/2001 | Duske, Jr. | H04B 7/18567 370/339 |
| 6,313,853 B1 | 11/2001 | Lamontagne et al. | |
| 6,333,973 B1 | 12/2001 | Smith et al. | |
| 6,351,762 B1 | 2/2002 | Ludwig et al. | |
| 6,362,842 B1 | 3/2002 | Tahara et al. | |
| 6,393,464 B1 | 5/2002 | Dieterman | |
| 6,434,604 B1 | 8/2002 | Harada et al. | |
| 6,437,818 B1 | 8/2002 | Ludwig et al. | |
| 6,456,841 B1 | 9/2002 | Tomimori | |
| 6,457,122 B1 * | 9/2002 | Ramezani | G06F 11/1433 713/1 |
| 6,583,806 B2 | 6/2003 | Ludwig et al. | |
| 6,594,673 B1 | 7/2003 | Smith et al. | |
| 6,594,688 B2 | 7/2003 | Ludwig et al. | |
| 6,630,944 B1 | 10/2003 | Kakuta et al. | |
| 6,631,186 B1 | 10/2003 | Adams et al. | |
| 6,662,023 B1 | 12/2003 | Helle | |
| 6,704,015 B1 | 3/2004 | Bovarnick et al. | |
| 6,720,863 B2 | 4/2004 | Hull et al. | |
| 6,721,784 B1 | 4/2004 | Leonard et al. | |
| 6,724,370 B2 | 4/2004 | Dutta et al. | |
| 6,772,195 B1 | 8/2004 | Hatlelid et al. | |
| 6,775,776 B1 | 8/2004 | Vogt et al. | |
| 6,778,642 B1 | 8/2004 | Schmidt et al. | |
| 6,784,901 B1 | 8/2004 | Harvey et al. | |
| 6,850,781 B2 | 2/2005 | Goto | |
| 6,910,186 B2 | 6/2005 | Kim | |
| 6,915,138 B2 | 7/2005 | Kraft | |
| 6,932,708 B2 | 8/2005 | Yamashita et al. | |
| 6,934,738 B1 | 8/2005 | Furusawa et al. | |
| 6,937,707 B2 * | 8/2005 | Kim | H04L 51/23 379/93.01 |
| 6,954,902 B2 | 10/2005 | Noma et al. | |
| 7,013,429 B2 | 3/2006 | Fujimoto et al. | |
| 7,072,941 B2 | 7/2006 | Griffin et al. | |
| 7,115,035 B2 | 10/2006 | Tanaka | |
| 7,120,455 B1 | 10/2006 | Chen et al. | |
| 7,124,164 B1 | 10/2006 | Chemtob | |
| 7,133,900 B1 | 11/2006 | Szeto | |
| 7,149,893 B1 | 12/2006 | Leonard et al. | |
| 7,152,093 B2 | 12/2006 | Ludwig et al. | |
| 7,206,809 B2 | 4/2007 | Ludwig et al. | |
| 7,218,943 B2 | 5/2007 | Klassen et al. | |
| 7,250,955 B1 | 7/2007 | Beeman et al. | |
| 7,365,736 B2 | 4/2008 | Marvit et al. | |
| 7,386,799 B1 | 6/2008 | Clanton et al. | |
| 7,412,470 B2 | 8/2008 | Masuno et al. | |
| 7,423,661 B2 | 9/2008 | Abe et al. | |
| 7,433,920 B2 | 10/2008 | Blagsvedt et al. | |
| 7,433,921 B2 | 10/2008 | Ludwig et al. | |
| 7,478,129 B1 | 1/2009 | Chemtob | |
| 7,496,385 B2 | 2/2009 | Gruen et al. | |
| 7,571,014 B1 | 8/2009 | Lambourne et al. | |
| 7,603,379 B2 | 10/2009 | Kang et al. | |
| 7,620,407 B1 | 11/2009 | Donald et al. | |
| 7,636,578 B1 | 12/2009 | Cope et al. | |
| 7,650,361 B1 | 1/2010 | Wong et al. | |
| 7,665,031 B2 | 2/2010 | Matthews et al. | |
| 7,669,134 B1 | 2/2010 | Christie et al. | |
| 7,685,530 B2 | 3/2010 | Sherrard et al. | |
| 7,710,262 B2 | 5/2010 | Ruha | |
| 7,716,593 B2 | 5/2010 | Durazo et al. | |
| 7,735,102 B1 | 6/2010 | Billmaier et al. | |
| 7,743,188 B2 | 6/2010 | Haitani et al. | |
| 7,789,225 B2 | 9/2010 | Whiteis | |
| 7,797,390 B2 | 9/2010 | Hagale et al. | |
| 7,834,861 B2 | 11/2010 | Lee | |
| 7,877,705 B2 | 1/2011 | Chambers et al. | |
| 7,899,474 B2 * | 3/2011 | Neil | H04L 51/58 455/414.4 |
| 7,908,219 B2 | 3/2011 | Abanami et al. | |
| 7,921,166 B2 | 4/2011 | Karn | |
| 8,019,822 B2 * | 9/2011 | Martino | H04L 51/08 379/265.09 |
| 8,024,758 B2 | 9/2011 | Byun et al. | |
| 8,060,621 B2 * | 11/2011 | Lee | H04L 67/14 709/227 |
| 8,121,586 B2 | 2/2012 | Araradian et al. | |
| 8,139,573 B2 * | 3/2012 | Kim | H04W 4/12 455/566 |
| 8,150,922 B2 | 4/2012 | Griffin et al. | |
| 8,150,930 B2 | 4/2012 | Satterfield et al. | |
| 8,209,634 B2 | 6/2012 | Klassen et al. | |
| 8,255,830 B2 | 8/2012 | Ording et al. | |
| 8,407,603 B2 | 3/2013 | Christie et al. | |
| 8,458,278 B2 | 6/2013 | Christie et al. | |
| 8,554,861 B2 | 10/2013 | Christie et al. | |
| 8,572,493 B2 | 10/2013 | Qureshi | |
| 8,607,334 B2 * | 12/2013 | Brown | H04L 63/0823 726/22 |
| 8,611,873 B2 | 12/2013 | Onyon et al. | |

(56) References Cited

U.S. PATENT DOCUMENTS

| | | | |
|---|---|---|---|
| 8,648,799 B1 | 2/2014 | Lloyd | |
| 8,650,652 B2* | 2/2014 | Adams | H04L 51/58 |
| | | | 726/28 |
| 8,689,147 B2 | 4/2014 | Griffin et al. | |
| 8,706,818 B2* | 4/2014 | Krzyzanowski | |
| | | | H04N 21/42209 |
| | | | 709/205 |
| 8,751,594 B2 | 6/2014 | Aceves | |
| 8,848,932 B2 | 9/2014 | Poulsen et al. | |
| 8,849,928 B2 | 9/2014 | Yuyama | |
| 8,914,752 B1 | 12/2014 | Spiegel | |
| 8,918,128 B2* | 12/2014 | Merrett | H04L 51/58 |
| | | | 455/418 |
| 8,922,485 B1 | 12/2014 | Lloyd | |
| 8,924,866 B2* | 12/2014 | Shin | G06F 3/0488 |
| | | | 715/792 |
| 8,984,444 B2 | 3/2015 | O | |
| 9,185,062 B1 | 11/2015 | Yang et al. | |
| 9,207,835 B1 | 12/2015 | Yang et al. | |
| 9,304,675 B2 | 4/2016 | Lemay et al. | |
| 9,313,160 B1 | 4/2016 | Shamis et al. | |
| 9,483,529 B1 | 11/2016 | Pasoi et al. | |
| 9,600,174 B2 | 3/2017 | Lemay et al. | |
| 10,110,530 B2* | 10/2018 | Sachtjen | H04L 41/026 |
| 10,306,049 B1 | 5/2019 | Bauer et al. | |
| 10,416,844 B2 | 9/2019 | Yang et al. | |
| 10,511,559 B2 | 12/2019 | Stovicek et al. | |
| 10,523,625 B1 | 12/2019 | Allen et al. | |
| 10,924,446 B1 | 2/2021 | Paul | |
| 10,963,145 B1 | 3/2021 | Voss et al. | |
| 11,079,913 B1 | 8/2021 | Kim et al. | |
| 2001/0005859 A1 | 6/2001 | Okuyama et al. | |
| 2001/0030597 A1 | 10/2001 | Inoue et al. | |
| 2001/0033298 A1* | 10/2001 | Slotznick | G06Q 10/107 |
| | | | 715/758 |
| 2002/0007395 A1 | 1/2002 | Matsuda | |
| 2002/0035467 A1 | 3/2002 | Morimoto et al. | |
| 2002/0054094 A1 | 5/2002 | Matsuda | |
| 2002/0057284 A1 | 5/2002 | Dalby et al. | |
| 2002/0093536 A1 | 7/2002 | Hong | |
| 2002/0120869 A1 | 8/2002 | Engstrom | |
| 2002/0126135 A1 | 9/2002 | Ball et al. | |
| 2002/0152220 A1* | 10/2002 | Kang | H04L 51/56 |
| 2002/0167488 A1 | 11/2002 | Hinckley et al. | |
| 2003/0073496 A1 | 4/2003 | D'amico et al. | |
| 2003/0078833 A1 | 4/2003 | Suzuki et al. | |
| 2003/0078969 A1 | 4/2003 | Sprague et al. | |
| 2003/0079024 A1 | 4/2003 | Hough et al. | |
| 2003/0097408 A1 | 5/2003 | Kageyama et al. | |
| 2003/0101450 A1 | 5/2003 | Davidsson et al. | |
| 2003/0112938 A1 | 6/2003 | Kanakubo et al. | |
| 2003/0120957 A1 | 6/2003 | Pathiyal | |
| 2003/0122787 A1 | 7/2003 | Zimmerman et al. | |
| 2003/0130014 A1 | 7/2003 | Rucinski | |
| 2003/0134678 A1 | 7/2003 | Tanaka | |
| 2003/0152203 A1 | 8/2003 | Berger et al. | |
| 2003/0162554 A1* | 8/2003 | Kim | H04W 4/14 |
| | | | 455/423 |
| 2003/0187925 A1 | 10/2003 | Inala et al. | |
| 2003/0187944 A1 | 10/2003 | Johnson et al. | |
| 2003/0208756 A1 | 11/2003 | Macrae et al. | |
| 2003/0228909 A1 | 12/2003 | Tanaka et al. | |
| 2003/0229722 A1 | 12/2003 | Beyda | |
| 2004/0015548 A1 | 1/2004 | Lee et al. | |
| 2004/0015553 A1 | 1/2004 | Griffin et al. | |
| 2004/0021676 A1 | 2/2004 | Chen et al. | |
| 2004/0027461 A1 | 2/2004 | Boyd et al. | |
| 2004/0039779 A1 | 2/2004 | Amstrong et al. | |
| 2004/0078444 A1 | 4/2004 | Malik et al. | |
| 2004/0100479 A1 | 5/2004 | Nakano et al. | |
| 2004/0125088 A1 | 7/2004 | Zimmerman et al. | |
| 2004/0172455 A1 | 9/2004 | Green et al. | |
| 2004/0199663 A1 | 10/2004 | Horvitz et al. | |
| 2004/0208301 A1* | 10/2004 | Urban | H04M 15/00 |
| | | | 379/142.17 |
| 2004/0210634 A1 | 10/2004 | Ferrer et al. | |
| 2004/0215731 A1 | 10/2004 | Tzann-en Szeto | |
| 2004/0223485 A1 | 11/2004 | Arellano et al. | |
| 2004/0248598 A1 | 12/2004 | Ding et al. | |
| 2004/0259591 A1 | 12/2004 | Grams et al. | |
| 2005/0004990 A1 | 1/2005 | Durazo et al. | |
| 2005/0041793 A1* | 2/2005 | Fulton | H04M 3/436 |
| | | | 379/201.12 |
| 2005/0055412 A1 | 3/2005 | Kaminsky et al. | |
| 2005/0086211 A1 | 4/2005 | Mayer et al. | |
| 2005/0086605 A1 | 4/2005 | Ferrer et al. | |
| 2005/0114753 A1 | 5/2005 | Kumar et al. | |
| 2005/0120306 A1 | 6/2005 | Klassen et al. | |
| 2005/0130631 A1 | 6/2005 | Maguire et al. | |
| 2005/0138552 A1 | 6/2005 | Venolia | |
| 2005/0143104 A1 | 6/2005 | Kim | |
| 2005/0144247 A1 | 6/2005 | Christensen et al. | |
| 2005/0144568 A1 | 6/2005 | Gruen et al. | |
| 2005/0169213 A1 | 8/2005 | Scian et al. | |
| 2005/0181821 A1 | 8/2005 | Elomaa et al. | |
| 2005/0188320 A1 | 8/2005 | Booking | |
| 2005/0191996 A1* | 9/2005 | Cha | H04M 1/0245 |
| | | | 455/418 |
| 2005/0193345 A1 | 9/2005 | Klassen et al. | |
| 2005/0198128 A1 | 9/2005 | Anderson et al. | |
| 2005/0210394 A1 | 9/2005 | Crandall et al. | |
| 2005/0223058 A1 | 10/2005 | Buchheit et al. | |
| 2005/0223066 A1 | 10/2005 | Buchheit et al. | |
| 2005/0233784 A1* | 10/2005 | You | H04M 1/0245 |
| | | | 455/418 |
| 2005/0278643 A1 | 12/2005 | Ukai et al. | |
| 2006/0001652 A1 | 1/2006 | Chiu et al. | |
| 2006/0002523 A1 | 1/2006 | Bettis et al. | |
| 2006/0005156 A1 | 1/2006 | Korpipää et al. | |
| 2006/0019639 A1 | 1/2006 | Adams et al. | |
| 2006/0026233 A1 | 2/2006 | Tenembaum et al. | |
| 2006/0031775 A1 | 2/2006 | Sattler et al. | |
| 2006/0044283 A1 | 3/2006 | Eri et al. | |
| 2006/0061545 A1 | 3/2006 | Hughes et al. | |
| 2006/0075027 A1 | 4/2006 | Zager et al. | |
| 2006/0084450 A1 | 4/2006 | Dam et al. | |
| 2006/0085505 A1* | 4/2006 | Gillum | G06Q 10/107 |
| | | | 713/170 |
| 2006/0094416 A1 | 5/2006 | Endo et al. | |
| 2006/0123353 A1 | 6/2006 | Matthews et al. | |
| 2006/0128404 A1 | 6/2006 | Klassen et al. | |
| 2006/0135136 A1 | 6/2006 | Kim et al. | |
| 2006/0152496 A1 | 7/2006 | Knaven | |
| 2006/0156245 A1 | 7/2006 | Williams et al. | |
| 2006/0161629 A1 | 7/2006 | Cohen et al. | |
| 2006/0168539 A1 | 7/2006 | Hawkins et al. | |
| 2006/0174207 A1 | 8/2006 | Deshpande | |
| 2006/0184886 A1 | 8/2006 | Chung et al. | |
| 2006/0187897 A1* | 8/2006 | Dabbs, III | H04L 12/189 |
| | | | 370/349 |
| 2006/0195787 A1 | 8/2006 | Topiwala et al. | |
| 2006/0205432 A1 | 9/2006 | Hawkins et al. | |
| 2006/0253787 A1 | 11/2006 | Fogg | |
| 2006/0277574 A1 | 12/2006 | Schein et al. | |
| 2006/0286968 A1* | 12/2006 | Klassen | G06Q 10/107 |
| | | | 455/412.1 |
| 2007/0004461 A1 | 1/2007 | Bathina et al. | |
| 2007/0033626 A1 | 2/2007 | Yang et al. | |
| 2007/0037605 A1 | 2/2007 | Logan et al. | |
| 2007/0053337 A1* | 3/2007 | Aoyama | H04M 1/72436 |
| | | | 370/347 |
| 2007/0073823 A1 | 3/2007 | Cohen | |
| 2007/0083623 A1 | 4/2007 | Nishimura et al. | |
| 2007/0085157 A1 | 4/2007 | Fadell et al. | |
| 2007/0093256 A1* | 4/2007 | Cha | H04M 1/0245 |
| | | | 455/455 |
| 2007/0097083 A1 | 5/2007 | Seok et al. | |
| 2007/0117549 A1 | 5/2007 | Arnos | |
| 2007/0124403 A1 | 5/2007 | Umezawa et al. | |
| 2007/0132738 A1 | 6/2007 | Lowles et al. | |
| 2007/0132789 A1 | 6/2007 | Ording et al. | |

(56) References Cited

U.S. PATENT DOCUMENTS

| | | |
|---|---|---|
| 2007/0150830 A1 | 6/2007 | Ording et al. |
| 2007/0150834 A1 | 6/2007 | Muller et al. |
| 2007/0150836 A1 | 6/2007 | Deggelmann et al. |
| 2007/0157106 A1 | 7/2007 | Bishop |
| 2007/0173233 A1 | 7/2007 | Vander Veen et al. |
| 2007/0173267 A1 | 7/2007 | Klassen et al. |
| 2007/0176898 A1 | 8/2007 | Suh et al. |
| 2007/0182595 A1 | 8/2007 | Ghasabian |
| 2007/0203991 A1 | 8/2007 | Fisher et al. |
| 2007/0213099 A1 | 9/2007 | Bast |
| 2007/0216659 A1 | 9/2007 | Amineh |
| 2007/0219857 A1 | 9/2007 | Seymour et al. |
| 2007/0224979 A1* | 9/2007 | O'Neal .................. G06Q 30/02 455/417 |
| 2007/0226652 A1 | 9/2007 | Kikuchi et al. |
| 2007/0236475 A1 | 10/2007 | Wherry |
| 2007/0243889 A1* | 10/2007 | Choi ...................... H04W 4/14 455/466 |
| 2007/0262951 A1 | 11/2007 | Huie et al. |
| 2007/0271527 A1 | 11/2007 | Paas et al. |
| 2007/0300140 A1 | 12/2007 | Makela et al. |
| 2008/0014989 A1 | 1/2008 | Sandegard et al. |
| 2008/0030496 A1 | 2/2008 | Lee et al. |
| 2008/0037722 A1* | 2/2008 | Klassen ............... H04M 1/7243 379/88.12 |
| 2008/0042978 A1 | 2/2008 | Perez-noguera |
| 2008/0051065 A1 | 2/2008 | Hong |
| 2008/0052945 A1 | 3/2008 | Matas et al. |
| 2008/0055264 A1 | 3/2008 | Anzures et al. |
| 2008/0059578 A1 | 3/2008 | Albertson et al. |
| 2008/0070593 A1 | 3/2008 | Altman et al. |
| 2008/0078758 A1 | 4/2008 | Shimura et al. |
| 2008/0094370 A1 | 4/2008 | Ording et al. |
| 2008/0094371 A1 | 4/2008 | Forstall et al. |
| 2008/0114841 A1 | 5/2008 | Lambert |
| 2008/0114849 A1 | 5/2008 | Yuyama |
| 2008/0120427 A1* | 5/2008 | Ramanathan ........... H04L 51/04 709/230 |
| 2008/0122796 A1 | 5/2008 | Jobs et al. |
| 2008/0133336 A1* | 6/2008 | Altman .................. H04W 4/21 705/14.1 |
| 2008/0146289 A1 | 6/2008 | Korneluk et al. |
| 2008/0153459 A1 | 6/2008 | Kansal et al. |
| 2008/0162649 A1 | 7/2008 | Lee et al. |
| 2008/0165136 A1 | 7/2008 | Christie et al. |
| 2008/0171535 A1 | 7/2008 | Carmody et al. |
| 2008/0178175 A1* | 7/2008 | Woundy ................ H04L 51/58 717/178 |
| 2008/0216022 A1 | 9/2008 | Lorch et al. |
| 2008/0222118 A1 | 9/2008 | Scian et al. |
| 2008/0261569 A1 | 10/2008 | Britt et al. |
| 2008/0262715 A1* | 10/2008 | Geelen ................ G01C 21/3655 701/533 |
| 2008/0268901 A1 | 10/2008 | Miramontes et al. |
| 2008/0270560 A1 | 10/2008 | Tysowski et al. |
| 2008/0307305 A1 | 12/2008 | Klassen et al. |
| 2008/0310602 A1 | 12/2008 | Bhupati |
| 2009/0003552 A1 | 1/2009 | Goldman et al. |
| 2009/0003620 A1 | 1/2009 | Mckillop et al. |
| 2009/0005011 A1 | 1/2009 | Christie et al. |
| 2009/0005089 A1* | 1/2009 | Paik ........................ H04L 51/04 455/466 |
| 2009/0007001 A1 | 1/2009 | Morin et al. |
| 2009/0037536 A1 | 2/2009 | Braam |
| 2009/0042607 A1 | 2/2009 | Adachi et al. |
| 2009/0049502 A1 | 2/2009 | Levien et al. |
| 2009/0051648 A1 | 2/2009 | Shamaie et al. |
| 2009/0082043 A1* | 3/2009 | Lazaridis .......... H04M 1/72436 455/466 |
| 2009/0088204 A1 | 4/2009 | Culbert et al. |
| 2009/0106376 A1 | 4/2009 | Tom et al. |
| 2009/0138828 A1 | 5/2009 | Schultz et al. |
| 2009/0164219 A1 | 6/2009 | Yeung et al. |
| 2009/0176517 A1* | 7/2009 | Christie .................. H04L 51/23 455/466 |
| 2009/0187842 A1 | 7/2009 | Collins et al. |
| 2009/0209293 A1 | 8/2009 | Louch |
| 2009/0248751 A1 | 10/2009 | Myman et al. |
| 2009/0265643 A1* | 10/2009 | Jachner .................. H04L 51/04 715/758 |
| 2009/0313582 A1 | 12/2009 | Rupsingh et al. |
| 2010/0069104 A1* | 3/2010 | Neil ........................ H04L 51/58 709/206 |
| 2010/0094809 A1 | 4/2010 | Consul et al. |
| 2010/0121636 A1 | 5/2010 | Burke et al. |
| 2010/0124906 A1 | 5/2010 | Hautala |
| 2010/0162138 A1 | 6/2010 | Pascal et al. |
| 2010/0164897 A1 | 7/2010 | Morin et al. |
| 2010/0273456 A1 | 10/2010 | Wolovitz et al. |
| 2010/0287249 A1 | 11/2010 | Yigang et al. |
| 2010/0318928 A1 | 12/2010 | Neuman et al. |
| 2010/0332518 A1 | 12/2010 | Song et al. |
| 2011/0054830 A1 | 3/2011 | Logan |
| 2011/0080356 A1 | 4/2011 | Kang et al. |
| 2011/0092190 A1 | 4/2011 | Willey et al. |
| 2011/0164058 A1 | 7/2011 | Lemay |
| 2011/0276901 A1 | 11/2011 | Zambetti et al. |
| 2011/0304648 A1 | 12/2011 | Kim et al. |
| 2012/0022872 A1 | 1/2012 | Gruber et al. |
| 2012/0038546 A1 | 2/2012 | Cromer et al. |
| 2012/0054278 A1 | 3/2012 | Taleb et al. |
| 2012/0054655 A1 | 3/2012 | Kang et al. |
| 2012/0131458 A1 | 5/2012 | Hayes et al. |
| 2012/0149405 A1 | 6/2012 | Bhat |
| 2012/0157114 A1 | 6/2012 | Alameh et al. |
| 2012/0254324 A1 | 10/2012 | Majeti et al. |
| 2012/0254325 A1 | 10/2012 | Majeti et al. |
| 2012/0306770 A1 | 12/2012 | Moore et al. |
| 2012/0313847 A1 | 12/2012 | Boda et al. |
| 2013/0026293 A1 | 1/2013 | Schneider et al. |
| 2013/0053007 A1 | 2/2013 | Cosman et al. |
| 2013/0067027 A1 | 3/2013 | Song et al. |
| 2013/0091298 A1 | 4/2013 | Ozzie et al. |
| 2013/0091443 A1 | 4/2013 | Park et al. |
| 2013/0093833 A1 | 4/2013 | Al-asaaed et al. |
| 2013/0132865 A1 | 5/2013 | Li |
| 2013/0212470 A1 | 8/2013 | Karunamuni et al. |
| 2013/0243924 A1 | 9/2013 | Bhandari et al. |
| 2013/0254714 A1 | 9/2013 | Shin et al. |
| 2013/0282180 A1 | 10/2013 | Layton |
| 2013/0282844 A1 | 10/2013 | Logan et al. |
| 2013/0310089 A1 | 11/2013 | Gianoukos et al. |
| 2014/0026073 A1 | 1/2014 | Christie et al. |
| 2014/0032682 A1 | 1/2014 | Prado et al. |
| 2014/0055552 A1 | 2/2014 | Song et al. |
| 2014/0059448 A1 | 2/2014 | Lee |
| 2014/0082501 A1 | 3/2014 | Bae et al. |
| 2014/0085487 A1 | 3/2014 | Park et al. |
| 2014/0136990 A1 | 5/2014 | Gonnen et al. |
| 2014/0222933 A1 | 8/2014 | Stovicek et al. |
| 2014/0344711 A1 | 11/2014 | Hallerstrom Sjostedt et al. |
| 2014/0354527 A1 | 12/2014 | Chen et al. |
| 2015/0040029 A1 | 2/2015 | Koum et al. |
| 2015/0042852 A1 | 2/2015 | Lee et al. |
| 2015/0095804 A1 | 4/2015 | Grossman et al. |
| 2015/0169893 A1 | 6/2015 | Desai |
| 2015/0172393 A1 | 6/2015 | Oplinger et al. |
| 2015/0172584 A1 | 6/2015 | Park et al. |
| 2015/0177914 A1 | 6/2015 | Coyner et al. |
| 2015/0188869 A1 | 7/2015 | Smilak et al. |
| 2015/0201062 A1 | 7/2015 | Shih et al. |
| 2015/0264004 A1 | 9/2015 | Khoo |
| 2015/0264303 A1 | 9/2015 | Chastney et al. |
| 2015/0271120 A1 | 9/2015 | Langholz |
| 2015/0312184 A1 | 10/2015 | Langholz et al. |
| 2015/0312185 A1 | 10/2015 | Langholz et al. |
| 2015/0319006 A1 | 11/2015 | Plummer et al. |
| 2015/0326510 A1 | 11/2015 | Tomlinson et al. |
| 2015/0331881 A1 | 11/2015 | Myles |
| 2015/0350141 A1 | 12/2015 | Yang et al. |
| 2015/0370426 A1 | 12/2015 | Carrigan et al. |
| 2016/0054841 A1 | 2/2016 | Yang et al. |

(56) References Cited

U.S. PATENT DOCUMENTS

| | | |
|---|---|---|
| 2016/0080552 A1 | 3/2016 | Keating et al. |
| 2016/0085393 A1 | 3/2016 | Lemay et al. |
| 2016/0088146 A1 | 3/2016 | Ying et al. |
| 2016/0099901 A1 | 4/2016 | Allen et al. |
| 2016/0165600 A1 | 6/2016 | Choi et al. |
| 2016/0231902 A1 | 8/2016 | Sirpal et al. |
| 2016/0277885 A1 | 9/2016 | Shan et al. |
| 2016/0277903 A1 | 9/2016 | Poosala et al. |
| 2016/0294958 A1 | 10/2016 | Zhang et al. |
| 2016/0320849 A1 | 11/2016 | Koo |
| 2016/0335041 A1 | 11/2016 | Wachter et al. |
| 2017/0083189 A1 | 3/2017 | Yang et al. |
| 2017/0083202 A1 | 3/2017 | Yang et al. |
| 2017/0097621 A1 | 4/2017 | Ackmann et al. |
| 2017/0206779 A1 | 7/2017 | Lee et al. |
| 2017/0220212 A1 | 8/2017 | Yang et al. |
| 2017/0255359 A1 | 9/2017 | Lemay et al. |
| 2017/0357425 A1 | 12/2017 | Smith et al. |
| 2017/0357434 A1 | 12/2017 | Coffman et al. |
| 2017/0359191 A1 | 12/2017 | Smith et al. |
| 2018/0101297 A1 | 4/2018 | Yang et al. |
| 2018/0227341 A1 | 8/2018 | Rizzi |
| 2018/0228003 A1 | 8/2018 | O'driscoll et al. |
| 2018/0308480 A1 | 10/2018 | Jang et al. |
| 2018/0329672 A1 | 11/2018 | Sadak et al. |
| 2018/0332559 A1 | 11/2018 | Gudivada et al. |
| 2018/0341448 A1 | 11/2018 | Behzadi et al. |
| 2018/0352072 A1 | 12/2018 | Christie et al. |
| 2018/0364665 A1 | 12/2018 | Clymer et al. |
| 2019/0025943 A1 | 1/2019 | Jobs et al. |
| 2019/0028419 A1 | 1/2019 | Sullivan |
| 2019/0102145 A1 | 4/2019 | Wilberding et al. |
| 2019/0138951 A1 | 5/2019 | Brownhill et al. |
| 2019/0361575 A1 | 11/2019 | Ni et al. |
| 2020/0050502 A1 | 2/2020 | Ghafourifar et al. |
| 2020/0135191 A1 | 4/2020 | Nourbakhsh |
| 2020/0152186 A1 | 5/2020 | Koh et al. |
| 2020/0186378 A1 | 6/2020 | Six et al. |
| 2020/0302913 A1 | 9/2020 | Marcinkiewicz |
| 2020/0348807 A1 | 11/2020 | Garcia et al. |
| 2020/0395012 A1 | 12/2020 | Kim et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0266274 A1 | 8/2021 | Liu et al. |
| 2021/0323406 A1 | 10/2021 | So et al. |
| 2021/0349680 A1 | 11/2021 | Kim et al. |
| 2021/0352172 A1 | 11/2021 | Kim et al. |
| 2022/0004356 A1 | 1/2022 | Kim et al. |
| 2023/0041125 A1 | 2/2023 | Kim et al. |
| 2023/0079965 A1 | 3/2023 | Garcia et al. |

FOREIGN PATENT DOCUMENTS

| | | |
|---|---|---|
| CN | 102215374 A | 10/2011 |
| CN | 103119968 A | 5/2013 |
| CN | 103207674 A | 7/2013 |
| CN | 103309606 A | 9/2013 |
| CN | 103399703 A | 11/2013 |
| CN | 103440247 A | 12/2013 |
| CN | 103473004 A | 12/2013 |
| CN | 103581544 A | 2/2014 |
| CN | 103583031 A | 2/2014 |
| CN | 103685729 A | 3/2014 |
| CN | 103959751 A | 7/2014 |
| CN | 205263700 U | 5/2016 |
| CN | 105900376 A | 8/2016 |
| CN | 109196825 A | 1/2019 |
| EP | 0464712 A2 | 1/1992 |
| EP | 0880091 A2 | 11/1998 |
| EP | 1347361 A1 | 9/2003 |
| EP | 1517228 A2 | 3/2005 |
| EP | 2490432 A1 | 8/2012 |
| EP | 2582120 A1 | 4/2013 |
| EP | 3038427 A1 | 6/2016 |
| JP | 9-259063 A | 10/1997 |
| JP | 9-265457 A | 10/1997 |
| JP | 11-98249 A | 4/1999 |
| JP | 2000-59422 A | 2/2000 |
| JP | 2000-99225 A | 4/2000 |
| JP | 2002-82893 A | 3/2002 |
| JP | 2002-163217 A | 6/2002 |
| JP | 2002-351789 A | 12/2002 |
| JP | 2003-141050 A | 5/2003 |
| JP | 2003-233568 A | 8/2003 |
| JP | 2005-86624 A | 3/2005 |
| JP | 2005-92441 A | 4/2005 |
| JP | 2006-72489 A | 3/2006 |
| JP | 2006-135667 A | 5/2006 |
| JP | 2008-99330 A | 4/2008 |
| JP | 2008-526156 A | 7/2008 |
| JP | 2008-546069 A | 12/2008 |
| JP | 2010-503126 A | 1/2010 |
| JP | 2010-503332 A | 1/2010 |
| JP | 2011-65654 A | 3/2011 |
| JP | 2011-107823 A | 6/2011 |
| JP | 2012-508530 A | 4/2012 |
| JP | 2013-542522 A | 11/2013 |
| JP | 2014-71835 A | 4/2014 |
| JP | 2014-87126 A | 5/2014 |
| JP | 2014-170982 A | 9/2014 |
| JP | 2018-7158 A | 1/2018 |
| KR | 10-2004-0089329 A | 10/2004 |
| KR | 10-2020-0039030 A | 4/2020 |
| WO | 1998/33111 A1 | 7/1998 |
| WO | 2003/056789 A1 | 7/2003 |
| WO | 2006/020305 A2 | 2/2006 |
| WO | 2008/030972 A1 | 3/2008 |
| WO | 2009/071112 A1 | 6/2009 |
| WO | 2010/054373 A2 | 5/2010 |
| WO | 2012/166277 A1 | 12/2012 |
| WO | 2013/048880 A1 | 4/2013 |
| WO | 2013/169875 A2 | 11/2013 |
| WO | 2015/183755 A1 | 12/2015 |
| WO | 2017/218143 A1 | 12/2017 |
| WO | 2018/213401 A1 | 11/2018 |
| WO | 2018/213415 A1 | 11/2018 |
| WO | 2018/232333 A1 | 12/2018 |

OTHER PUBLICATIONS

Notice of Allowance received for U.S. Appl. No. 17/027,373, dated Jun. 3, 2022, 8 pages.
Applicant-Initiated Interview Summary received for U.S. Appl. No. 16/936,164, dated Aug. 23, 2022, 5 pages.
Communication of the Board of Appeal received for European Patent Application No. 15729286.3, dated Oct. 6, 2022, 8 pages.
Corrected Notice of Allowance received for U.S. Appl. No. 16/936,164, dated Oct. 13, 2022, 3 pages.
Notice of Allowance received for U.S. Appl. No. 17/027,373, dated Oct. 3, 2022, 5 pages.
Office Action received for Chinese Patent Application No. 202111652452.4, dated Aug. 29, 2022, 23 pages (12 pages of English Translation and 11 pages of Official Copy).
Notice of Acceptance received for Australian Patent Application No. 2020239711, dated Dec. 16, 2021, 3 pages.
Office Action received for Indian Patent Application No. 202014041529, dated Dec. 6, 2021, 6 pages.
Office Action received for Japanese Patent Application No. 2020-159840, dated Dec. 10, 2021, 13 pages (7 pages of English Translation and 6 pages of Official Copy).
Non-Final Office Action received for U.S. Appl. No. 16/936,164, dated Jan. 18, 2022, 18 pages.
Non-Final Office Action received for U.S. Appl. No. 17/027,373, dated Feb. 2, 2022, 17 pages.
Applicant-Initiated Interview Summary received for U.S. Appl. No. 17/476,404, dated Dec. 20, 2022, 2 pages.
Decision of Board of Appeal received for European Patent Application No. 15728307.8, dated Dec. 8, 2022, 17 pages.

(56) References Cited

OTHER PUBLICATIONS

Invitation to Pay Search Fees received for European Patent Application No. 21728781.2, dated Dec. 2, 2022, 3 pages.
Minutes of the Oral Proceedings received for European Patent Application No. 15729286.3, dated Dec. 6, 2022, 5 pages.
Office Action received for Australian Patent Application No. 2022201532, dated Dec. 19, 2022, 5 pages.
Office Action received for Australian Patent Application No. 2021202815, dated Apr. 11, 2022, 2 pages.
Adium, "AboutAdium—Adium X—Trac", Available Online at: http://web.archive.org/web/20070819113247/http://trac.adiumx.com/wiki/AboutAdium, retrieved on Nov. 25, 2011, 2 pages.
Advisory Action received for U.S. Appl. No. 13/908,998, dated Nov. 10, 2015, 3 pages.
Ahuja et al., "A Comparison of Application Sharing Mechanisms In Real-Time Desktop Conferencing Systems", AT&T Bell Laboratories, 1990, pp. 238-248.
Apple Computer, Inc., "Welcome to Tiger", Available Online at: http://www.maths.dundee.ac.uk/software/Welcome_to_Mac_OS_X_v10.4_Tiger.pdf, 2005, pp. 1-32.
Applicant-Initiated Interview Summary received for U.S. Appl. No. 15/960,330, dated Aug. 11, 2020, 3 pages.
Applicant-Initiated Interview Summary received for U.S. Appl. No. 15/960,330, dated Jan. 21, 2021, 5 pages.
Arango et al., "Touring Machine: A Software Platform for Distributed Multimedia Applications", 1992 IFIP International Conference on Upper Layer Protocols, Architectures, and Applications, May 1992, pp. 1-11.
Betts et al., "Goals and Objectives for User Interface Software", Computer Graphics, vol. 21, No. 2, Apr. 1987, pp. 73-78.
Bleher et al., "A Graphic Interactive Application Monitor", IBM Systems Journal, vol. 19, No. 3, Sep. 1980, pp. 382-402.
Borenstein et al., "Cooperative Work in the Andrew Message System", ACM Digital Library, 1988, pp. 306-323.
Bussler et al., "Web Service Execution Environment (WSMX)", retrieved from Internet on Sep. 17, 2012, Available Online at: http://www.w3.org/Submission/WSMX, Jun. 3, 2005, 29 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Casner et al., "N-Way Conferencing with Packet Video", The Third International Workshop on Packet Video, Mar. 22-23, 1990, pp. 1-6.
Chartier David, "Using Multi-Network Meebo Chat Service on Your iPhone", Available Online at: http://www.tuaw.com/2007/07/04/using-multi-network-meebo-chat-service-on-your-iphone/, Jul. 4, 2007, 5 pages.
Cheyer Adam, "A Perspective on AI & Agent Technologies for SCM", VerticalNet presentation, 2001, 22 pages.
Cheyer Adam, "Adam Cheyer—About", Available Online at http://www.adam.cheyer.com/about.html, retrieved on Sep. 17, 2012, pp. 1-2.
Conklin Jeffrey, "A Survey of Hypertext", MCC Software Technology Program, Dec. 1987, 40 pages.
Corrected Notice of Allowance received for U.S. Appl. No. 12/163,908, dated Feb. 22, 2018, 8 pages.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW90 Proceedings, Oct. 1990, pp. 329-342.
Decision to Grant received for Chinese Patent Application No. 200780041351.5, dated Jun. 12, 2013, 3 pages.
Decision to Grant received for Japanese Patent Application No. 2009-527503, dated Oct. 12, 2012, 3 pages.
Decision to Grant received for Japanese Patent Application No. 2012-246631, dated May 11, 2015, 6 pages.
Del Strother Jonathan, "Coverflow", Available Online at: http://www.steelskies.com/coverflow, retrieved on Jun. 15, 2006, 14 pages.
Domingue et al., "Web Service Modeling Ontology (WSMO)—An Ontology for Semantic Web Services", Position Paper at the W3C Workshop on Frameworks for Semantics in Web Services, Innsbruck, Austria, Jun. 2005, 6 pages.
Donahue et al., "Whiteboards: A Graphical Database Tool", ACM Transactions on Office Information Systems, vol. 4, No. 1, Jan. 1986, pp. 24-41.
Dourish et al., "Portholes: Supporting Awareness in a Distributed Work Group", Proceedings of the SIGCHI conference on Human factors in Computing Systems, May 1992, pp. 541-547.
Egido Carmen, "Video Conferencing as a Technology to Support Group Work: A Review of its Failures", Bell Communications Research, 1988, pp. 13-24.
Elliot Chip, "High-Quality Multimedia Conferencing Through a Long-Haul Packet Network", BBN Systems and Technologies, 1993, pp. 91-98.
Extended European Search Report (includes Partial European Search Report and European Search Opinion) received for European Patent Application No. 13155688.8, dated Aug. 22, 2013, 11 pages.
Final Office Action received for U.S. Appl. No. 10/428,523, dated Apr. 22, 2009, 22 pages.
Final Office Action received for U.S. Appl. No. 10/428,523, dated Nov. 29, 2007, 19 pages.
Final Office Action received for U.S. Appl. No. 11/688,664, dated Feb. 22, 2010, 18 pages.
Final Office Action received for U.S. Appl. No. 11/688,664, dated Mar. 15, 2011, 19 pages.
Final Office Action received for U.S. Appl. No. 11/848,208, dated Nov. 4, 2011, 20 pages.
Final Office Action received for U.S. Appl. No. 11/848,208, dated Oct. 9, 2014, 15 pages.
Final Office Action received for U.S. Appl. No. 12/163,908, dated Nov. 7, 2012, 15 pages.
Final Office Action received for U.S. Appl. No. 12/242,846, dated Jun. 5, 2012, 14 pages.
Final Office Action received for U.S. Appl. No. 12/726,247, dated Mar. 18, 2011, 28 pages.
Final Office Action received for U.S. Appl. No. 13/908,998, dated Aug. 17, 2015, 23 pages.
Final Office Action received for U.S. Appl. No. 15/960,330, dated Nov. 10, 2020, 19 pages.
Fisher et al., "Virtual Environment Display System", Interactive 3D Graphics, Oct. 23-24, 1986, pp. 77-87.
Forsdick Harry, "Explorations into Real-Time Multimedia Conferencing", Proceedings of the Ifip Tc 6 International Symposium on Computer Message Systems, 1986, pp. 331-347.
Gardner, Jr. P.C, "A System for the Automated Office Environment", IBM Systems Journal, vol. 20, No. 3, 1981, pp. 321-345.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Gmail, "About Group Chat", Available Online at http://mail.google.com/support/bin/answer.py?answer=81090, Nov. 26, 2007, 2 pages.
Good et al., "Building a User-Derived Interface", Communications of the ACM; (Oct. 1984) vol. 27, No. 10, Oct. 1984, pp. 1032-1043.
Gruhn et al., "A Research Perspective on Computer-Assisted Office Work", IBM Systems Journal, vol. 18, No. 3, 1979, pp. 432-456.
Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.
Halbert D.C, "Programming by Example", Dept. Electrical Engineering and Comp. Sciences, University of California, Berkley, Nov. 1984, 81 pages.
Hill R.D, "Some Important Features and Issues in User Interface Management System", Dynamic Graphics Project, University of Toronto, CSRI, vol. 21, No. 2, Apr. 1987, pp. 116-120.
Hiroshi, "Teamwork Station: Towards a Seamless Shared Workspace", NTT Human Interface Laboratories, CSCW90 Proceedings, Oct. 1990, pp. 13-26.
Hopper Andy, "Pandora—An Experimental System for Multimedia Applications", Olivetti Research Laboratory, Apr. 1990, pp. 19-34.

(56) References Cited

OTHER PUBLICATIONS

Howard Johnh, "(Abstract) An Overview of the Andrew File System", Information Technology Center, Carnegie Mellon University; (CMU-ITC-88-062) To Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, pp. 1-10.
Ichat AV, "Video Conferencing for the Rest of US", Apple—Mac OS X—iChat AV, Available Online at: http://www.apple.com/macosx/features/ichat/html, retrieved on Apr. 13, 2006, 3 pages.
International Preliminary Report on Patentability received for PCT Patent Application No. PCT/US2007/077424, dated Mar. 10, 2009, 9 pages.
International Search Report and Written Opinion received for PCT Patent Application No. PCT/US2007/077424, dated Jun. 19, 2008, 13 pages.
Invitation to Pay Additional Fees and Partial Search Report received for PCT Application No. PCT/US2007/077424, dated Apr. 29, 2008, 6 pages.
Iphone Hacks, "Native iPhone MMS Application Released", Available Online at http://www.iphonehacks.com/2007/12/iphone-mms-app.html, retrieved on Dec. 25, 2007, 5 pages.
Iphonechat, "iChat for iPhone in JavaScript", Available Online at http://www.publictivity.com/iPhoneChat/, retrieved on Dec. 25, 2007, 2 pages.
Jaybird, "Everything Wrong with AIM: Because We've All Thought About It", Available Online at: http://www.psychonoble.com/archives/articles/82.html, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 1-16.
Kaeppner et al., "Architecture of HeiPhone: A Testbed for Audio/Video Teleconferencing", IBM European Networking Center, 1993, 51 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991, 14 pages.
Kurlander et al., "Comic Chat", [Online], 1996 [Retrieved on: Feb. 4, 2013, SIGGRAPH '96 Proceedings of the 23rd annual conference on Computer graphics and interactive techniques, Available Online at: http://delivery.acm.org/10.1145/240000/237260/p225-kurlander.pdf, 1996, pp. 225-236.
Lantz et al., "Towards a Universal Directory Service", Departments of Computer Science and Electrical Engineering, Stanford University, 1985, pp. 250-260.
Lantz Keith, "An Experiment in Integrated Multimedia Conferencing", Department of Computer Science, Stanford University, 1986, pp. 267-275.
Lauwers et al., "Collaboration Awareness in Support of Collaboration Transparency Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Meyer Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Morland D.V, "Human Factors Guidelines for Terminal Interface Design", Communications of the ACM vol. 26, No. 7, Jul. 1983, pp. 484-494.
Morris et al., "Andrew: A Distributed Personal Computing Environment", Communications of the ACM, (Mar. 1986); vol. 29 No. 3, Mar. 1986, pp. 184-201.
Muller et al., "CSCW'92 Demonstrations", 1992, pp. 11-14.
Non-Final Office Action received for U.S. Appl. No. 13/908,998, dated Mar. 3, 2015, 26 pages.
Non-Final Office Action received for U.S. Appl. No. 10/428,523, dated Apr. 12, 2007, 11 pages.
Non-Final Office Action received for U.S. Appl. No. 10/428,523, dated Jul. 9, 2008, 19 pages.
Non-Final Office Action received for U.S. Appl. No. 11/688,664, dated Jul. 19, 2012, 16 pages.
Non-Final Office Action received for U.S. Appl. No. 11/688,664, dated Jul. 22, 2009, 16 pages.
Non-Final Office Action received for U.S. Appl. No. 11/688,664, dated Sep. 29, 2010, 23 pages.
Non-Final Office Action received for U.S. Appl. No. 11/848,208, dated Apr. 1, 2011,8 pages.
Non-Final Office Action received for U.S. Appl. No. 11/848,208, dated Dec. 23, 2013, 13 pages.
Non-Final Office Action received for U.S. Appl. No. 12/163,908, dated Apr. 7, 2017, 13 pages.
Non-Final Office Action received for U.S. Appl. No. 12/163,908, dated Jun. 13, 2012, 17 pages.
Non-Final Office Action received for U.S. Appl. No. 12/242,846, dated Oct. 19, 2011, 17 pages.
Non-Final Office Action received for U.S. Appl. No. 12/726,247, dated Jul. 18, 2012, 23 pages.
Non-Final Office Action received for U.S. Appl. No. 12/726,247, dated Sep. 28, 2010, 27 pages.
Non-Final Office Action received for U.S. Appl. No. 14/963,044, dated May 9, 2016, 9 pages.
Non-Final Office Action received for U.S. Appl. No. 15/960,330, dated Apr. 28, 2020, 20 pages.
Notenboom Leoa, "Can I Retrieve Old MSN Messenger Conversations?", Available Online at: http://ask-leo.com/can_i_retrieve_old_msn_messenger_conversations.html, Mar. 11, 2004, 23 pages.
Notice of Allowance received for Canadian Patent Application No. 2,661,886, dated Jan. 7, 2014, 1 page.
Notice of Allowance received for Chinese Patent Application No. 201310169099.3, dated May 11, 2016, 4 pages.
Notice of Allowance received for U.S. Appl. No. 12/242,846, dated Dec. 7, 2012, 9 pages.
Notice of Allowance received for U.S. Appl. No. 12/242,846, dated Feb. 5, 2013, 9 pages.
Notice of Allowance received for U.S. Appl. No. 10/428,523, dated Oct. 5, 2009, 10 pages.
Notice of Allowance received for U.S. Appl. No. 11/688,664, dated Feb. 8, 2013, 12 pages.
Notice of Allowance received for U.S. Appl. No. 11/848,208, dated Jan. 15, 2016, 14 pages.
Notice of Allowance received for U.S. Appl. No. 12/163,908, dated Nov. 30, 2017, 13 pages.
Notice of Allowance received for U.S. Appl. No. 12/726,247, dated Feb. 8, 2013, 10 pages.
Notice of Allowance received for U.S. Appl. No. 12/726,247, dated May 30, 2013, 10 pages.
Notice of Allowance received for U.S. Appl. No. 14/963,044, dated Nov. 7, 2016, 8 pages.
Notice of Allowance received for U.S. Appl. No. 15/960,330, dated Apr. 30, 2021, 18 pages.
Notice of Intent to Issue a Reexam Certificate received for U.S. Appl. No. 90/013,163, dated Jan. 29, 2015, 22 pages.
Notice of Restriction Requirement received for U.S. Appl. No. 10/428,523, dated Dec. 29, 2006, 4 pages.
Office Action received for Canadian Patent Application No. 2,661,886, dated Jul. 14, 2010, 3 pages.
Office Action received for Canadian Patent Application No. 2,661,886, dated Nov. 7, 2011,3 pages.
Office Action received for Chinese Patent Application No. 200780041351.5, dated Aug. 3, 2012, 6 pages.
Office Action received for Chinese Patent Application No. 200780041351.5, dated Dec. 6, 2010, 5 pages.
Office Action received for Chinese Patent Application No. 200780041351.5, dated Nov. 3, 2011, 14 pages.

(56) References Cited

OTHER PUBLICATIONS

Office Action received for Chinese Patent Application No. 201080001767.6, dated Sep. 16, 2014, 11 pages.
Office Action received for Chinese Patent Application No. 201310169099.3, dated Dec. 7, 2015, 6 pages.
Office Action received for Chinese Patent Application No. 2013101690993, dated Jul. 2, 2015, 15 pages.
Office Action received for European Patent Application No. 07841749.0, dated Feb. 18, 2011,4 pages.
Office Action received for European Patent Application No. 07841749.0, dated Nov. 14, 2012, 5 pages.
Office Action received for European Patent Application No. 13155688.8, dated Jan. 2, 2017, 7 pages.
Office Action received for Japanese Patent Application No. 2009-527503, dated Sep. 16, 2011, 7 pages.
Office Action received for Japanese Patent Application No. 2012-246631, dated Nov. 18, 2013, 4 pages.
Office Action received for Japanese Patent Application No. 2012-246631, dated Oct. 17, 2014, 5 pages.
Padilla Alfredo, "Palm Treo 750 Cell Phone Review—Messaging", Available Online at: http://www.wirelessinfo.com/content/palm-Treo-750-Cell-Phone-Review/Messaging.htm, Mar. 17, 2007, 6 pages.
Palay et al., "The Andrew Toolkit: An Overview", Information Technology Center, Carnegie-Mellon University, 1988, pp. 1-15.
Palm User Guide, 2005-2007, 755 pages.
Palm, Inc, "User Guide: Your Palm Treo.TM. 755p Smartphone", 2005-2007, 304 pages.
Patterson et al., "Rendezvous: An Architecture for Synchronous Multi-User Applications", CSCW '90 Proceedings, 1990, pp. 317-328.
Pearl Amy, "System Support for Integrated Desktop Video Conferencing", Sunmicrosystems Laboratories, Dec. 1992, pp. 1-15.
Phillips Dick, "The Multi-Media Workstation", SIGGRAPH '89 Panel Proceedings, 1989, pp. 93-109.
Raper Larryk, "The C-MU PC Server Project", (CMU-ITC-86-051), Dec. 1986, pp. 1-30.
Reexam Non-Final Office Action received for U.S. Appl. No. 90/013,163, dated Aug. 1, 2014, 45 pages.
Request for Ex-Parte Reexamination, received for U.S. Appl. No. 90/013,163, filed Feb. 25, 2014, 265 pages.
Roddy et al., "Communication and Collaboration in a Landscape of B2B eMarketplaces", Vertical Net Solutions, A Business White Paper, Jun. 15, 2000, 23 pages.
Roddy et al., "Interface Issues in Text Based Chat Rooms", SIGCHI Bulletin, vol. 30, No. 2, Apr. 1998, pp. 119-123.
Root Robert, "Design of a Multi-Media Vehicle for Social Browsing", Bell Communications Research, 1988, pp. 25-38.
Rosenberg et al., "An Overview of the Andrew Message System", Information Technology Center Carnegie-Mellon University, Jul. 1987, pp. 99-108.
Scheifler R.W, "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schooler et al., "A Packet-switched Multimedia Conferencing System", By Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler Eve, "A Distributed Architecture for Multimedia Conference Control", ISI Research Report, Nov. 1991, pp. 1-18.
Schooler Evem, "Case Study: Multimedia Conference Control in a Packet-Switched Teleconferencing System", Journal of Internetworking: Research and Experience, vol. 4, No. 2, Jun. 1993, pp. 99-120.
Schooler Evem, "The Impact of Scaling on a Multimedia Connection Architecture", Journal of Multimedia Systems, vol. 1, No. 1, Aug. 1993, 11 pages.
Smith et al., "Guidelines for Designing User Interface Software", User Lab, Inc., Aug. 1986, pp. 1-384.
Srinivas et al., "Monet: A Multi-Media System for Conferencing and Application Sharing in Distributed Systems", CERC Technical Report Series Research Note, Feb. 1992, 19 pages.
Summon to Attend Oral Proceedings received for European Patent Application No. 07841749.0, mailed on Jun. 21, 2016, 12 pages.
Summons to Attend Oral Proceedings received for European Patent Application No. 07841749.0, mailed on Mar. 6, 2017, 19 pages.
Supplemental Non-Final Office Action received for U.S. Appl. No. 11/848,208, dated Apr. 20, 2011, 15 pages.
Tidwell Jenifer, "Animated Transition", Designing Interfaces, Patterns for effective Interaction Design, First Edition, Nov. 2005, 4 pages.
Tidwell Jenifer, "Designing Interfaces, Animated Transition", Achieved by Internet Wayback Machine, Available Online at https://web.archive.org/web/20060205040223/http://designinginterfaces.com:80/Animated Transition, retrieved on Mar. 20, 2018, 2005, 2 pages.
Touch Joseph, "Zoned Analog Personal Teleconferencing", USC / Information Sciences Institute, 1993, pp. 1-19.
Trigg et al., "Hypertext Habitats: Experiences of Writers in Note Cards", Hypertext '87 Papers; Intelligent Systems Laboratory, Xerox Palo Alto Research Center, 1987, pp. 89-108.
Trowbridge David, "Using Andrew for Development of Educational Applications", Center for Design of Educational Computing, Carnegie-Mellon University (CMU-ITC-85-065), Jun. 2, 1985, pp. 1-6.
Turletti Thierry, "The INRIA Videoconferencing System (IVS)", Oct. 1994, pp. 1-7.
Viegas et al., "Chat Circles", SIGCHI Conference on Human Factors in Computing Systems, May 15-20, 1999, pp. 9-16.
Wadlow M.G, "The Role of Human Interface Guidelines in the Design of Multimedia Applications", Carnegie Mellon University (To be Published in Current Psychology Research and Reviews, Summer 1990 (CMU-ITC-91-101), 1990, pp. 1-22.
Walker et al., "The LOCUS Distributed Operating System", University of California at Los Angeles, 1983, pp. 49-70.
Watabe et al., "Distributed Multiparty Desktop Conferencing System: MERMAID", CSCW 90 Proceedings, Oct. 1990, pp. 27-38.
Wirelessinfo, "SMS/MMS Ease of Use (8.0)", Available Online at: http://www.wirelessinfo.com/content/palm-Treo-750-Cell-Phone-Review/Messaging.htm, Mar. 2007, 3 pages.
Zelig, "A Review of the Palm Treo 750v", Available Online at: http://www.mtekk.com.au/Articles/tabid/54/articleType/ArticleView/articleId/769/A-Review-of-the-Palm-Treo-750v.aspx, Feb. 5, 2007, 3 pages.
Ziegler, Jr. K, "A Distributed Information System Study", IBM Systems Journal, vol. 18, No. 3, 1979, pp. 374-401.
Intention to Grant received for Danish Patent Application No. PA202070617, dated Nov. 15, 2021, 2 pages.
Final Office Action received for U.S. Appl. No. 17/476,404, dated May 5, 2022, 30 pages.
Applicant-Initiated Interview Summary received for U.S. Appl. No. 17/476,404, dated Jul. 27, 2022, 6 pages.
Corrected Notice of Allowance received for U.S. Appl. No. 17/027,373, dated Jul. 12, 2022, 2 pages.
Notice of Allowance received for Japanese Patent Application No. 2020-159840, dated Jul. 8, 2022, 4 pages (1 page of English Translation and 3 pages of Official Copy).
International Preliminary Report on Patentability received for PCT Patent Application No. PCT/US2021/031760, dated Nov. 24, 2022, 11 pages.
Minutes of Oral Proceedings received for European Patent Application No. 15728307.8, dated Nov. 11, 2022, 4 pages.
Notice of Allowance received for U.S. Appl. No. 17/027,373, dated Aug. 2, 2022, 2 pages.
Examiner-Initiated Interview Summary received for U.S. Appl. No. 17/027,373, dated Mar. 31, 2022, 4 pages.

(56) References Cited

OTHER PUBLICATIONS

Office Action received for Japanese Patent Application No. 2020-159840, dated Mar. 28, 2022, 6 pages (3 pages of English Translation and 3 pages of Official Copy).
Communication of the Board of Appeal received for European Patent Application No. 15728307.8, dated Sep. 14, 2022, 9 pages.
Non-Final Office Action received for U.S. Appl. No. 17/476,404, dated Sep. 14, 2022, 31 pages.
Notice of Allowance received for U.S. Appl. No. 16/936,164, dated Sep. 21, 2022, 9 pages.
Applicant-Initiated Interview Summary received for U.S. Appl. No. 16/936,164, dated Mar. 22, 2022, 4 pages.
Applicant-Initiated Interview Summary received for U.S. Appl. No. 17/476,404, dated Mar. 18, 2022, 2 pages.
Summons to Attend Oral Proceedings received for European Patent Application No. 15728307.8, mailed on Mar. 7, 2022, 4 pages.
Summons to Attend Oral Proceedings received for European Patent Application No. 15729286.3, mailed on Mar. 10, 2022, 3 pages.
Office Action received for Japanese Patent Application No. 2021-166451, dated Jan. 5, 2023, 6 pages (3 pages of English Translation and 3 pages of Official Copy).
Final Office Action received for U.S. Appl. No. 16/936,164, dated Jul. 6, 2022, 21 pages.
Notice of Allowance received for Korean Patent Application No. 10-2020-0123805, dated Jun. 19, 2022, 5 pages (2 pages of English Translation and 3 pages of Official Copy).
Techniqued, "How to Sent Voice Messages in WhatsApp", Published on YouTube.com, Available at: https://www.youtube.com/watch?v=mkJqYO984v0, Aug. 12, 2013, 1 page.
Non-Final Office Action received for U.S. Appl. No. 17/476,404, dated Feb. 8, 2022, 26 pages.
Ambrogi Robert, "Send Secure, Self-Destructing Messages with Wickr", Lawsites Blog, Available online at: https://www.lawsitesblog.com/2013/11/send-secure-self-destructing-messages-wickr.html, Nov. 5, 2013, 3 pages.
AndroidCentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant-Initiated interview Summary received for U.S. Appl. No. 15/488,093, dated Jan. 14, 2020, 4 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/223,794, dated Sep. 7, 2021, 3 pages.
Board Decision received for Chinese Patent Application No. 201580029071.7, dated Jul. 13, 2021, 2 pages (1 page of English Translation and 1 page of Official Copy).
Brief Communication Regarding Oral Proceedings received for European Patent Application No. 17167629.9, mailed on Nov. 12, 2020, 2 pages.
Corrected Notice of Allowance received for U.S. Appl. No. 14/928,865, dated Aug. 5, 2019, 2 pages.
Corrected Notice of Allowance received for U.S. Appl. No. 14/928,865, dated May 16, 2019, 2 pages.
Corrected Notice of Allowance received for U.S. Appl. No. 15/366,763, dated Jan. 2, 2020, 5 pages.
Corrected Notice of Allowance received for U.S. Appl. No. 15/366,890, dated Feb. 12, 2020, 2 pages.
Corrected Notice of Allowance received for U.S. Appl. No. 15/488,093, dated Jun. 15, 2020, 2 pages.
Corrected Notice of Allowance received for U.S. Appl. No. 15/488,093, dated Jun. 30, 2020, 2 pages.
Decision on Appeal received for U.S. Appl. No. 14/503,355, dated Aug. 25, 2020, 10 pages.
Decision to Refuse received for European Patent Application No. 15728307.8, dated Dec. 18, 2019, 14 pages.
Decision to Refuse received for European Patent Application No. 15729286.3, dated Dec. 18, 2019, 13 pages.
Decision to Refuse received for European Patent Application No. 17167629.9, dated Nov. 24, 2020, 2 pages.
Examiner's Answer to Appeal Brief received for U.S. Appl. No. 14/503,355, dated Apr. 17, 2020, 17 pages.
Extended European Search Report received for European Patent Application No. 17167629.9, dated Jun. 2, 2017, 7 pages.
Final Office Action received for U.S. Appl. No. 14/503,355, dated May 20, 2019, 27 pages.
Final Office Action received for U.S. Appl. No. 14/503,355, dated Sep. 8, 2017, 25 pages.
Final Office Action received for U.S. Appl. No. 14/928,865, dated Dec. 5, 2018, 15 pages.
Final Office Action received for U.S. Appl. No. 17/026,818, dated Jan. 29, 2021, 21 pages.
"How to use popular SNS confidence (WeChat) in China 2 _ voice message, press together, shake function etc.", Available Online at: http://seechina365.com/2014/04/05/wechat02/, Apr. 5, 2014, 27 pages (13 pages of Official Copy Only and 14 pages of English Translation).
International Preliminary Report on Patentability received for PCT Patent Application No. PCT/US2015/032305, dated Dec. 15, 2016, 8 pages.
International Preliminary Report on Patentability received for PCT Patent Application No. PCT/US2015/032309, dated Dec. 15, 2016, 8 pages.
International Search Report and Written Opinion received for PCT Patent Application No. PCT/US2015/032305, dated Sep. 10, 2015, 10 pages.
International Search Report and Written Opinion received for PCT Patent Application No. PCT/US2015/032309, dated Sep. 2, 2015, 10 pages.
International Search Report and Written Opinion received for PCT Patent Application No. PCT/US2021/031760, dated Sep. 16, 2021, 18 pages.
Minutes of Oral Proceedings received for European Patent Application No. 15728307.8, mailed on Dec. 13, 2019, 4 pages.
Minutes of Oral Proceedings received for European Patent Application No. 15729286.3, mailed on Dec. 13, 2019, 4 pages.
Mobile How To, "How To Send A Picture Message/MMS—Samsung Galaxy Note 3", Online Available at: https://www.youtube.com/watch?v=-3d0z8-KeDw, Published on Nov. 3, 2013, 1 page.
Non-Final Office Action received for U.S. Appl. No. 14/503,386, dated Jan. 7, 2015, 19 pages.
Non-Final Office Action received for U.S. Appl. No. 14/503,355, dated Dec. 30, 2016, 23 pages.
Non-Final Office Action received for U.S. Appl. No. 14/503,355, dated Sep. 4, 2018, 25 pages.
Non-Final Office Action received for U.S. Appl. No. 14/503,376, dated Dec. 22, 2014, 21 pages.
Non-Final Office Action received for U.S. Appl. No. 14/928,865, dated Mar. 27, 2018, 15 pages.
Non-Final Office Action received for U.S. Appl. No. 15/366,763, dated Mar. 8, 2019, 14 pages.
Non-Final Office Action received for U.S. Appl. No. 15/366,890, dated May 8, 2019, 16 pages.
Non-Final Office Action received for U.S. Appl. No. 15/488,093, dated Oct. 4, 2019, 18 pages.
Non-Final Office Action received for U.S. Appl. No. 17/026,818, dated Nov. 25, 2020, 20 pages.
Non-Final Office Action received for U.S. Appl. No. 17/223,794, dated Jun. 16, 2021, 32 pages.
Norman Don, "Affordances and Design", Jng.org, Available Online at: http://jnd.org/dn.mss/affordances_and.html, Jan. 14, 2006, 5 pages.
Notice of Acceptance received for Australian Patent Application No. 2015267259, dated Jan. 30, 2018, 3 pages.
Notice of Acceptance received for Australian Patent Application No. 2015267260, dated Jan. 30, 2018, 3 pages.
Notice of Acceptance received for Australian Patent Application No. 2018203215, dated Nov. 20, 2019, 3 pages.

(56) References Cited

OTHER PUBLICATIONS

Notice of Acceptance received for Australian Patent Application No. 2020201575, dated Mar. 15, 2021, 3 pages.
Notice of Allowance received for Chinese Patent Application No. 201510290133.1, dated Jan. 9, 2019, 2 pages (1 page of English Translation and 1 page of Official Copy).
Notice of Allowance received for Chinese Patent Application No. 201510291012.9, dated Jan. 9, 2019, 2 pages (1 page of English Translation and 1 page of Official Copy).
Notice of Allowance received for Chinese Patent Application No. 201520365358.4, dated Nov. 20, 2015, 4 pages (2 pages of English Translation and 2 pages of Official Copy).
Notice of Allowance received for Chinese Patent Application No. 201520365843.1, dated Feb. 15, 2016, 5 pages (3 pages of English Translation and 2 pages of official Copy).
Notice of Allowance received for Chinese Patent Application No. 201580029071.7, dated Aug. 19, 2021, 5 pages (1 page of English Translation and 4 pages of Official Copy).
Notice of Allowance received for Chinese Patent Application No. 201710267617.3, dated May 8, 2021, 2 pages (1 page of English Translation and 1 page of Official Copy).
Notice of Allowance received for Japanese Patent Application No. 2017-514992, dated Feb. 15, 2019, 4 pages (1 page of English Translation and 3 pages of Official Copy).
Notice of Allowance received for Japanese Patent application No. 2017-514993, dated Jan. 12, 2018, 4 pages (1 page of English Translation and 3 pages of Official copy).
Notice of Allowance received for Japanese Patent Application No. 2018-018497, dated Jun. 21, 2019, 4 pages (1 page of English Translation and 3 pages of Official Copy).
Notice of Allowance received for Japanese Patent Application No. 2019-050138, dated Jun. 15, 2020, 5 pages (1 page of English Translation and 4 pages of Official Copy).
Notice of Allowance received for Japanese Patent Application No. 2020-118723, dated Oct. 16, 2020, 4 pages (1 page of English Translation and 3 pages of Official Copy).
Notice of Allowance received for Japanese Patent Application No. 2020-187397, dated Sep. 10, 2021, 4 pages (1 page of English Translation and 3 pages of Official Copy).
Notice of Allowance received for U.S. Appl. No. 14/503,376, dated Jul. 29, 2015, 13 pages.
Notice of Allowance received for U.S. Appl. No. 14/503,376, dated Sep. 2, 2015, 2 pages.
Notice of Allowance received for U.S. Appl. No. 14/503,376, dated Sep. 24, 2015, 5 pages.
Notice of Allowance received for U.S. Appl. No. 14/503,386, dated Jul. 30, 2015, 12 pages.
Notice of Allowance received for U.S. Appl. No. 14/503,386, dated Sep. 24, 2015, 5 pages.
Notice of Allowance received for U.S. Appl. No. 14/928,865, dated Apr. 3, 2019, 7 pages.
Notice of Allowance received for U.S. Appl. No. 14/928,865, dated Jul. 22, 2019, 7 pages.
Notice of Allowance received for U.S. Appl. No. 15/366,763, dated Oct. 8, 2019, 10 pages.
Notice of Allowance received for U.S. Appl. No. 15/366,890, dated Nov. 14, 2019, 9 pages.
Notice of Allowance received for U.S. Appl. No. 15/488,093, dated Apr. 22, 2020, 8 pages.
Notice of Allowance received for U.S. Appl. No. 17/026,818, dated May 13, 2021, 10 pages.
Office Action received for Australian Patent Application No. 2015100711, dated Jul. 27, 2015, 7 pages.
Office Action Received for Australian Patent Application No. 2015100711, dated Nov. 19, 2015, 6 pages.
Office Action received for Australian Patent Application No. 2015267259, dated Jun. 2, 2017, 2 pages.
Office Action received for Australian Patent Application No. 2015267260, dated Jun. 2, 2017, 2 pages.
Office Action received for Australian Patent Application No. 2016102028, dated Feb. 13, 2017, 4 pages.
Office Action received for Australian Patent Application No. 2016102029, dated Feb. 22, 2017, 4 pages.
Office Action received for Australian Patent Application No. 2018203215, dated Mar. 29, 2019, 3 pages.
Office Action received for Australian Patent Application No. 2020201575, dated Dec. 22, 2020, 3 pages.
Office Action received for Australian Patent Application No. 2020239711, dated Sep. 13, 2021, 5 pages.
Office Action received for Chinese Patent Application No. 201510290133.1, dated Feb. 9, 2018, 10 pages (5 pages of English Translation and 5 pages of Official Copy).
Office Action received for Chinese Patent Application No. 201510291012.9, dated Feb. 8, 2018, 10 pages (5 pages of English Translation and 5 pages of Official Copy).
Office Action received for Chinese Patent Application No. 201520365358.4, dated Aug. 11, 2015, 4 pages (2 pages of English Translation and 2 pages of Official Copy).
Office Action received for Chinese Patent Application No. 201520365843.1, dated Aug. 25, 2015, 4 pages (2 pages of English Translation and 2 pages of Official Copy).
Office Action received for Chinese Patent Application No. 201520365843.1, dated Nov. 16, 2015, 3 pages (2 pages of English Translation and 1 page of Official Copy).
Office Action received for Chinese Patent Application No. 201580029071.7, dated Apr. 2, 2021, 19 pages (3 pages of English Translation and 16 pages of Official Copy).
Office Action received for Chinese Patent Application No. 201580029071.7, dated Apr. 9, 2020, 33 pages (9 pages of English Translation and 24 pages of Official Copy).
Office Action received for Chinese Patent Application No. 201580029071.7, dated Jul. 2, 2019, 29 pages (8 pages of English Translation and 21 pages of Official Copy).
Office Action received for Chinese Patent Application No. 201580029071.7, dated Oct. 29, 2020, 20 pages (5 pages of English Translation and 15 pages of Official Copy).
Office Action received for Chinese Patent Application No. 201620393549.6, dated Aug. 18, 2016, 2 pages (1 page of English Translation and 1 page of Official Copy).
Office Action received for Chinese Patent Application No. 201620393549.6, dated Jan. 13, 2017, 2 pages (Official Copy only) (See Communication under 37 CFR § 1.98(a) (3)).
Office Action received for Chinese Patent Application No. 201620393748.7, dated Aug. 18, 2016, 2 pages (1 page of English Translation and 1 page of Official Copy).
Office Action received for Chinese Patent Application No. 201620393748.7, dated Jan. 13, 2017, 2 pages (Official Copy only) (See Communication under 37 CFR § 1.98(a) (3)).
Office Action received for Chinese Patent Application No. 201710267617.3, dated Apr. 17, 2020, 23 pages (7 pages of English Translation and 16 pages of Official Copy).
Office Action received for Chinese Patent Application No. 201710267617.3, dated Jul. 10, 2019, 18 pages (4 pages of English Translation and 14 pages of Official Copy).
Office Action received for Chinese Patent Application No. 201710267617.3, dated Nov. 2, 2020, 6 pages (3 pages of English Translation and 3 pages of Official Copy).
Office Action received for Danish Patent Application No. PA202070617, dated Sep. 24, 2021, 4 pages.
Office Action received for European Patent Application No. 15729286.3, dated Feb. 7, 2018, 7 pages.
Office Action received for European Patent Application No. 15728307.8, dated Feb. 8, 2018, 7 pages.
Office Action received for European Patent Application No. 17167629.9, dated Jan. 25, 2019, 7 pages.
Office Action received for Japanese Patent Application No. 2017-514992, dated Apr. 6, 2018, 11 pages (6 pages of English Translation and 5 pages of Official Copy).
Office Action received for Japanese Patent Application No. 2018-018497, dated Dec. 10, 2018, 8 pages (4 pages of English Translation and 4 pages of Official Copy).

(56) References Cited

OTHER PUBLICATIONS

Office Action received for Japanese Patent Application No. 2019-050138, dated Jan. 27, 2020, 9 pages (4 pages of English Translation and 5 pages of Official Copy).
Office Action received for Japanese Patent Application No. 2020-187397, dated Mar. 12, 2021, 8 pages (4 pages of English Translation and 4 pages of Official Copy).
Olson Parmy, "Delete By Default: Why More Snapchat-Like Messaging Is On its Way", Forbes.com, Available Online at: https://www.forbes.com/sites/parmyolson/2013/11/22/delete-by-default-why-more-snapchat-like-messaging-is-on-its-way, Nov. 22, 2013, 6 pages.
Result of Consultation received for European Patent Application No. 15728307.8, dated Nov. 21, 2019, 7 pages.
Result of Consultation received for European Patent Application No. 15729286.3, dated Nov. 21, 2019, 6 pages.
Result of Consultation received for European Patent Application No. 17167629.9, dated Nov. 10, 2020, 3 pages.
Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA202070617, dated Dec. 23, 2020, 8 pages.
Senicar et al., "User-Centered Design and Development of an Intelligent Light Switch for Sensor Systems", Technical Gazette, vol. 26, No. 2, Available Online at https://hrcak.srce.hr/file/320403, 2019, pp. 339-345.
Softonic, "Beginners Guide to WhatsApp", Retrieved from the Internet: https://www.youtube.com/watch?v=1YN36kYDgrk, Apr. 29, 2013, 2 pages.
Summons to Attend Oral Proceedings received for European Patent Application No. 15728307.8, mailed on Jun. 28, 2019, 10 pages.
Summons to Attend Oral Proceedings received for European Patent Application No. 15729286.3, mailed on Jun. 27, 2019, 9 pages.
Summons to Attend Oral Proceedings received for European Patent Application No. 17167629.9, mailed on Jun. 3, 2020, 11 pages.
"WhatsApp" users over 400 million people! I tried to investigate the most used messaging application in the world, Online available at: "http://www.appps.jp/2128786/", Jan. 24, 2014, 10 pages (8 pages of Official Copy Only and 2 pages of English Translation).
WeChat Philippines, "WeChat TVC—Hold To Talk", Online available at: https://www.youtube.com/watch?v=E_UxteOWVSo, May 11, 2013, 1 page.
WeChat Wiki, Online available on: http://web.archive.org/web/20130514131044/http://wechat.wikia.com/wiki/WeChat_Wiki, May 14, 2013, 12 pages.
Part_2 LINE How To, You can use LINE perfectly if you just read this!!, How to use & set up LINE, LINE convenience book for 50 million people, Japan, EI Publishing Co., Ltd., Mar. 10, 2014, pp. 16-55 (Official Copy Only) (See Communication under 37 CFR § 1.98(a) (3)).
Yundanfengqingdeqing, "A light cloud and light breeze; How to upload multiple pictures on Sina Weibo", Baidu Experience, Available Online at: https://jingyan.baidu.com/article/6181c3e074ad0d152ff15353.html, Jan. 13, 2014, 12 pages (6 pages of Official Copy and 6 pages of English Translation).
Corrected Notice of Allowance received for U.S. Appl. No. 16/936,164, dated Oct. 28, 2022, 3 pages.
Corrected Notice of Allowance received for U.S. Appl. No. 17/027,373, dated Oct. 26, 2022, 2 pages.
Notice of Allowance received for Korean Patent Application No. 10-2022-0091730, dated Oct. 4, 2022, 5 pages (2 pages of English Translation and 3 pages of official copy).
Notice of Allowance received for Japanese Patent Application No. 2022-125792, dated Jan. 27, 2023, 4 pages (1 page of English Translation and 3 pages of Official Copy).
Office Action received for Chinese Patent Application No. 202111652452.4, dated Feb. 11, 2023, 28 pages (13 pages of English Translation and 15 pages of Official Copy).
Office Action received for European Patent Application No. 21728781.2, dated Mar. 1, 2023, 13 pages.

\* cited by examiner

2400

```
                                                    ┌── 2402
┌─────────────────────────────────────────────────────┐
│ In response to detecting a finger gesture on an add recipient icon, display a │
│           list of contacts on the touch screen.     │
└─────────────────────────────────────────────────────┘
                            │
                            ▼                       ┌── 2404
┌─────────────────────────────────────────────────────┐
│ In response to detecting a finger swipe gesture on the contact list, scroll the │
│           list of contacts on the touch screen.     │
└─────────────────────────────────────────────────────┘
                            │
                            ▼                       ┌── 2406
┌─────────────────────────────────────────────────────┐
│ In response to detecting a finger gesture on a contact in the list of contacts, │
│  add the contact to the multiple recipients, and generate a corresponding      │
│   recipient icon in a message recipient field on the touch screen display.     │
└─────────────────────────────────────────────────────┘
                            │
                            ▼                       ┌── 2408
┌─────────────────────────────────────────────────────┐
│   Repeat steps 2402 - 2406 until all of the multiple recipients are selected.  │
└─────────────────────────────────────────────────────┘
                            │
                            ▼
                       ( Figure 25 )
```

3016 — If no user request to view the incoming message is detected within a predetermined period of time, cease to display the incoming message on the touch screen display after the predetermined period of time.

3018 — After ceasing to display the incoming message, display a message alert on the touch screen display. The message alert includes an identifier of the party and a time indicator for the incoming message.

3020 — After ceasing to display the incoming message, in response to detecting a user request to unlock the device, unlock the device.

3022 — In response to detecting a user selection of an instant messaging icon, display a list of instant messaging conversations. The list includes an unread message indicia adjacent to the conversation between the user of the device and the party.

3024 — If no user request to view the incoming message is detected within the predetermined period of time, mark a conversation that includes the incoming message as containing at least one unread message.

Figure 30B

PORTABLE ELECTRONIC DEVICE WITH CONVERSATION MANAGEMENT FOR INCOMING INSTANT MESSAGES

RELATED APPLICATIONS

This application is a continuation of U.S. patent application Ser. No. 15/960,330, "Portable Electronic Device with Conversation Management for Incoming Instant Messages," filed Apr. 23, 2018, which is a continuation of U.S. patent application Ser. No. 12/163,908, now U.S. Pat. No. 9,954,996, "Portable Electronic Device with Conversation Management for Incoming Instant Messages," filed Jun. 27, 2008, which claims priority to U.S. Provisional Patent Application Nos. 61/019,293, "Portable Electronic Device with Conversation Management for Incoming Instant Messages," filed Jan. 6, 2008, 61/019,292, "Portable Electronic Device for Instant Messaging Multiple Recipients," filed Jan. 6, 2008, 60/937,993, "Portable Multifunction Device," filed Jun. 29, 2007, and 60/946,969, "Portable Electronic Device for Instant Messaging," filed Jun. 28, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; (10) U.S. patent application Ser. No. 11/848,208, "Portable Electronic Device for Instant Messaging," filed Aug. 30, 2007; and (11) U.S. patent application Ser. No. 12/101,832, "Touch Screen Device, Method, and Graphical User Interface for Determining Commands by Applying Heuristics," filed Apr. 11, 2008. All of these applications are incorporated by reference herein in their entirety.

TECHNICAL FIELD

The disclosed embodiments relate generally to portable electronic devices, and more particularly, to portable devices for performing instant messaging.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions.

Some portable communication devices (e.g., mobile telephones, sometimes called mobile phones, cell phones, cellular telephones, and the like) have resorted to adding more pushbuttons, increasing the density of pushbuttons, overloading the functions of the pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Portable device-based Instant Messaging (IM) services are becoming increasingly popular. But most IM services on portable electronic devices have a rudimentary user interface. It is cumbersome to create instant messages on such devices. A user often needs to press a telephone keypad repeatedly to choose a character. It is also difficult to find and view previous instant messages. For example, it is inconvenient or even impossible for the user to view a series of previous messages with a particular user while composing a new message for that user.

IM services also typically do not allow the user to send telephony-based instant messages to multiple recipients in an intuitive manner. Interfaces for adding multiple recipients of an instant message are time consuming because they often require a user to repeatedly press many keys before all recipients are added. Furthermore, many of these interfaces do not allow the user to send a reply or another message to the set of multiple recipients without re-selecting all of the multiple recipients.

IM services also typically do not provide an intuitive interface for responding or viewing message when the device is in locked or unlocked mode. Many of the existing IM services also do not allow the user to view the message or a portion thereof without the user pressing a series of keys.

Accordingly, there is a need for portable multifunction devices with more transparent and intuitive user interfaces for instant messaging that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a touch screen or a touch screen display) with a graphical user interface (GUI), one or more processors, memory and one or more modules, programs or sets of instructions stored in the memory for performing multiple functions. In some embodiments, the user interacts with the GUI primarily through finger contacts and gestures on the touch screen display. Instructions for performing instant messaging operations may be included in a computer program product configured for execution by one or more processors.

One aspect of the invention is a computer-implemented method performed by a portable electronic device with a touch screen display. The device displays an incoming message from a party to a user of the device on the touch screen display while the device is locked. The device responds to detecting a user request to view the incoming message, by immediately displaying a set of messages between the user of the device and the party in a chronological order. The displayed set of messages includes the incoming message.

Another aspect of the invention is a computer-implemented method performed by a portable electronic device with a touch screen display. While the device is unlocked, the device displays a portion of an incoming message from a party to a user of the device, a view icon, and a long-message indicia on the touch screen display if the incoming message is longer than a predefined length. Alternately, if the incoming message is equal to or less than the predefined length, the device displays the entire incoming message and a reply icon on the touch screen display. The device responds to detecting user selection of either the view icon or the reply icon, by immediately displaying a set of messages between the user of the device and the party in a chronological order, wherein the set of messages includes the incoming message.

Another aspect of the invention is a portable electronic device with a touch screen display, one or more processors, memory, and one or more programs. The one or more programs are stored in the memory and configured to be executed by the one or more processors. The programs include instructions for displaying an incoming message from a party to a user of the device on the touch screen display while the device is locked; and instructions for viewing the incoming message and immediately displaying a set of messages between the user of the device and the party in a chronological order in response to detecting a user request to view the incoming message. The displayed set of messages includes the incoming message.

Another aspect of the invention is a portable electronic device with a touch screen display, one or more processors, memory, and one or more programs. The one or more programs are stored in the memory and configured to be executed by the one or more processors. The programs include instructions for displaying a portion of an incoming message from the party to the device, a view-message icon, and a long-message indicia on the touch screen display if the incoming message is longer than a predefined length while the device is unlocked. The programs further include instructions for displaying the incoming message from the party to the user of the device and a reply icon on the touch screen display if the incoming message is equal to or less than the predefined length while the device is unlocked, and instructions for responding to user selection of either the view icon or the reply icon by immediately displaying a set of messages between the user of the device and the party in a chronological order. The displayed set of messages includes the incoming message.

Another aspect of the invention is a computer readable storage medium have instructions stored therein. The instructions when executed by a portable electronic device with a touch screen display, cause the device to display an incoming message from a party to a user of the device on the touch screen display while the device is locked, and to respond to detecting a user request to view the incoming message by immediately displaying a set of messages between the user of the device and the party in a chronological order. The displayed set of messages includes the incoming message.

Another aspect of the invention is a computer readable storage medium having instructions stored therein. The instructions, when executed by a portable electronic device with a touch screen display, while the device is unlocked, cause the device to display a portion of an incoming message from a party to a user of the device, a view icon, and a long-message indicia on the touch screen display if the incoming message is longer than a predefined length. The computer readable storage medium also includes instructions to display the incoming message from the party to the user of the device and a reply icon on the touch screen display if the incoming message is equal to or less than the predefined length. The computer readable storage medium further includes instructions to respond to detecting user selection of either the view icon or the reply icon, by immediately displaying a set of messages between the user of the device and the party in a chronological order. The displayed set of messages includes the incoming message.

Another aspect of the invention is a graphical user interface (GUI) on a portable electronic device with a touch screen display. The GUI displays an incoming message from a party to a user of the device, and a set of messages between the user of the device and the party in a chronological order. While the device is locked, the GUI displays the incoming message from a party to a user of the device, and responds to detecting a user request to view the incoming message by immediately displaying the set of messages between the user of the device and the party in a chronological order. The set of messages includes the incoming message.

Another aspect of the invention is a graphical user interface (GUI) on a portable electronic device with a touch screen display. The GUI displays an incoming message or a portion of an incoming message from a party to a user of the device, a view icon, a long message indicia if the message is longer than a predefined length, and a reply icon. The GUI also displays a set of messages between the user of the device and the party. The view icon and a long message indicia are displayed on the touch screen if the incoming message is longer than a predefined length. The reply icon is displayed on the touch screen display if the incoming message is equal to or less than the predefined length. In response to detecting user selection of either the view icon or the reply icon, the set of messages between the user of the device and the party is immediately displayed in a chronological order. The displayed set of messages includes the incoming message.

Another aspect of the invention is a portable electronic device with a touch screen display. The device comprises means for displaying, while the device is locked, an incoming message from a party to a user of the device on the touch screen display; and means for responding, while the device is locked, to detection of a user request to view the incoming message, by immediately displaying a set of messages between the user of the device and the party in a chronological order. The displayed set of messages includes the incoming message.

Another aspect of the invention is a portable electronic device with a touch screen display. The device includes means for displaying, while the device is unlocked, a portion of an incoming message from the party to the user of the device, and for displaying a view icon and a long-message indicia on the touch screen display if the incoming message is longer than a predefined length. The device also includes means for displaying the incoming message from the party to the user of the device and a reply icon on the touch screen display if the incoming message is equal to or less than the predefined length, and means for responding to detection of a user selection of either the view icon or the reply icon by immediately displaying a set of messages between the user of the device and the party in a chronological order, wherein the displayed set of messages includes the incoming message.

Thus, the invention provides a transparent and intuitive user interface for handling instant messages on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 23F shows an example of marking an incoming message with an "unread" message indicia in accordance with some embodiments. FIG. 23G shows an example of an incoming message in "read" status by omitting the unread message indicia in accordance with some embodiments.

FIG. 24 is a flow diagram for illustrating an exemplary process for adding multiple recipients to an instant message through finger gestures in accordance with some embodiments.

FIGS. 30A-30B are flow diagrams illustrating an exemplary process for displaying an incoming message while the device is in locked mode in accordance with some embodiments.

DESCRIPTION OF EMBODIMENTS

Figure 1A:
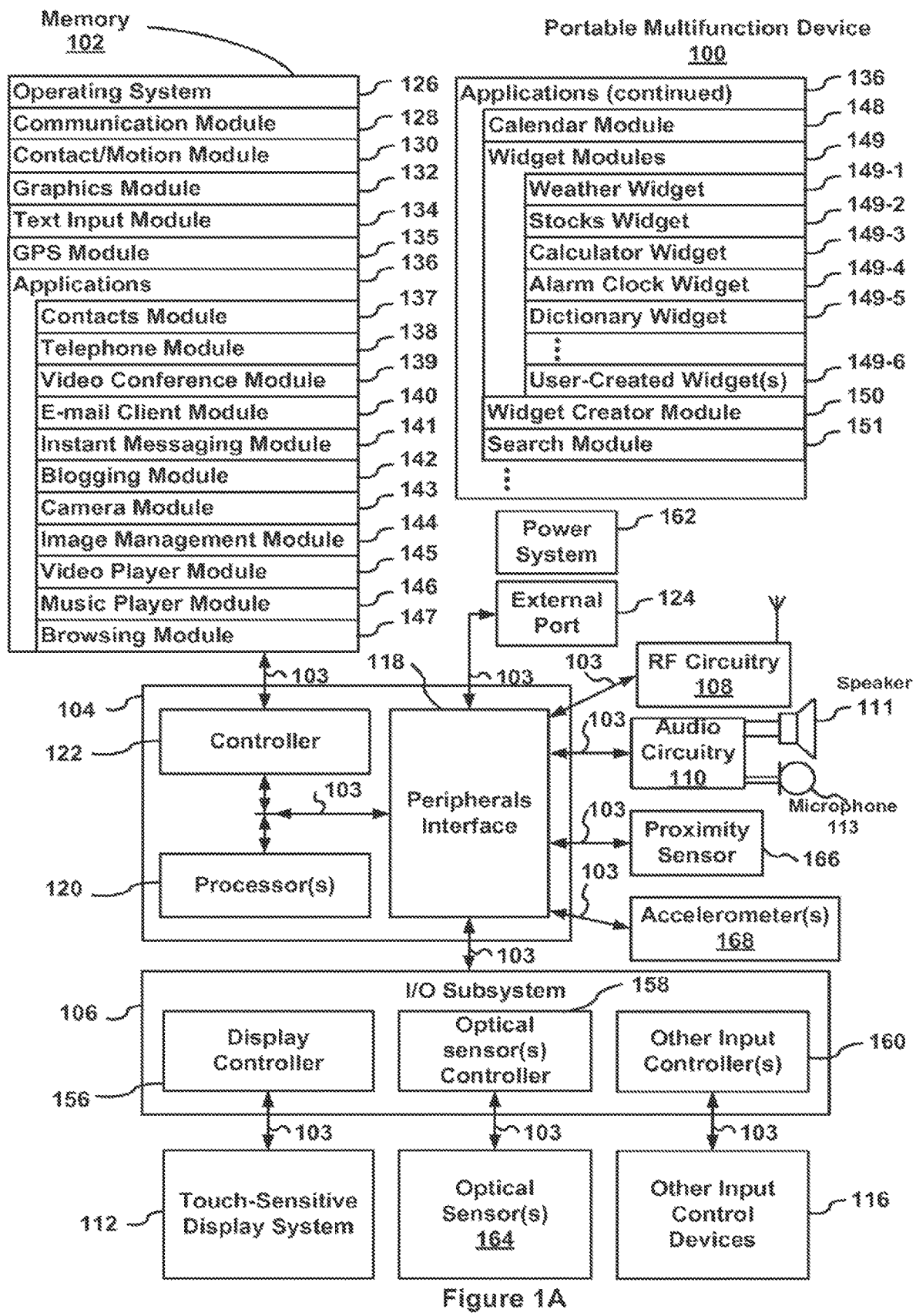
FIGS. 1A-1B are block diagrams illustrating a portable electronic device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a bloggins application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
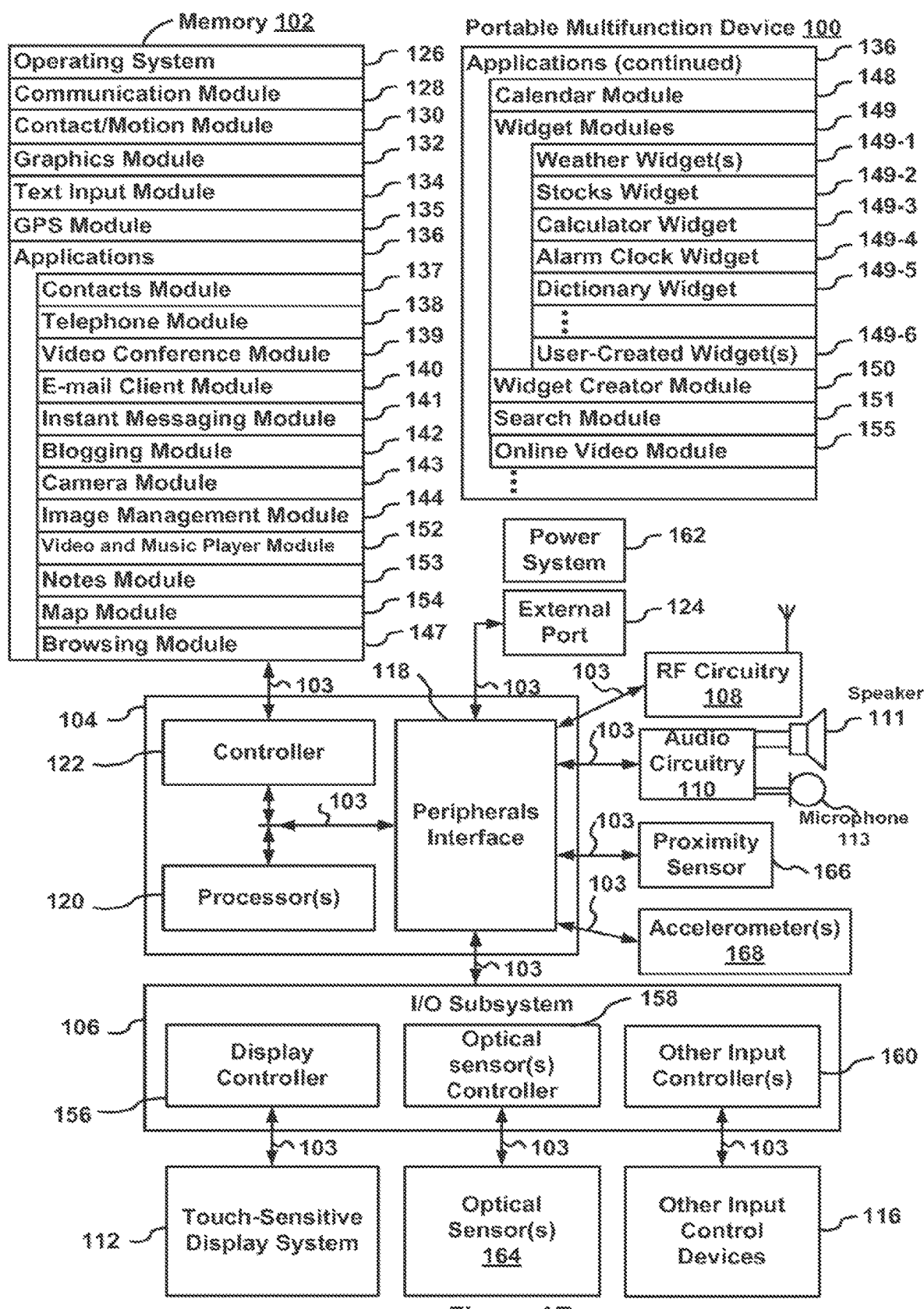

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data. GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch. Sensitive Input Devices," filed Jul. 30, 2004; (4) U.S. patent application Ser. No. 11/048,264, "Gestures For Touch Sensitive input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference in their entirety herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005; 11/240,788, "Proximity Detector In Handheld Device," filed Sep. 30, 2005; 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as expanding a user-selected web-page portion to fill a browser window). In this context, a respective animation that executes an action, or confirms an action by the user of the device, typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the c-mail client module 140 may be used to create, send, receive, and manage e-mail. In conjunction with image management module 144, the e-mail module 140 makes it very easy to create and send e-mails with still or video images taken with camera module 143.

In conjunction with RE circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RE circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a web-clip widget). In some embodiments, a web-clip widget comprises a file containing an XML property list that includes a URL for the web page and data indicating the user-specified portion of the web page. In some embodiments, the data indicating the user-specified portion of the web page includes a reference point and a scale factor. In some embodiments, the data indicating the user-specified portion of the web page includes a set of coordinates within the web page or an identification of a structural element within the web page. Alternatively, in some embodiments a web-clip widget includes an HTML (Hypertext Markup Language) file, a CSS (Cascading Style Sheets) file, and a JavaScript file, or an XML (Extensible Markup Language) file and a JavaScript file.

In some embodiments a web-clip widget includes an image file (e.g., a png file) of an icon corresponding to the widget. In some embodiments, a web-clip widget corresponds to a folder containing the image file and a file that includes a URL for the web page and data indicating the user-specified portion of the web page. In some embodiments, a web-clip widget corresponds to a folder containing the image file and an executable script.

Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
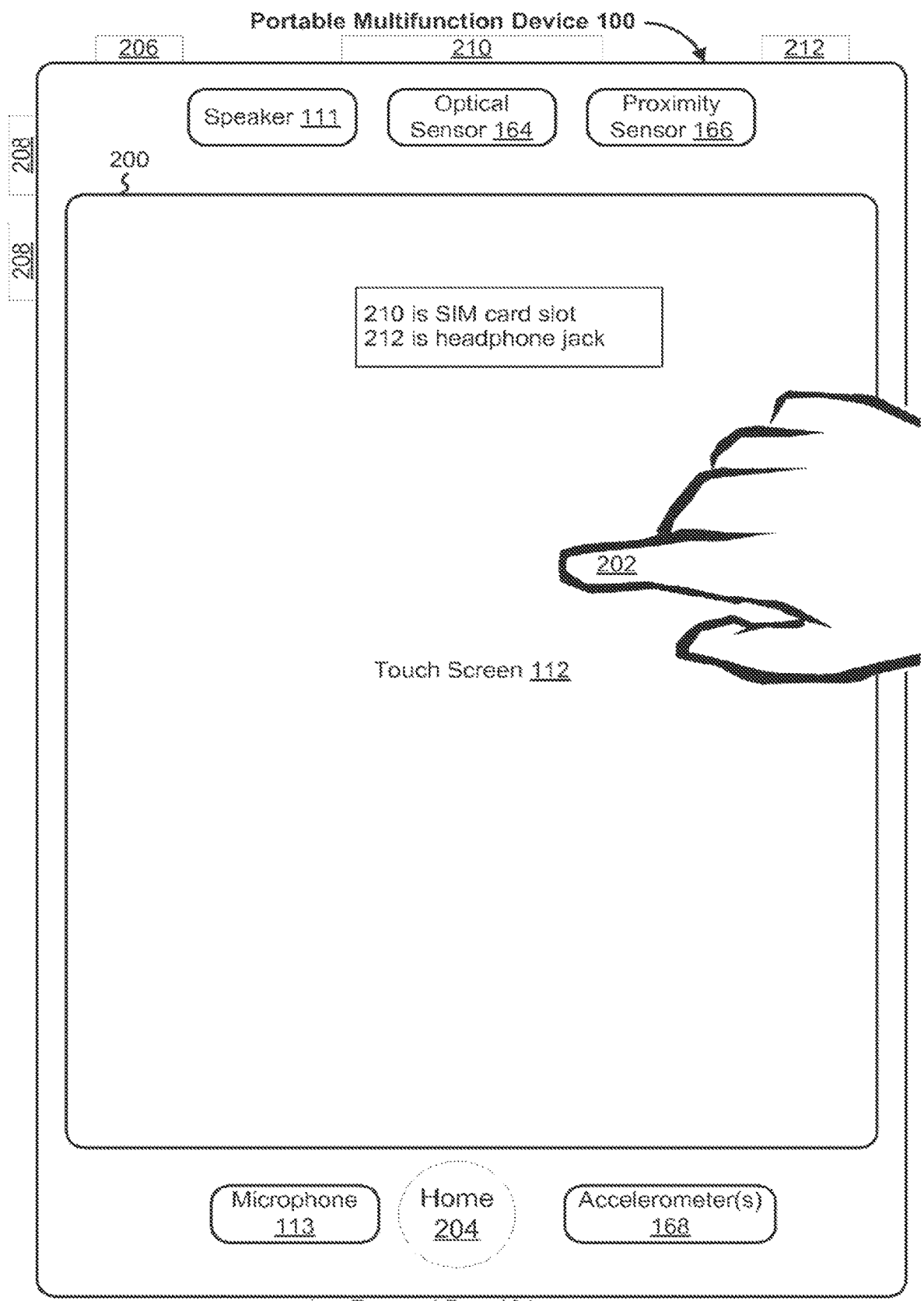
FIG. 2 illustrates a portable electronic device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
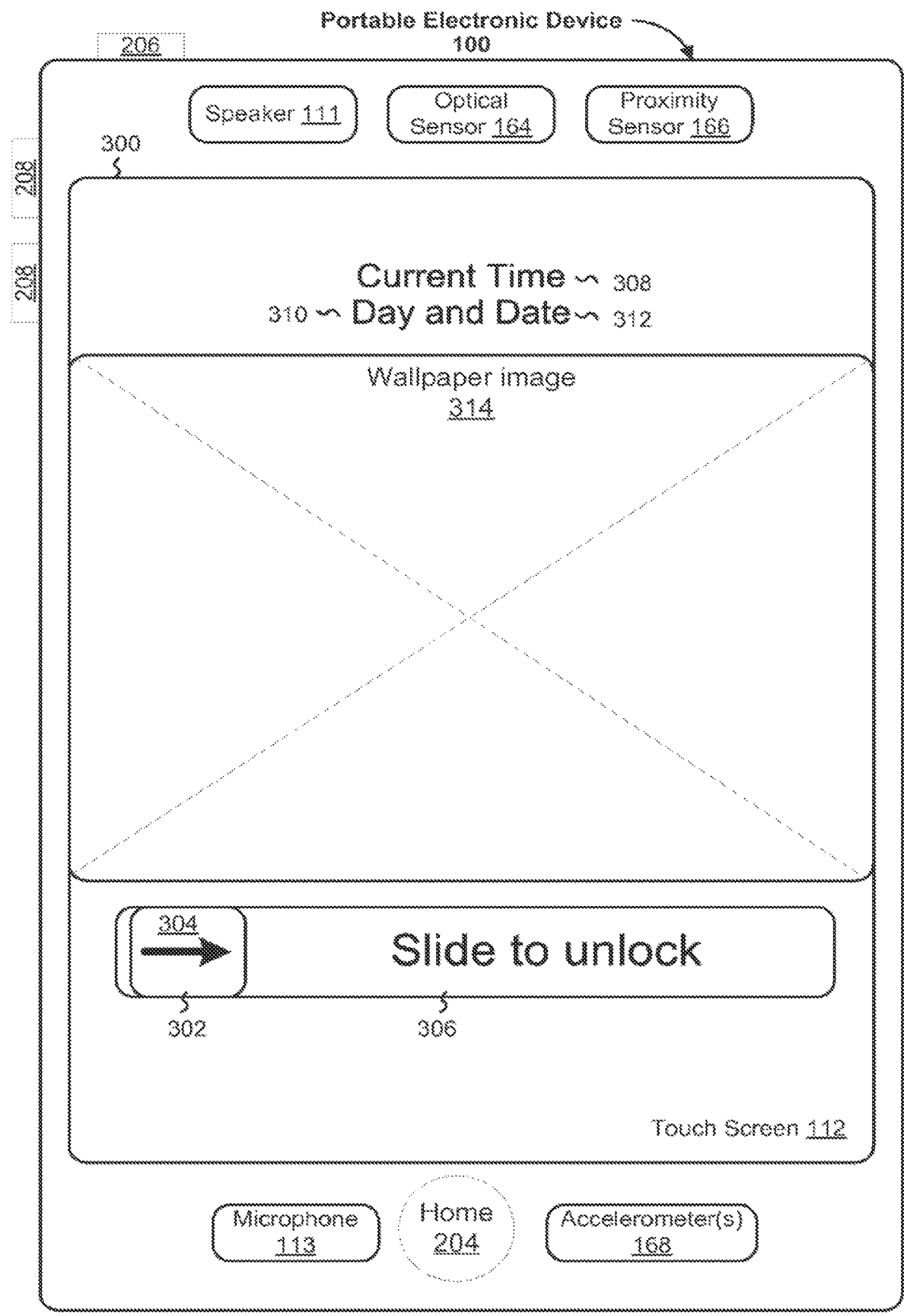
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4:
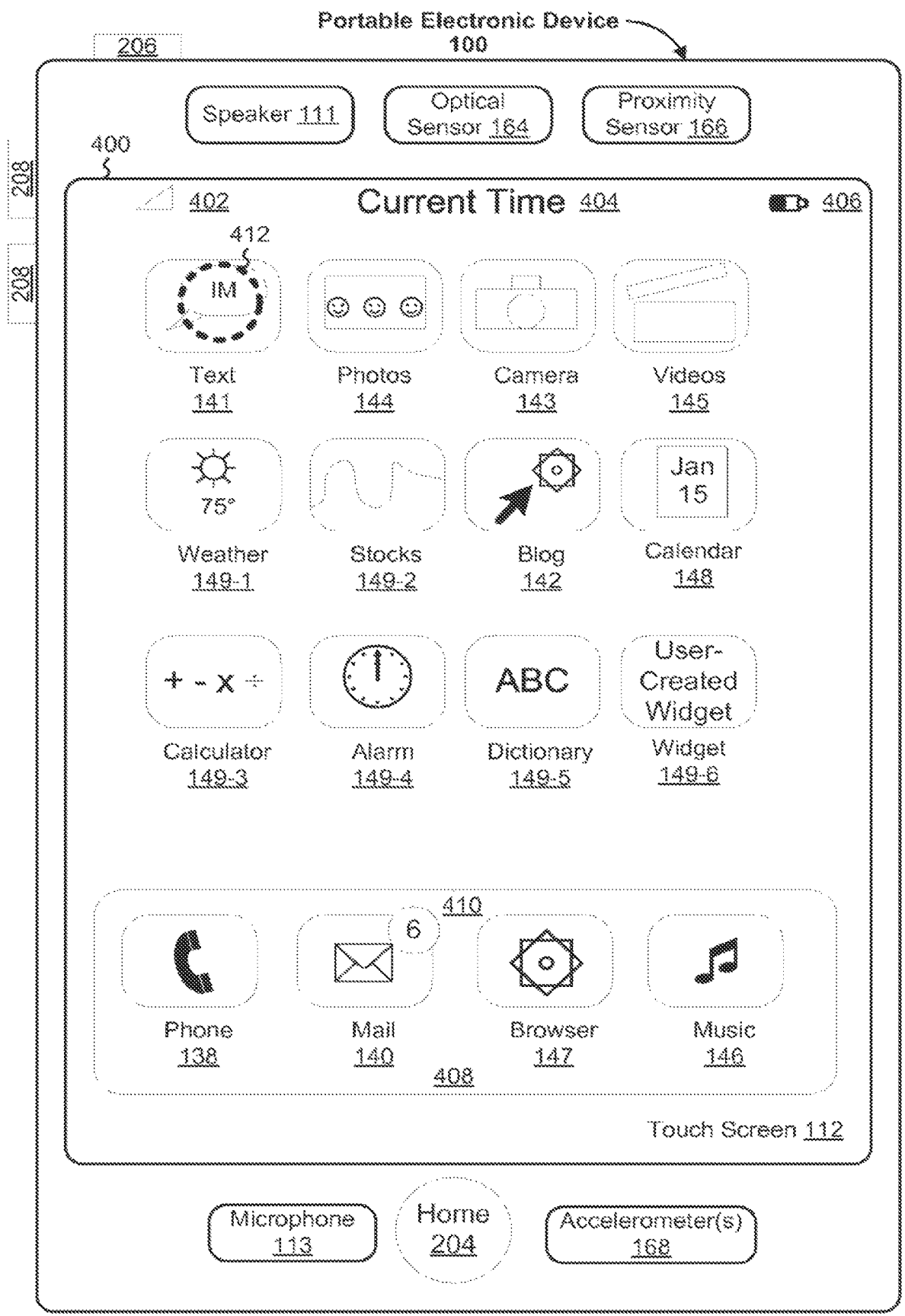
FIG. 4 illustrates an exemplary user interface for a menu of applications on a portable electronic device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
  Phone 138;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5;

User-created widget 149-6; and

Other applications (not shown)(e.g., map 154 and online video 155).

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that displays the user-created widgets or icons corresponding to the user-created widgets. A user may activate a particular widget by gesturing on the corresponding name or icon.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5:
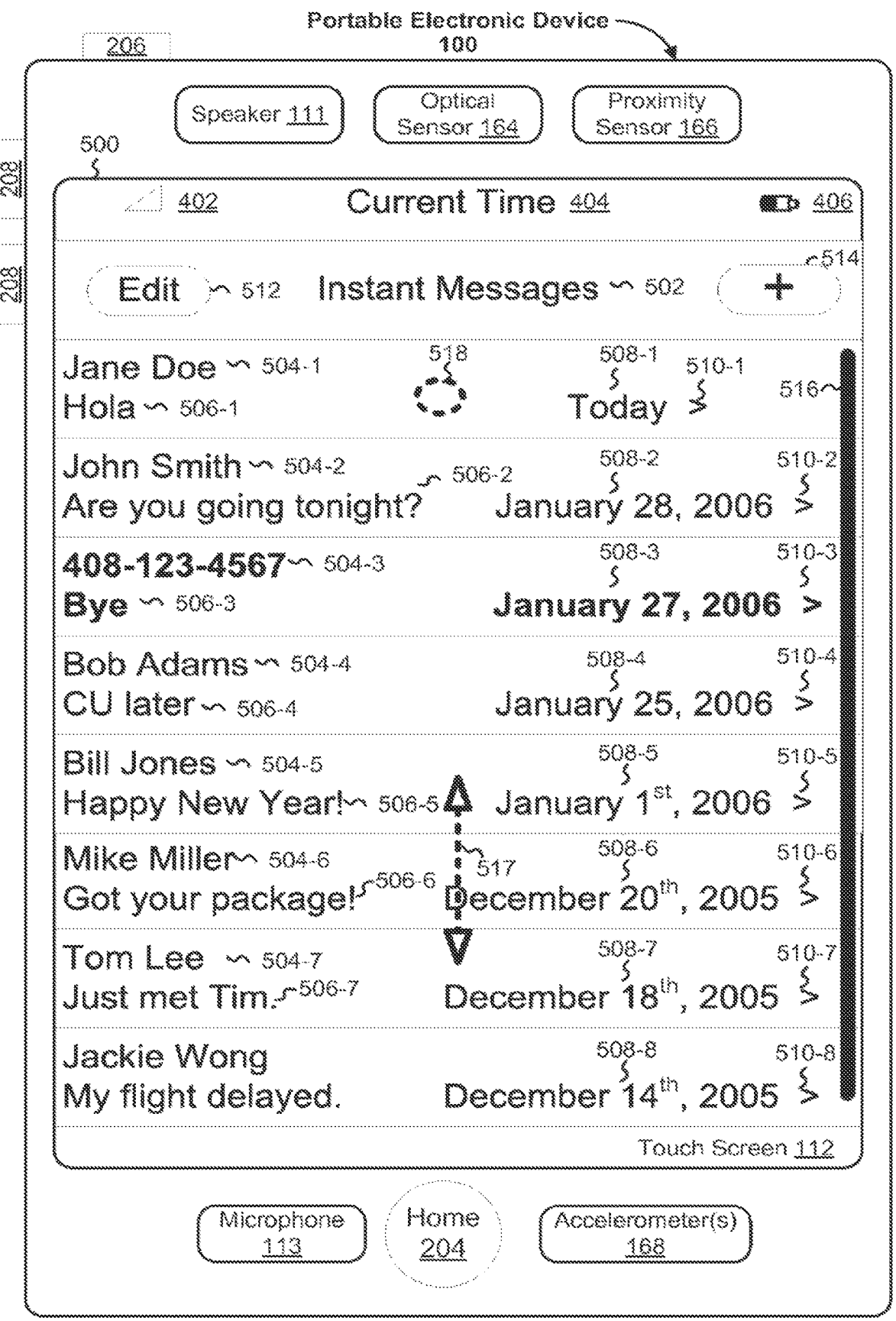
FIG. 5 illustrates an exemplary user interface for listing instant message conversations on a portable electronic device in accordance with some embodiments.
Figure 6A:
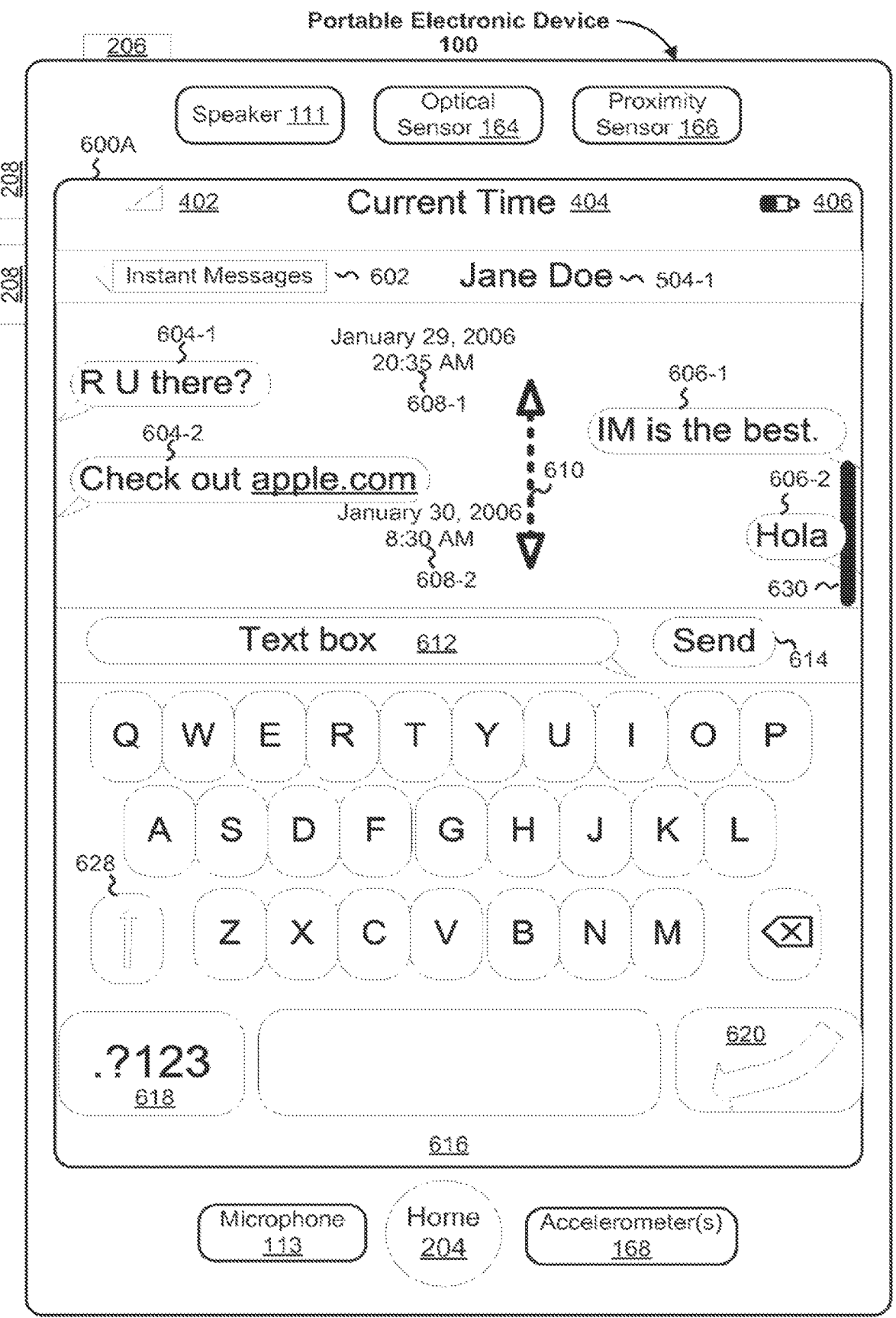
FIGS. 6A through 6K illustrate an exemplary user interface for inputting text for an instant message in accordance with some embodiments.
Figure 7:
FIG. 7 illustrates an exemplary user interface for deleting an instant message conversation in accordance with some embodiments.

FIG. 5 illustrates an exemplary user interface for listing instant message conversations on a portable electronic device in accordance with some embodiments. An instant message conversation includes a set of messages exchanged between a user of the portable electronic device and one or more other persons. In some embodiments, user interface 500 includes the following elements, or a subset or superset thereof:

402, 404, and 406, as described above;

"Instant Messages" or other similar label 502;

Names 504 of the persons a user has instant message conversations with (e.g., Jane Doe 504-1) or the phone number if the corresponding person's name is not available (e.g., 408-123-4567 504-3);

Text 506 of the last message or a portion thereof in the conversation (note that the last message could be the last one either sent or received by the user);

Date 508 and/or time of the last message in the conversation;

Selection icon 510 that when activated (e.g., by a finger gesture on the icon) initiates transition to a UI for the corresponding conversation (e.g., FIG. 6A for Jane Doe 504-1);

Edit icon 512 that when activated (e.g., by a finger gesture on the icon) initiates transition to a UI for deleting conversations (e.g., FIG. 7);

Create message icon 514 that when activated (e.g., by a finger gesture on the icon) initiates display of a user interface for creating a new instant message and thus a new conversation; and Vertical bar 516 that helps a user understand what portion of the list of instant message conversations is being displayed.

Figure 10:
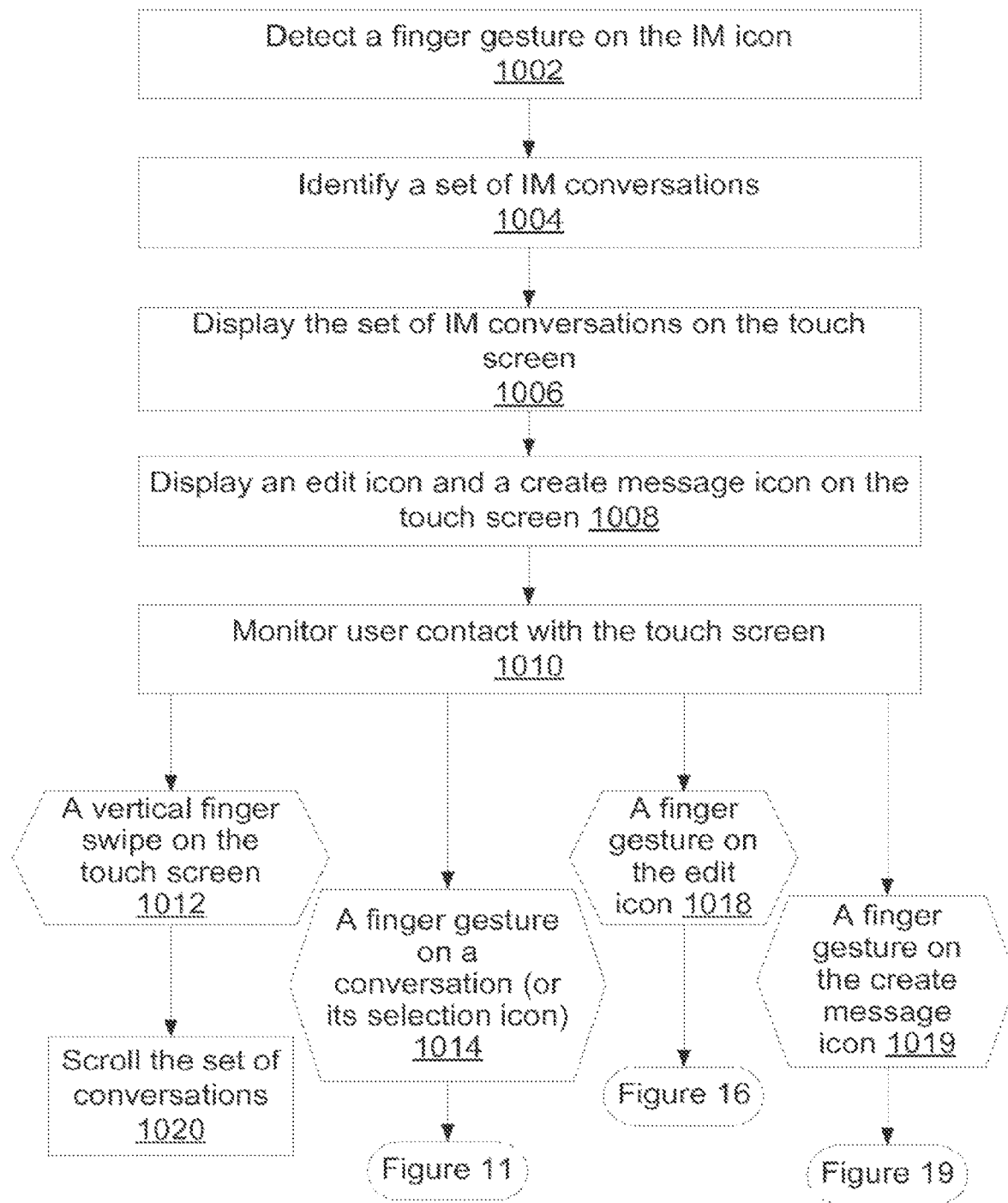
FIG. 10 is a flowchart illustrating a process for displaying a list of instant message conversations on a portable electronic device's touch screen in accordance with some embodiments.

FIG. 10 is a flowchart illustrating a process for displaying a list of instant message conversations on a portable electronic device's touch screen in accordance with some embodiments. Upon detecting a finger gesture (1002) (e.g., a finger tap 412 on the IM icon 141, FIG. 4), the IM module 141 identifies a set of IM conversations (1004) and displays them on the touch screen (1006). To be able to edit an existing conversation or launch a new conversation, the portable device may display an edit icon 512 and a create message icon 514, respectively, on the touch screen (1008). The portable device monitors user contact with the touch screen and acts accordingly (1010).

As shown in FIG. 5, the list of conversations may be displayed in a chronological order. The conversation with "Jane Doe" is at the top because it is the only conversation that includes at least one message generated today 508-1, which is assumed to be Jan. 29, 2006 in this example. In some embodiments, the conversations are ordered by the timestamp of the most recent message in each conversation. In some embodiments, a conversation including at least one message that has not been checked by the user is highlighted in the touch screen. For example, the third conversation in the list is displayed using boldfaced characters to suggest that the user has not checked the recent message sent by the person at the phone number 408-123-4567.

In some embodiments, the name 504 associated with an instant message conversation is determined by finding an entry in the user's contact list 137 that contains the phone number used by the instant message conversation. If no such entry is found, then just the phone number is displayed (e.g., 504-3). In some embodiments, if the other person sends messages from two or more different phone numbers, the messages may appear in the same conversation including the person's name if all the phone numbers used are found in the same entry (i.e., the entry for the other person) in the user's contact list 137. In some embodiments, the conversation includes messages sent from phone numbers and/or email addresses associated with the other person. In some embodiments, the messages sent by the other person include a first message sent from a first address associated with the other person and a second message sent from a second address associated with the other person that is different from the first address. In some embodiments, the first address is a telephone number and the second address is an email address. In some embodiments, the first and second addresses are two distinct telephone numbers. In some embodiments, the first and second addresses are two distinct email addresses.

In some other embodiments, if the other person sends messages from two or more different phone numbers, the messages may appear in different conversations corresponding to different numbers. The phone numbers or other identifiers are displayed next to the person's name to distinguish these conversations from each other.

In some embodiments, the name field of an instant message conversation includes names or other identifiers of multiple parties that participate in the conversation as message recipients and/or senders. If there is no room for displaying all the names, a selected subset of names is displayed with a symbol like " " at the end, indicating that there are more parties in the conversation. By default, a message by the user of the portable electronic device is sent to all the parties of the conversation. For FIGS. 5-21 and the corresponding text, the IM conversations will be presumed to involve only two parties, the user and another person. For FIGS. 22A-22Q and the corresponding text, the IM conversations will be presumed to involve more than two parties.

Automatically binning the instant messages into "conversations" (instant messages exchanged between the user of the device and a respective person or phone number) makes it easier for the user to carry on and keep track of instant message exchanges with multiple parties. As will be described below, the user is not only able to see the last message sent by the other party, the user can also visit old messages exchanged between the user and the other party.

In some embodiments, vertical bar 516 is displayed temporarily after an object is detected on or near the touch screen display (e.g., a finger touch is detected anywhere on the list of instant message conversations). In some embodiments, the vertical bar 516 has a vertical position on top of the displayed portion of the list that corresponds to the vertical position in the list of the displayed portion of the list. In some embodiments, the vertical bar 516 has a vertical length that corresponds to the portion of the list being displayed. In some embodiments, if the entire list of IM conversations can be displayed simultaneously on the touch screen 112, the vertical bar 516 is not displayed. In some embodiments, if the entire list of IM conversations can be displayed simultaneously on the touch screen 112, the vertical bar 516 is displayed with a length that corresponds to the length of the list display area (e.g., as shown in FIG. 5).

As noted above, the portable device monitors (1010) user contact with the conversation list. When the user swipes his finger or a stylus on the touch screen in a substantially vertical direction (1012), this user contact may be interpreted as a scrolling gesture. In some embodiments, the scrolling gesture is independent of the horizontal position of the user contact with the touch screen display. In some embodiments, the scrolling gesture is substantially independent of the horizontal position of the user contact with the touch screen display (e.g., one or more side regions of the touch screen display may be reserved for other functions, such as functions corresponding to icons, soft keys or application navigation functions, and not available for the scroll gesture). The portable electronic device, accordingly, scrolls the conversation list and displays a different portion of the conversation list (1020).

As shown in FIG. 5, the conversation list moves in a direction consistent with the scrolling gesture 517. If the scrolling gesture is downward (or upward), the conversation list also moves downward (or upward). Scrolling the conversation list downward will typically scroll the list to earlier entries in the list, until the first entry is reached (e.g., Jane Doe 504-1). But if the user does not have too many IM conversations, the portable electronic device may display the entire conversation list and the scrolling gesture has no effect.

If the user taps on the edit icon 512 using his linger or stylus (1018), the portable electronic device replaces the conversation list UT with a new UI that allows the user to edit the conversations. A more detailed description of the conversation editing feature is provided below in connection with FIGS. 7 and 16.

Similarly, if the user taps on the message creation icon 514 (1019), the portable electronic device replaces the conversation list UI with a new UI that allows the user to create a new instant message and therefore a new conversation. A more detailed description of this feature is provided below in connection with FIGS. 8A-8B, 9 and 19.

If the user taps on a particular conversation in the list (1014), the portable electronic device would interpret the tap as a gesture indicating that the user intends to check the messages associated with the user selected conversation. Accordingly, the portable electronic device replaces the conversation list UI shown in FIG. 5 with a conversation UI for a user-selected conversation (e.g., as shown in FIG. 6A).

FIGS. 6A through 6K illustrate an exemplary user interface for inputting text for an instant message in accordance with some embodiments.

In some embodiments, user interface 600A (FIG. 6A) includes the following elements, or a subset or superset thereof:

- 402, 404, and 406, as described above;
- Name 504 corresponding to the phone number or email address used in the instant message conversation (or the phone number itself if the name is not available);
- Instant messages icon 602 that when activated (e.g., by a finger gesture on the icon) initiates transition to a UI listing instant message conversations (e.g., UI 500);
- Instant messages 604 from the other party, typically listed in order along one side of UI 600A;
- Instant messages 606 to the other party, typically listed in order along the opposite side of UI 600A to show the back and forth interplay of messages in the conversation;
- Timestamps 608 for at least some of the instant messages;
- Text entry box 612;
- Return icon 614 that when activated (e.g., by a finger gesture on the icon) initiates a new line in the message in text box 612;
- Letter keyboard 616 for entering text in box 612;
- Alternate keyboard selector icon 618 that when activated (e.g., by a finger gesture on the icon) initiates the display of a different keyboard (e.g., 624, FIG. 6C);
- Send icon 620 that when activated (e.g., by a finger gesture on the icon) initiates sending of the message in text box 612 to the other party (e.g., Jane Doe 504-1);
- Shift key 628 that when activated (e.g., by a finger gesture on the icon) capitalizes the next letter chosen on letter keyboard 616; and
- Vertical bar 630 that helps a user understand what portion of the list of instant messages in an IM conversation is being displayed.

Figure 11:
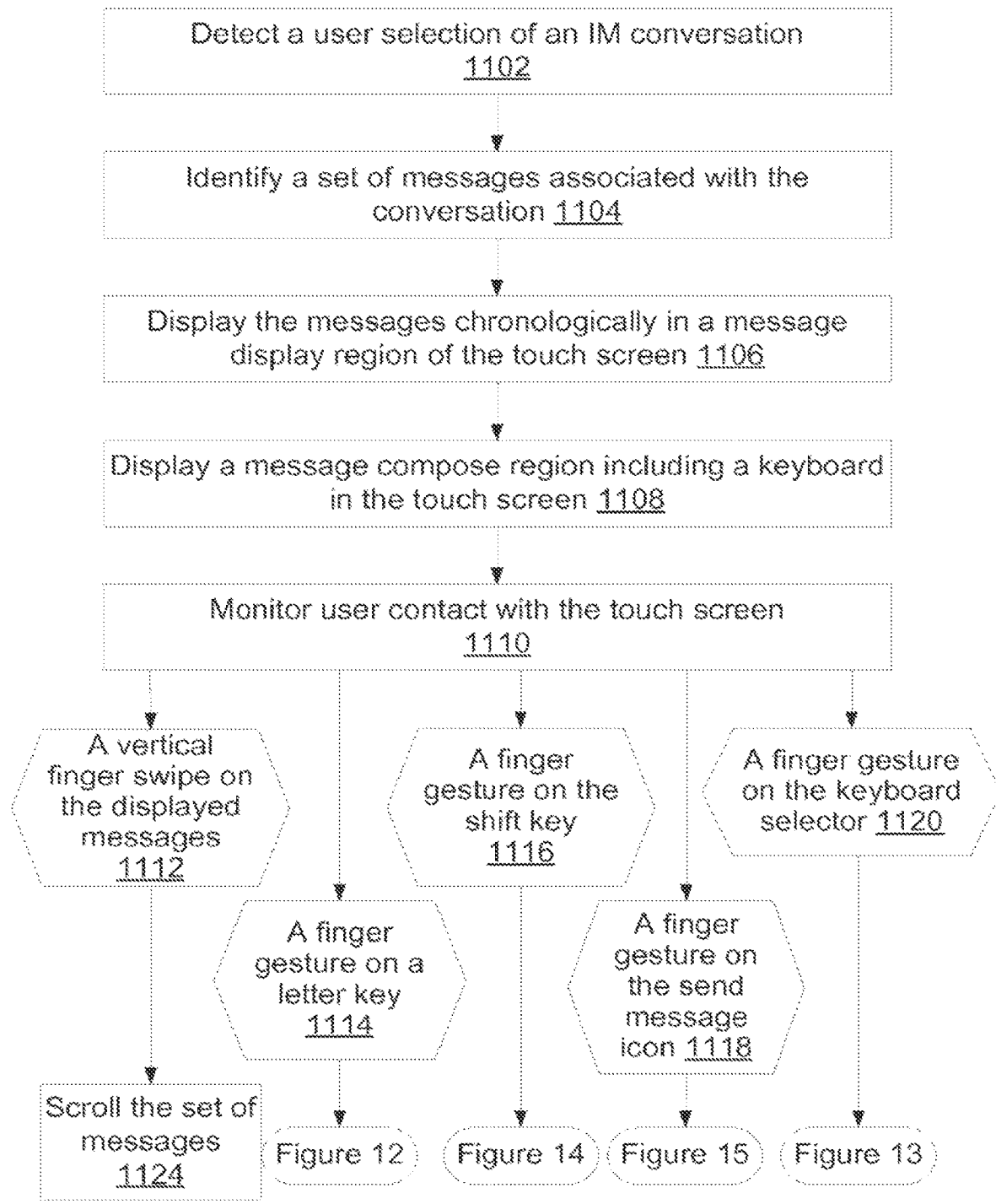
FIG. 11 is a flowchart illustrating a process for displaying a user selected instant message conversation upon detecting a predefined user contact with the portable electronic device's touch screen in accordance with some embodiments.

FIG. 11 is a flowchart illustrating a process for displaying a user selected instant message conversation upon detecting a predefined user contact with the portable electronic device's touch screen in accordance with some embodiments. In this example, the conversation with Jane Doe is displayed in response to a finger gesture 518 on the conversation with Jane Doe (FIG. 5).

Upon detecting the user selection of the conversation with Jane Doe (1102), IM module 141 identifies a set of instant messages 604 and 606 associated with the conversation (1104) and displays the instant messages in a message display region of the touch screen in a chronological order (1106). Because a user visiting an existing conversation may want to compose a new instant message to the other person, the portable electronic device also displays a message compose region on the touch screen (1108). In some embodiments, the message compose region includes a text box 612 displaying characters entered by the user, a send message icon 614, a letter keyboard 616, and a keyboard selector icon 618. The portable electronic device monitors the user contact with the touch screen and responds accordingly (1110).

Figure 21:
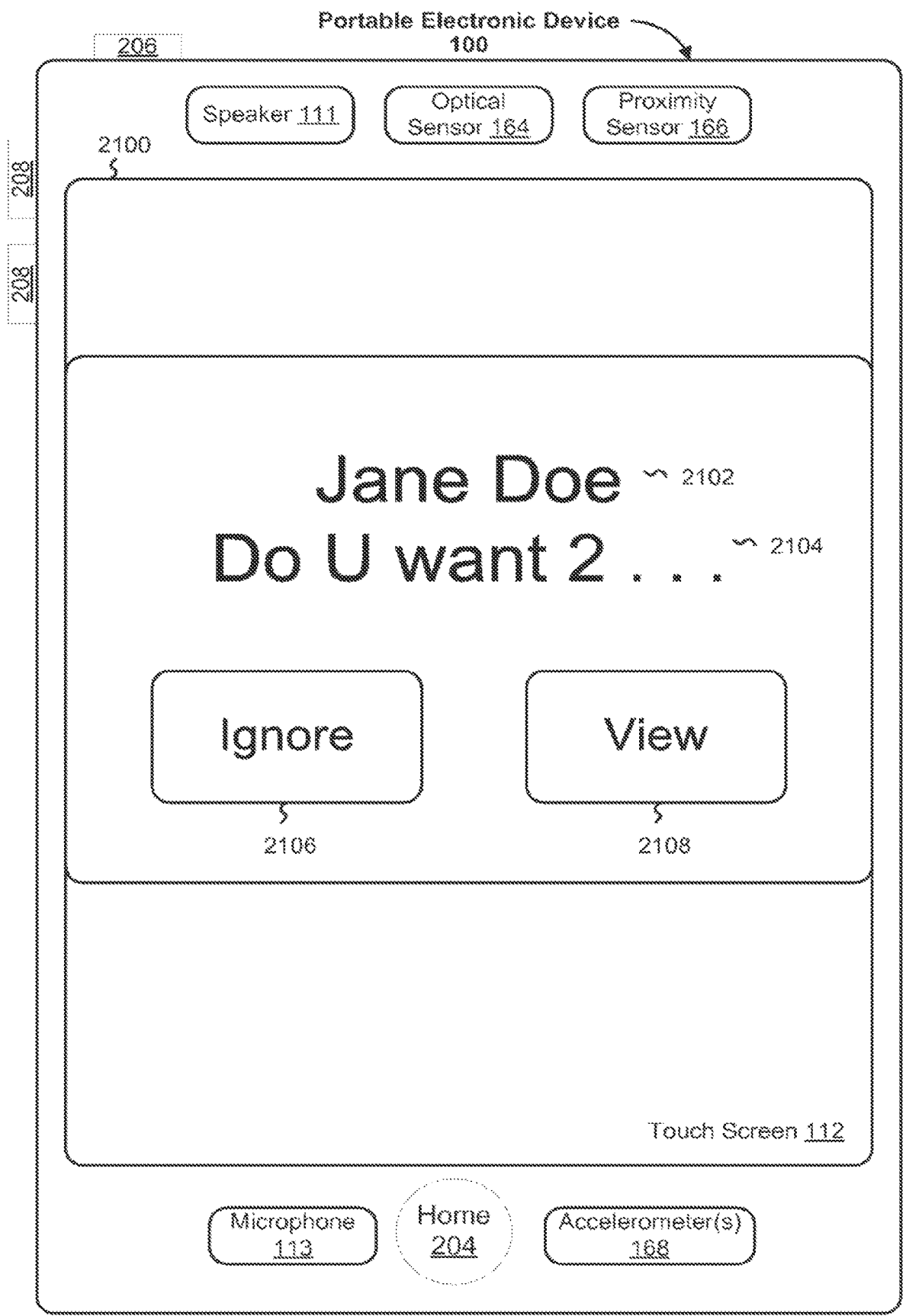
FIG. 21 illustrates an exemplary user interface for alerting a user to a new instant message in accordance with some embodiments.

In some embodiments, the portable electronic device receives an instant message while the user of the device is using another application, e.g., browsing a web page using the browser 147 or listening to music using the music player 146. In this case, the device may replace the user interface of an on-going application with a new user interface on the touch screen 112 or superimpose a new user interface on top of the user interface for the on-going application. FIG. 21 illustrates an exemplary user interface for alerting a user to a new instant message in accordance with some embodiments. This user interface may or may not suspend or terminate the on-going application. For example, the user may still listen to the music when this new user interface appears on the touch screen 112. This may be true even if the user subsequently chooses to activate the IM module 141 and respond to the new message.

In some embodiments, the new user interface (e.g., UI2100, FIG. 21) includes the following elements, or a subset or superset thereof:

the name 2102 of the person sending the instant message (e.g., Jane Doe), which may be determined by matching the phone number or email address for the incoming instant message with a phone number or email address in the user's contacts 137;

the newly received instant message or a portion thereof 2104 (e.g., "Do U want 2 . . . ");

a first action icon 2106, e.g., "Ignore"; and a second action icon 2108, e.g., "View."

A user selection of the "Ignore" icon 2106 brings back the user interface of the on-going application and the user can resume the operation that was interrupted by the incoming message. A user selection of the "View" icon 2108 may bypass the user interface 500 and bring the user directly to the user interface 600A that includes the new instant message. The user can then perform any message-related operations, as described below.

In some embodiments, the portable electronic device may receive an instant message while it is in the lock mode. In this case, the device may include a visual alert indicating the arrival of the new message in the user interface 300 and/or generate an audio alert through the device's speaker 111. If the user of the device unlocks the device's touch screen 112 in response to the visual and/or audio alert, the user may see user interface 600A (not user interface 400) on the touch screen. FIGS. 23A-23L, discussed below, also illustrate exemplary UIs for handling incoming instant messages.

As shown in FIG. 6A, the instant messages 604 from Jane Doe may be displayed on the left side of the message display region with the most recent message (e.g., 604-2) towards the bottom. The messages sent by the user to Jane Doe are on the opposite side of the display region. The messages' relative vertical locations correspond to the order in which these messages are exchanged between the user of the device and Jane Doe. Selected timestamps 608 further indicate when these messages are exchanged. In some embodiments, a timestamp is displayed near the message it is associated with. If the message display region does not have enough room to display the timestamp of every message currently in the message display region, the device may display timestamps for a subset of the messages, e.g., a timestamp 608-1 corresponding to the message 604-1 at the top of the message region and a timestamp 608-2 corresponding to the message 606-2 at the bottom of the message region. In some embodiments, the device may display more timestamps for messages in the middle if, e.g., the time gap between the two messages is above a predefined threshold. From the instant messages, the user can easily capture the topic of the conversation. If necessary, the user can browse the other old messages not currently on display by applying a scrolling gesture 610 on the message display region (1112). In response, the portable electronic device scrolls the set of message conversations (1124). In some embodiments, the scrolling gesture is independent of the horizontal position of the user contact with the touch screen display. In some embodiments, the scrolling gesture is substantially independent of the horizontal position of the user contact with the touch screen display, as described above.

In some embodiments, the device highlights certain portions of incoming and outgoing messages using, e.g., underlines, distinct font sizes or styles, and/or colors. Typically, the highlighted portions are deemed to have special connotations such as phone numbers, URLs, stock tickers, or contacts' names. These highlighted message portions may be user-selectable. For example, a user finger gesture on the highlighted portion "apple.com" of the message 604-2 causes the activation of the browser 147, which then brings up the home page of the website www.apple.com. Similarly, a user finger gesture on a telephone number activates the phone 138 and initiates a call to the telephone number.

In some embodiments, a vertically downward scrolling gesture scrolls the conversation downward, thereby showing older messages in the conversation. In some embodiments, a vertically upward scrolling gesture scrolls the conversation upward, thereby showing newer, more recent messages in the conversation. In some embodiments, as noted above, the last message in the conversation (e.g., 606-2) is displayed in the list of instant message conversations 500 (e.g., 506-1).

In some embodiments, vertical bar 630 is displayed temporarily after an object is detected on or near the touch screen display (e.g., a finger touch is detected anywhere on the list of instant messages). In some embodiments, the vertical bar 630 has a vertical position on top of the displayed portion of the list that corresponds to the vertical position in the list of the displayed portion of the list. In some embodiments, the vertical bar 630 has a vertical length that corresponds to the portion of the list being displayed. For example, in FIG. 6A, the vertical position of the vertical bar 630 indicates that the bottom of the list of messages is being displayed (which correspond to the most recent messages) and the vertical length of the vertical bar 630 indicates that roughly half of the messages in the conversation are being displayed.

In response to the user's finger gestures on different letter keys in the keyboard (1114), a new instant message is composed in the text box 612. A more detailed description of this composition process is provided below in connection with FIG. 12. In some embodiments, the keyboard 616 in FIG. 6A has only 26 English characters due to the touch screen's limited size. To enter characters such as digits, punctuation and other special symbols, the user needs to tap on the keyboard selector icon 618 (1120) and/or the shift key icon 628 (1116) to bring in additional keyboards or switch the existing keyboard to a different display mode (e.g., from upper/lower case to lower/upper case). More detailed descriptions of these processes are provided below in connection with FIGS. 13 and 14, respectively. After completing the new message, the user taps on the send message icon 614 to transmit the message to the other participant of the conversation (1118). A more detailed description of the sending process is provided below in connection with FIG. 15.

Figure 12:
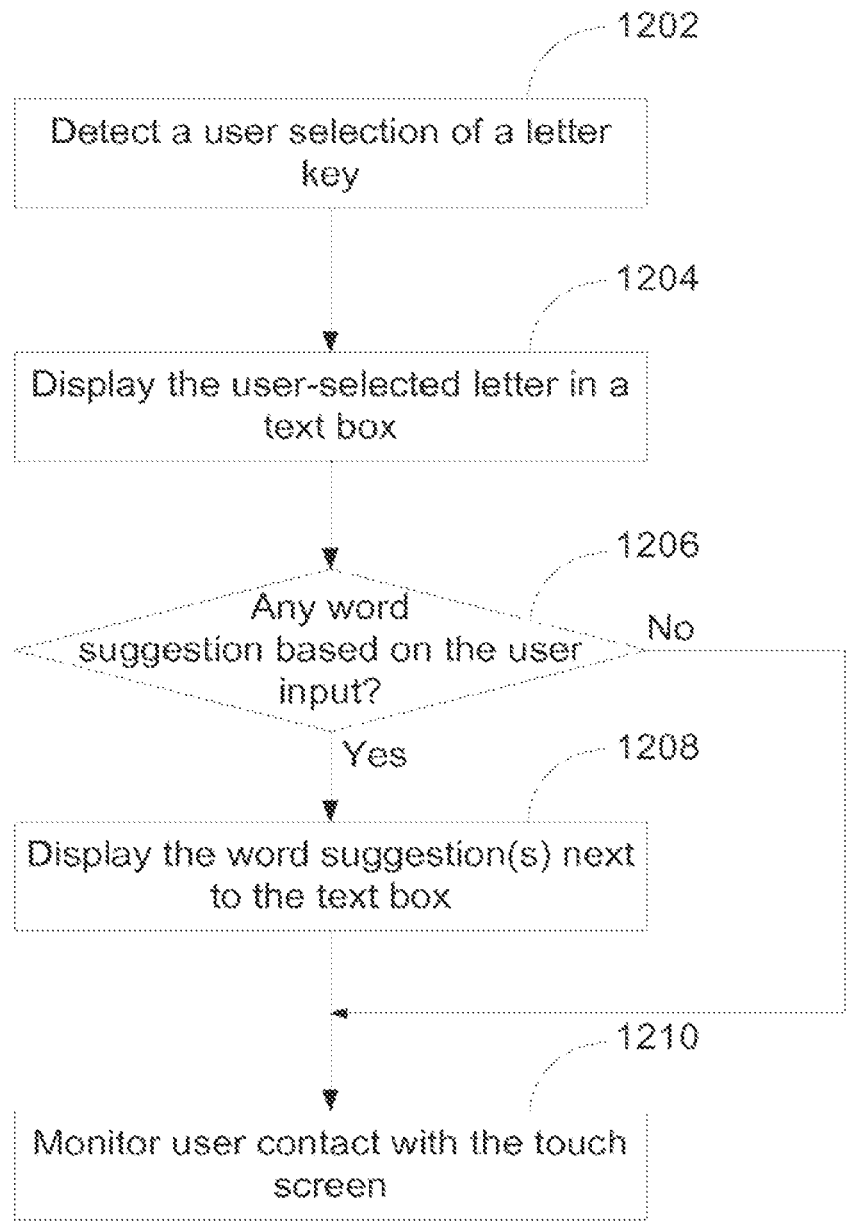
FIG. 12 is a flowchart illustrating a process for displaying a user-entered character and word suggestions, if any, in accordance with some embodiments.

FIG. 12 is a flowchart illustrating a process for displaying a user-entered character and word suggestions, if any, in accordance with some embodiments. Upon detecting a user selection of a letter key (1202), the portable electronic device displays the user-selected letter in the text box 612 (1204). To expedite the process of composing the new message, the portable electronic device may determine if it can offer any word suggestions based on the user input (1206). To do so, the portable electronic device may apply linguistics-based algorithms (e.g., as described in U.S. patent application Ser. No. 11/549,624, titled "Method, System, and Graphical User Interface for Text Entry with Partial Word Display" filed Oct. 13, 2006, which is hereby incorporated by reference in its entirety) to the user input and display one or more related words from its database (1208).

Figure 6B:
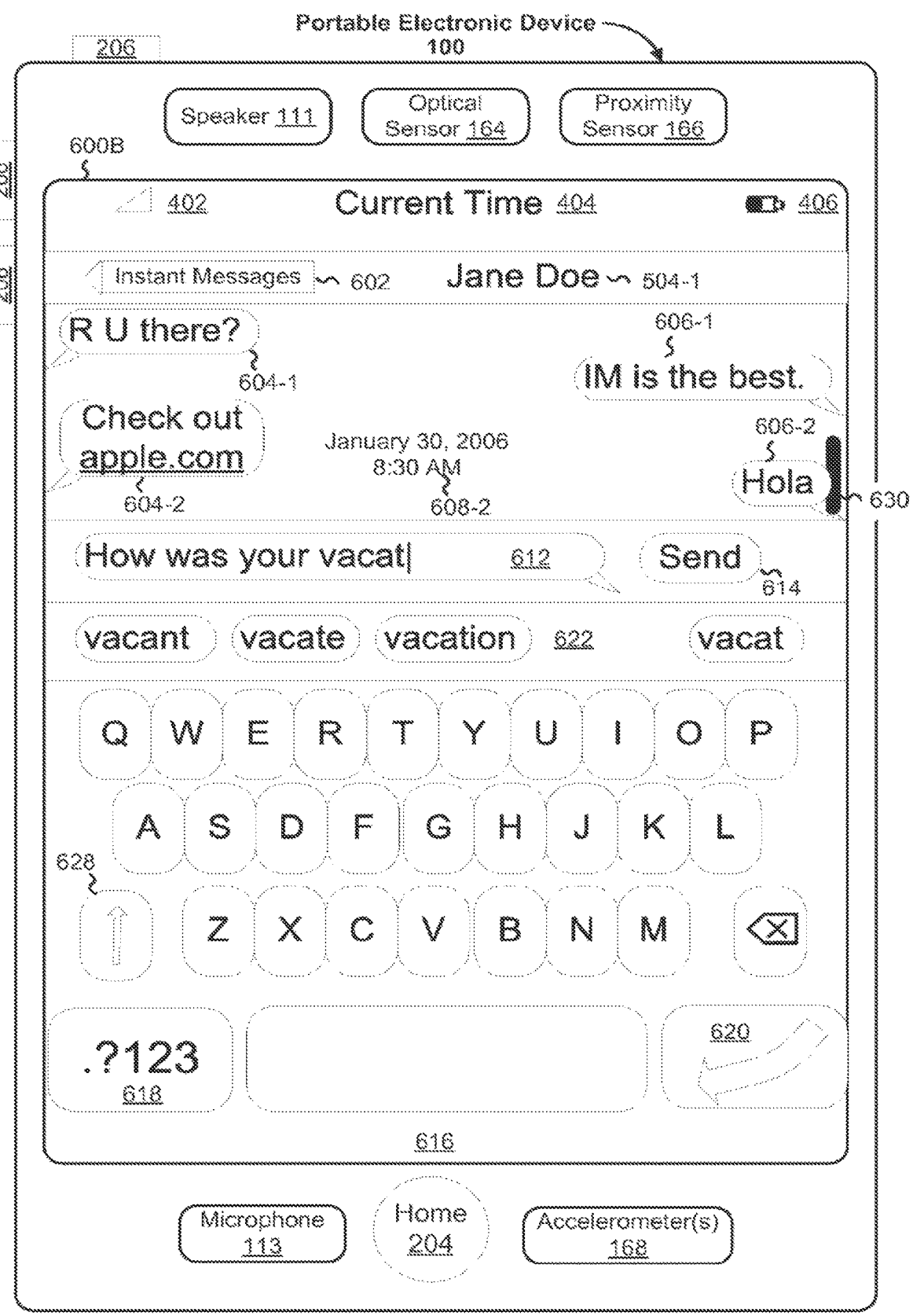

As shown in FIG. 6B, user interface 600B (FIG. 6B) includes the following elements, or a subset or superset thereof:
- 402, 404, 406, 602, 604, 606, 608, 612, 614, 616, 618, and 620 as described above; and
- word suggestion area 622 that provides a list of possible words to complete the word fragment being typed by the user in text box 612.

In this example, based on the user-entered string "vacat", the portable electronic device displays three possible words, "vacant", "vacate", and "vacation", in the area 622. The user can choose any of them by finger tapping on a respective word icon. Alternatively, the user can ignore all the computer-suggested words by tapping on the icon that exactly matches his input. In some embodiments, the portable electronic device also saves the user input as a new word in its database. Subsequently, when the user enters the same string or a subset thereof, the portable electronic device may display this new word as one of the word suggestions. In some embodiments, the word suggestion area does not appear in UI 600B until after a predefined time delay (e.g., 2-3 seconds) in text being entered by the user. In some embodiments, the word suggestion area is not used or can be turned off by the user. In some embodiments, a suggested word (e.g., 644 FIG. 6H, discussed below) is displayed next to the user-entered string (e.g., just above or just below the string), rather than in a separate area 622.

If there is no suggestion by the portable electronic device or if the option is turned off, the portable electronic device resumes monitoring the user contact with the touch screen and acts accordingly (1210).

Additional description of providing word suggestions can be found in U.S. patent application Ser. No. 11/620,642, "Method, System, and Graphical User Interface for Providing Word Recommendations," filed Jan. 5, 2007, the content of which is hereby incorporated by reference in its entirety.

As noted above, the keyboard 616 may not include all the characters the user would like to enter. There are different approaches to bringing in additional characters. For example, as shown in FIG. 6B, the user can tap on the keyboard selector icon 618 to replace the current letter keyboard 616 with a new keyboard that includes a different set of characters such as digits and/or punctuation.

Figure 13:
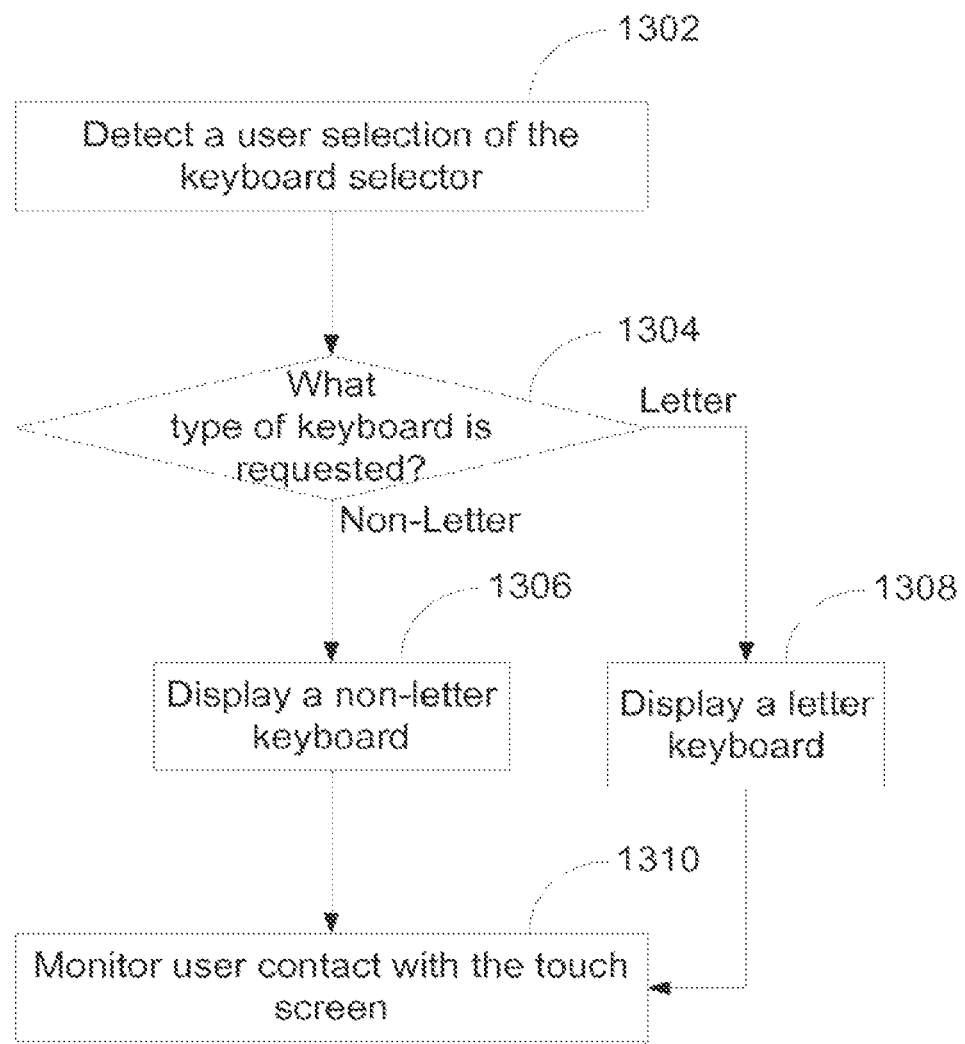
FIG. 13 is a flowchart illustrating a process for displaying respective keyboards upon detecting a user contact with a keyboard selection icon in accordance with some embodiments.

FIG. 13 is a flowchart illustrating a process for displaying respective keyboards upon detecting a user contact with a keyboard selection icon in accordance with some embodiments. In response to a user selection of the keyboard selector 618 (1302), the portable electronic device checks what type of keyboard is requested (1304). Depending on the type of the requested keyboard, the portable electronic device displays a letter keyboard (1308) or non-letter keyboard (1306). In some embodiments, the meaning of the user contact with the keyboard selector icon 618 depends on the keyboard's current display mode. Following the display of the requested keyboard, the portable electronic device then resumes monitoring the user contact with the touch screen (1310).

Figure 6C:
Figure 6D:
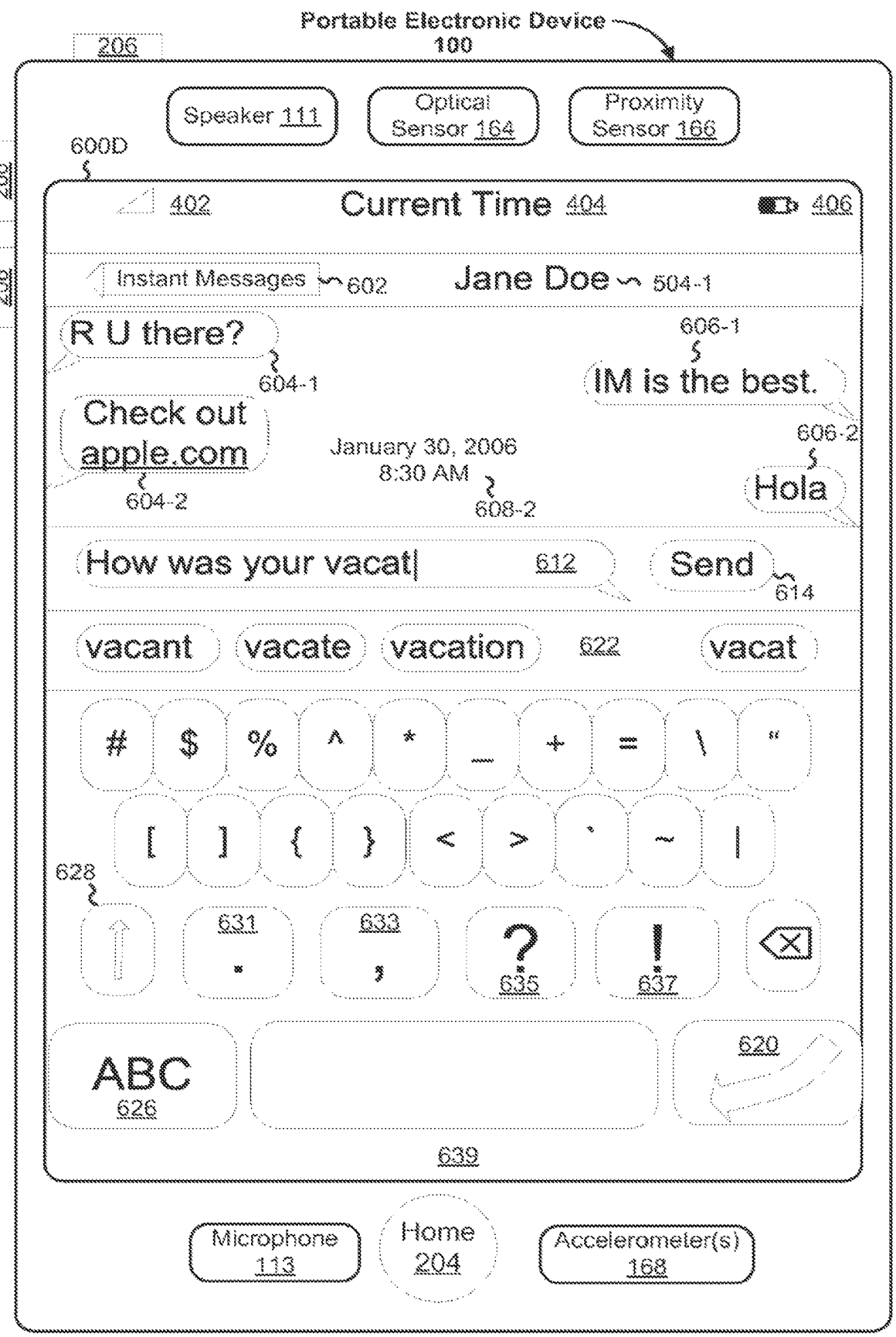

As shown in FIG. 6C, after a user finger gesture on the keyboard selector icon 618 in FIG. 6B, a new user interface 600C is rendered on the touch screen with the following elements, or a subset or superset thereof:
- 402, 404, 406, 602, 604, 606, 608, 612, 614, 620, and 622 as described above;
- Alternate keyboard 624, which may be made up primarily of digits and punctuation, with frequently used punctuation keys (e.g., period key 631, comma key 633, question mark key 635, and exclamation point key 637) made larger than the other keys;
- Letter keyboard selector icon 626 that when activated (e.g., by a finger gesture on the icon) initiates the display of a letter keyboard (e.g., 616, FIG. 6A); and
- Shift key 628 that when activated (e.g., by a finger gesture on the icon) initiates display of yet another keyboard (e.g., 639, FIG. 6D).

Note that the non-letter keyboard selector 618 in FIG. 6B is now replaced with the letter keyboard selector 626 in FIG. 6C. In some embodiments, the period key 631 and the comma key 633 are located near the keyboard selector icon 626 to reduce the distance that a user's finger needs to travel to enter the oft-used period and comma.

But the alternate keyboard 624 may not be all-inclusive. For example, it may not have any arithmetic operators such as "+", "−", "*", or "/". A finger gesture on the keyboard selector 626 brings back the letter keyboard 616, not any new keyboards. In some embodiments, the user may tap on another multi-function key, e.g., the shift key 628, to bring in additional keyboards.

Figure 14:
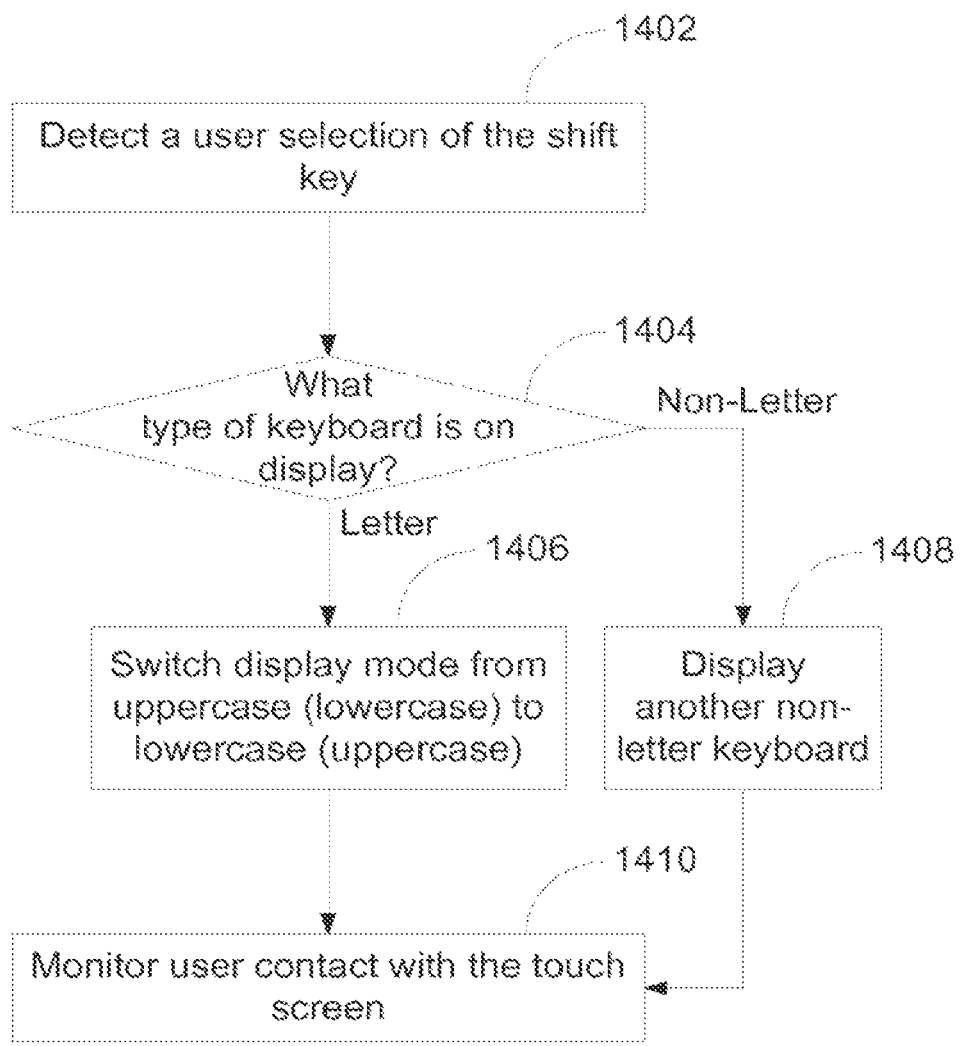
FIG. 14 is a flowchart illustrating a process for interpreting the meaning of a particular user contact with the shift key in accordance with some embodiments.

In some embodiments, like the keyboard selector icons (618, 626), the shift key 628 has different meanings in different contexts. FIG. 14 is a flowchart illustrating a process for interpreting the meaning of a particular user contact with the shift key 628 in accordance with some embodiments. The portable electronic device detects user selection of the shift key (1402). The portable electronic device checks what keyboard is currently displayed on the touch screen (1404). If the current one is a letter keyboard, a finger gesture on the shift key triggers the portable electronic device to switch its display mode of the subsequent user-entered letters from uppercase to lowercase or vice versa (1406).

Referring back to FIG. 6B, in some embodiments, the portable electronic device, by default, only displays the first letter "h" of the first word "how" in uppercase. If the user wants to enter another uppercase letter in the same sentence, he can tap on the shift key 628. As a result, the shift key 628 is displayed in a visually different manner (e.g., with a different color or shading) after the finger gesture. In some embodiments, the shift key 628 returns to the lowercase mode after the user enters the next letter in uppercase. If the user wants to enter a sequence of uppercase letters, he can maintain the finger contact with the shift key 628 for a predefined extended period of time (e.g., 1-3 seconds) until the shift key 628 has a new appearance. In some other embodiments, the shift key 628 stays in the uppercase mode for all subsequent user-entered letters until another finger gesture is detected on the shift key 628.

Returning now to FIG. 14, the user contact with the shift key 628 has a different meaning if the current keyboard is a non-letter keyboard (e.g., the alternate keyboard 624 in FIG. 6C). Because none of the characters in the keyboard 624 have two different display modes, the portable electronic device replaces the keyboard 624 with another non-letter keyboard 639 (1408) and then waits for the next user contact with the touch screen (1410).

FIG. 6D is a screenshot of the corresponding user interface 6001), which includes the following elements, or a subset or superset thereof:

- 402, 404, 406, 602, 604, 606, 608, 612, 614, 620, 622, 626, 628 as described above; and
- Another alternate keyboard 639, which may be made up primarily of symbols and punctuation, with frequently used punctuation keys (e.g., period key 631, comma key 633, question mark key 635, and exclamation point key 637) made larger than the other keys.

Like the keyboard 624, none of the characters in the keyboard 639 have two different display modes. In some embodiments, the user can tap again on the shift key 628 to bring in more alternate keyboards with more special characters or symbols. In some embodiments, the user can tap again on the shift key 628 to return to the alternate keyboard 624. At any time, the user can also switch back to the letter keyboard by tapping on the keyboard selection icon 626.

Additional description of selecting soft keyboards can be found in U.S. patent application Ser. No. 11/553,431, "Method, System, and Graphical User Interface for Selecting a Soft Keyboard," filed Oct. 26, 2006, the content of which is hereby incorporated by reference in its entirety.

Figure 6E:
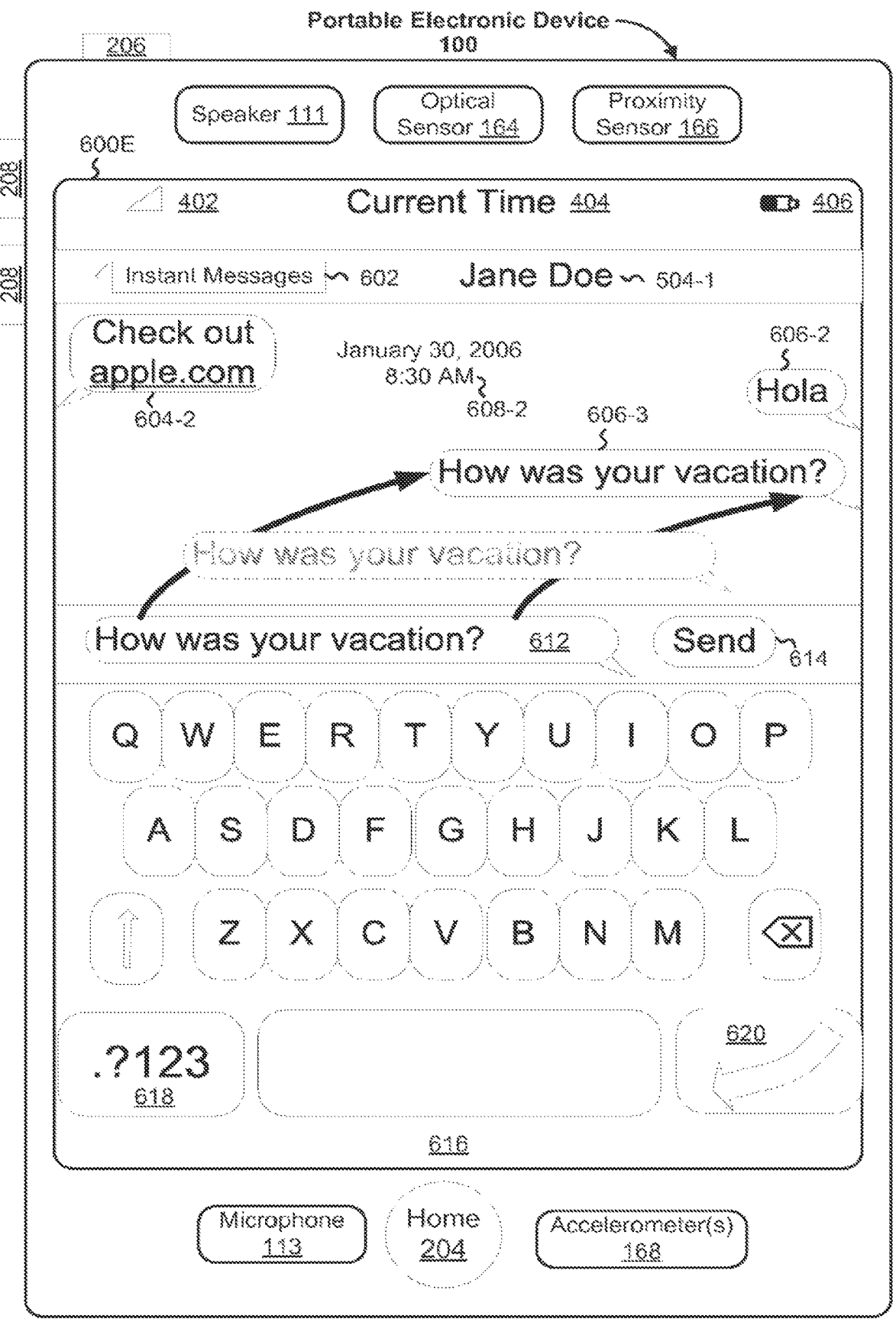
Figure 6F:
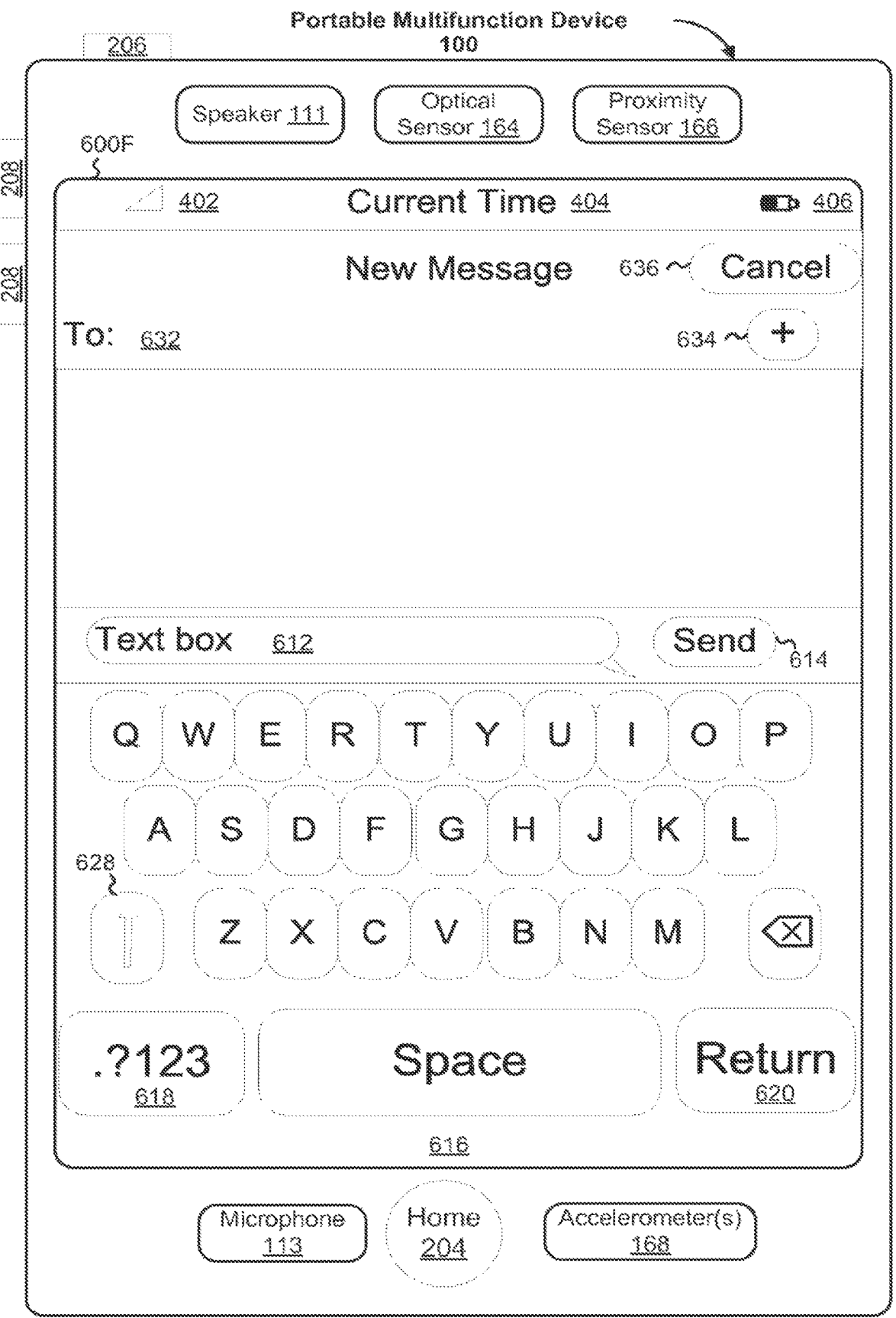
Figure 6G:
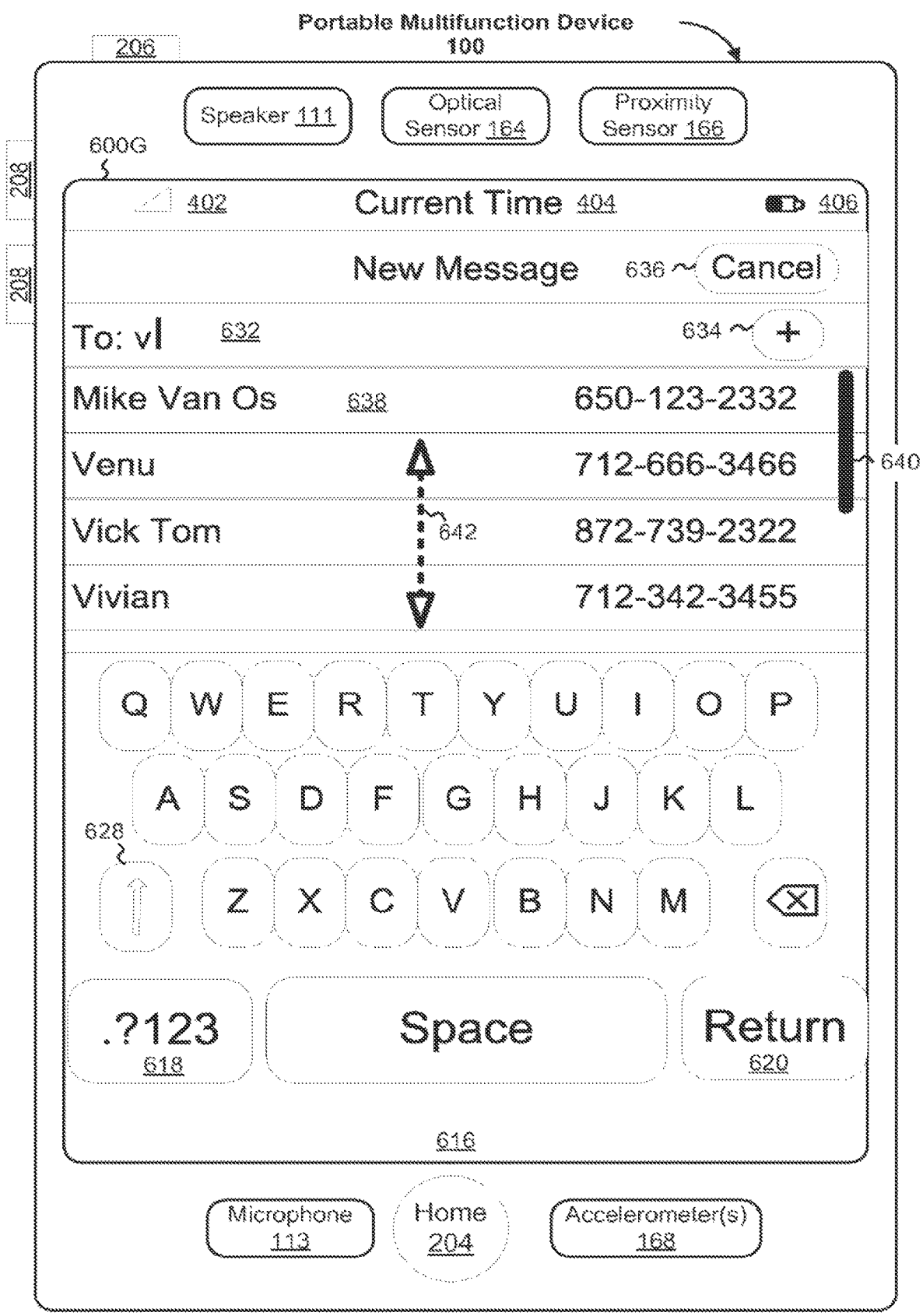

After completing a new message, the user sends the message by activating (e.g., with a finger gesture) the send message icon 614. FIG. 6E depicts such a user interface 600E that includes the following elements, or a subset or superset thereof:

- 402, 404, 406, 602, 604, 606, 608, 612, 614, 616, 618, and 620, as described above; and
- New instant message 606-3 sent to the other party.

In some embodiments, this user finger gesture triggers an animation of the new message moving from the text box 612 to the side of the message display region showing messages sent by the user of the device. For example, when the user activates a send key (e.g., either 614), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

Figure 15:
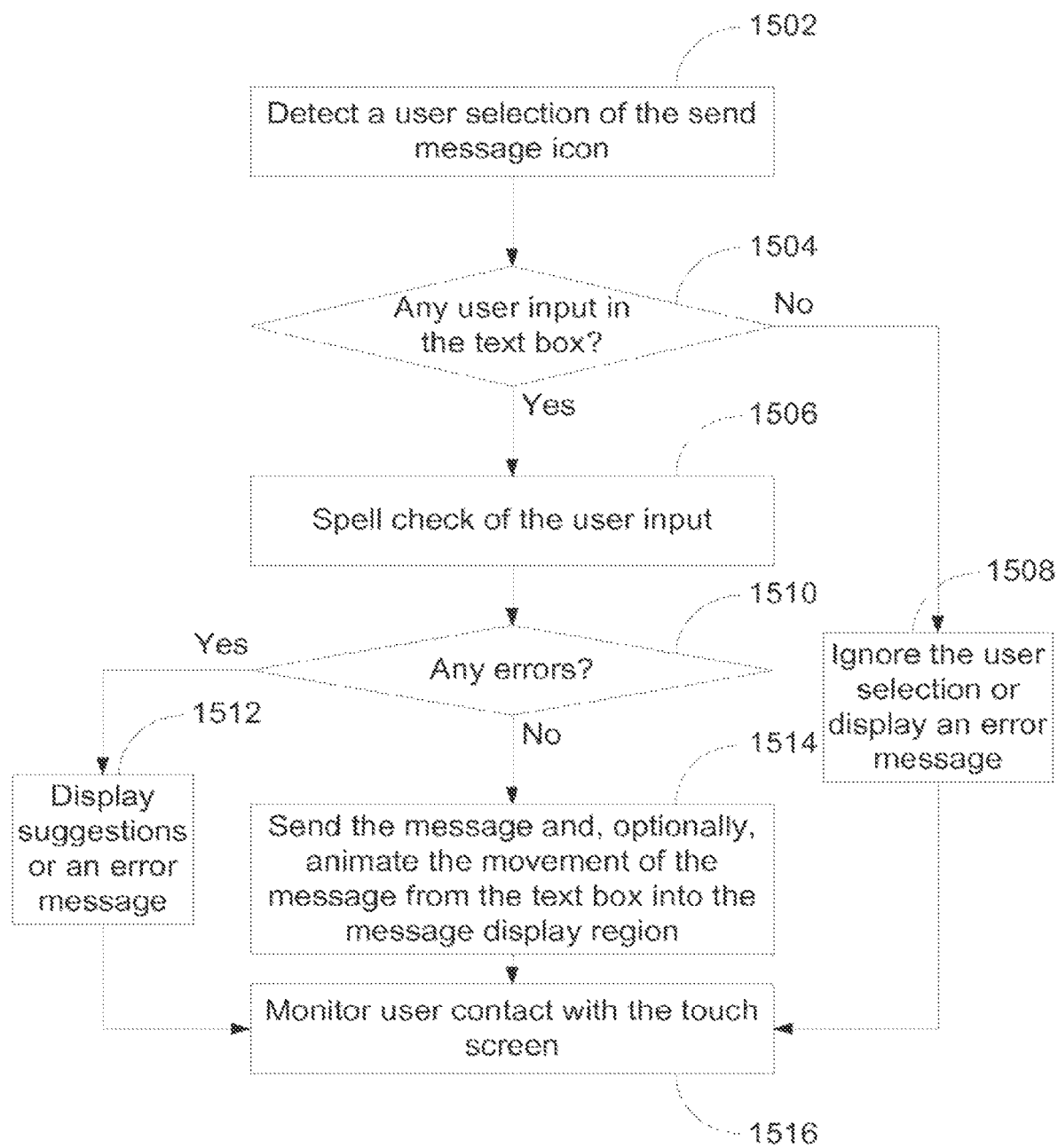
FIG. 15 is a flowchart illustrating a process for sending an instant message to a respective recipient in accordance with some embodiments.

FIG. 15 is a flowchart illustrating a process for sending an instant message to a respective recipient in accordance with some embodiments. In response to a user selection of the send message icon (1502), the portable electronic device checks if there is any user input in the text box (1504). If not, it may simply ignore the user's finger gesture on the send icon or display an error message on the touch screen (1508). In some embodiments, the visual appearance of the send icon 614 is changed (e.g., dimmed) if there is no user input in the text box.

If there is any user input in the text box (1504, yes), the portable electronic device may optionally conduct a spell check of the user input (1506). If there are any spelling errors (1510, yes), an error message and/or word suggestions are displayed on the touch screen for the user to choose (1512). If there are no spelling errors, the portable electronic device sends the message and may also animate the movement of the new message from the text box into the message display region (1514). The portable electronic device then monitors the user contact with the touch screen (1516).

In some embodiments, keys in keyboards 616 (FIGS. 6A, 6B, 6E-6K), 624 (FIG. 6C), and/or 639 (FIG. 6D) briefly change shape, shade and/or color when touched/activated by a user to help the user learn to activate the desired keys. In some embodiments, a user selection of any key on the touch screen by a finger gesture is accompanied by a sound for the same purpose. In some other embodiments, different sounds are associated with different types of keystrokes to indicate what keys have been "pressed" by the user. In some embodiments, an outline or shaded area corresponding to the user's finger contact is shown on the keyboard to help train the user.

In some embodiments, a user can delete an instant message from a conversation by finger tapping on the corresponding quote bubble in the message display region. The portable electronic device, in response, grays out the bubble and pops up a small window on the touch screen. The small window may include a "Yes" icon and a "No" icon. If the user re-affirms his decision of deleting the message by finger tapping on the "Yes" icon, the portable electronic device removes the bubble from the message display region. But if the user chooses the "No" icon, the quote bubble resumes its normal appearance.

In some embodiments, user interface 600F (FIG. 6F) includes the following elements, or a subset or superset thereof:

- 402, 404, 406, 612, 614, 616, 618, 620, and 628, as described above;
- Recipient input field 632 that when activated (e.g., by a finger tap on the field) receives and displays the phone number of the recipient of the instant message (or the recipient's name if the recipient is already in the user's contact list);
- Add recipient icon 634 that when activated (e.g., by a finger tap on the icon) initiates the display of a scrollable list of contacts (e.g., 638, FIG. 6G); and
- Cancel icon 636 that when activated (e.g., by a finger tap on the icon) cancels the new instant message.

In some embodiments, user interface 600G (FIG. 6G) includes the following elements, or a subset or superset thereof:

- 402, 404, 406, 616, 618, 620, 628, 632, 634, and 636, as described above;
- Scrollable list 638 of contacts that match the input in recipient input field 632; and
- Vertical bar 640 that helps a user understand how many items in the contact list that match the input in recipient input field 632 are being displayed.

In some embodiments, list 638 contains contacts that match the input in recipient input field 632. For example, if the letter "v" is input, then contacts with either a first name or last name beginning with "v" are shown. If the letters "va" are input in field 632, then the list of contacts is narrowed to contacts with either a first name or last name beginning with "va", and so on until one of the displayed contacts is selected (e.g., by a tap on a contact in the list 638).

In some embodiments, a user can scroll through the list 638 by applying a vertical swipe gesture 642 to the area displaying the list 638. In some embodiments, a vertically downward gesture scrolls the list downward and a vertically upward gesture scrolls the list upward, In some embodiments, vertical bar 640 is displayed temporarily after an object is detected on or near the touch screen display (e.g., a finger touch is detected anywhere on the list 638). In some embodiments, the vertical bar 640 has a vertical position on top of the displayed portion of the list that corresponds to the vertical position in the list of the displayed portion of the list. In some embodiments, the vertical bar 640 has a vertical length that corresponds to the portion of the list being displayed.

In some embodiments, user interfaces 600H (FIG. 6H) and 600I (FIG. 6I) include the following elements, or a subset or superset thereof:

402, 404, 406, 612, 614, 616, 618, 620, 628, 632, 634, and 636, as described above;

Suggested word 644 adjacent to the word being input;

Suggested word 646 in the space bar in keyboard 616; and/or

Insertion marker 656 (e.g., a cursor, insertion bar, insertion point, or pointer).

In some embodiments, activating suggested word 644 (e.g., by a finger tap on the suggested word) replaces the word being typed with the suggested word 644. In some embodiments, activating suggested word 646 (e.g., by a finger tap on the space bar) replaces the word being typed with the suggested word 646. In some embodiments, a user can set whether suggested words 644 and/or 646 are shown (e.g., by setting a user preference).

In some embodiments, a letter is enlarged briefly after it is selected (e.g., "N" is enlarged briefly after typing "din" in FIG. 6H) to provide feedback to the user.

In some embodiments, user interfaces 600J (FIG. 6J) and 600K (FIG. 6K) include the following elements, or a subset or superset thereof:

402, 404, 406, 612, 614, 616, 618, 620, 628, 632, 634, 636, and 656 as described above; and Expanded portion 650 of graphics that helps a user adjust the position of an expanded insertion marker 657 (sometimes called an "insertion point magnifier");

Expanded insertion marker 657; and

Vertical bar 658 that indicates what portion of an instant message including multiple lines of text is being displayed.

In some embodiments, a finger contact 648-1 on or near the insertion marker 656 initiates the display of insertion point magnifier 650 and expanded insertion marker 657-1. In some embodiments, as the finger contact is moved on the touch screen (e.g., to position 648-2), there is corresponding motion of the expanded insertion marker (e.g., to 657-2) and the insertion point magnifier 650. Thus, the insertion point magnifier 650 provides an efficient way to position a cursor or other insertion marker using finger input on the touch screen. In some embodiments, the magnifier 650 remains visible and can be repositioned as long as continuous contact is maintained with the touch screen (e.g., from 648-1 to 648-2 to even 648-3).

Figure 6H:
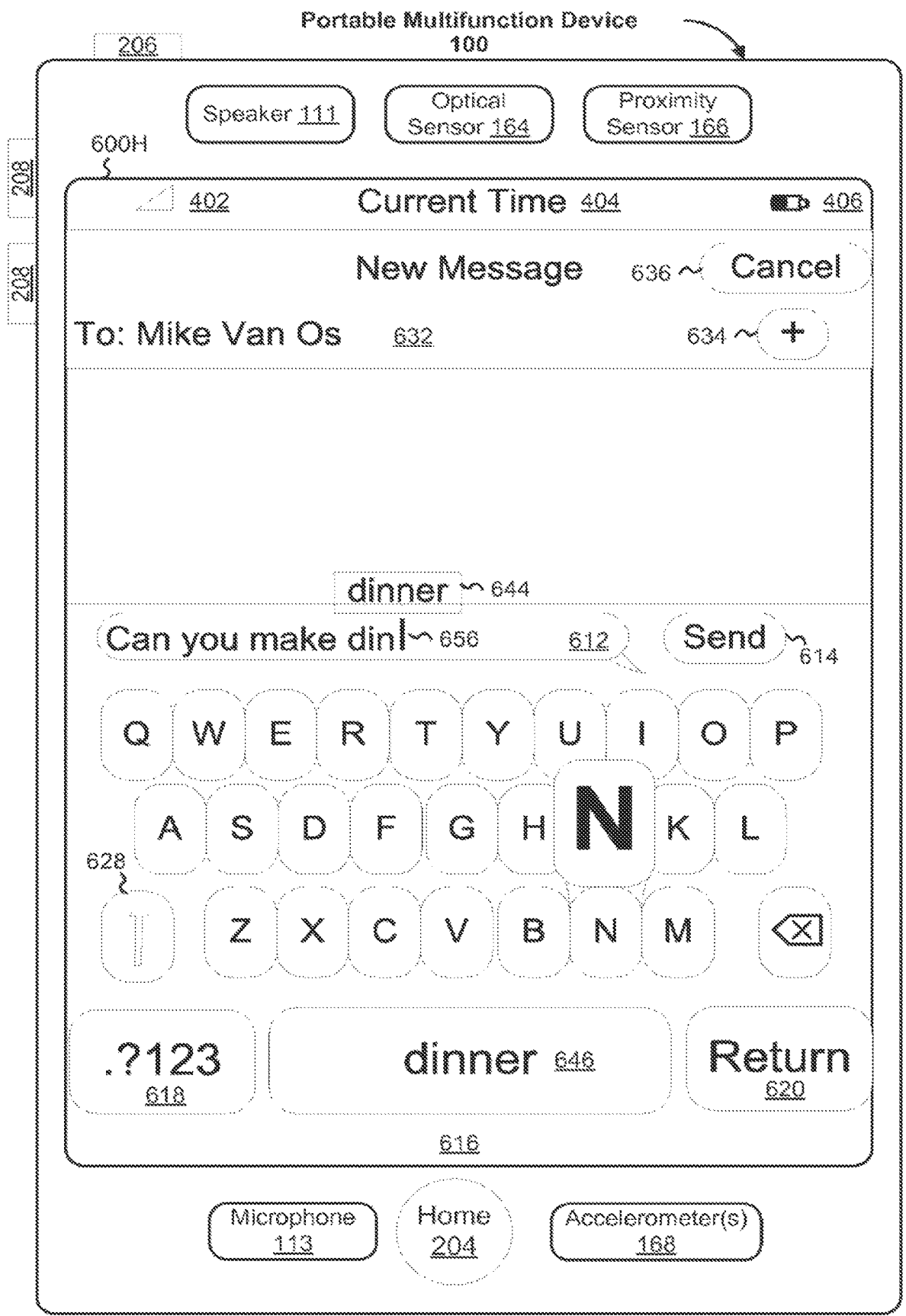
Figure 6I:
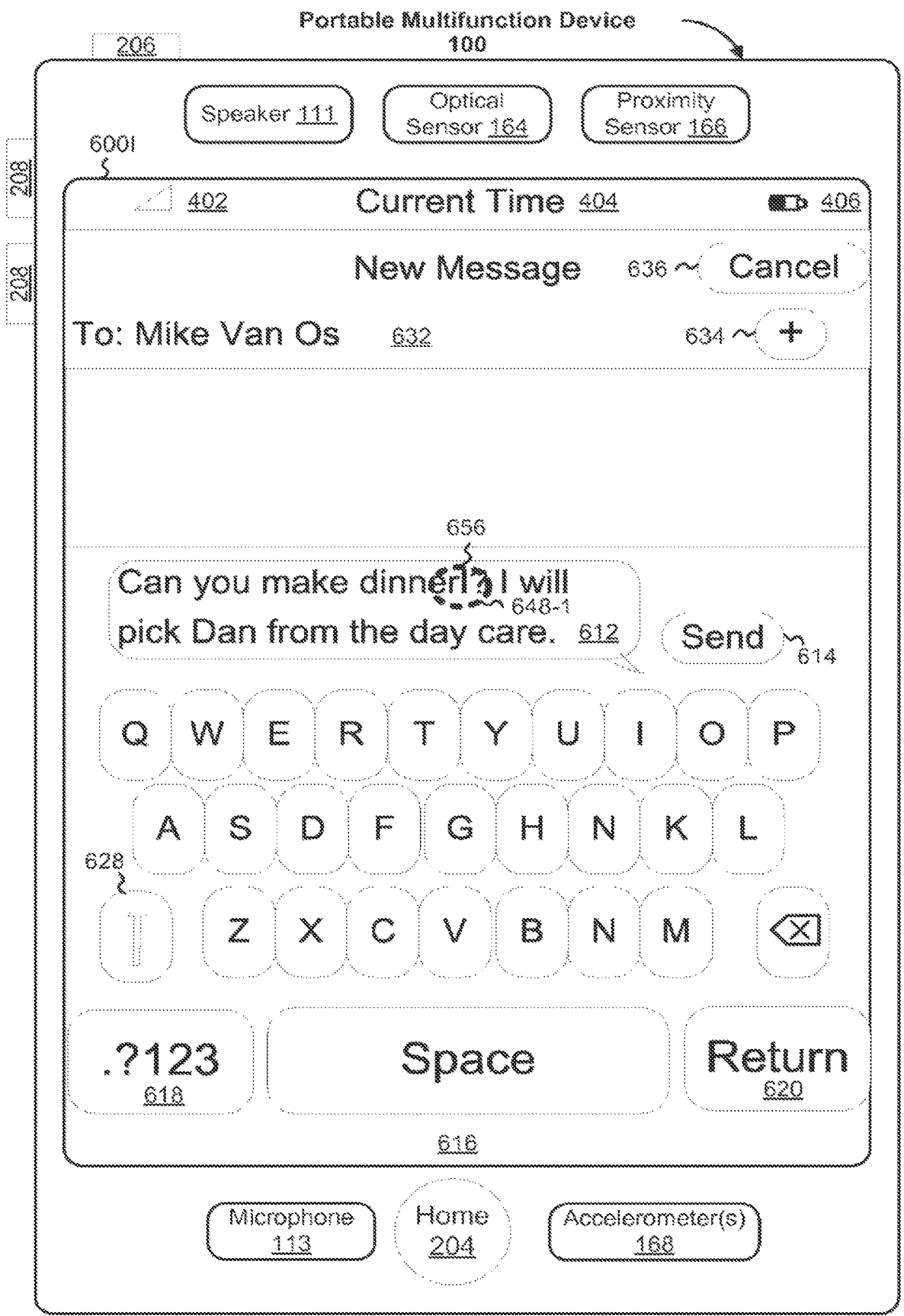

In some embodiments, a portable electronic device displays graphics and an insertion marker (e.g., marker 656, FIG. 6I) at a first location in the graphics on a touch screen display (e.g., FIG. 6I). In some embodiments, the insertion marker 656 is a cursor, insertion bar, insertion point, or pointer. In some embodiments, the graphics comprise text (e.g., text in box 612, FIG. 6I).

A finger contact is detected with the touch screen display (e.g., contact 648-1, FIG. 6I). In some embodiments, the location of the finger contact is proximate to the location of the insertion marker. In some embodiments, the location of the finger contact is anywhere within a text entry area (e.g., box 612, FIG. 6I).

In response to the detected finger contact, the insertion marker is expanded from a first size (e.g., marker 656, FIG. 6I) to a second size (e.g., marker 657-1, FIG. 6J) on the touch screen display, and a portion (e.g., portion 650-1, FIG. 6J) of the graphics on the touch screen display is expanded from an original size to an expanded size.

In some embodiments, the portion of the graphics that is expanded includes the insertion marker and adjacent graphics. In some embodiments, after the insertion point and the portion of the graphics are expanded, graphics are displayed that include the insertion marker and adjacent graphics at the original size and at the expanded size.

Figure 6J:

Movement of the finger contact is detected on the touch screen display (e.g., from 648-1 to 64R-2, FIG. 6J).

The expanded insertion marker is moved in accordance with the detected movement of the finger contact from the first location (e.g., 657-1, FIG. 6J) to a second location in the graphics (e.g., 657-2, FIG. 6J).

In some embodiments, the portion of the graphics that is expanded changes as the insertion marker moves from the first location to the second location (e.g., from 650-1 to 650-2, FIG. 6J). In some embodiments, the portion of the graphics that is expanded is displayed in a predefined shape. In some embodiments the portion (e.g., 650, FIG. 6J) of the graphics that is expanded is displayed in a circle. In some embodiments, the expanded insertion marker 657 is within the circle.

In some embodiments, the detected movement of the finger contact has a horizontal component on the touch screen display and a vertical component on the touch screen display. In some embodiments, moving the expanded insertion marker 657 in accordance with the detected movement of the finger contact includes moving the expanded insertion marker and the expanded portion of the graphics in accordance with the horizontal component of motion of the finger contact if the finger contact moves outside a text entry area without breaking contact. For example, in FIG. 6I, if the finger contact moves from 648-2 (inside the text entry area 612) to 648-3 (in the keyboard area), the expanded insertion point 657 and the expanded portion 650 of the graphics may move horizontally along the lower portion of the text entry area in accordance with the horizontal component of the movement from 648-2 to 648-3 (not shown).

In some embodiments, moving the expanded insertion marker in accordance with the detected movement of the finger contact includes moving the expanded insertion marker in a first area of the touch screen that includes characters entered using a soft keyboard (e.g., text box 612, FIG. 6J), wherein the soft keyboard is located in a second area of the touch screen that is separate from the first area (e.g., keyboard 616, FIG. 6J).

Figure 6K:
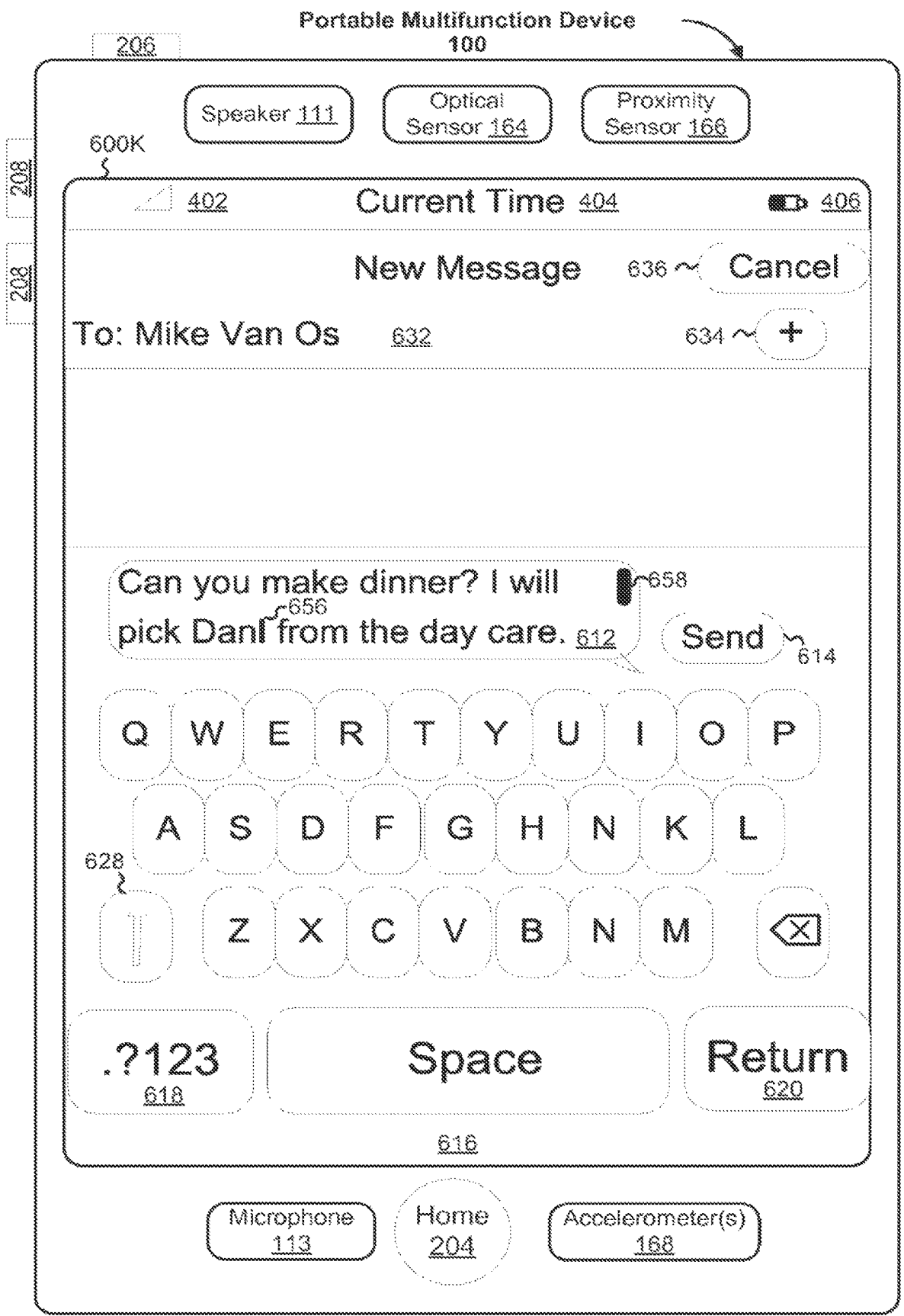

In some embodiments, the expanded insertion marker is contracted from the second size to the first size if finger contact with the touch screen display is broken (e.g., insertion marker 656, FIG. 6K). In some embodiments, the contracting includes an animation of the expanded insertion marker 657 shrinking into the insertion marker 656 at the second location.

In some embodiments, the expanded portion 650 of the graphics is contracted if finger contact with the touch screen display is no longer detected for a predetermined time.

A graphical user interface on a portable electronic device with a touch screen display comprises an insertion marker and graphics. In response to detecting a finger contact 648 with the touch screen display, the insertion marker is expanded from a first size 656 to a second size 657, and a portion 650 of the graphics is expanded. In response to detecting movement of the finger contact on the touch screen display, the expanded insertion marker is moved in accordance with the detected movement of the finger contact from a first location 657-1 in the graphics to a second location 657-2 in the graphics.

As noted above in connection with FIG. 6E, a user finger selection of the send key 614 triggers an animation of the message moving from the text box 612 to the message display region. In some embodiments, prior to sending the message, the size of the text box expands as text is entered (e.g., from one line of text in FIG. 6H to two lines of text in FIG. 6I). In some embodiments, the text box 612 does not have enough room for displaying the entire message if it has too many lines of text (as indicated by the short vertical bar 658). When a quote bubble containing the multi-line message comes out of the text box 612, it may gradually grow its size until a predefined condition is met (e.g., the bubble has enough room to contain the entire message and/or the size of the bubble reaches a threshold that is statically or dynamically determined by the device based on the number of existing messages in the conversation). For example, if the text box shows 3 lines of a 10 line instant message, then the quote bubble may grow from a 3 line quote bubble to a 10 line quote bubble during the animation that moves the message from the text box 612 to the message display region.

Additional description of insertion marker positioning can be found in U.S. patent application Ser. No. 11/553,436, "Method, System, And Graphical User Interface For Positioning An Insertion Marker In A Touch Screen Display," filed Oct. 26, 2006, the content of which is hereby incorporated by reference in its entirety.

Besides deleting individual messages from a conversation, an entire conversation may be deleted via edit icon 512 in FIG. 5. FIG. 7 illustrates an exemplary user interface for deleting an instant message conversation in accordance with some embodiments. In some embodiments, user interface 700 includes the following elements, or a subset or superset thereof:

402, 404, 406, 504, 506, 508, 510, as described above;
Delete icons 702;
Remove icon 704; and
Done icon 706.

Figure 16:
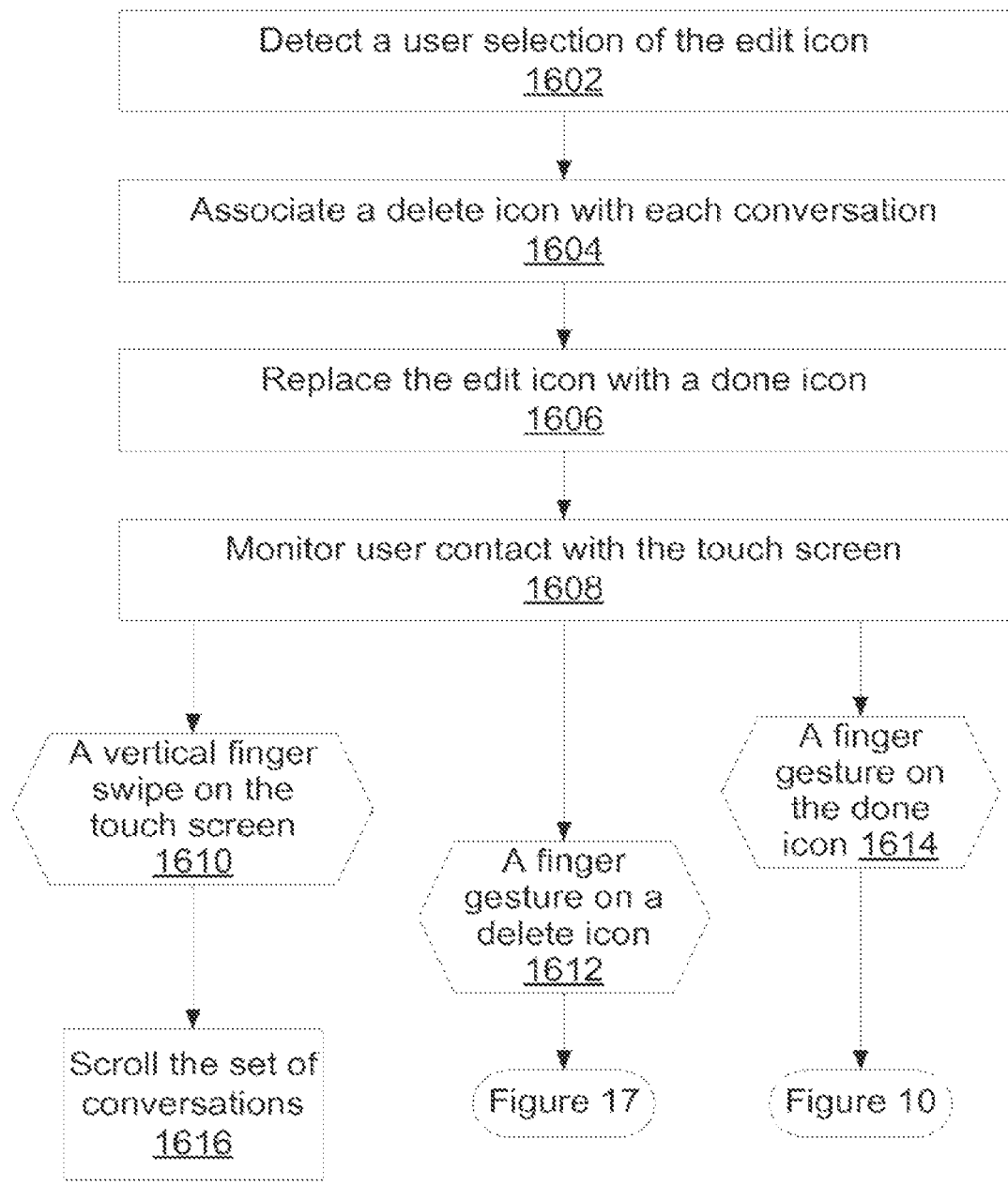
FIG. 16 is a flowchart illustrating a process for displaying a list of instant message conversations for editing in accordance with some embodiments.

FIG. 16 is a flowchart illustrating a process for displaying a list of instant message conversations for editing in accordance with some embodiments. Upon detecting a user selection of the edit icon 512 (1602), the portable electronic device associates a delete icon 702 with each conversation (1604) (e.g., a delete icon 702 appears next to each conversation). Additionally, the portable electronic device may replace the edit icon 512 with a done icon 706 (1606) and monitor user contact with the touch screen (1608).

If the user swipes his finger or stylus on the touch screen in a substantially vertical direction (1610), the portable electronic device scrolls the conversation list (1616). If a user activates a delete icon (e.g., with a finger gesture), the portable electronic device continues the deletion process for the corresponding conversation. A more detailed description of an exemplary conversation removal process is provided below in connection with FIGS. 17 and 18. But if the user touches the done icon, the portable electronic device removes all the delete icons 702 from the touch screen and brings back the conversation list UI as shown in FIG. 5.

Figure 17:
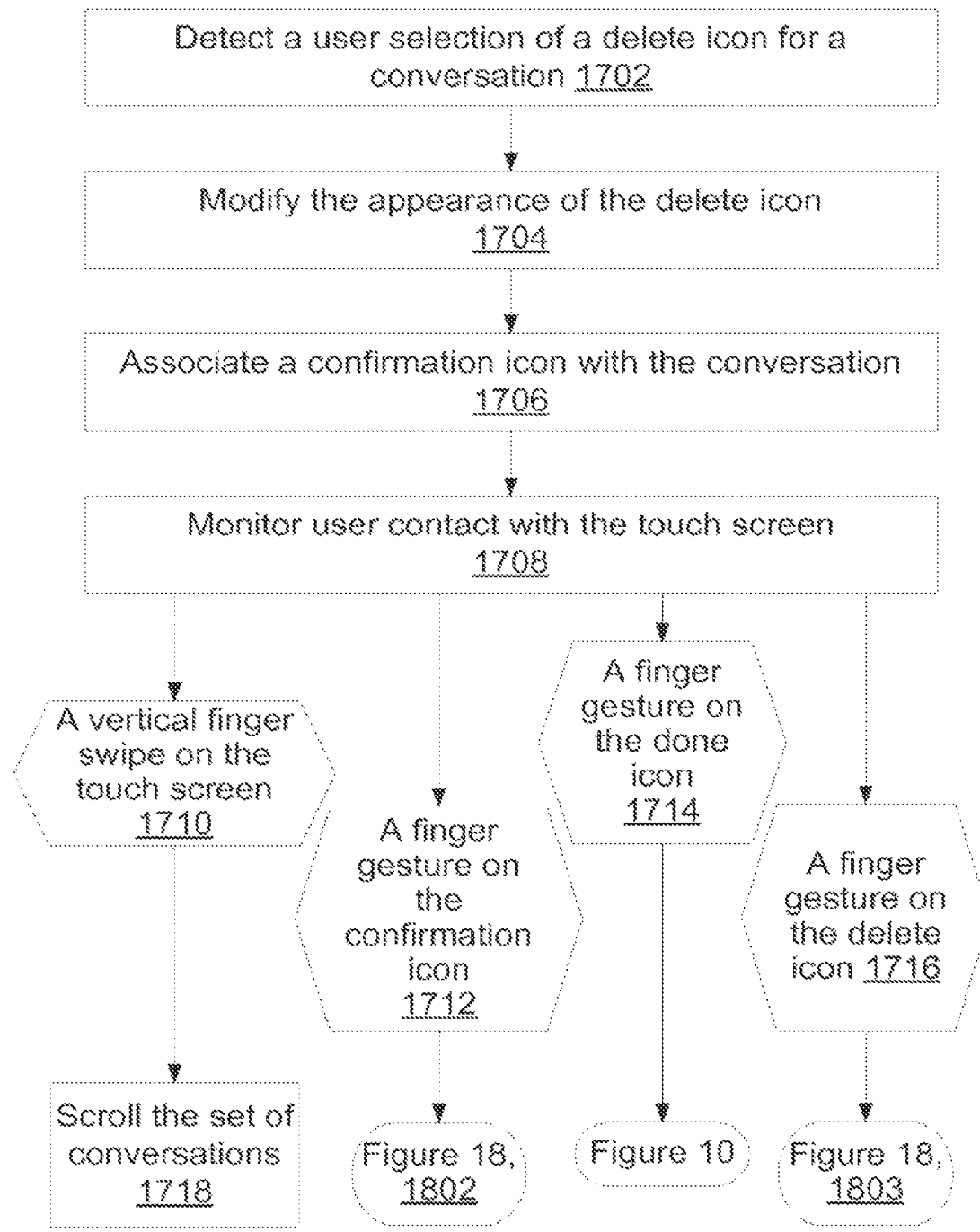
FIG. 17 is a flowchart illustrating a process for editing a user selected instant message conversation in accordance with some embodiments.

FIG. 17 is a flowchart illustrating a process for editing a user selected instant message conversation in accordance with some embodiments. Upon detecting a user selection of the delete icon associated with a conversation (1702), the portable electronic device changes the delete icon's appearance (e.g., rotating the selected delete icon 702-4, FIG. 7, by 90 degrees) (1704). The portable electronic device associates a confirmation icon (e.g., remove icon 704) with the selected conversation (1706). In some embodiments, during the editing process, at most one confirmation icon at a time is displayed on the touch screen. Depending on the next user contact with the touch screen (1708), the portable electronic device may perform different operations to the conversation list. For example, the device may scroll the list up/down in response to a scrolling gesture by the user (1710, 1718). The device may bring back the conversation list UI in response to a finger gesture on the done icon (1714).

Figure 18:
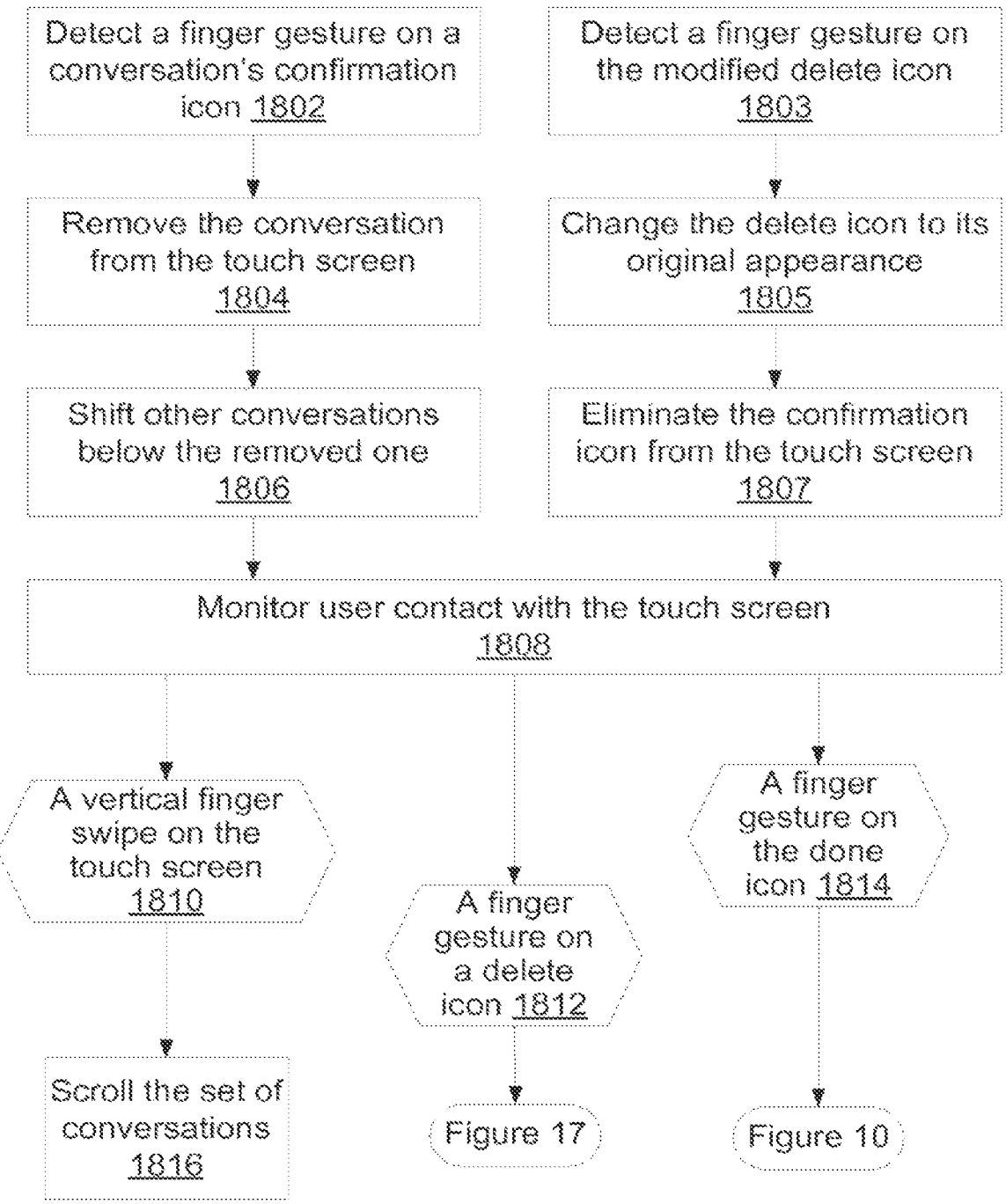
FIG. 18 is a flowchart illustrating a process for removing a user selected instant message conversation or exiting a conversation edit mode in accordance with some embodiments.

FIG. 18 is a flowchart illustrating a process for removing a user selected instant message conversation or exiting a conversation edit mode in accordance with some embodiments. If the user selects the confirmation icon (1712, 1802), the portable electronic device removes the conversation from the touch screen (1804). If the removed conversation is not the last one in the list, the portable electronic device may shift other conversations upward to fill the space left by the removed conversation (1806). A finger gesture on the modified delete icon 702-4 or, in some embodiments, anywhere on the touch screen besides the confirmation icon 704 (1716, 1803) indicates that the user decides not to delete the conversation. Accordingly, the portable electronic device changes the delete icon back to its original appearance (1805) and removes the confirmation icon from the touch screen (1807).

Following the operation 1806 or 1807, the portable electronic device resumes monitoring the user contact with the touch screen (1808). For example, the user may activate the done icon 706 (1814) by tapping on it with a finger when the user has finished deleting IM conversations and the device returns to UI 500. The user may delete another conversation by activating its associated delete icon (1812). If there is a long list of conversations that fill more than the screen area, the user may scroll through the list using vertically upward and/or vertically downward gestures 708 on the touch screen (1810, 1816).

This conversation removal process, which requires multiple gestures by the user on different parts of the touch screen (e.g., delete icon 702-4 and confirmation icon 704 are on opposite sides of the touch screen) can reduce the chance that a user accidentally deletes a conversation or other similar item.

Figure 19:
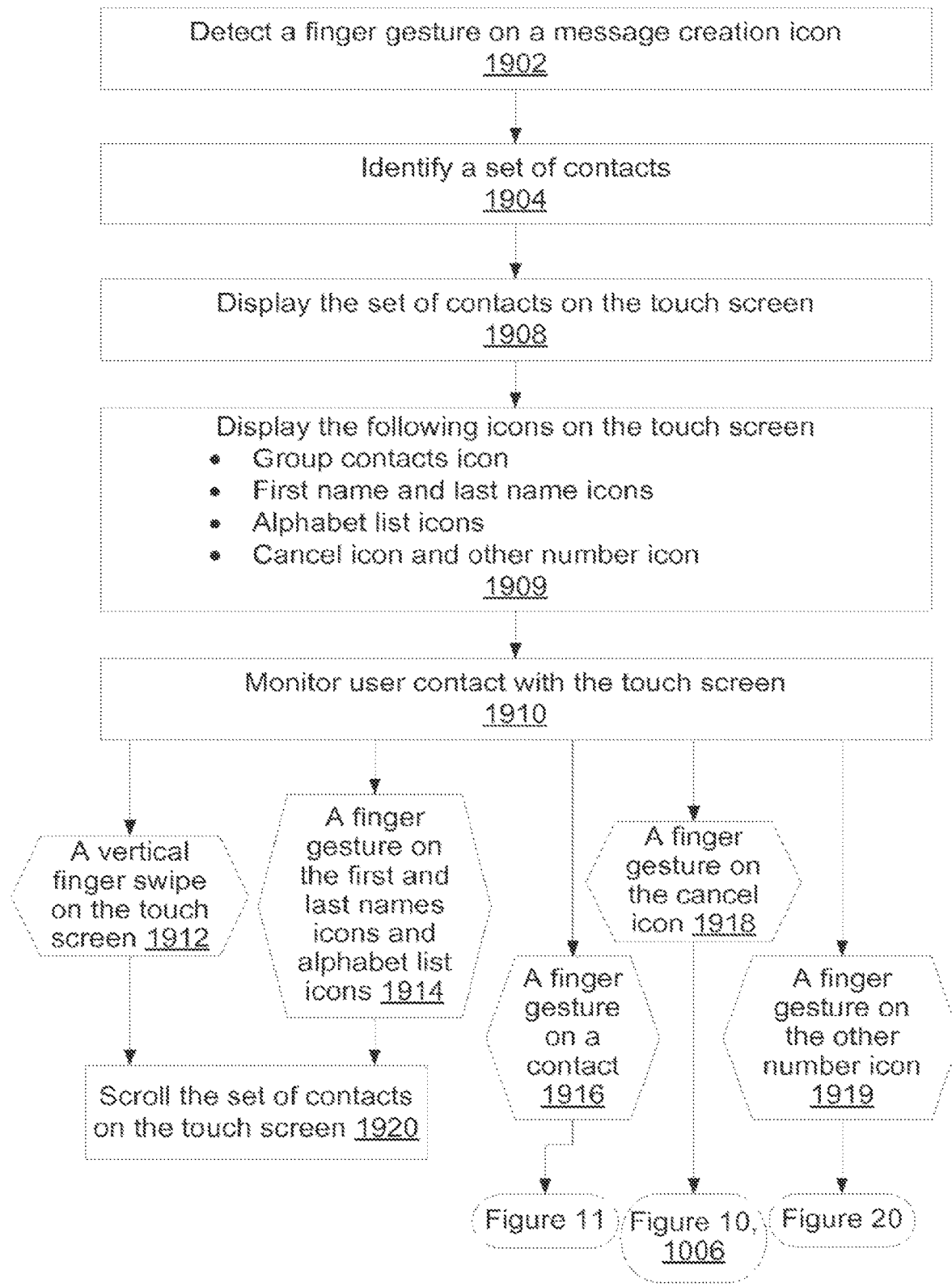
FIG. 19 is a flowchart illustrating a process for displaying a list of contacts from which a user chooses to send an instant message in accordance with some embodiments.

Referring again to FIG. 5, a user may start a new conversation with another person by activating the message creation icon 514 (e.g., with a finger tap or other gesture). FIG. 19 is a flowchart illustrating a process for displaying a list of from which a user chooses to send an instant message in accordance with some embodiments. After detecting the user selection of the message creation icon 514 (FIG. 5), and, in some embodiments, add icon 634 (FIG. 6F) (1902), the portable electronic device identifies a set of contacts from the user's address book or the equivalent because it does not know to whom this new conversation is directed (1904). Next, the portable electronic device displays the identified contacts on the touch screen (1908). In some embodiments, the portable electronic device displays multiple icons on the touch screen in addition to the contact list (1909), such as the group contacts icon, the first name and last name icons, the alphabet list icons, the cancel icon, and the other number icon. A more detailed description of these icons is provided below in connection with FIGS. 8A and 8B. After rendering the contact list and the additional icons, the portable electronic device then monitors the user contact with the touch screen (1910).

Figure 8A:
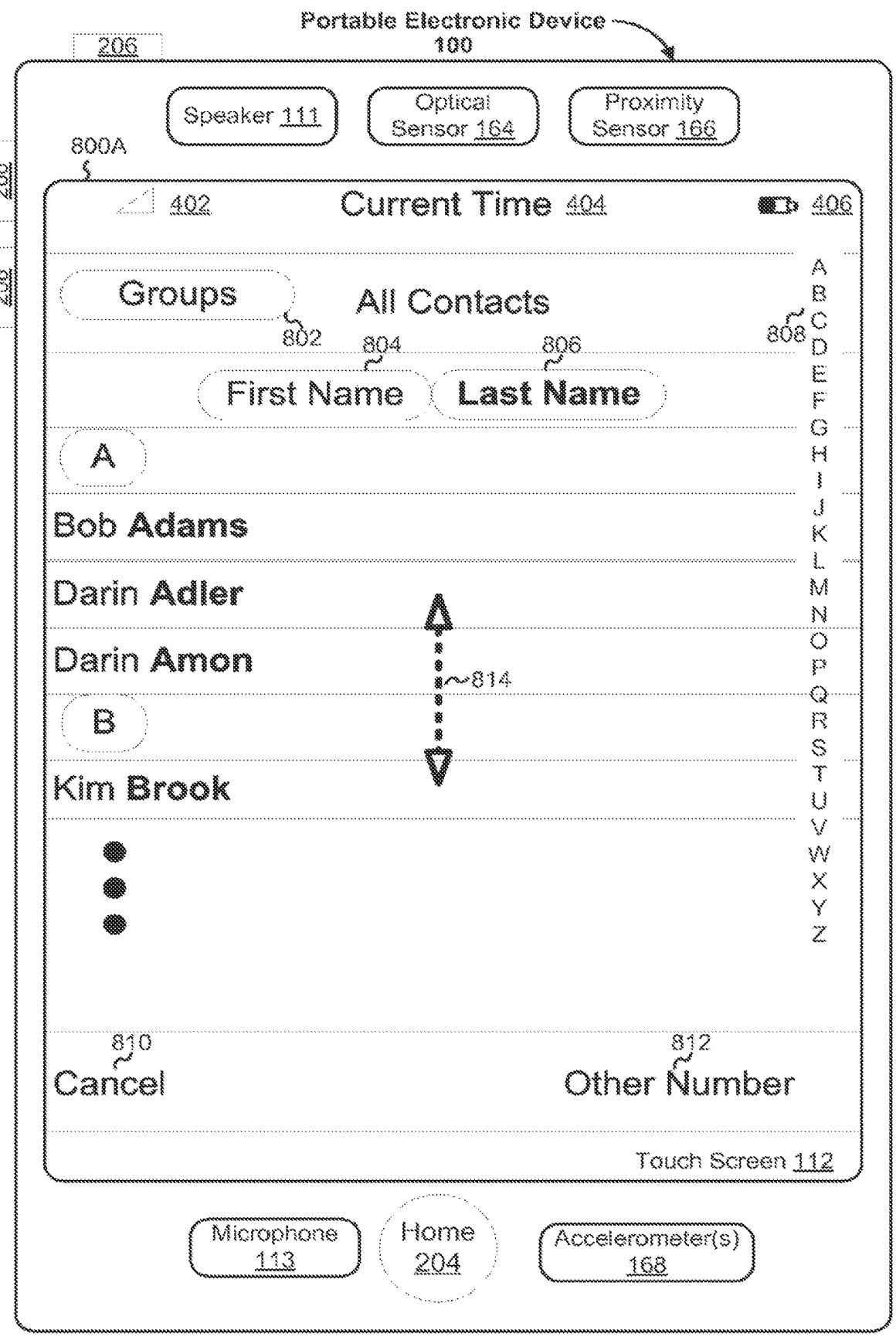
FIGS. 8A and 8B illustrate an exemplary user interface for a contact list in accordance with some embodiments.
Figure 8B:
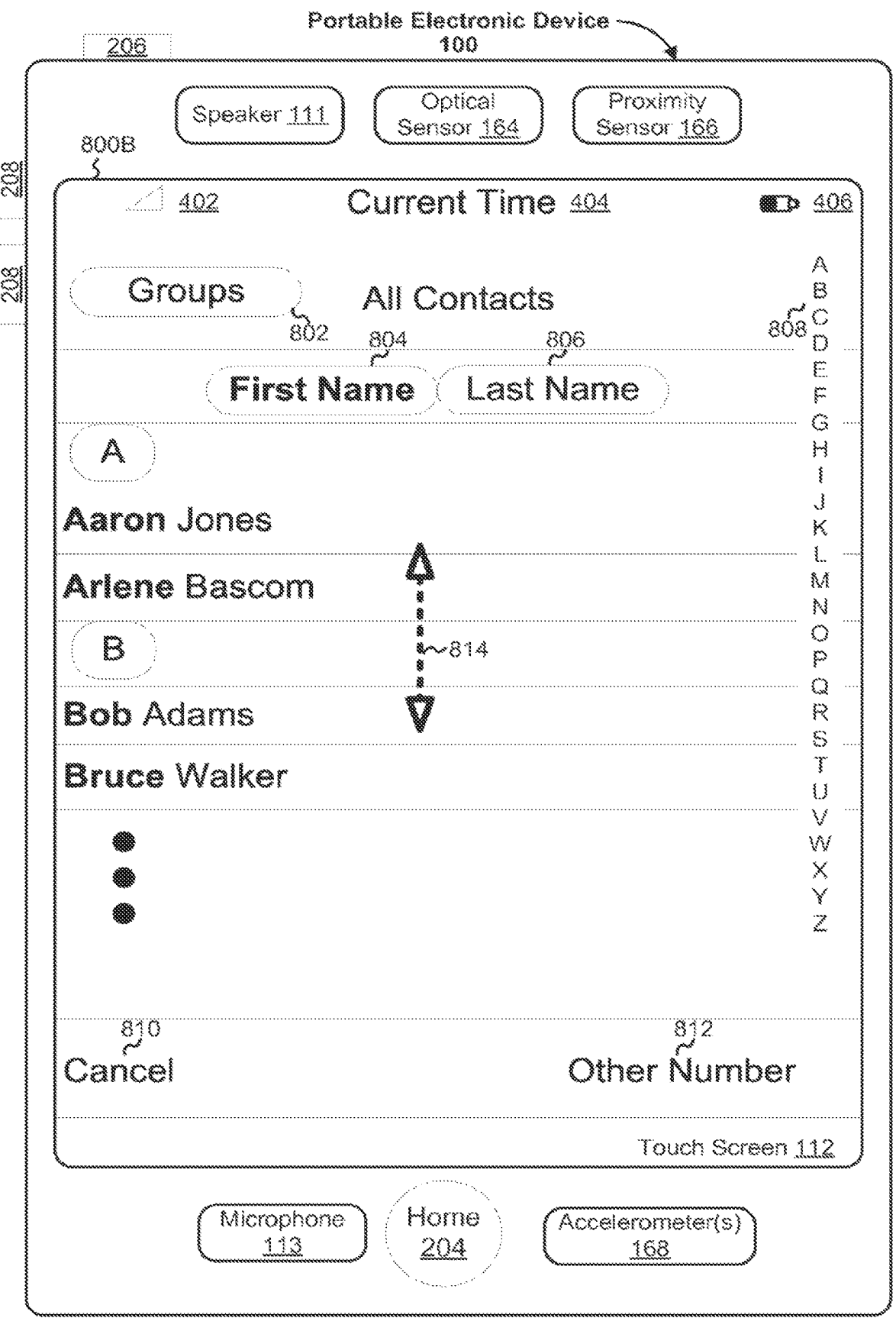
Figure 9:
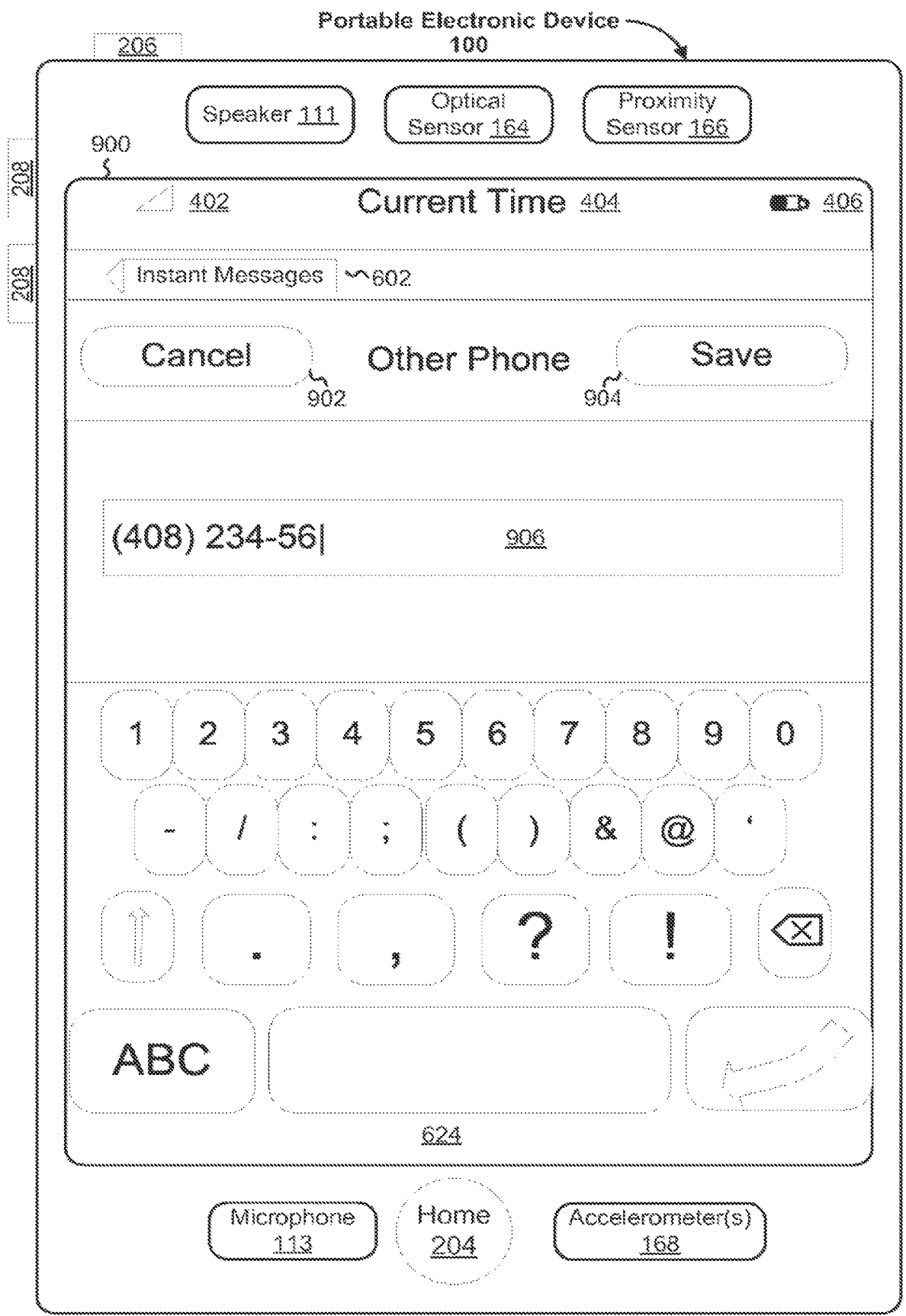
FIG. 9 illustrates an exemplary user interface for entering a phone number for instant messaging in accordance with some embodiments.

FIGS. 8A and 8B illustrate an exemplary user interface for a contact list in accordance with some embodiments. In some embodiments, user interfaces 800A and 800B include the following elements, or a subset or superset thereof:

- 402, 404, 406, as described above;
- Groups icon 802 that when activated (e.g., by a finger gesture on the icon) initiates display of groups of contacts;
- First name icon 804 that when activated (e.g., by a finger gesture on the icon) initiates an alphabetical display of the user's contacts by their first names (FIG. 8B);
- Last name icon 806 that when activated (e.g., by a finger gesture on the icon) initiates an alphabetical display of the user's contacts by their last names (FIG. 8A);
- Alphabet list icons 808 that the user can touch to quickly arrive at a particular first letter in the displayed contact list;
- Cancel icon 810 that when activated (e.g., by a finger gesture on the icon) initiates transfer back to the previous UI (e.g., UI 500); and
- Other number icon 812 that when activated (e.g., by a finger gesture on the icon) initiates transfer to a UI for entering a phone number for instant messaging, such as a phone number that is not in the user's contact list (e.g., UI 900, FIG. 9).

As described in U.S. patent application Ser. No. 11/322, 547, "Scrolling List With Floating Adjacent Index Symbols," filed Dec. 23, 2005, which is hereby incorporated by reference in its entirety, the user may scroll through the contact list using vertically upward and/or vertically downward gestures 814 on the touch screen.

If the next user contact is such a scrolling gesture 814 (1912) or a finger gesture on one of the first name icon 804, the second name icon 806 and the alphabet list icons 808 (1914), the portable electronic device modifies the contacts currently on display (1920). Although the contact list may be shared by multiple applications on the same portable device (e.g., email, phone, and instant messaging), a user selection of a name in the contact list in this context will be used for IM service because the contact list was requested from within the IM application. Here the contact list is being shown in connection with user activation of the message creation icon 514 in the IM application 141.

If the portable electronic device detects a finger gesture on one person's name or other identifier in the contact list (1916), the portable electronic device displays a message compose region for a message to the selected contact (1108, FIG. 11) and displays a conversation UI as shown in FIG. 6A. In some embodiments, if there is an existing conversation between the user and the selected person, the portable electronic device merges the new conversation into the existing one by displaying messages associated with the existing conversation.

If the portable electronic device detects a user gesture on the cancel icon 810 (1918), the portable electronic device aborts the process of creating the new conversation and brings back the conversation list shown in FIG. 5 (1006, FIG. 10).

In some embodiments, if the portable electronic device detects a finger gesture on the other number icon 812 (1919), typically a new conversation with a person not in the contact list is initiated. Accordingly, the portable electronic device may render a new user interface for the user to enter the person's contact information that is going to be used by the new conversation.

Figure 20:
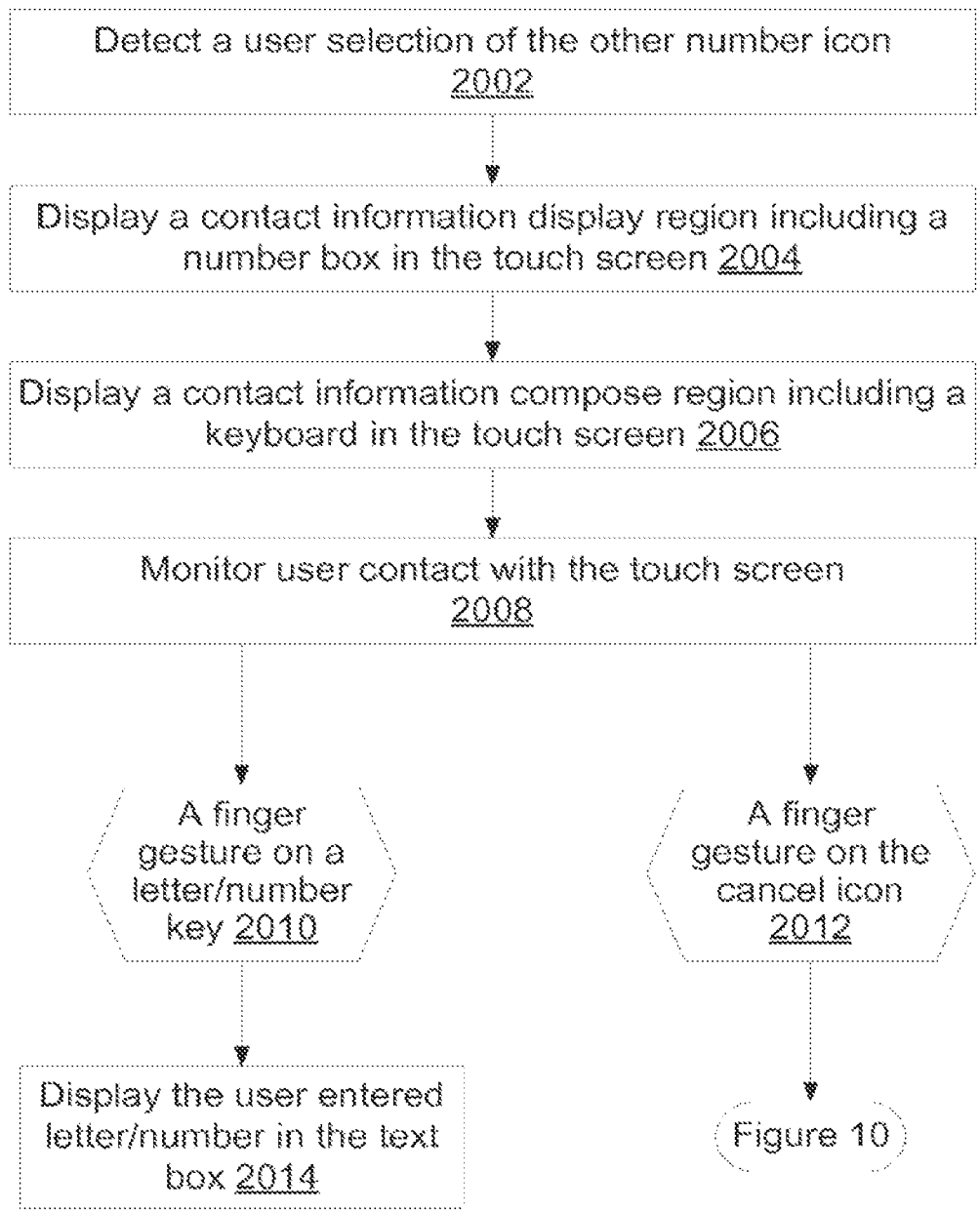
FIG. 20 is a flowchart illustrating a process for launching a new conversation using a new phone number in accordance with some embodiments.

FIG. 20 is a flowchart illustrating a process for launching a new conversation using a new phone number in accordance with some embodiments. Upon detecting user selection of the other number icon (2002), the portable electronic device provides a contact information display region (2004) and a contact information compose region (2006) on the touch screen. The contact information may be a phone number or an email address for IM service. The contact information display region includes a text box 906 for displaying the user-entered contact information. The contact information compose region includes a keyboard 624 for the user to enter such contact information. The device monitors user contact with the touch screen (2008). If the user activates the cancel icon (2012), the portable electronic device aborts the process of creating a new conversation and returns to the conversation list UI shown in FIG. 5. If the user input is a letter or number (2010), the portable electronic device displays it in the text box (2014).

FIG. 9 illustrates an exemplary user interface for entering a phone number for instant messaging in accordance with some embodiments. In some embodiments, user interface 900 includes the following elements, or a subset or superset thereof:

- 402, 404, 406, 602, and 624, as described above;
- Cancel icon 902 that when activated (e.g., by a finger gesture on the icon) initiates transfer back to the previous UI (e.g., UI 800A or UI 800B);
- Save icon 904 that when activated (e.g., by a finger gesture on the icon) initiates saving the entered phone number in the instant messages conversation list (e.g., UI 500) and displaying a UI to compose an instant message to be sent to the entered phone number (e.g., UI 600A); and
- Number entry box 906 for entering the phone number using keyboard 624.

Note that the keyboard displayed may depend on the application context. For example, the UI displays a soft keyboard with numbers (e.g., 624) when numeric input is needed or expected. The UI displays a soft keyboard with letters (e.g., 616) when letter input is needed or expected.

Figure 22A:
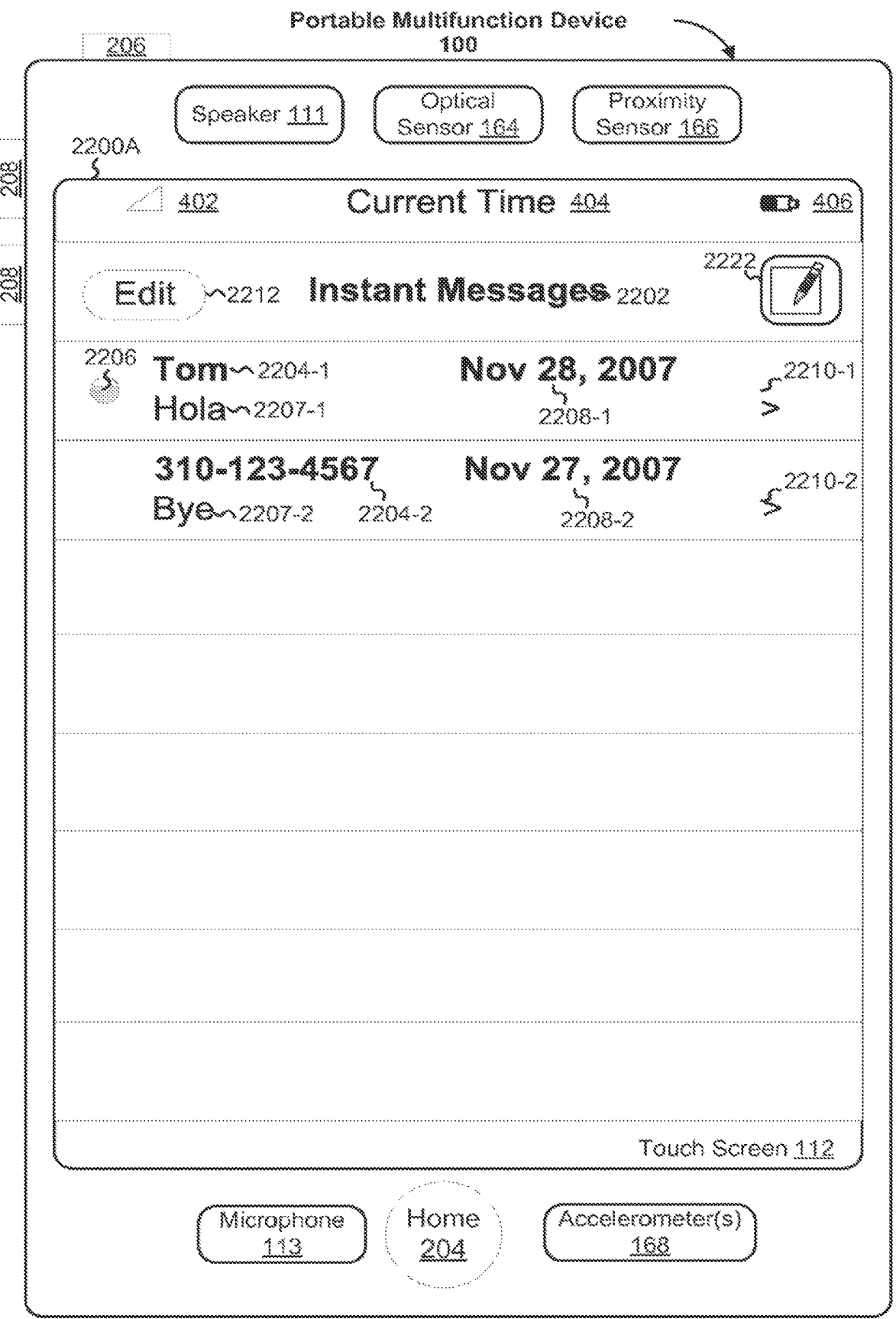
FIG. 22A illustrates an exemplary user interface for displaying a list of instant messaging conversations on a portable electronic device in accordance with some embodiments.
Figure 22B:
FIG. 22B-22D illustrates exemplary user interfaces for selecting multiple recipients of an instant message in accordance with some embodiments.
Figure 22C:
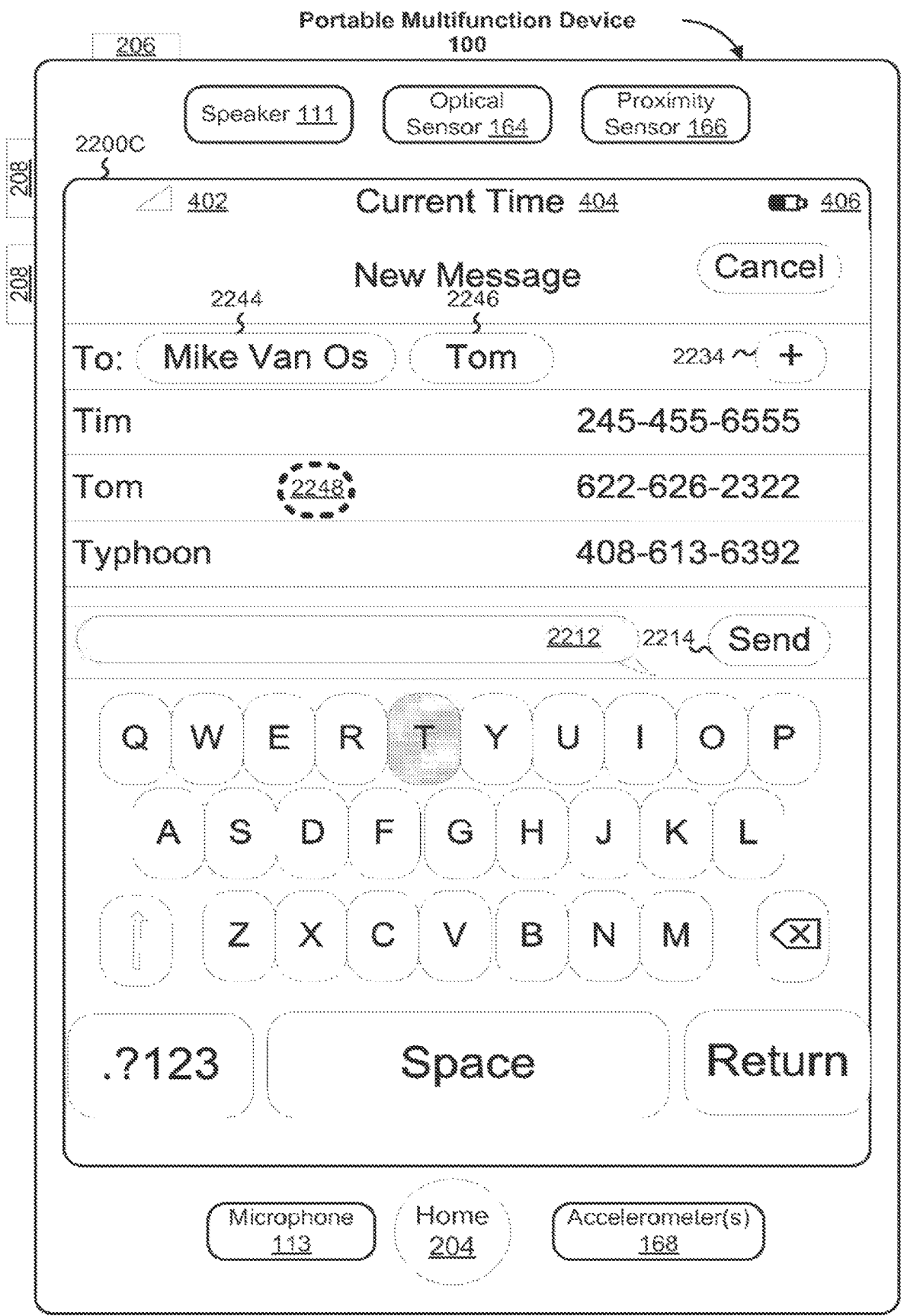
Figure 22D:
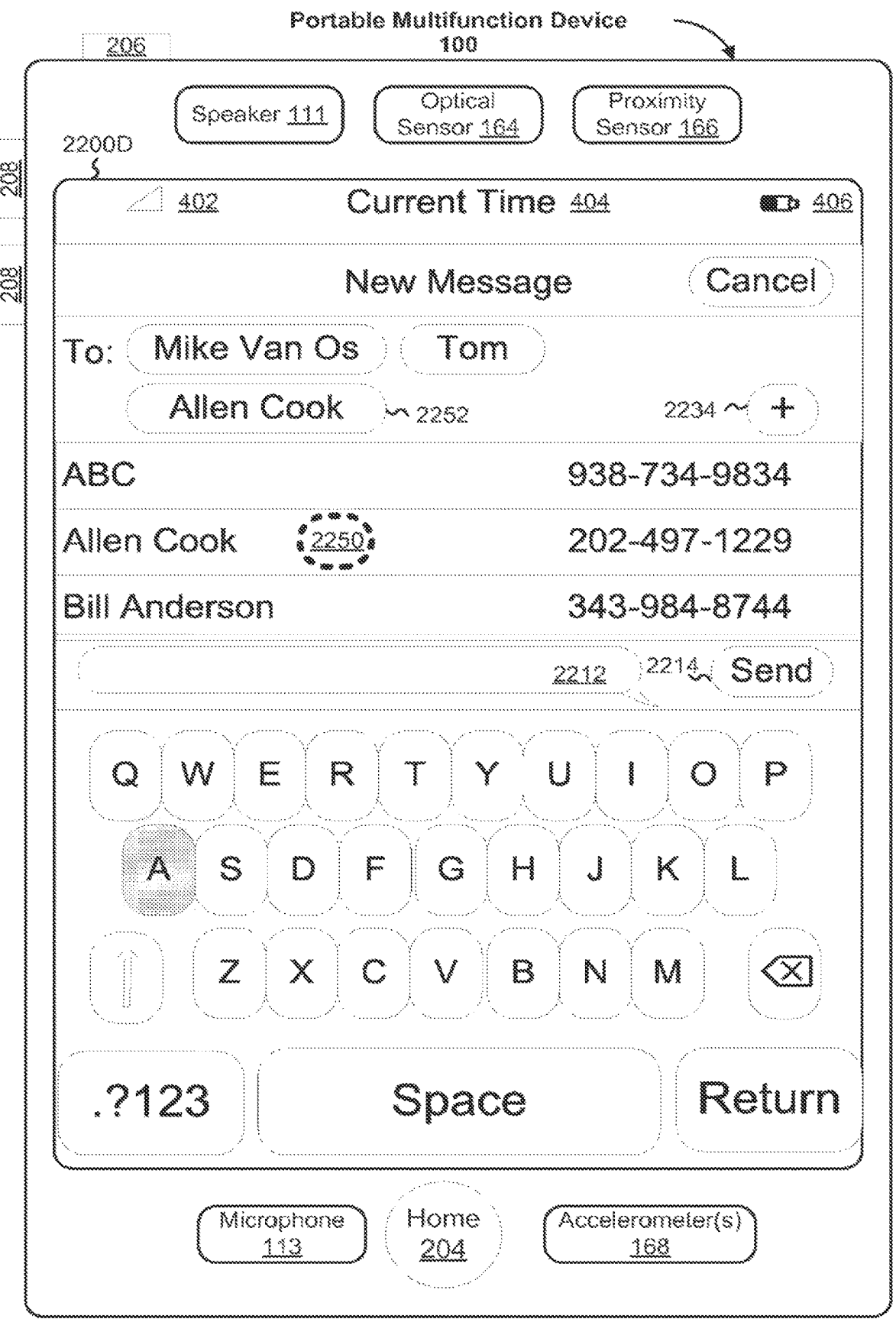
Figure 22E:
FIG. 22E illustrates an exemplary user interface for composing an instant message to multiple recipients after user selection of the recipients in accordance with some embodiments.
Figure 22F:
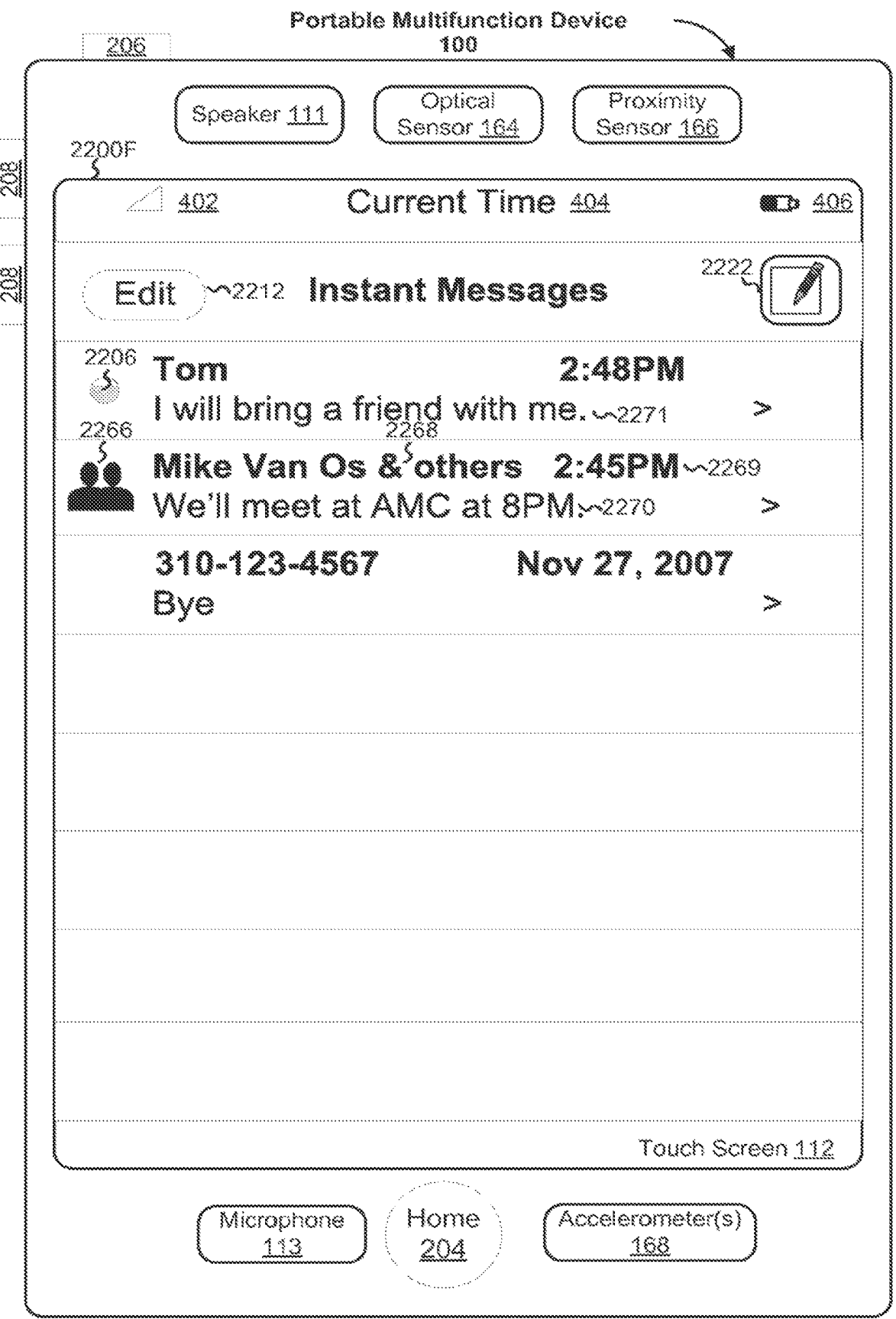
FIG. 22F illustrates an exemplary user interface for displaying a list of instant messaging conversations including a group conversation and a response to an instant message sent to multiple recipients in accordance with some embodiments.
Figure 22G:
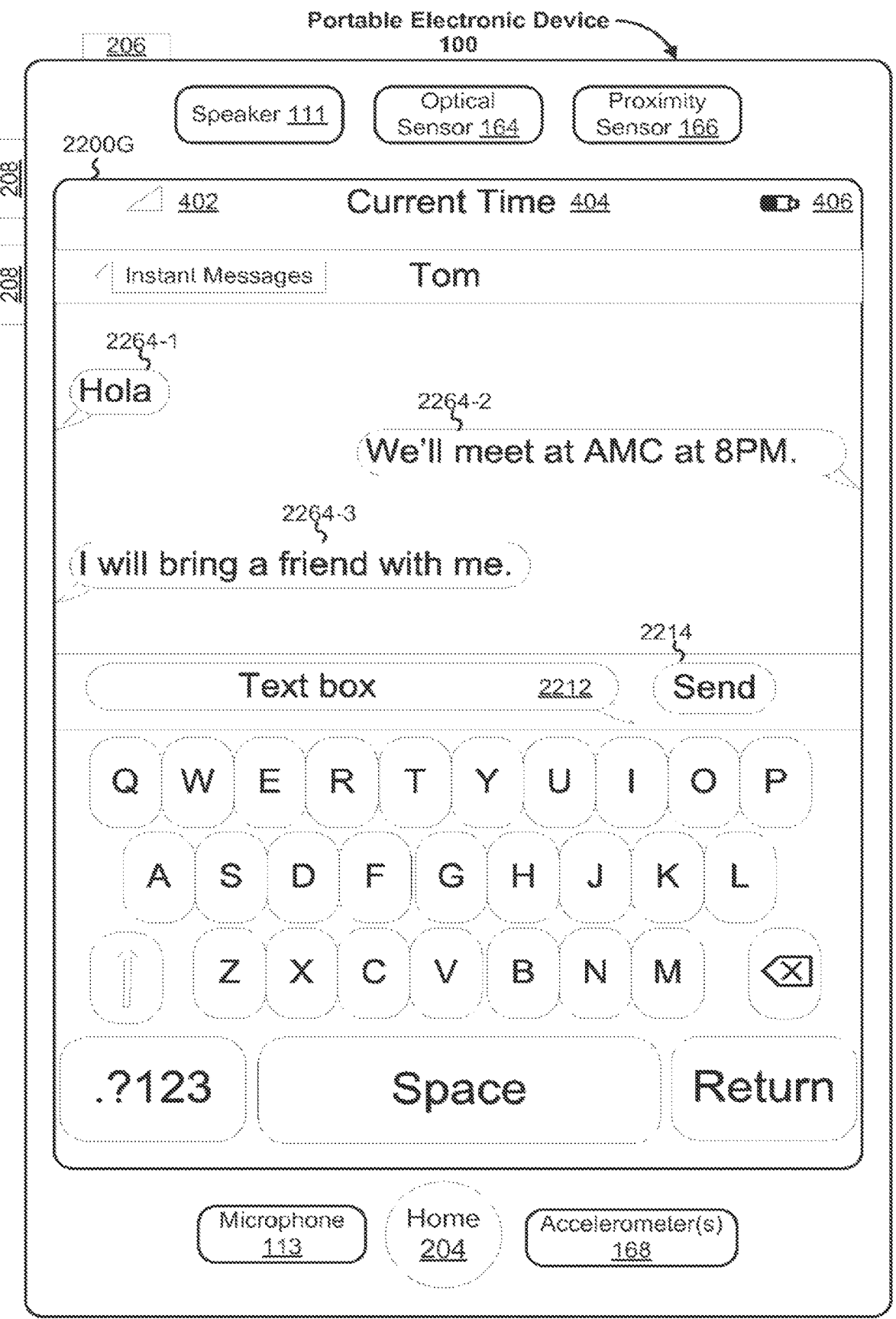
FIG. 22G-H illustrates exemplary user interfaces for displaying a set of outgoing messages between the user and one or more parties and for composing a message to one or more parties in accordance with some embodiments.
Figure 22H:
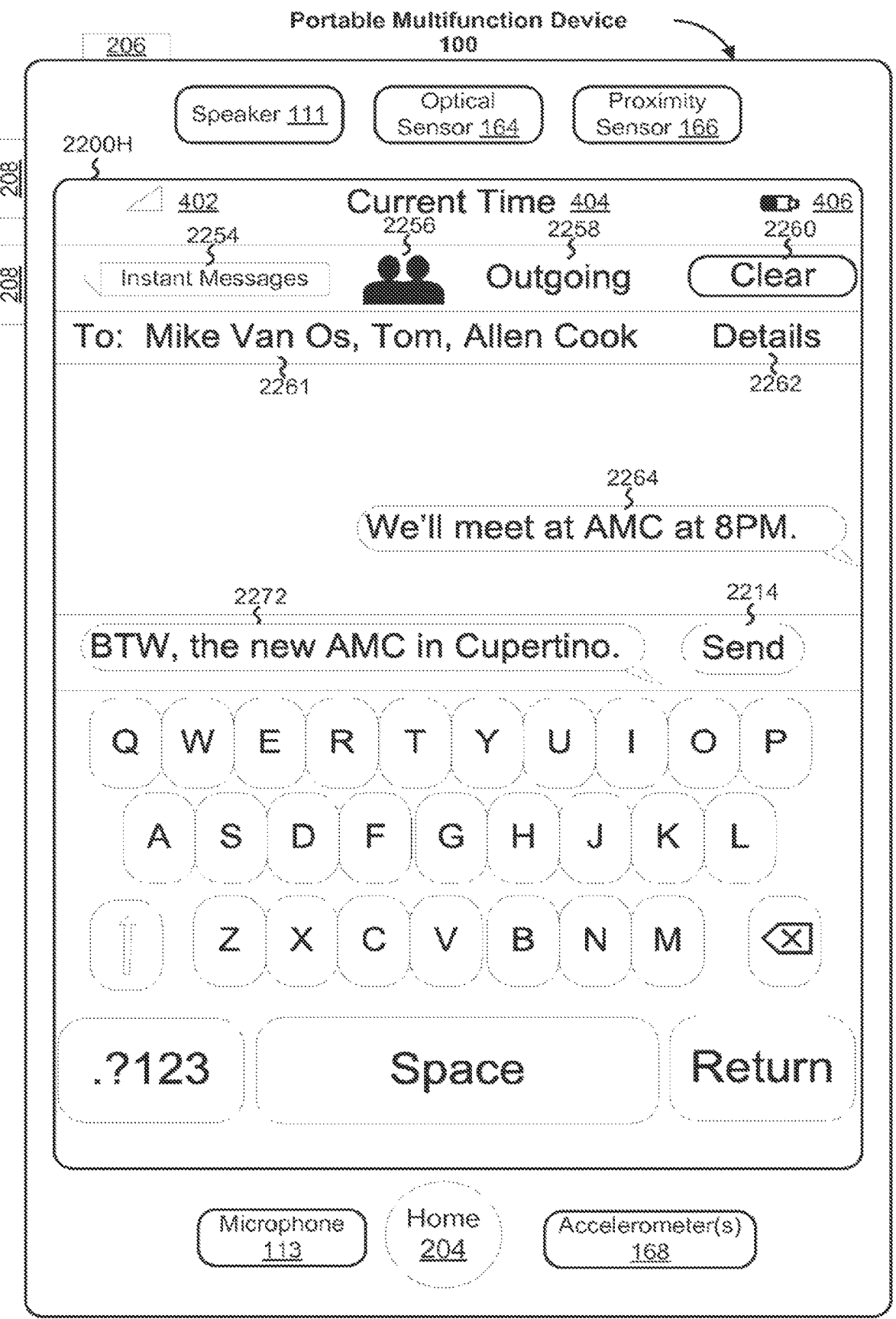
Figure 22I:
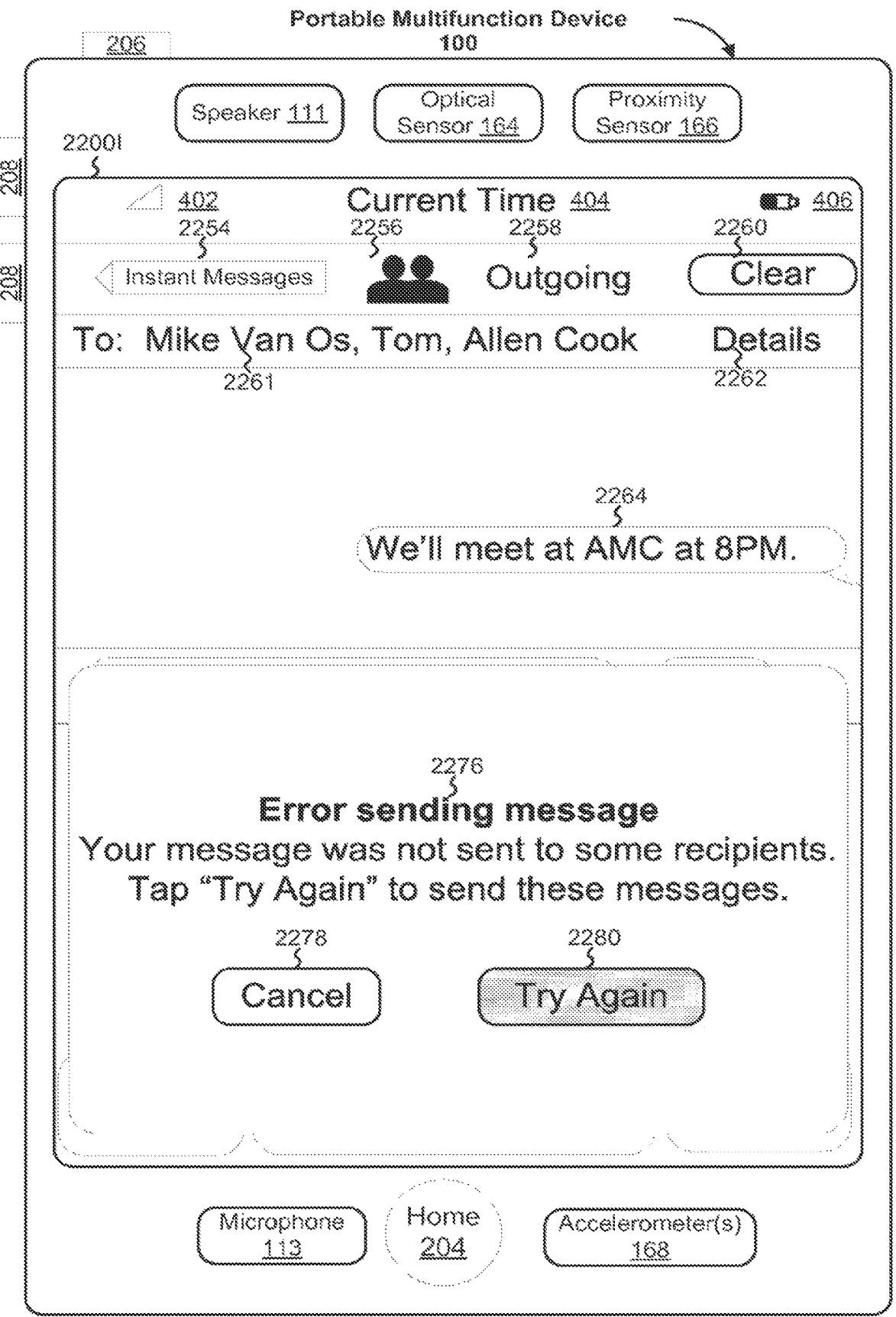
FIG. 22I-K illustrates exemplary user interfaces for displaying an error message indicating a communication error when sending an outgoing message to the recipients in accordance with some embodiments.
Figure 22J:
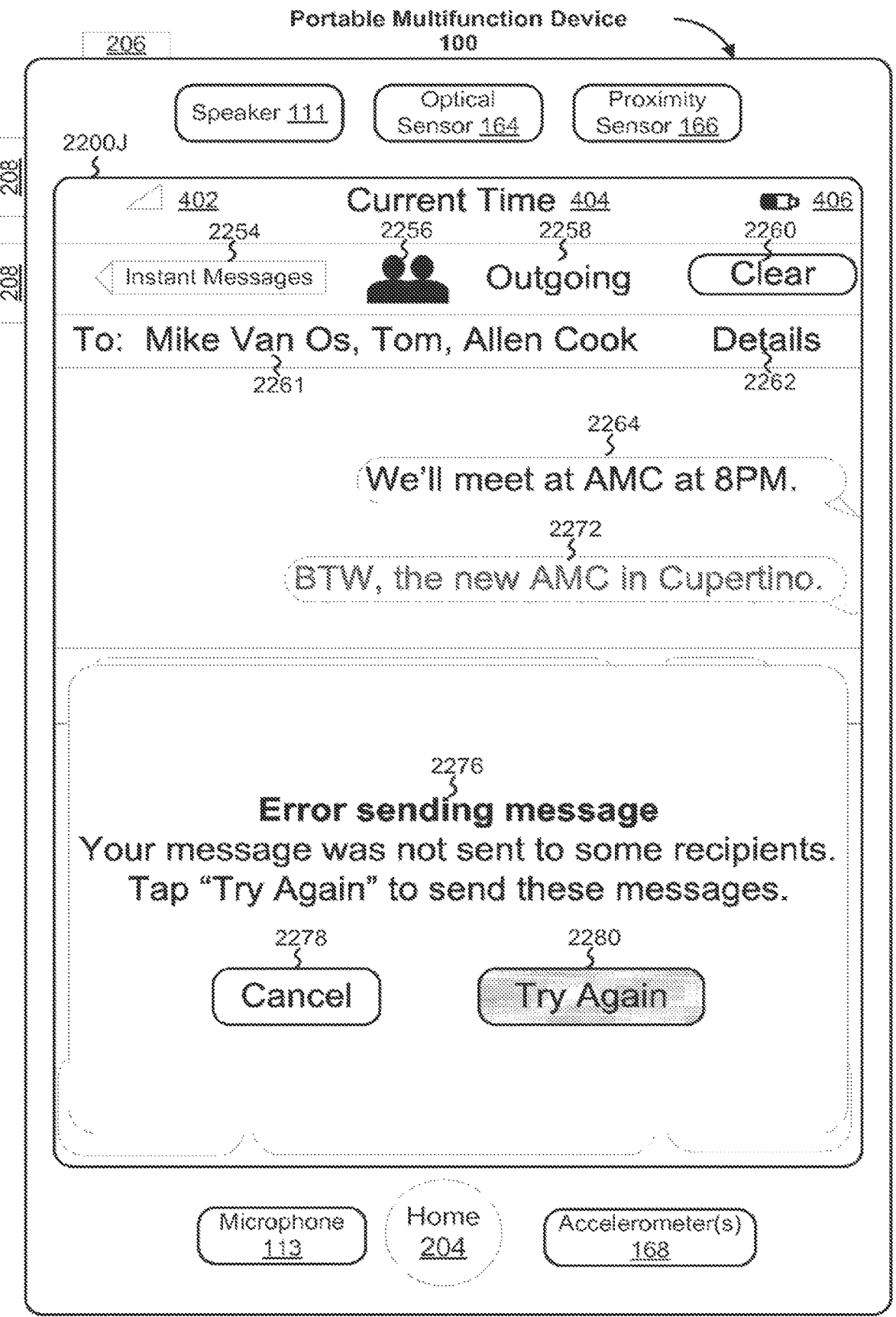
Figure 22K:
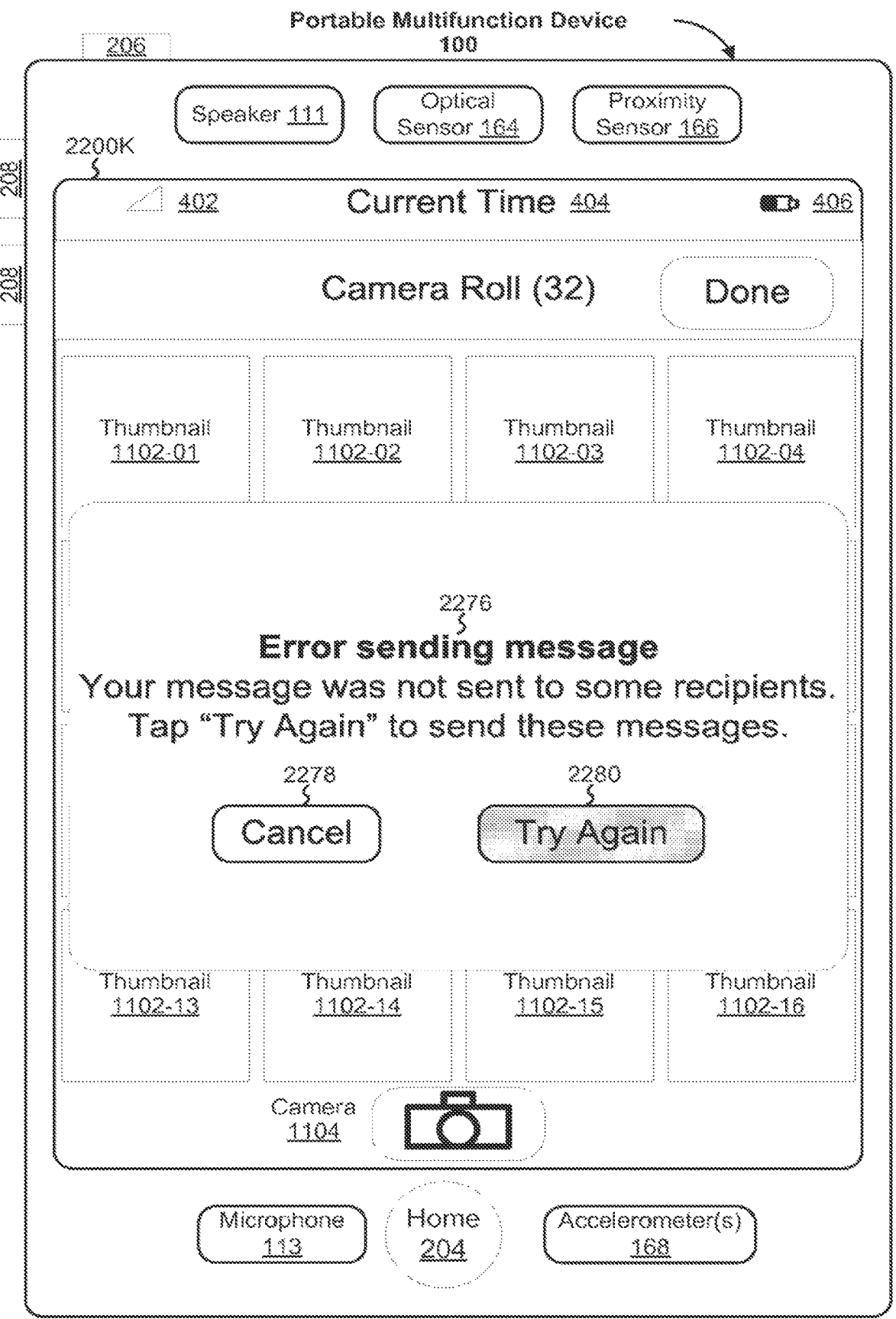
Figure 22L:
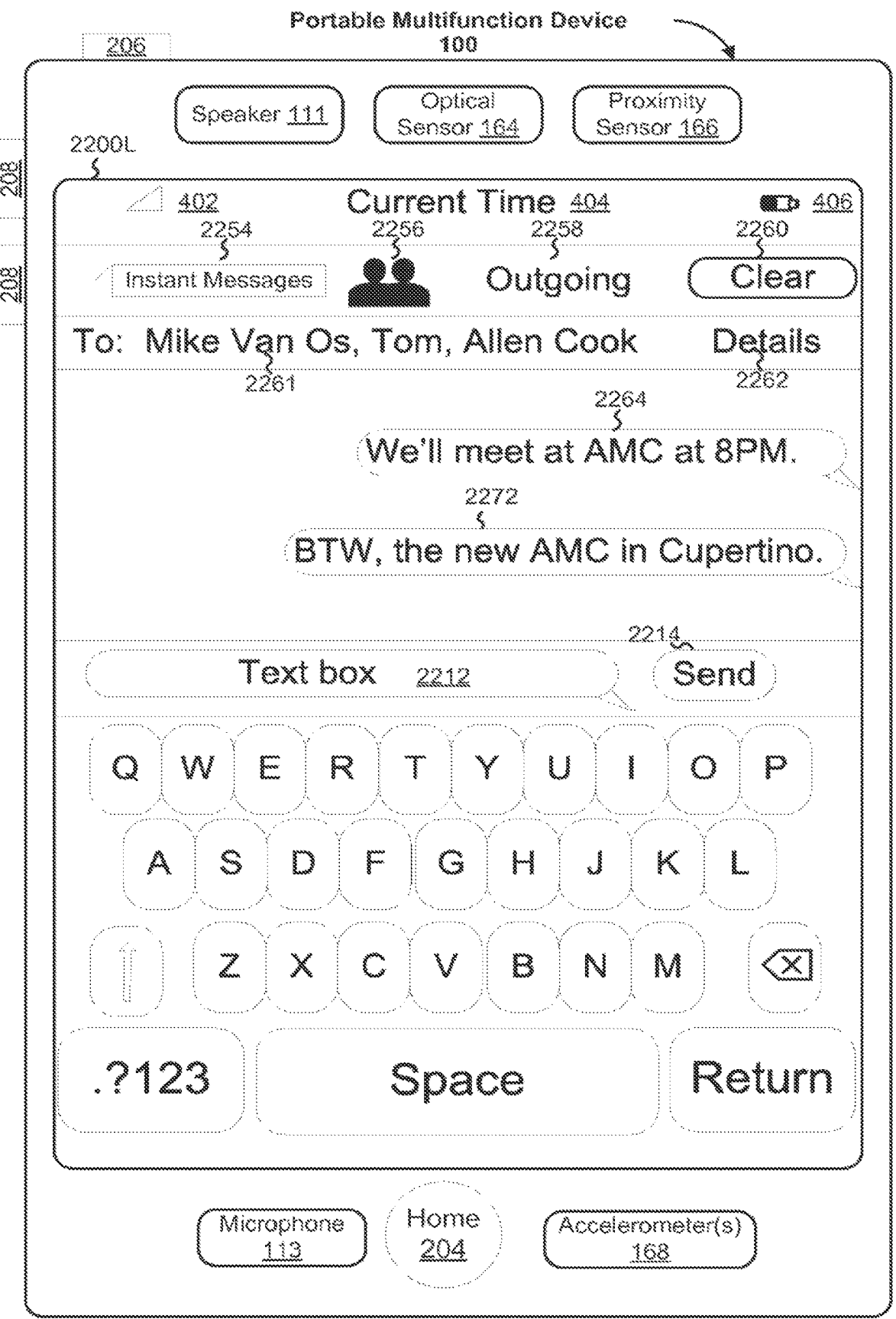
FIG. 22L illustrates an exemplary user interface for replying to an instant message and for displaying a list of instant messages in a group conversation in accordance with some embodiments.
Figure 22M:
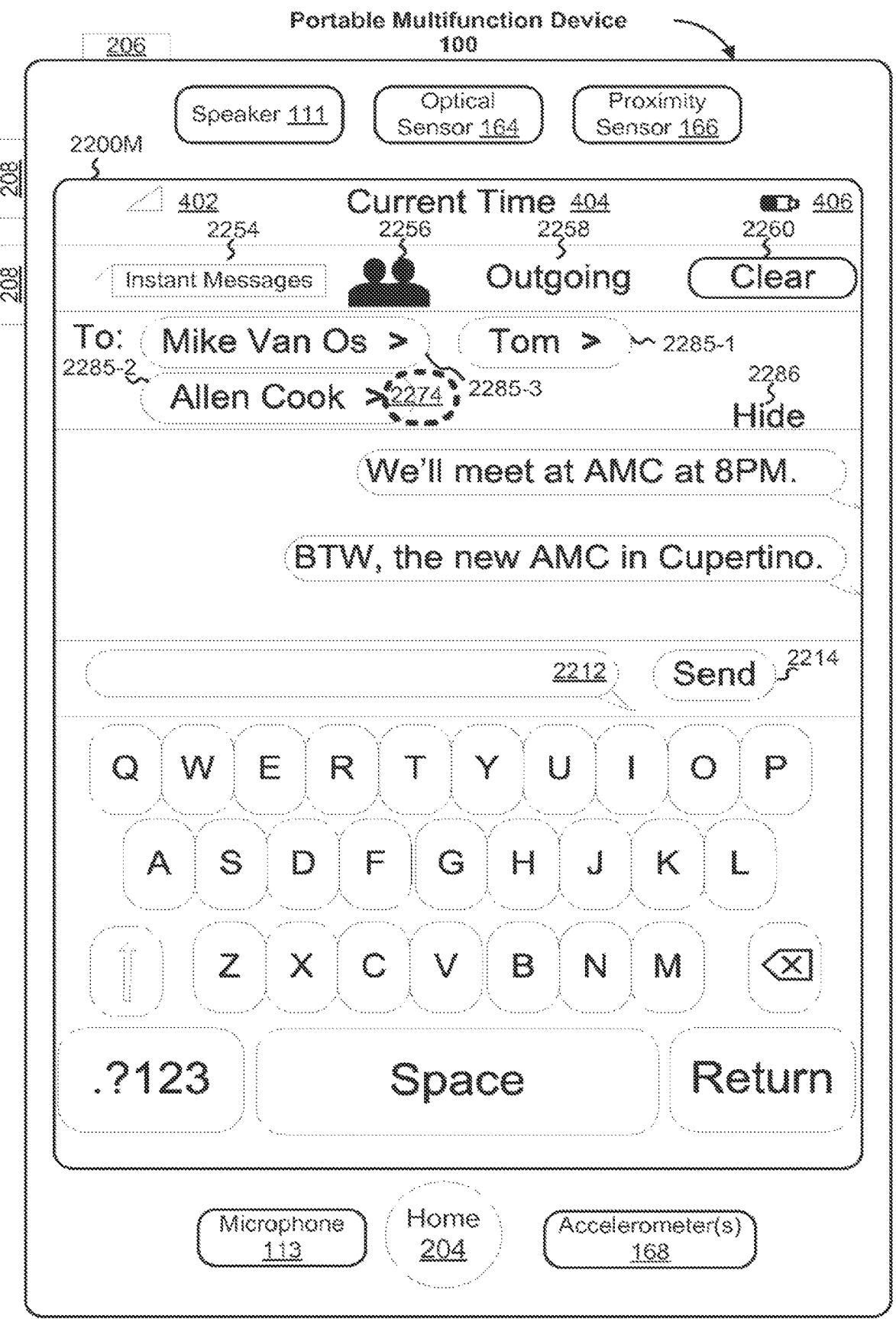
FIG. 22M illustrates an exemplary user interface for accessing detailed information on recipients of the group conversation while composing a message to the group.
Figure 22N:
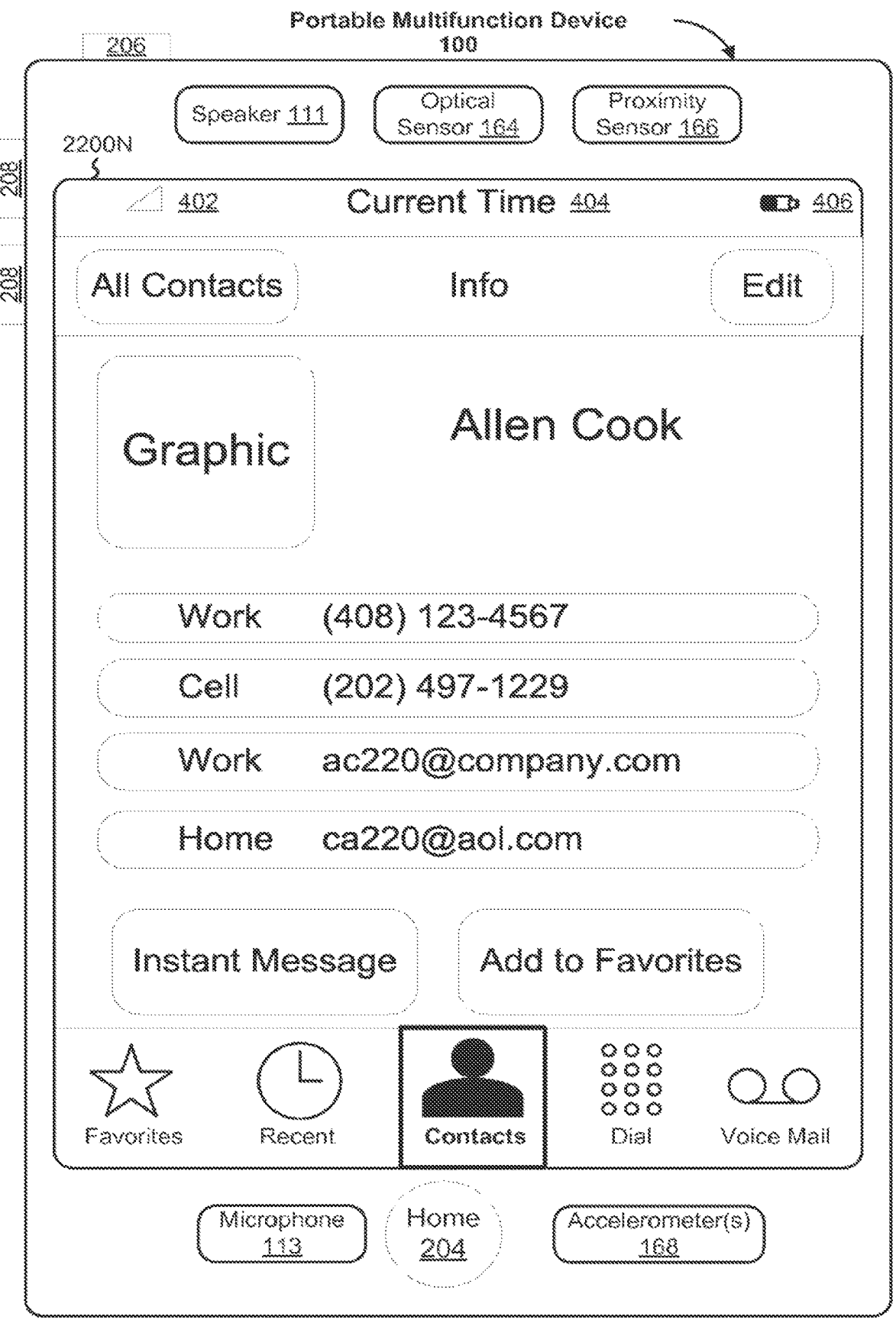
FIG. 22N illustrates an exemplary user interface for displaying detailed information associated with a contact in accordance with some embodiments.
Figure 22O:
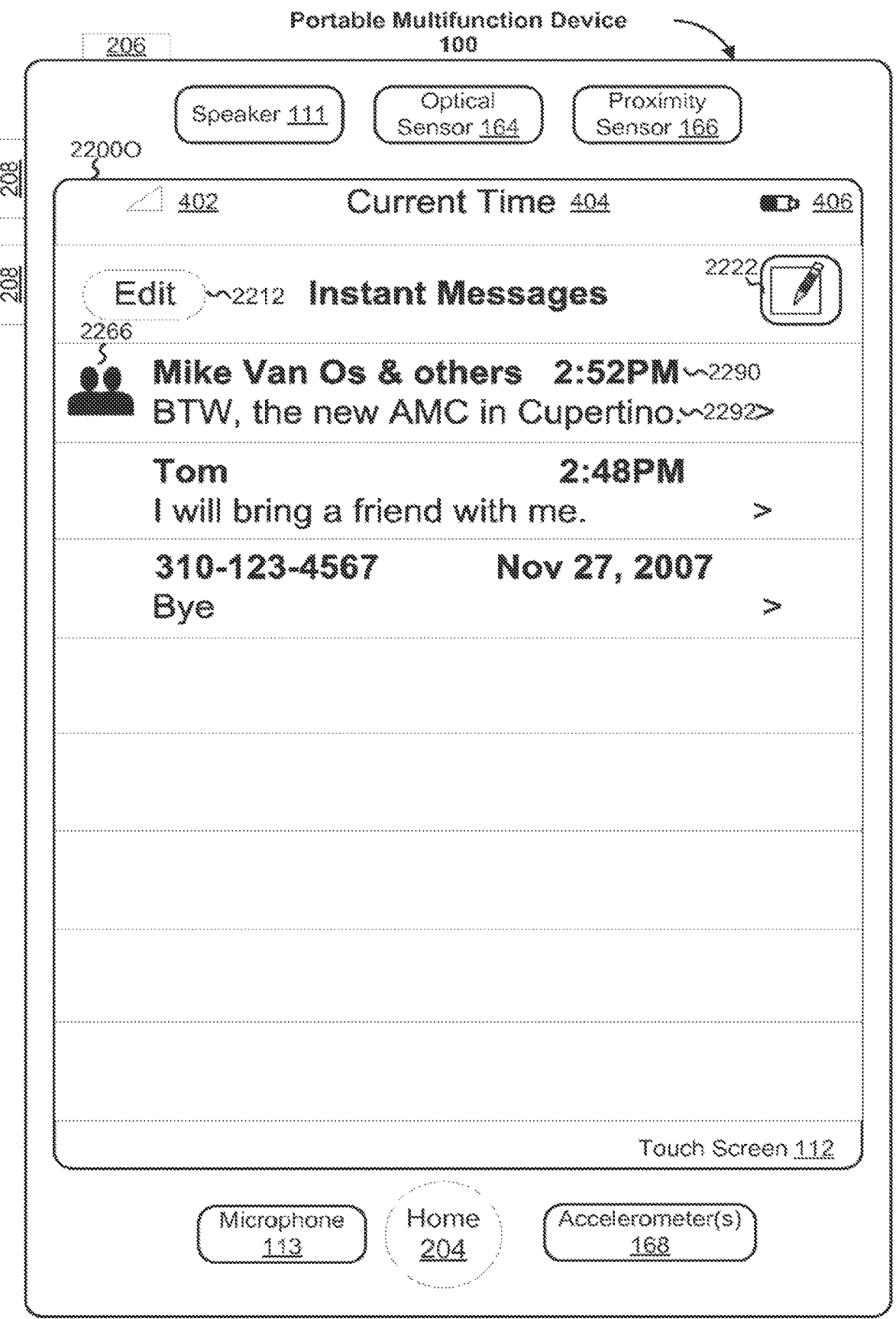
FIGS. 22O and 22P illustrate exemplary user interfaces for displaying instant messaging conversations on a portable electronic device in accordance with some embodiments.
Figure 22P:
Figure 22Q:
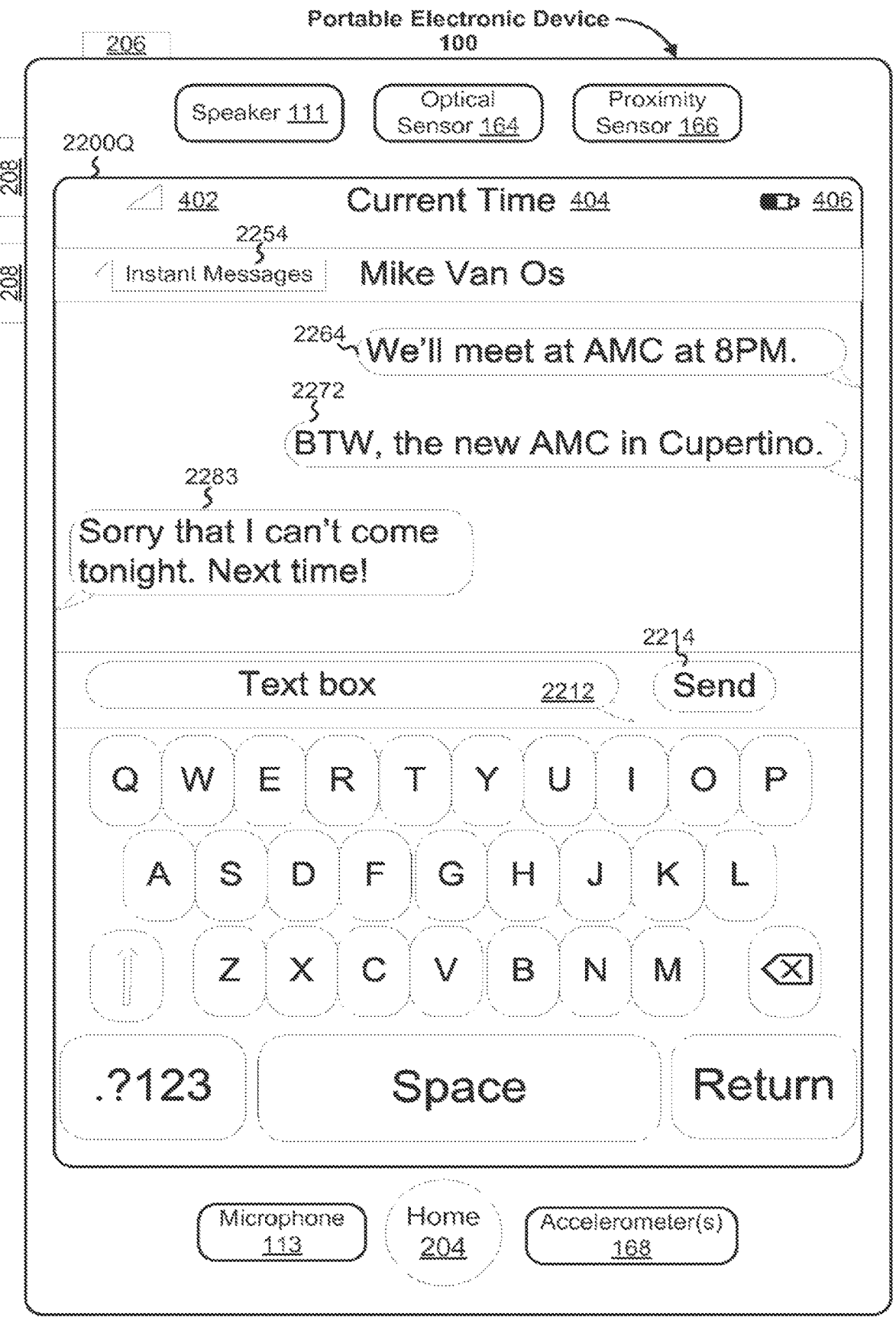
FIG. 22Q illustrates an exemplary user interface for displaying a set of outgoing messages between the user and one or more parties and for composing a message to one or more parties in accordance with some embodiments.

FIGS. 22A-22Q illustrate exemplary user interfaces for creating and sending telephony-based instant messages to multiple recipients and for receiving and responding to replies to such messages in accordance with some embodiments. The user interfaces in FIGS. 22A-22Q are described in more detail below. In addition, the user interfaces in FIGS. 22A-22Q are used to illustrate the processes described below with reference to FIGS. 24-29.

FIG. 22A illustrates an exemplary user interface 2200A for displaying instant messaging conversations on a portable electronic device in accordance with some embodiments. The UI 2200A in FIG. 22A shows a list of instant message conversations, with entries listing conversations with two individuals (Tom and an unknown person with phone number 310-123-4567). The IM conversations listed in FIG. 22A do not include any group conversations. In some embodiments, UI 2200A includes the following elements, or a subset or superset, thereof:

- 402, 404, and 406, as described above;
- "Instant Messages" or "Text Messages" or other similar label 2202;
- Names 2204 of the persons with whom the user has instant message conversations (e.g., Tom 2204-1); when the name of the other party is not available, the displayed name may be the phone number of the other party (e.g., 310-123-4567 2204-2);
- an unread message indicia 2206 that indicates messages that have not been read;

Text 2207 of the last message or a portion thereof in the conversation (note that the last message could be the last one either sent or received by the user);

Date 2208 and/or time of the last message in the conversation;

Selection icon 2210 that when activated (e.g., by a finger gesture on the icon) initiates transition to a UI for the corresponding conversation;

Edit icon 2212 that when activated (e.g., by a finger gesture on the icon) initiates transition to a UI for deleting conversations (e.g., UI 700, FIG. 7); and Create message icon 2222 that when activated (e.g., by a finger gesture on the icon) initiates transition to the users contact list (e.g., FIG. 8A).

FIGS. 22B-22O illustrate exemplary user interfaces for selecting multiple recipients of an instant message in accordance with some embodiments. These Figures illustrate using finger gestures to address an instant message to multiple recipients (e.g., to Mike Van Os, Tom, and Allen Cook) using a method similar to that described above with respect to FIGS. 6G and 6H. In particular, finger gesture 2231 in UI 2200B, FIG. 22B, selects Mike Van Os as a message recipient; finger gesture 2248, FIG. 22C in UI 2200C, selects Tom as another message recipient; and finger gesture 2250 in UI 2200D, FIG. 22D, selects Allen Cook as yet another message recipient.

In some embodiments, user interface 2200B (FIG. 22B) includes the following elements, or a subset or superset, thereof:

402, 404, and 406 as described above;

Recipient input field 2232 that when activated (e.g., by a finger tap on the field) receives and displays the phone number of the recipient(s) of the instant message (or the recipient's name if the recipient is already in the user's contact list);

Add recipient icon 2234 that when activated (e.g., by a finger tap on the icon) initiates the display of a scrollable list of contacts (e.g., 2239, FIG. 22B);

Scrollable list 2239 of contacts (e.g., where a vertical swipe gesture 2242 upwards to scroll the list up, and downward to scroll the list down);

Text box 2212 that when activated (e.g., by a finger tap on the field) displays a message compose region (FIG. 6H).

Vertical bar 2240 that helps a user understand how many items in the contact list that match the input in recipient input field 2232 are being displayed in the scrollable list 2239; and Cancel icon 2236 that when activated (e.g., by a finger tap on the icon) cancels the composing of a new instant message.

In some embodiments, user interfaces 2200C and 2200D (FIGS. 22C and 22D) includes the following elements, or a subset or superset, thereof:

402, 404, 406, 2212, 2214, and 2234 as described above; and

Recipient icons 2244, 2246, and 2252.

FIG. 22E illustrates an example of a user interface 2200E for composing an instant message to multiple recipients after user selection of the recipients in accordance with some embodiments. FIG. 22E shows a first message sent to Mike Van Os, Tom, and Allen Cook (e.g., "We'll meet at AMC at 8 PM.").

User interface 2200E includes the following elements, or a subset or superset thereof:

402, 404, 406 as described above;

"Outgoing" or other similar label 2258 indicating that the message is being sent from the device to others;

Multi-recipient identifier 2261 identifying all recipients of the instant message;

Details icon 2262 that when activated allows the user to access detailed contact information of a corresponding recipient;

Instant messages icon 2254 that when activated transitions to a UI showing a list of instant messaging conversations (e.g. FIG. 22F);

Group conversation indicia 2256 which indicates that the message is a part of a group conversation;

Clear icon 2260 that when activated (e.g. by a finger gesture on the icon) clears the message entry text box;

a text box 2212 that when activated (e.g., by a finger tap on the field) displays a message compose region (e.g. FIG. 6H);

the most recent outgoing message 2264; and a send icon 2214 that when activated, sends the message to the selected recipients.

FIG. 22F illustrates an example of a user interface 2200F for displaying a list of instant messaging conversations including a group conversation and a response to an instant message in accordance with some embodiments. In particular, FIG. 22F shows the list of instant message conversations after the first message has been sent and after one of the recipients (Tom) has replied. The most recent entry in the instant message conversation between the user and Tom is now "I will bring a friend with me," rather than "Hola."

In some embodiments, user interface 2200F includes the following elements, or a subset or superset thereof:

402, 404, 406, 2212, 2222 as described above;

an unread message indicia 2206 that indicates messages that have not been read;

group conversation indicia 2266 that indicates the conversation (next to which the indicia 2266 is displayed) is a group conversation; and a time indicator 2269 that indicates the time at which a last message of the group conversation was sent.

FIG. 22G-H illustrates examples of user interfaces for displaying a set of outgoing messages between the user and one or more parties and for composing a message to one or more parties in accordance with some embodiments. FIG. 22G shows, in a user interface 2200G, the instant message conversation between the user and Tom after Tom has replied to the first instant message of a group conversation with Mike Van Os, Tom, and Allen Cook. The messages appear in chronological order, with the most recent message ("I will bring a friend with me") closest to the text input box. FIG. 22H shows, in a user interface 2200H, a second instant message 2272 being composed by the user. In this example, the message "BTW, the new AMC in Cupertino" will be sent to all the other parties in the group conversation, Mike Van Os, Tom, and Allen Cook, when the user activates the Send icon 2214.

In some embodiments, user interface 2200G includes the following elements, or a subset or superset thereof:

402, 404, 406, 2212 and 2214 as described above; and a set of messages 2264 between the user and a recipient(s).

In some embodiments, user interface 2200H includes the following elements, or a subset or superset thereof:

402, 404, 406, 2214, 2254, 2256, 2258, 2260 as described above;

a details icon 2262 that when activated (e.g. by finger tap gesture on the icon) replaces a multi-recipient identifier 2261 with a set of contact icons (e.g., 2285 FIG. 22N), each contact icon representing one of the multiple recipients.

a multi-recipient identifier 2261 that shows all recipients of the outgoing message;

a new outgoing message 2272 to the other parties (recipients) in the group conversation; and a set of messages 2264 between the user and a recipient(s).

FIG. 22I-22K illustrate examples of user interfaces for displaying an error message after experiencing a problem sending a message to one or more of the recipients in accordance with some embodiments. FIGS. 22I and 22J illustrate an example of an error message that is displayed, if there is a problem sending the message to one or more of the recipients, while the user is using an instant messaging application. FIG. 22K illustrates an example of an error message that is displayed, if there is a problem sending the message to one or more of the recipients, while the user is using a non-instant messaging application.

In some embodiments, user interfaces 2200I-2200K (FIGS. 22I-22K) may include the following elements, or a subset or superset thereof:
- 402, 404, 406, 2254, 2256, 2258, 2260, 2261, 2262, and 2264 as described above;
- Label indicating error and error message 2276 indicating a communication error in connection with sending the new outgoing message;
- a cancel icon 2278 that when activated (e.g., by a finger tap gesture) cancels or postpones the sending of the message;
- a try again icon 2280 that when activated (e.g., by a finger tap gesture) resends the message to at least one of the multiple recipients; and
- the outgoing message 2272 is displayed with an appearance distinct from the other outgoing messages, if any, in the conversation.

FIG. 22L illustrates an example of a user interface 2000L for replying to an instant message and for displaying a list of instant messages in a group conversation in accordance with some embodiments. FIG. 22L shows the "group conversation" with Mike Van Os, Tom, and Allen Cook after the second instant message has been sent to the group. In some embodiments, a "group conversation" includes only outbound telephony-based instant messages from the user to a group selected by the user. Thus, "group conversations" are actually a collection of one-way outbound messages and not two-way exchanges amongst the group for telephony-based instant messages.

In some embodiments, user interface 2200L may include the following elements, or a subset or superset thereof:
- 402, 404, 406, 2212, 2214, 2254, 2256, 2258, 2260, 2261 and 2262 as described above;
- the group conversation including the first 2264 and second instant message 2272 sent to the group.

FIG. 22M illustrates an example of a user interface 2200M for accessing detailed information on recipients of the group conversation while composing a message to the group. FIG. 22M shows how the user can access details on the members of the group conversation.

In some embodiments, UI 2200M includes the following elements, or a subset or superset thereof:
- one or more contact icons 2285 that when activated displays contact information of a corresponding recipient in the multiple recipients; and
- a Hide icon 2286 that when activated will replace the set of contact icons with a multi-recipient identifier (e.g., 2261 FIG. 22L).

FIG. 22N illustrates an example of a user interface 2200N for displaying detailed information of a user selected contact, such as a user selected member of a group conversation. The user of the device may navigate to user interface 2200N of FIG. 22N by performing a finger gesture 2274 (FIG. 22M) on a contact icon 2285 in a group conversation user interface (e.g., UI 2300M, FIG. 22M).

In some embodiments, UI 2200N includes the following elements, or a subset or superset thereof:
- Graphic representing the contact;
- Name of the contact; and
- Phone numbers associated with the contact FIGS. 22O and 22P illustrate examples of user interfaces for displaying instant messaging conversations on a portable electronic device in accordance with some embodiments. In some embodiments, UI 2200O and UI 2200P include elements already discussed with respect to user interface 2200A (FIG. 22A) and UI 2200F (FIG. 22F). In particular, FIG. 22O shows the list of instant message conversations after a second message ("BTW, the new AMC in Cupertino") has been sent to a group of recipients and before any of the recipients have replied. The group conversation with the most recent message has been moved to the top of the user's list of instant message conversations.

As shown here, in some embodiments, in the list of instant messages conversations outbound messages to a group only appear in the corresponding group conversations. Such messages do not appear as the most recent message in the corresponding individual conversations in the list of instant message conversations. For example, in FIG. 22O, "BTW, the new AMC in Cupertino" appears with the group conversation, but not with the individual conversation with Tom.

FIG. 22P shows an example of a list of instant message conversations after the second message has been sent and after Mike Van Os has replied to the second message. In this example, Mike Van Os did not have a pre-existing instant messaging conversation with the user, so a new individual conversation has been started with Mike Van Os. Replies to outbound messages in a group conversation are either added to existing individual instant messaging conversations (e.g., a conversation with Tom) or used to initiate new individual instant messaging conversations (e.g., a new conversation with Mike Van Os). In some embodiments, replies are not incorporated into the group conversation, which only contains outbound messages.

FIG. 22Q illustrates an example of a user interface 2200Q for displaying a set of outgoing messages between the user and one or more parties and for composing a message to one or more parties in accordance with some embodiments. FIG. 22Q shows an example of a user interface displaying the new instant messaging conversation between the user and Mike Van Os after Mike Van Os has replied to the second instant message in the group conversation. As shown here, in some embodiments, the conversation includes the outbound messages that were sent to Mike Van Os as part of the group conversation, as well as the reply(s) by Mike Van Os.

In some embodiments, UI 2200Q includes the following elements, or a subset or superset thereof:
- 402, 404, 406, 2212, 2214, and 2254 as described above; and
- a set of messages 2264, 2272, 2283 between the user and a recipient including any messages (e.g., messages 2264, 2272) that are part of a group conversation received by the recipient.

FIG. 24 is a flow diagram for illustrating an example of a process for adding multiple recipients to an instant message through finger gestures in accordance with some embodiments. In some embodiments, the device allows the user to compose and send a telephony-based instant message to multiple recipients. An instant message conversation, in the following context, includes a set of messages between a user of the portable device and other person(s) based on Short Messaging Service (SMS), Multimedia Messaging Service (MMS), Enhanced Messaging Service (EMS), or other telephony-based communication protocol.

The multiple recipients in the group conversation are selected by a process 2400 in which:
- in response to detecting a finger gesture on an add recipient icon (e.g., 2234 FIG. 22B), the device displays (2402) a list of contacts on the touch screen;
- in response to detecting a finger swipe gesture (e.g., 2242, FIG. 22B) on the contact list, the device scrolls (2404) the list of contacts on the touch screen; and
- in response to detecting a finger gesture (e.g., 2231 FIG. 22B, 2248 FIG. 22C, 2250 FIG. 22D) on a contact in the list of contacts, the device adds the contact to the multiple recipients, and generates a corresponding recipient icon (e.g., 2246 FIG. 22C, 2252 FIG. 22D) in a message recipient field on the touch screen display (2406).

The device repeats (2408) the process above until all of the multiple recipients are selected.

In some embodiments, the list of contacts is narrowed to contacts corresponding to the letters inputted. For example, if the letter "v" is inputted, the list of contacts is narrowed to contacts having a name that starts with a "v" (e.g., FIG. 22B). The narrowed list of contacts include, for example, first names or last names that begin with a "v," (e.g., "Vivian" or "Mike Van Os") or businesses or other entities stored in the contacts list that have a name that begins with a "v." Similarly, as shown in FIG. 22C, if the user inputs a "t," the list of contacts is narrowed to contacts corresponding to "t," which includes last names, first names, and other entities (e.g., "Typhoon") that start with a "t."

In some embodiments, multiple recipients in the message can be selected by directly entering contact information through the soft keyboard. In response to one or more finger gestures on one or more keys corresponding to one or more letters on a soft keyboard displayed on the touch screen display, the device displays the one or more letters in the message recipient field on the touch screen display.

Figure 25:
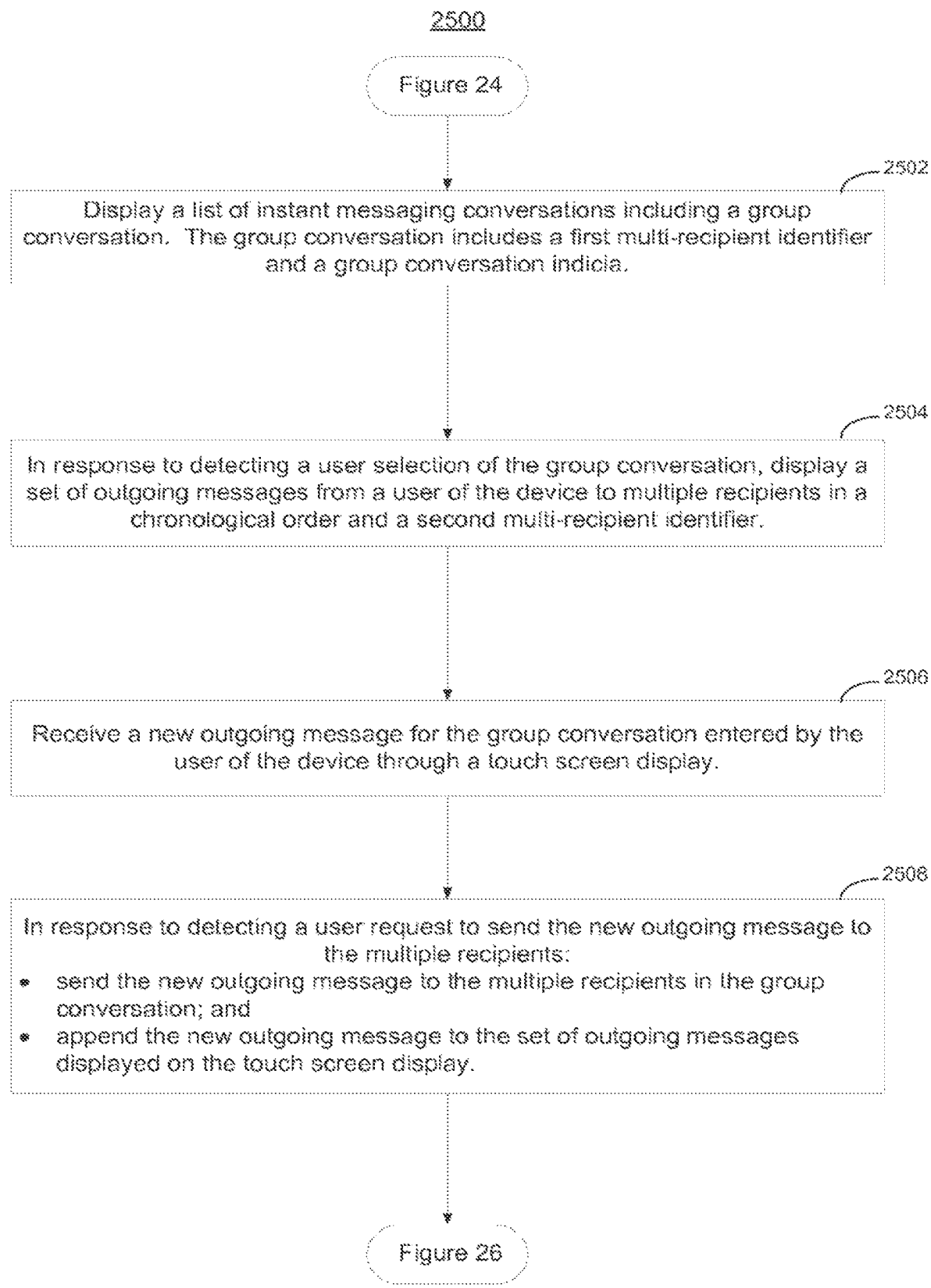
FIG. 25 is a flow diagram showing an exemplary method 2500 for displaying a list of instant messaging conversations including a group conversation and for sending a new outgoing message to multiple recipients in the group conversation in accordance with some embodiments. Method 2500 occurs at a portable electronic device with a touch screen display.

FIG. 25 is a flow diagram showing an exemplary method 2500 for displaying a list of instant messaging conversations including a group conversation and for sending a new outgoing message to multiple recipients in the group conversation in accordance with some embodiments. Method 2500 occurs at a portable electronic device with a touch screen display.

The device displays (2502) a list of instant messaging conversations (e.g., UI 2200F) including a group conversation (e.g., 2270 FIG. 22F). The group conversation includes a first multi-recipient identifier (e.g., 2268) and a group conversation indicia (e.g., 2266).

As previously discussed, in some embodiments incoming messages or responses to the group conversation are not considered to be part of the group conversation, and hence are not designated with a group conversation indicia (e.g., 2266). For example, Tom's message 2271 (FIG. 22F) is a response to the user's group conversation 2270 (as shown in FIG. 22F, Tom was a recipient of the outgoing message.). Because responses to the group conversation are not considered to be part of the group conversation, Tom's response 2271 is not accompanied by a group conversation indicia (e.g., 2266).

In response to detecting a user selection of the group conversation (e.g., 2270 FIG. 22F), the device displays (2504) a set of outgoing messages (e.g., 2264 FIG. 22H) from a user of the device to multiple recipients in a chronological order and also displays a second multi-recipient identifier (e.g., 2261 FIG. 22H).

In some embodiments, the first multi-recipient identifier (e.g., 2268 FIG. 22F) identifies a subset, but not all, of the multiple recipients, while the second multi-recipient identifier (e.g., 2261 FIG. 22H) identifies all of the multiple recipients. For example, the first multi-recipient identifier (e.g., 2268 FIG. 22F) may be an abbreviated representation (e.g., "Mike Van Os & others") of the recipients. In some embodiments, if the identifiers of the message recipients in the second multi-recipient identifier field (e.g., 2261 FIG. 22E) are too long and/or numerous to be displayed in the display region that is used for listing message recipients, a scroll bar may be displayed to allow the user to scroll through a list of the message recipients, enabling the user to view all of the message recipients.

The device receives (2506) a new outgoing message for the group conversation entered by the user of the device through the touch screen display. In some embodiments, the new outgoing messages are short messaging service (SMS), multimedia messaging service (MMS), or enhanced messaging service (EMS) messages.

In response to detecting a user request to send the new outgoing message to the multiple recipients, the device sends (2508) the new outgoing message to the multiple recipients in the group conversation. Also in response to detecting a user request to send the new outgoing message to the multiple recipients, the device appends (2508) the new outgoing message to the set of outgoing messages displayed on the touch screen display. For example, in FIG. 22H, after the user requests to send the new outgoing message (e.g., user gesture on the "Send" icon 2214) the device sends the new outgoing message to the multiple recipients and appends the new outgoing message (e.g., 2272) to the set of outgoing messages (2264, FIG. 22L), as shown in FIG. 22L.

In some embodiments, the appending of the new outgoing message to the set of the outgoing messages displayed on the touch screen occurs before the sending of the new outgoing message to multiple recipients. These two parts of operation 2508 are independent of each other and can happen in any order.

Figure 26:
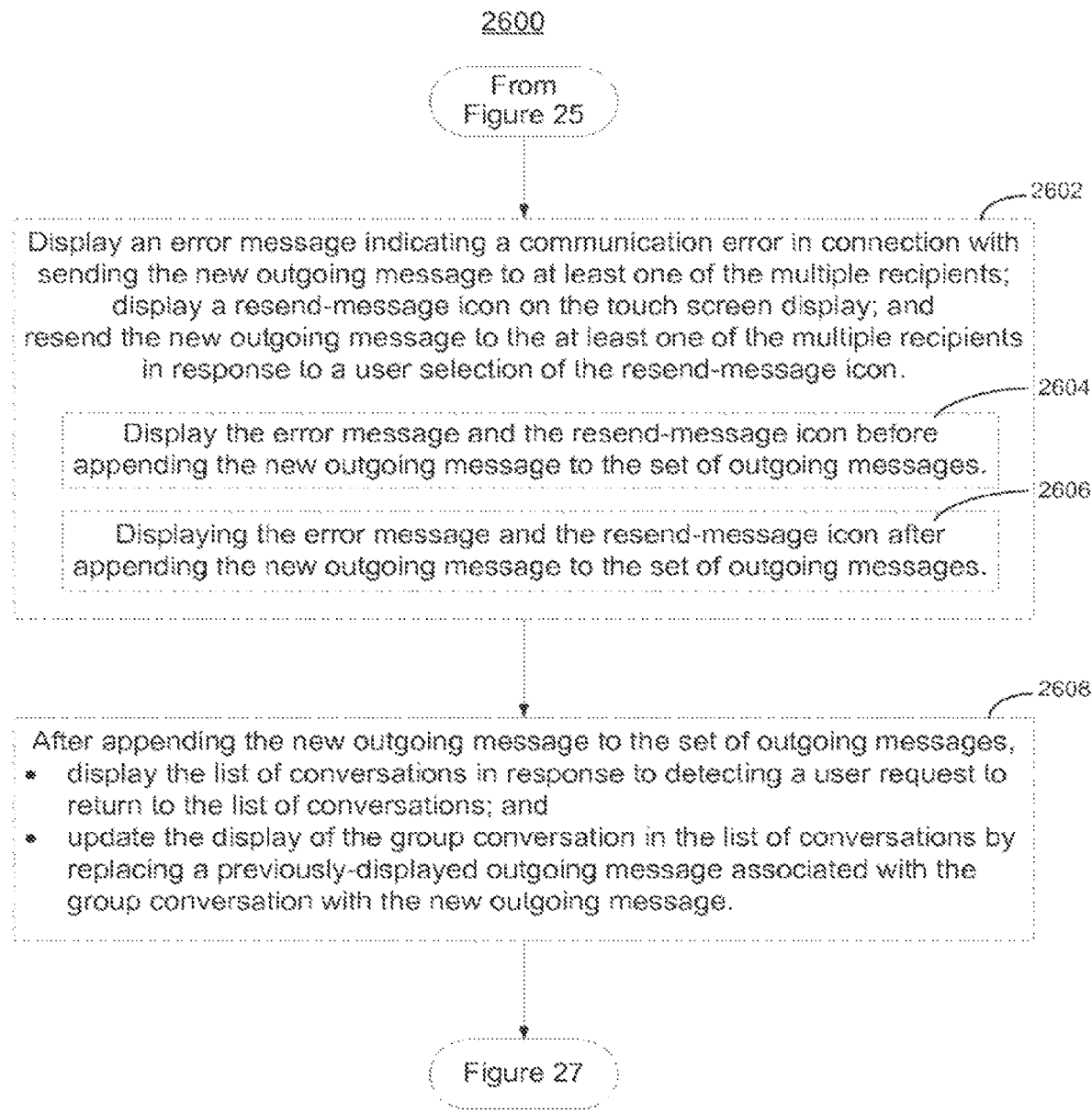
FIG. 26 is a flow diagram illustrating an exemplary process for displaying an error message indicating a communication error when sending the new outgoing message and for resending the message after an error in accordance with some embodiments.

FIG. 26 is a flow diagram illustrating an example of a process for displaying an error message indicating a communication error when sending the new outgoing message and for resending the message after an error in accordance with some embodiments.

In some embodiments, the device displays (2602) an error message (e.g., 2276 FIG. 22I) indicating a communication error in connection with sending the new outgoing message to at least one of the multiple recipients, displays (2602) a resend-message icon (e.g., 2280) on the touch screen display, and resends the new outgoing message to the at least one of the multiple recipients in response to a user selection (e.g., finger tap gesture) of the resend-message icon (e.g., 2280).

In some embodiments, the device displays (2604) the error message (e.g., 2276 FIG. 22I) and the resend-message icon (e.g., 2280) before appending the new outgoing message to the set of outgoing messages. For example, in FIG. 22I, the device displays an error message in connection with sending the new outgoing message, but has not yet appended the message to the set of outgoing messages (e.g., 2264 FIG. 22I).

In some embodiments, the device displays (2606) the error message (e.g., 2276 FIG. 22J) and the resend-message icon (e.g., 2280) after appending the new outgoing message (e.g., 2272) to the set of outgoing messages (e.g., 2264).

In some embodiments, after appending the new outgoing message (e.g., 2272 FIG. 22L) to the set of outgoing messages (e.g., 2264), the device displays (2608) the list of conversations (e.g., FIG. 22O) in response to detecting a user request to return to the list of conversations (e.g., user gesture on the "Instant Messages" icon 2254, FIG. 22L).

After appending the new outgoing message (e.g., 2272 FIG. 22L) to the set of outgoing messages (e.g., 2264 FIG. 22L), the device also updates (2608) the display of the group conversation in the list of conversations (e.g., UI 2200O FIG. 22O) by replacing a previously-displayed outgoing message (e.g., 2270 FIG. 22F) associated with the group conversation with the new outgoing message (e.g., 2292 FIG. 22O). For example, in FIG. 22O, the message "BTW, the new AMC in Cupertino" now replaces the previously displayed outgoing message "We'll meet at AMC at 8 pm."

In some embodiments, the message with the error bears a different appearance than other messages in the conversation (e.g. dotted lines, different colors). After successfully resending the message, the appearance of the message (e.g., 2272) will change to indicate success (e.g., removal of dotted lines) (FIG. 22L.) Additionally, in FIG. 22L, the text box 2212 is available for sending of more messages to the group after successfully resending the message.

Figure 27:
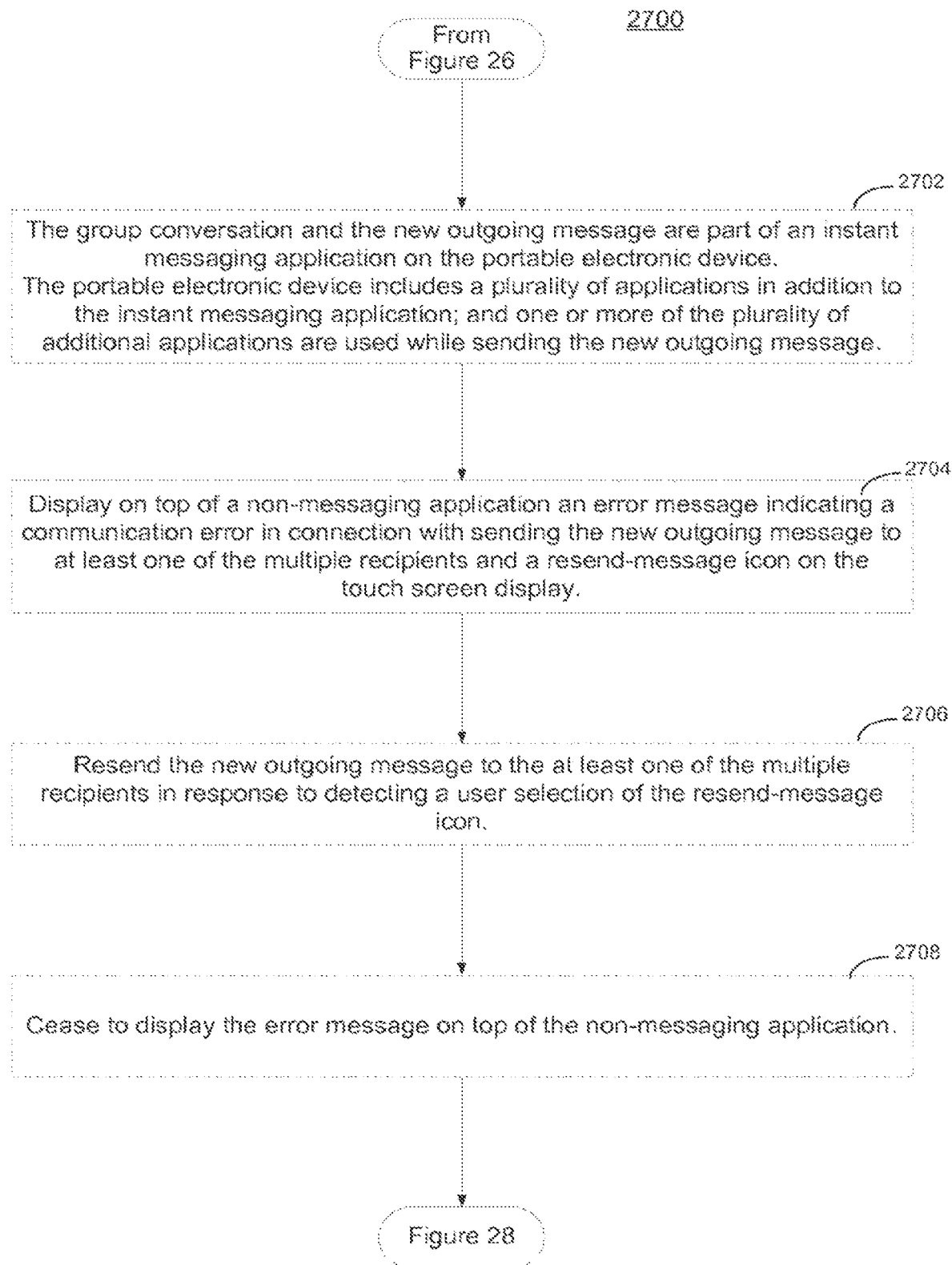
FIG. 27 is a flow diagram illustrating an exemplary process for displaying an error message in connection with sending the new outgoing message to at least one of the multiple recipients when a non-messaging application is being used while sending the outgoing message in accordance with some embodiments.

FIG. 27 is a flow diagram illustrating an example of a process for displaying an error message in connection with sending the new outgoing message to at least one of the multiple recipients when a non-messaging application is being used while sending the outgoing message in accordance with some embodiments.

The group conversation and the new outgoing message are part of an instant messaging application on the portable electronic device. The portable electronic device includes a plurality of applications in addition to the instant messaging application, and in this example one or more of the plurality of additional applications are used while sending the new outgoing message (2702). For example, the user may switch to a non-messaging application after sending a message.

The device displays (2704) on top of a non-messaging application an error message (e.g., 2276 FIG. 22K) indicating a communication error in connection with sending the new outgoing message to at least one of the multiple recipients and a resend-message icon (e.g., 2280) on the touch screen display. For example, in FIG. 22K, the error message 2276 is displayed on top of a non-messaging application "Camera Roll."

The device resends (2706) the new outgoing message to the at least one of the multiple recipients in response to detecting a user selection of the resend-message icon (e.g., 2280).

After the device resends the new outgoing message (2706), the device ceases (2708) to display the error message on top of the non-messaging application. In some embodiments, in response to user selection of the Cancel icon (e.g., 2278), the device also ceases to display the error message on top of the non-messaging application.

Figure 28:
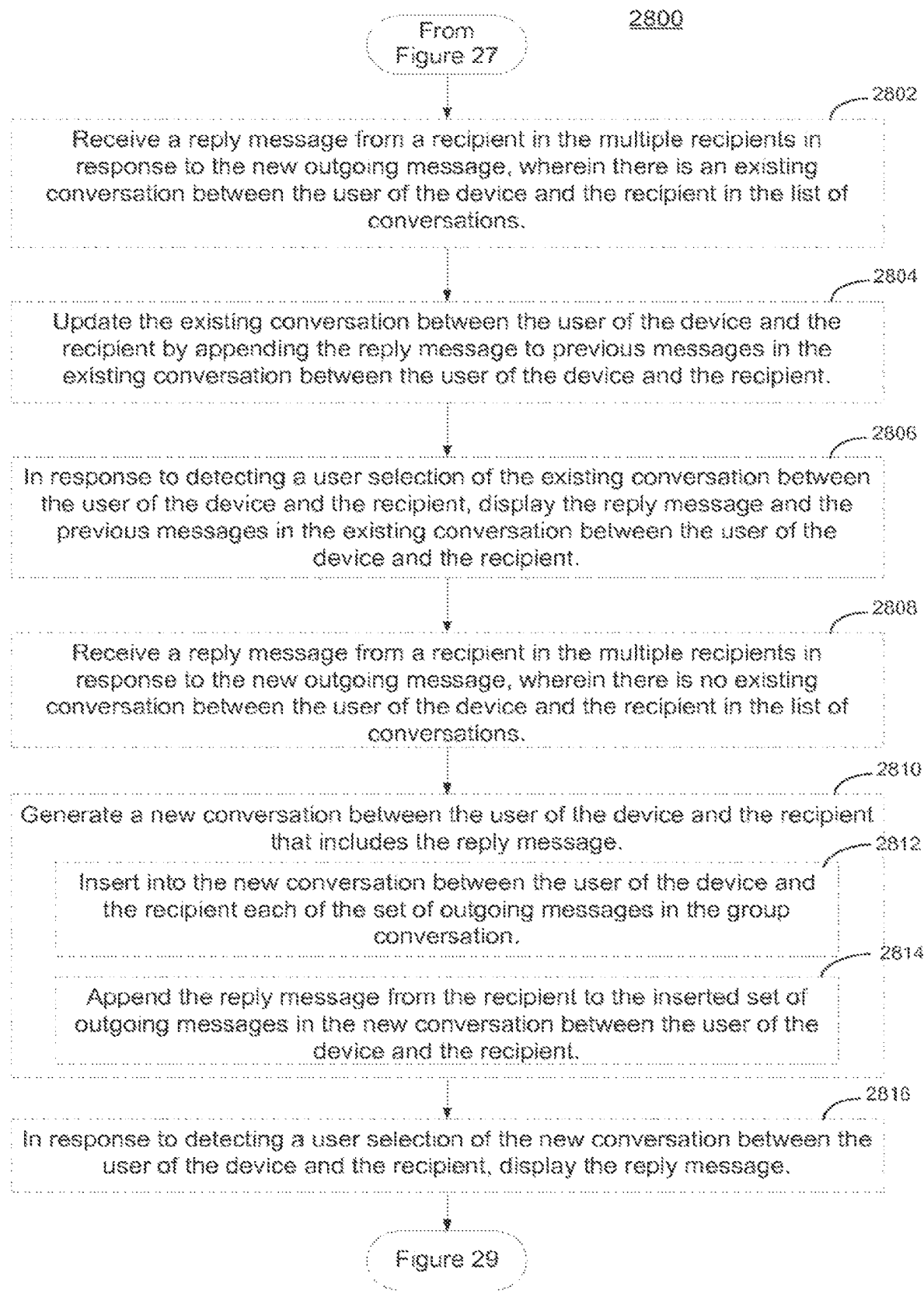
FIG. 28 is a flow diagram illustrating an exemplary process for replying to an existing conversation between the user of the device and the recipient, and for generating a new conversation between the user of the device and the recipient of the message in accordance with some embodiments.

FIG. 28 is a flow diagram illustrating an example of a process for replying to an existing conversation between the user of the device and the recipient, and for generating a new conversation between the user of the device and the recipient of the message in accordance with some embodiments.

In some embodiments, the device receives (2802) a reply message from a recipient in the multiple recipients in response to the new outgoing message. In this example, there is an existing conversation between the user of the device and the recipient, and the existing conversation is listed in the list of conversations. For example, in FIG. 22F, the device receives a reply message (e.g., 2271) from a recipient (Tom) in the multiple recipients (e.g., in FIG. 22E, the recipients were Toni, Allen Cook, and Mike) in response to the new outgoing message (e.g., 2270). As shown in FIG. 22A, there is already an existing conversation between the user of the device and Tom.

In some embodiments, the device updates (2804) the existing conversation between the user of the device and the recipient by appending the reply message to previous messages in the existing conversation between the user of the device and the recipient. For example, in some embodiments, the device will update the existing conversation between Tom and the user of the device by appending the user's reply message to previous messages between the user and Tom.

In some embodiments, in response to detecting a user selection (e.g., finger tap gesture) of the existing conversation between the user of the device and the recipient (e.g., the conversation with Tom, shown in FIG. 22F), the device displays (2806) the reply message and the previous messages in the existing conversation between the user of the device and the recipient. For example, in response to user selection of Tom's reply message 2271 in the user interface shown in FIG. 22F, the device displays (FIG. 22G) Tom's reply message "I will bring a friend with me" and the previous messages, "We'll meet at AMC at 8 PM" and "Nola" in the existing conversation between the user of the device and Tom.

In some embodiments, the previous messages in the existing conversation between the user of the device and the recipient includes each of the set of outgoing messages in the group conversation. For example, in UI 2200G (FIG. 22G), the previous messages includes the outgoing messages in the group conversation (e.g. "We'll meet at AMC at 8 pm").

The previous messages in the existing conversation between the user of the device and the recipient include messages, if any, that are not in the set of outgoing messages in the group conversation. For example, in UI 2200G (FIG. 22G), the previous messages include messages not in the group conversation (e.g., "Hola").

The device may receive (2808) a reply message from a recipient in the multiple recipients in response to the new outgoing message, wherein there is no existing conversation between the user of the device and the recipient in the list of conversations. For example, the user of the device may receive a message from Mike Van Os (e.g., 2294 FIG. 22P). As previously discussed, Mike Van Os is a recipient of the "BTW, the new AMC in Cupertino" message 2292 that is part of a group conversation (see FIG. 22E). In this example, there is no existing conversation between the user and Mike in the list of conversations (see FIG. 22A, FIG. 22F, and FIG. 22P).

In some embodiment, when the device receives a reply message from a recipient in the multiple recipients in response to the new outgoing message, wherein there is no existing conversation between the user of the device and the recipient in the list of conversations, the device generates (2810) a new conversation between the user of the device and the recipient that includes the reply message. In the example shown in FIG. 22P, since there is no existing conversation between Mike and the user, the device generates a new conversation between the user and Mike, including Mike's reply message "Sorry that I can't come tonight . . . " 2294.

In some embodiments, in response to detecting a user selection of the new conversation between the user of the device and the recipient (e.g., 2294 FIG. 22P), the device displays (2816) the reply message (e.g., "Sony that I can't come tonight . . . " FIG. 22Q).

In some embodiments, generating the new conversation between the user of the device and the recipient further includes inserting (2812) into the new conversation (between the user of the device and the recipient) each of the set of outgoing messages in the group conversation. In some embodiments, generating the new conversation between the user of the device and the recipient also includes appending (2814) the reply message from the recipient to the inserted set of outgoing messages in the new conversation between the user of the device and the recipient. For example, in FIG. 22Q, the set of outgoing messages in the group conversation ("We'll meet at AMC at 8 PM" 2264 and "BTW, the new AMC in Cupertino" 2272) is inserted into the new conversation between the user and Mike. The reply message from Mike ("Sony that I can't come tonight. Next time!" 2283) is also appended to the inserted set of outgoing messages.

Figure 29:
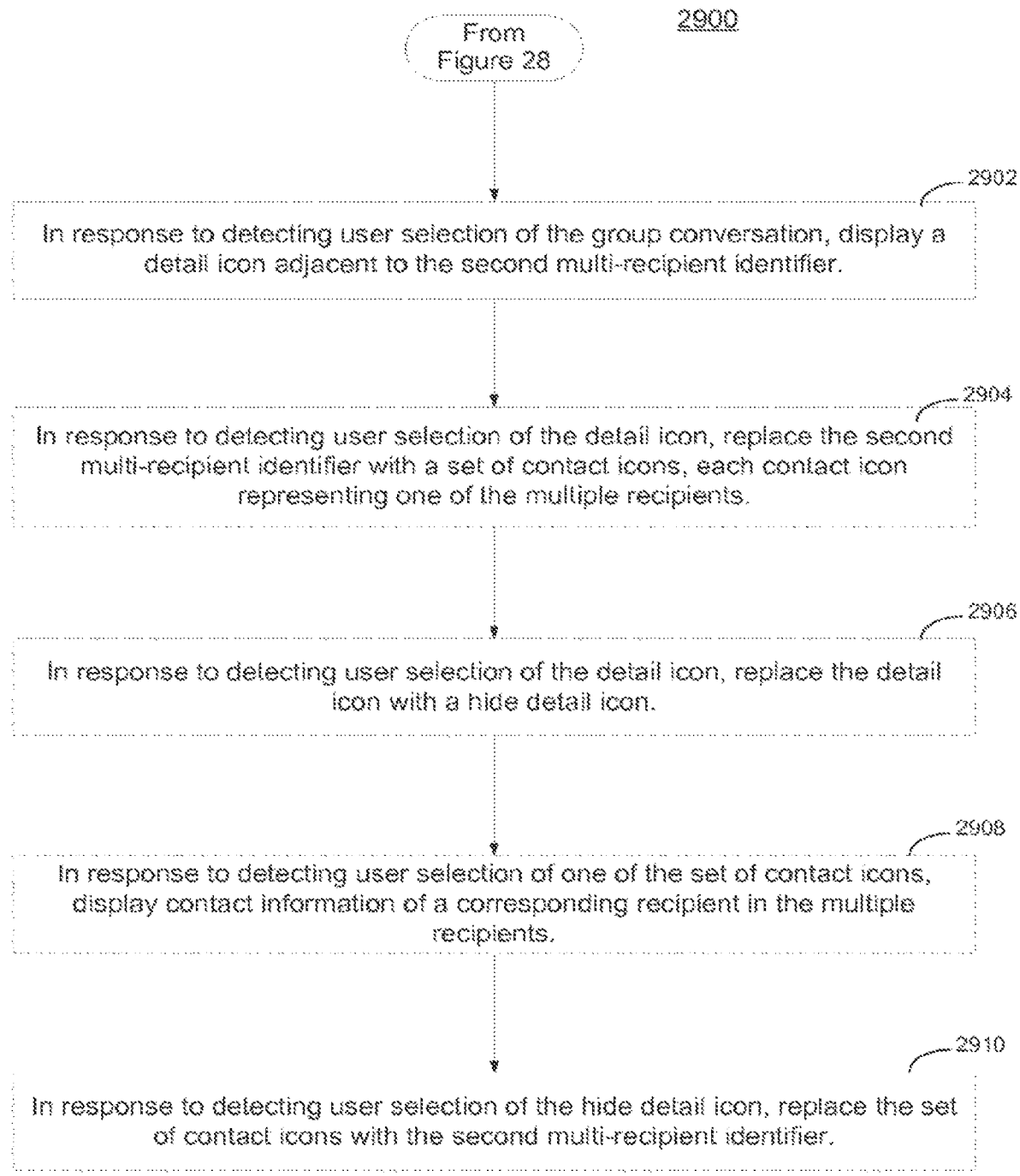
FIG. 29 is a flow diagram illustrating an exemplary process for revealing and hiding contact details in accordance with some embodiments.

FIG. 29 is a flow diagram illustrating an example of a process for revealing and hiding contact details in accordance with some embodiments. In response to detecting user selection (e.g., finger tap gesture) of the group conversation (e.g., 2290 FIG. 22P), the device displays (2902) a details icon (e.g., 2262 FIG. 22L) adjacent to the second multi-recipient identifier 2261 (FIG. 22L).

In response to detecting user selection of the detail icon (e.g., 2262), the device replaces (2904) a multi-recipient identifier (e.g., "Mike Van Os, Tom, Allen Cook," 2261 FIG. 22L) with a set of contact icons 2285 (e.g., FIG. 22M), each contact icon representing one of the multiple recipients. For example, in UI 2200M, Allen Cook, one of the multiple recipients of the message, is represented by the contact icon 2285-2 "Allen Cook."

In some embodiments, one of the set of contact icons is a telephone number. For example, this may occur if the recipient is not on the device's contact list (not shown on drawings).

In response to detecting user selection of the details icon (e.g., 2262 FIG. 22L), the device also replaces (2906) the details icon with a hide detail icon (e.g., 2286 FIG. 22M).

In response to detecting user selection of one of the set of contact icons (e.g., 2285-2), the device displays (2908) contact information of a corresponding recipient in the multiple recipients. For example, in response to user selection (e.g., 2274) of the "Allen Cook" contact icon 2285-2, the device displays UI 2200N (FIG. 22N) which contains the contact information of "Allen Cook."

In some embodiments, email addresses and other information associated with the contact that is not relevant to sending instant messages are grayed-out in the user interface showing the selected recipient's contact information (not shown in FIG. 22N).

In response to detecting user selection of the hide detail icon (e.g., 2286 FIG. 22M), the device replaces (2910) the set of contact icons 2285 with the multi-recipient identifier 2261 (e.g., "Mike Van Os, Tom, Allen Cook" FIG. 22L).

FIGS. 23A-23L illustrate exemplary user interfaces for displaying incoming instant messages while the device is in locked and unlocked mode in accordance with some embodiments. The user interfaces in FIGS. 23A-23L are described in more detail below. In addition the user interfaces in FIGS. 23A-23L are used to illustrate the processes described with reference to FIGS. 30A, 30B and 31A-31C below.

Figure 23A:
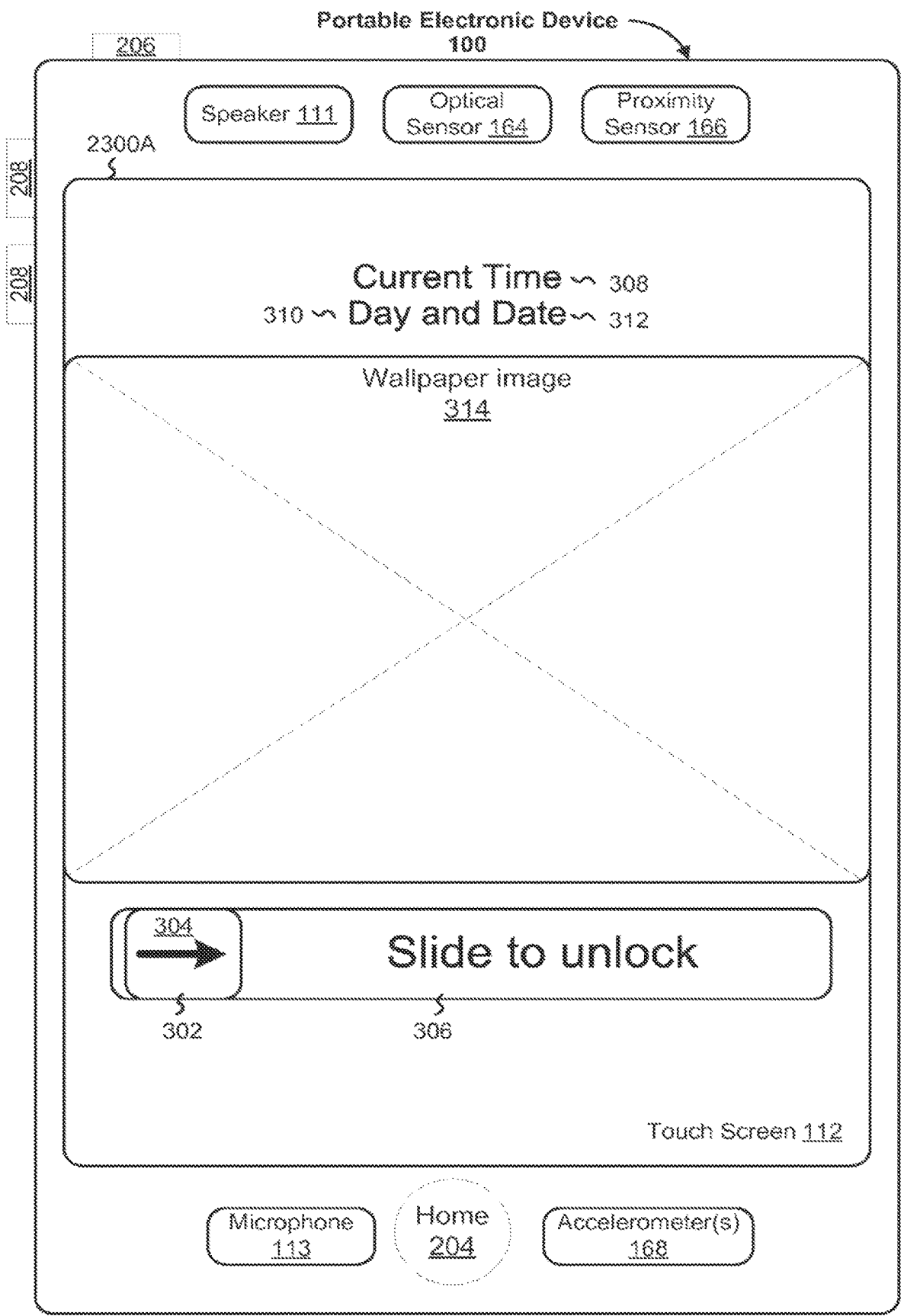
FIG. 23A illustrates an exemplary user interface 2300A for unlocking the touch screen display of device when the device is in locked mode in accordance with some embodiments.

FIG. 23A illustrates an exemplary user interface for unlocking a portable electronic device in accordance with some embodiments. In some embodiments, user interface 2300A includes the following elements, or a subset or superset thereof:

An unlock image 302 that is moved with a finger gesture (sometimes called the unlock gesture) to unlock the device;
Arrow 304 that provides a visual cue to the unlock gesture;
Channel 306 that provides additional cues to the unlock gesture;
Time 308;
Day 310;
Date 312; and
Wallpaper image 314.

Figure 23B:
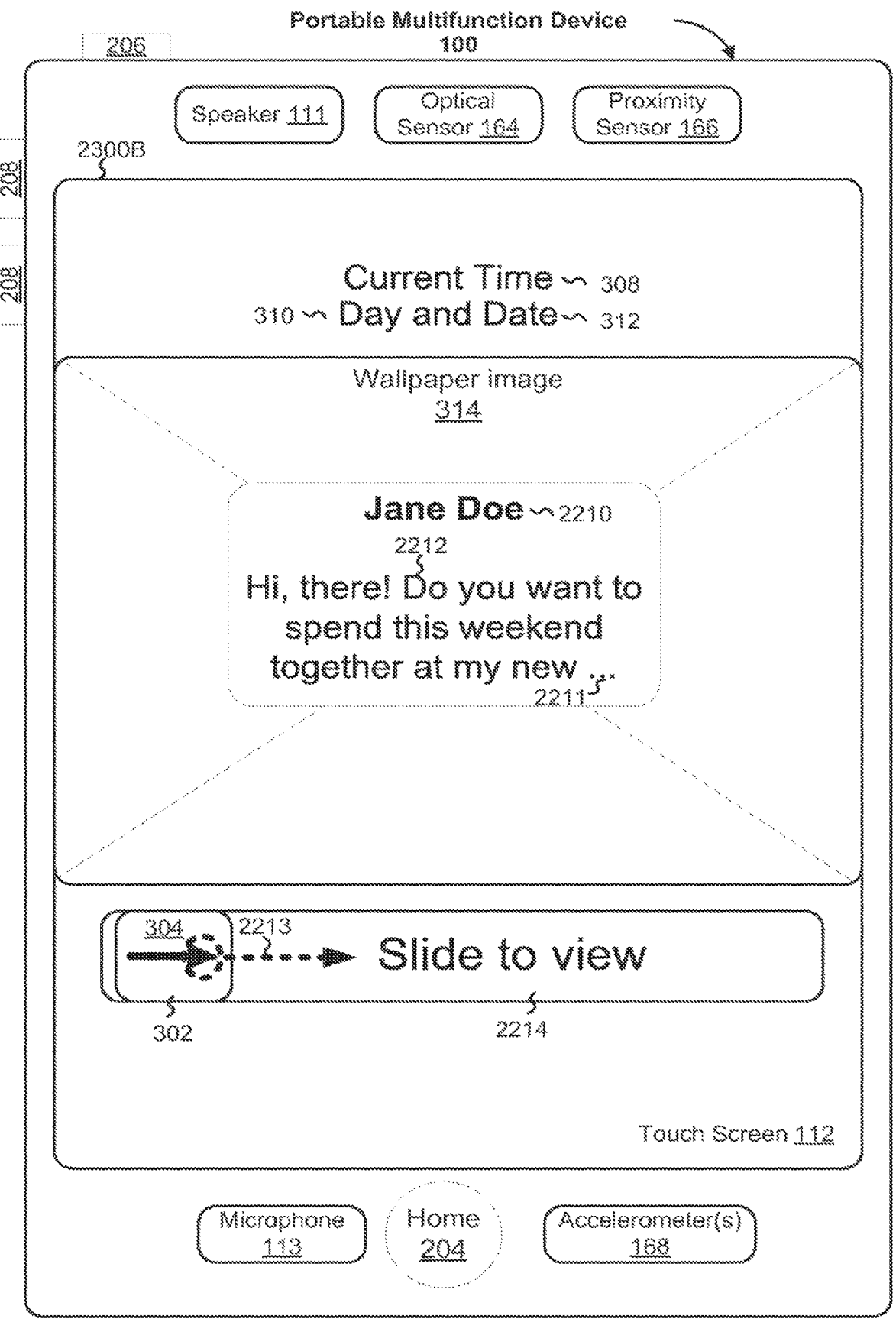
FIG. 23B illustrates an exemplary user interface 2300B for displaying an incoming message from a party to the user of the device and for displaying an unlock icon adaptively when the device is locked in accordance with some embodiments.

FIG. 23B illustrates an example of a user interface UI 2300B for displaying, while device remains locked (also called in locked mode), an incoming message from a party to the user of the device and for displaying an unlock icon or view icon in accordance with some embodiments. In particular, FIG. 23B shows an incoming message from Jane sent to the user of the device. A portion of the message is displayed because the message is longer than a predefined length. The "slide to unlock" icon 306 of FIG. 23A also changes to a "slide to view" icon 2214.

In some embodiments, UI 2300B includes the following elements, or a subset or superset thereof:

302, 304, 308, 310, 312, and 314 as described above;
name of the party 2210 that sent the incoming message to the user of the device;
a portion of the incoming message 2212;
a long message indicia 2211 indicating the incoming message is longer than a predefined length; and a
slide to view image 2214 (in place of the slice to unlock image 306, of UI 2300A, FIG. 23A) that in response to a gesture (e.g., a finger sliding gesture), immediately displays a set of messages between the user of the device and the party in a chronological order.

Figure 23C:
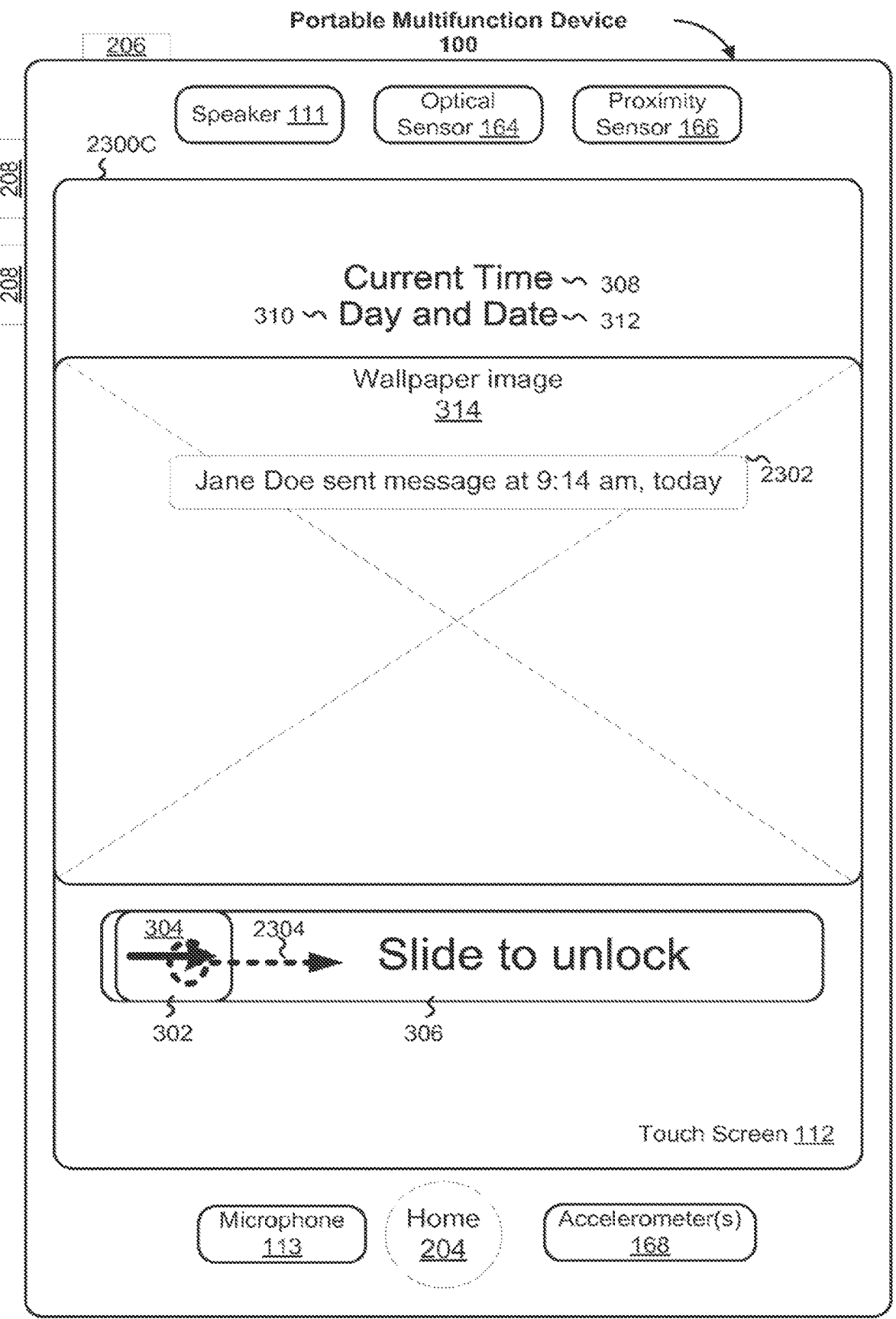
FIG. 23C illustrates an exemplary user interface 2300C for displaying a message alert on the touch screen display in accordance with some embodiments.

FIG. 23C illustrates an exemplary user interface 2300C for displaying a message alert on the touch screen display in accordance with some embodiments. In particular, FIG. 23C shows an incoming message as an alert. If the user ignores the message shown in UI 2300B for at least a predetermined period of time, FIG. 23B, the displayed message of UI 2300B is reduced to a message alert as shown on FIG. 23C, and the "slide to view" icon 2214 changes back to the "slide to unlock" icon 306. The user is determined to have ignored the message shown in UI 2300B for at least the predetermined period of time if no user request to view the incoming message (e.g. a finger gesture 2213 on the view icon 2214 FIG. 23B) is detected within a predetermined period of time.

In some embodiments, UI 2300C includes the following elements, or a subset or superset thereof:

302, 304, 306, 308, 310, 312, and 314 as described above; and
a message alert 2302 that includes the identifier of the party (e.g., "Jane Doc") and a time indicator (e.g., "9:14 am, today") for the incoming message.

Figure 23D:
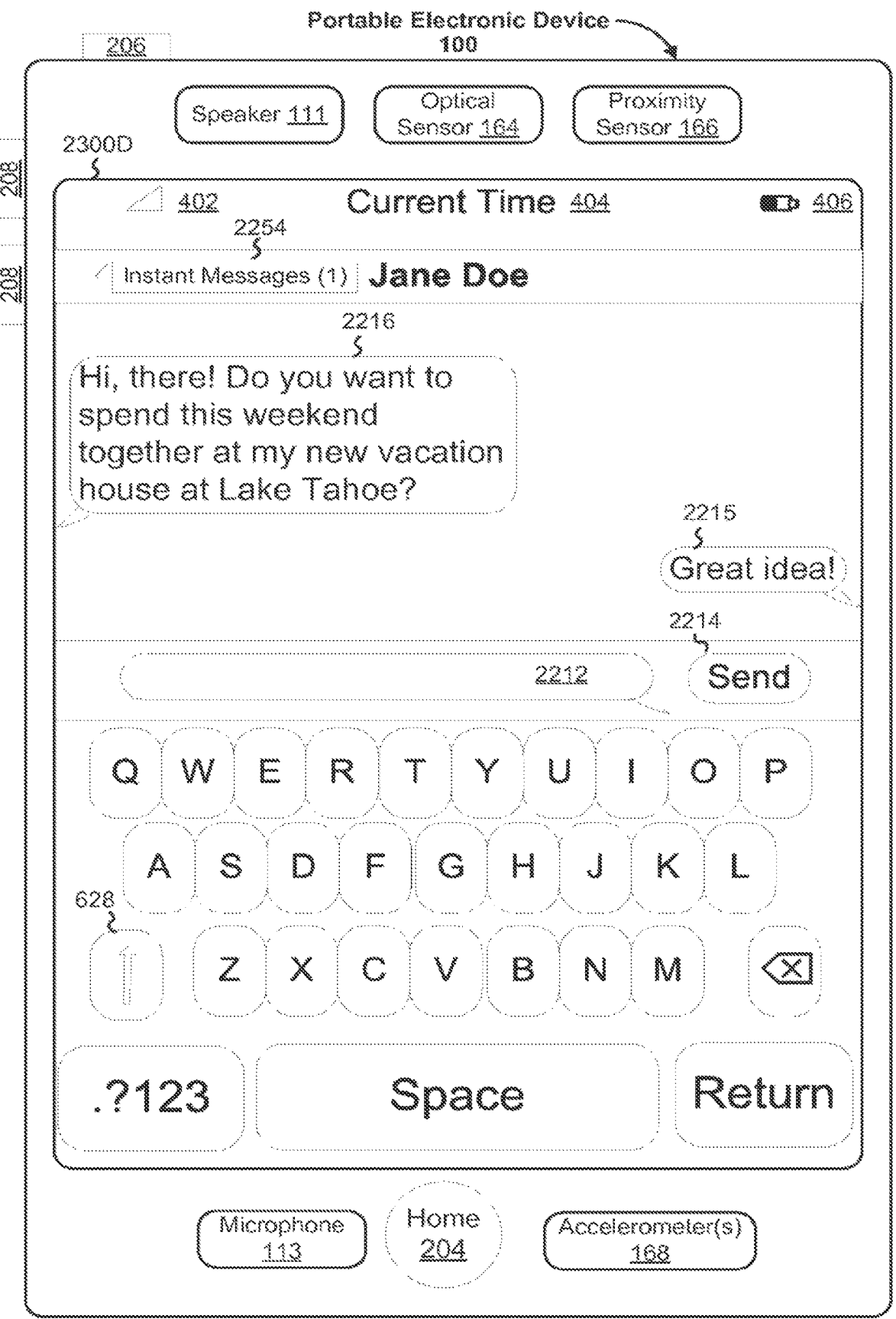
FIG. 23D illustrates an exemplary user interface 2300D allowing the user to respond to an incoming message.

FIG. 23D illustrates an example of a user interface 2300D allowing the user to respond to the incoming message. In this example, FIG. 23D shows an instant message conversation between the user and Jane Doe. If the user chooses to view the message (from FIG. 23B), the device displays a message response UI 2300D (FIG. 23D), which allows the user to respond to Jane's message. In this example, the user's responds with a message having the text "Great idea!" The messages appear in chronological order with the user's response at the end.

In some embodiments, UI 2300D displays the incoming message in its entirety 2216, the user's response to the incoming message 2215, and elements already discussed with respect to UI 2200G (FIG. 22G).

Figure 23E:
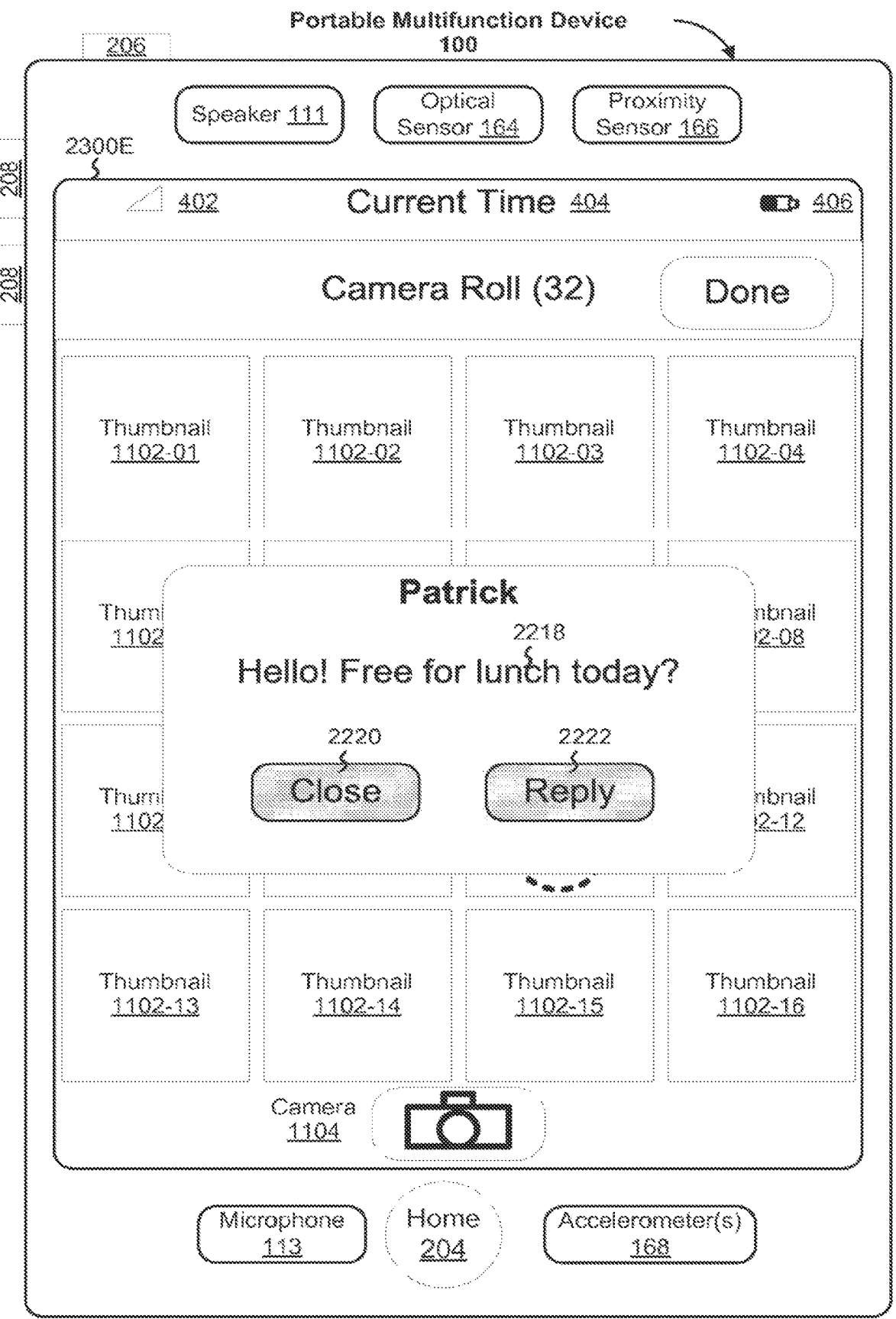
FIG. 23E illustrates an exemplary user interface 2300E for displaying an incoming message that is less than or equal to a predefined length according to some embodiments.

FIG. 23E illustrates an example of a user interface 2300E for displaying, while the device is unlocked, an incoming message having a length that is less than or equal to a predefined length according to some embodiments. In this example, FIG. 23E shows an incoming message received while the device is in unlocked mode and while a non-messaging application (e.g., Camera Roll) is in use. The message 2218 is displayed on top of the non-messaging application. Here, the device displays the entire message because the incoming message is shorter than the predefined length. The UI 2300E includes icons 2220, 2222 that enable the user to either reply to the message or close the message.

Figure 23F:
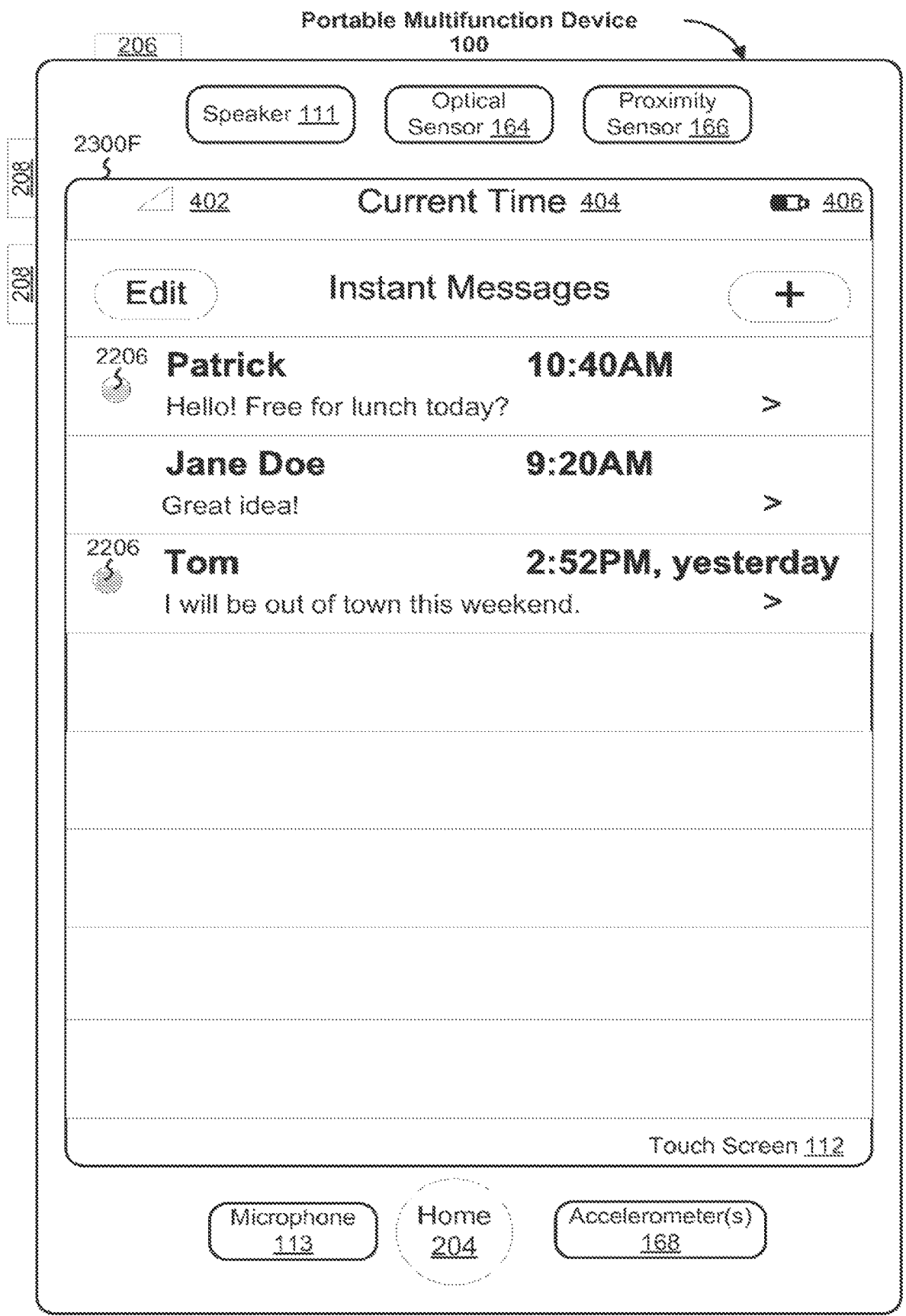
FIG. 23F-G illustrates an exemplary user interface for designating the status of the incoming message.
Figure 23G:
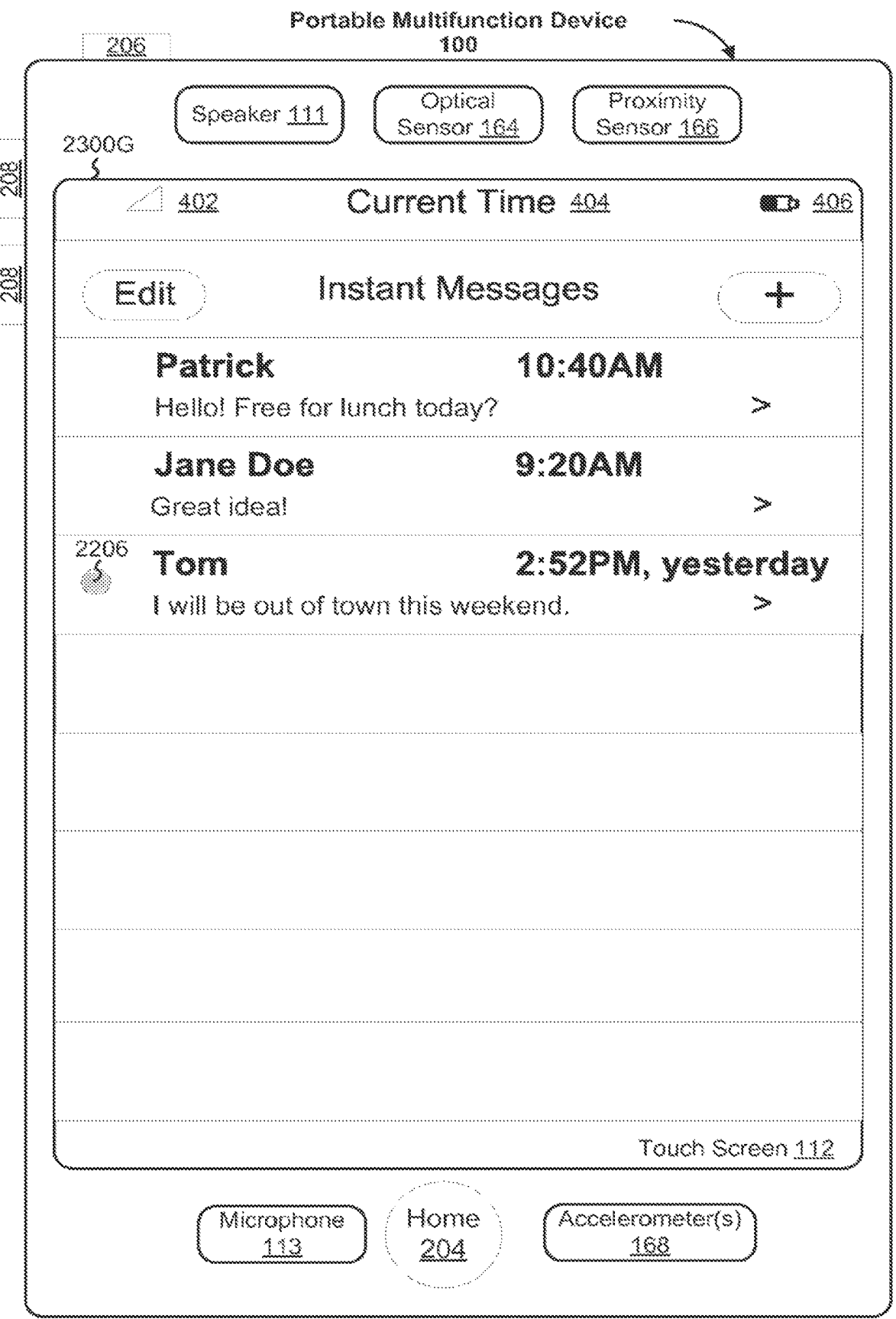
Figure 23H:
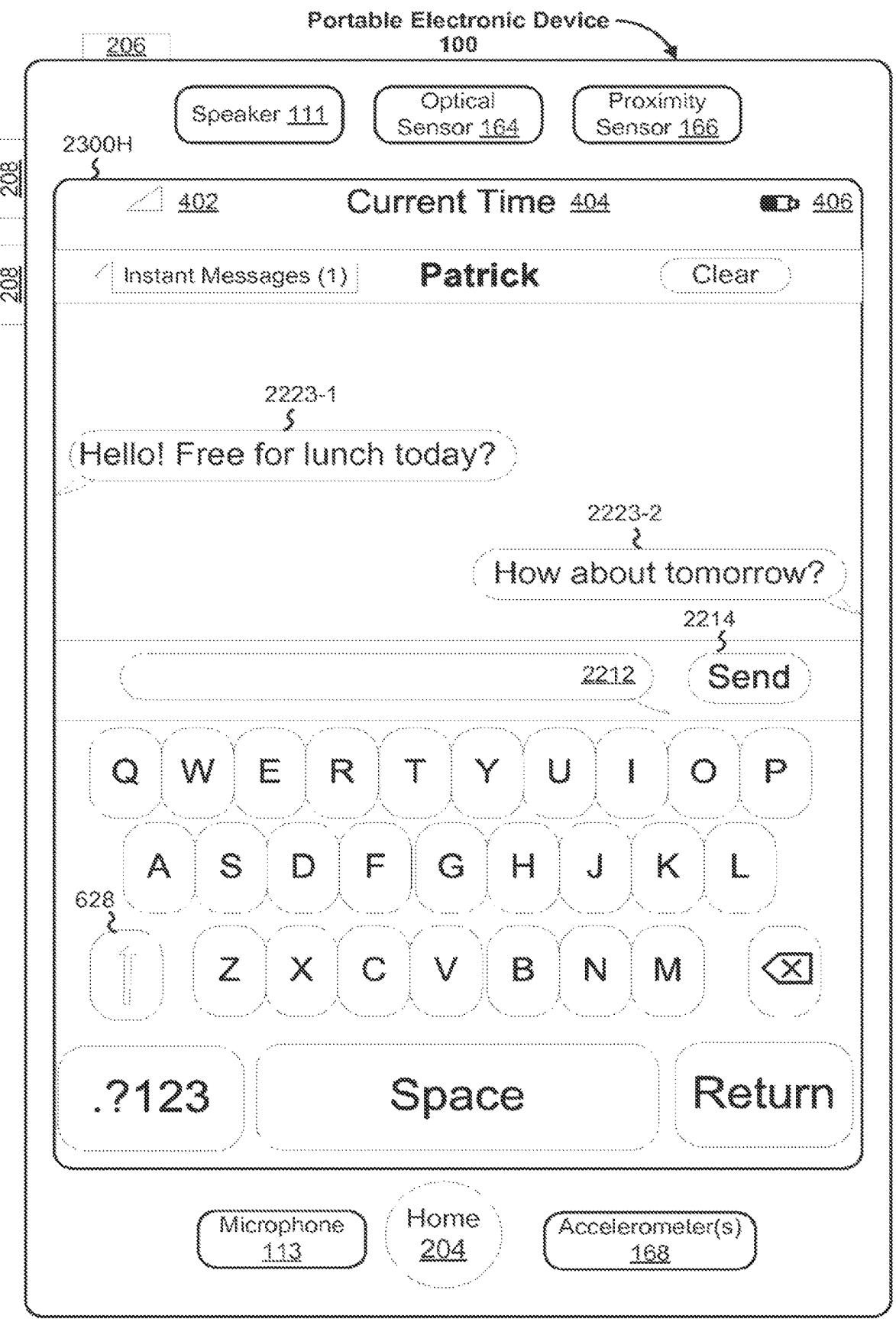
FIG. 23H illustrates an exemplary user interface 2300H for composing a reply message and for displaying a set of messages including the incoming message.

In some embodiments, user interface 2300E includes the following elements, or a subset or superset thereof:
  the incoming message in its entirety 2218;
  a close icon 2220 that when activated ceases the display of the incoming message or a portion thereof; and
  a reply icon 2222 that when activated immediately displays a set of messages between the user and the party in a chronological order (see, for example, UI 2300H, FIG. 23H).

FIG. 23F-23G illustrate examples of user interfaces for displaying a list of instant messaging conversations between the user and other parties, and for displaying the status of the incoming message. In some embodiments, user interfaces 2300F-2300G include elements already discussed with respect to UI 2200A (FIG. 22A) and UI 2200F (FIG. 22F). FIG. 23F shows an example of a list of instant messaging conversations. There are conversations listed for Patrick, Jane Doe, and Tom. An unread message indicia 2206 is displayed next to the list entries for the conversations with Patrick and Tom. If the user ignores the message pop-up on FIG. 23E (user does not select either close or reply), Patrick's message will be marked as unread because the device assumes that the user did not read the message.

FIG. 23G shows another example of a list of instant messaging conversations, similar to the list in FIG. 23F. However, in this example, only the list entry for the conversation with Tom has an unread message indicia next to it. The list entry for the conversation with Patrick does not have an unread indicia next to it because, in this example, A) the last message from Patrick was displayed in its entirety (as shown in FIG. 23D), and B) the user chose to close the message, for example by touching the close icon 2220 shown in FIG. 23E. Because Patrick's entire message was displayed (FIG. 23E) and because the user chose to close the message, the device assumes that the user read the message, and therefore does not mark the message as unread.

FIG. 23H illustrates an example of a user interface 2300H for composing a reply message and for displaying a set of messages including the incoming message. The user interface 2300H is displayed, for example, after the user chooses (e.g., by touching with a finger) the "Reply" icon 2222 in UI 2300E (FIG. 23E). In this example, FIG. 23H shows a plurality of the most recent messages from the instant messaging conversation between the user and Patrick, and a soft keyboard for entering a reply message. The UI 2300H enables the user to respond to Patrick's message. In some embodiments, user interface 2300H includes elements already discussed with respect to UI 2300D (FIG. 23D), including an incoming message 2223-1 and reply to the incoming message 2223-2.

Figure 23I:
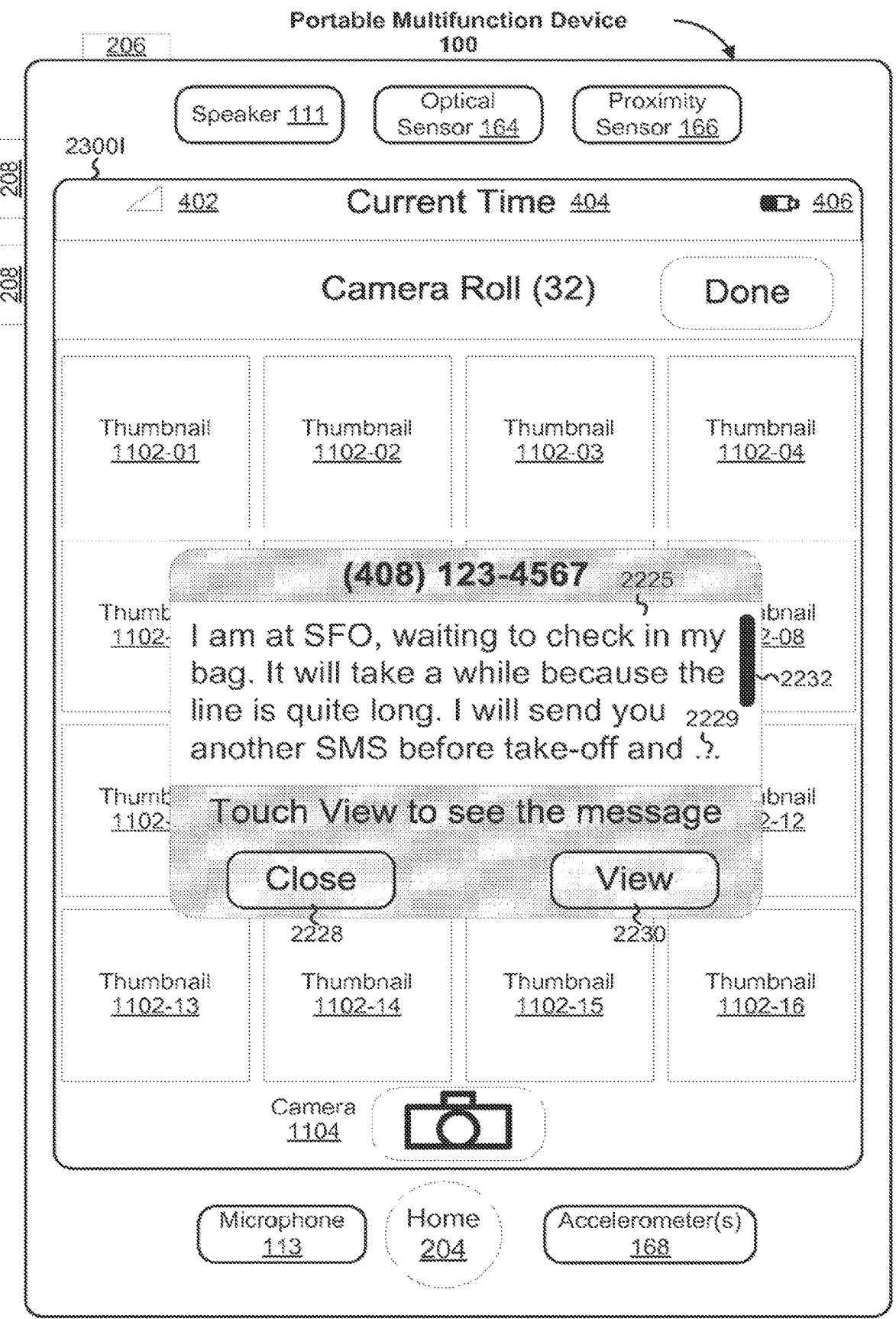
FIG. 23I illustrates an exemplary user interface 2300I for displaying an incoming message that is longer than a predefined length while the device is unlocked according to some embodiments.

FIG. 23I illustrates an example of a user interface 2300I for displaying, while the device is unlocked, an incoming message that is longer than a predefined length according to some embodiments. UI 2300I shows a portion 2225 of an incoming message when the device is unlocked and a non-messaging application is in use. Only a portion of the message is displayed because the message is longer than a predefined length. The user can read the entire message by either scrolling the message with a scroll bar 2232, or by selecting the View icon 2230. The user can also select the Close icon 2228 to close the displayed message. Note, that the sender of the incoming message in this example is designated by a phone number and not a contact name. The phone number from which a message is received may be displayed when the phone number is not found in the user's contact list, or if the phone number is found in the user's contact list by the contact list entry does not include a name.

In some embodiments, UI 2300I includes the following elements, or a subset or superset thereof:
  a View icon 2230 that when activated immediately displays a set of messages between the user of the device and the party in a chronological order. The displayed set of messages includes the incoming message;
  a Close icon 2228 that when activated within a predetermined period of time of the message (or message portion) first being displayed, causes the incoming message or a portion thereof to no longer be displayed;
  a long message indicia (e.g., an ellipsis, " . . . ") 2229; and
  a scroll indicator 2232 that when activated allows the user to scroll through the message.

Figure 23J:
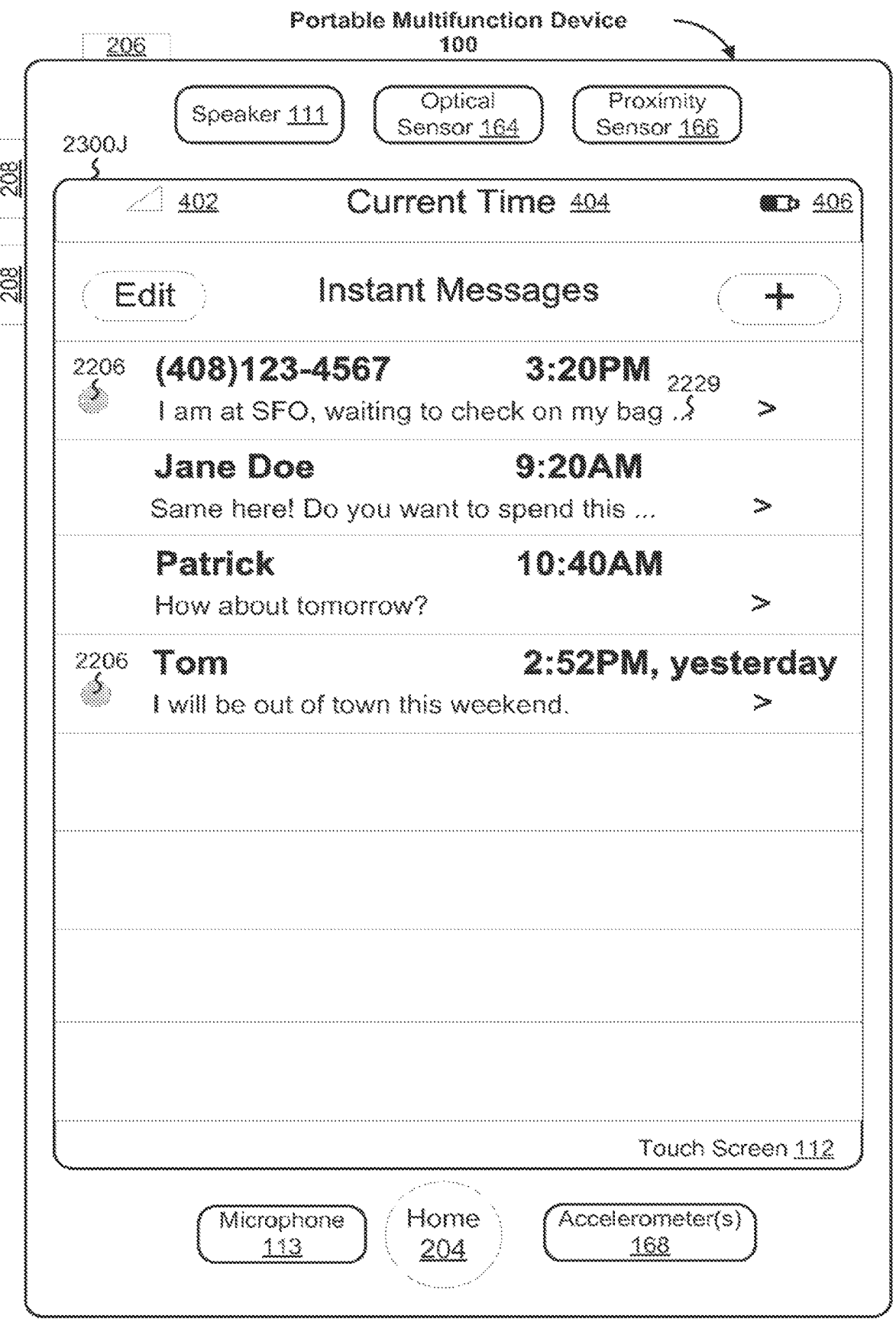
FIG. 23J illustrates an exemplary user interface 2300J for displaying a list of conversations in response to detecting user selection of the close icon when the incoming message is longer than a predefined length according to some embodiments.

FIG. 23J illustrate an example of a user interface 2300J for displaying a list of instant messaging conversations between the user and other parties, and for displaying the status of the incoming message. In this example, FIG. 23J shows a list of instant messaging conversations between the user and other parties that is displayed after the user chooses to close the message shown in FIG. 23I without scrolling through the message, or when the user does not respond to the message pop-up within a predetermined period of time. The conversation that includes the incoming message (from 408-123-4567) is designated with an unread message indicia. It is noted that, because only a portion of the incoming message was displayed, and the user did not scroll through the remainder of the message, the user did not read the entire incoming message. In some embodiments, user interface 2300J includes elements already discussed with respect to UI 2200A (FIG. 22A), UI 2200F (FIG. 22F), UI 2200P (FIG. 22P) and UI 2200Q (FIG. 22Q).

Figure 23K:
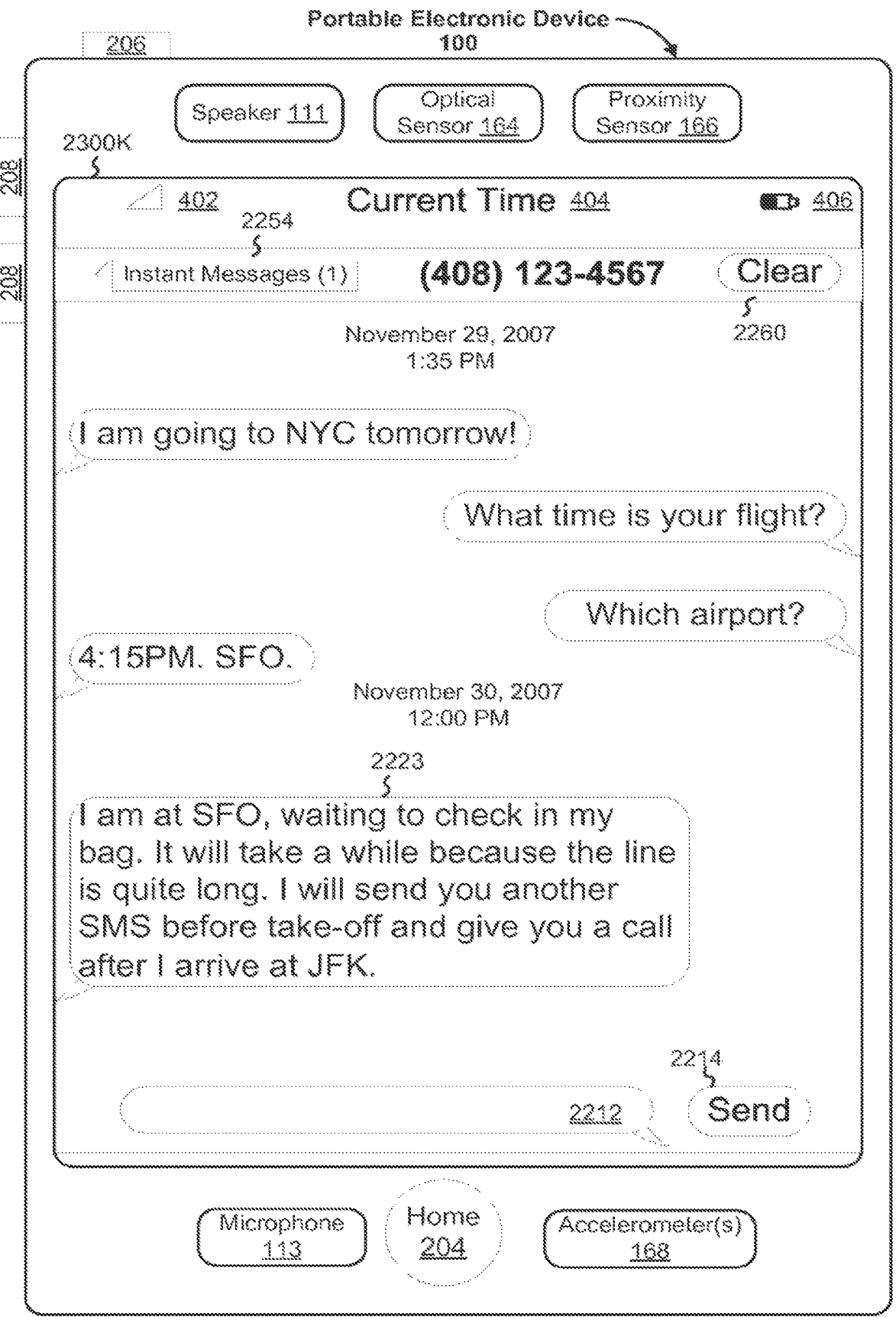
FIG. 23K illustrates an exemplary user interface 2300K for displaying a set of messages between the user of the device and the party that sent the incoming message in a chronological order according to some embodiments.

FIG. 23K illustrates an example of a user interface 2300K for displaying a set of messages between the user of the device and the party that sent the incoming message in a chronological order according to some embodiments. UI 2300K includes the text of the entire incoming message 2223. UI 2300K of FIG. 23K is display, for example, when the user selects the view icon 2230 in UI 2300I, FIG. 23I. In FIG. 23K, the user can view all messages, or at least all recent messages, between the user and the 408-123-4567 party. UI 2300K optionally includes a scroll bar when the messages in the conversation do not fit on the touch screen display. To reply to the incoming message, or to otherwise add another message to the conversation, the user can click on the text box for the incoming message, which will cause the device to display a soft keyboard (see, for example, UI 2300L of FIG. 23L). In some embodiments, user interface 2300K includes elements already discussed with respect to UI 2300H (FIG. 23H) and UI 2300D (FIG. 23D).

Figure 23L:
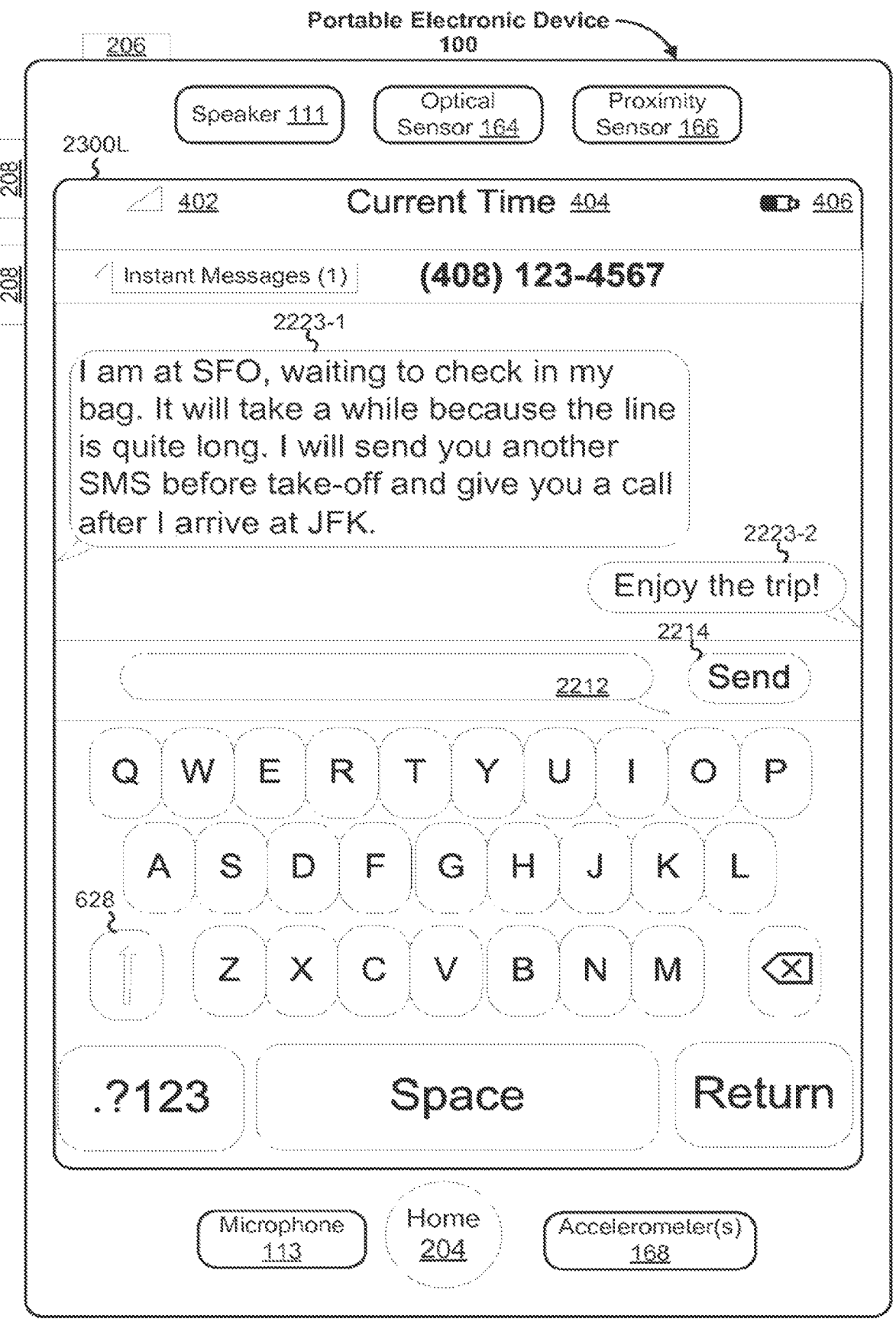
FIG. 23L illustrates an exemplary user interface for displaying a message with an unread message indicia in accordance with some embodiments.

FIG. 23L illustrates an example of a user interface 2300L for displaying a set of outgoing messages between the user and the sender of the incoming message, and for composing a reply message. FIG. 23L shows a soft keyboard through which the user can reply to an incoming message, or to otherwise add a message to a conversation. In the example shown in FIG. 23L, the user replies with "Enjoy the trip!," which is subsequently appended to the end of the displayed set of messages between the user and the other party. In some embodiments, UI 2300L includes elements already discussed with respect to UI 2300D (FIG. 23D) and UI 2300H (FIG. 23H).

Figure 30A:
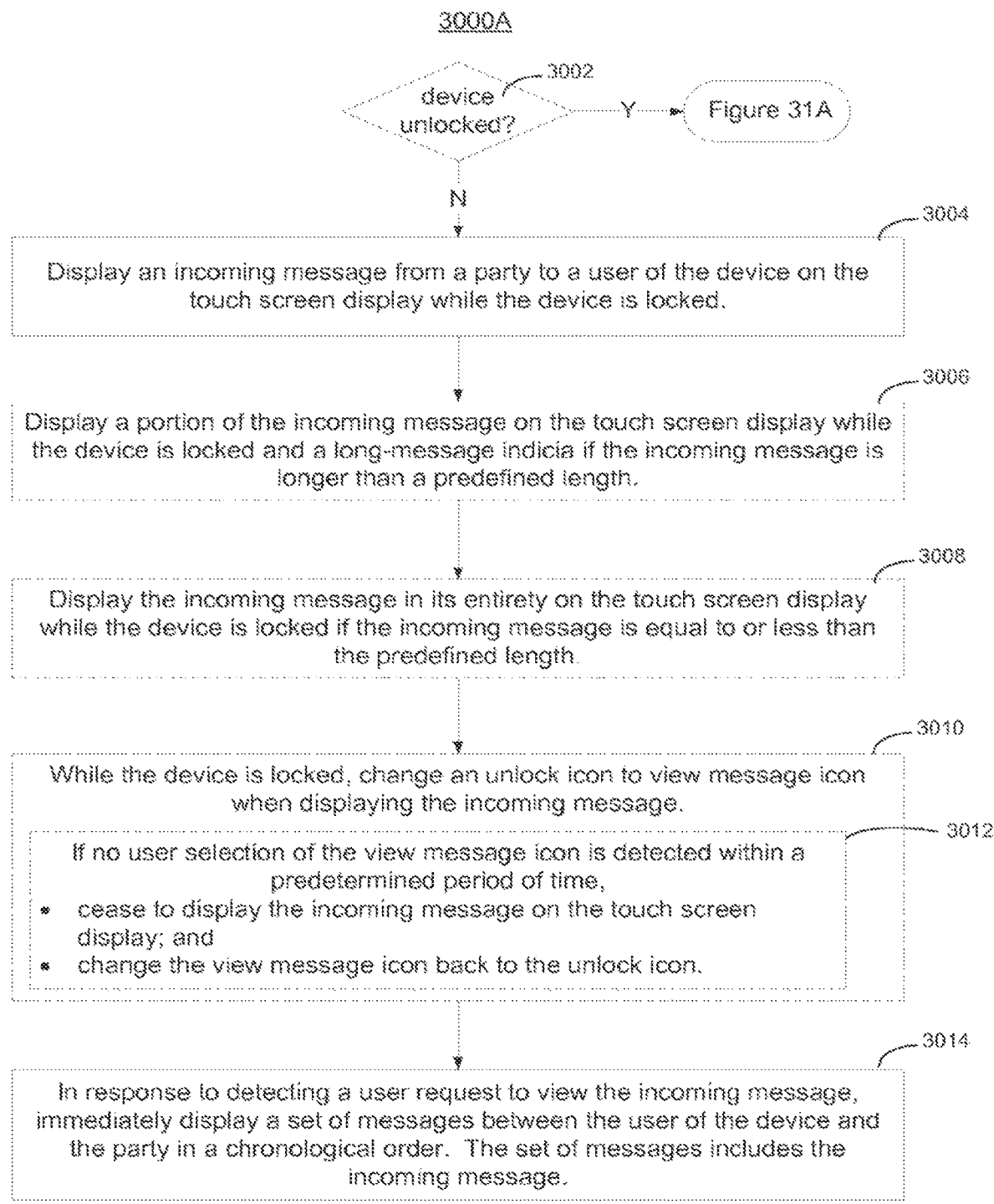

FIGS. 30A-30B are flow diagrams illustrating an example of a process for displaying an incoming message while the device is in locked mode 3002 in accordance with some embodiments.

The device displays (3004) an incoming message (e.g., 2212 FIG. 23B) from a party (e.g., "Jane Doe" 2210) to a user of the device on the touch screen display while the device is locked. In some embodiments, the incoming message is a Short Messaging Service (SMS), Multimedia Messaging Service, Enhanced Messaging Service (EMS), eXtensible Messaging and Presence Protocol (XMPP) message.

In some embodiments, the device displays (3006) a portion of the incoming message (e.g., 2212) on the touch screen display while the device is locked and a long-message indicia (e.g., an ellipsis, " . . . " 2211) if the incoming message is longer than a predefined length. The device displays (3008) the incoming message in its entirety on the touch screen display while the device is locked if the incoming message is equal to or less than the predefined length.

In some embodiments, while the device is locked, the unlock icon (e.g., "Slide to unlock" 306 FIG. 23A) is changed (3010) to a view icon (e.g., "Slide to view" 2214, FIG. 23B) when displaying the incoming message. The unlock icon may have a "Slide to unlock" or similar label. The view icon may have a "Slide to view" or similar label.

Operations 3006 and 3008 (displaying the message) can happen either before or after operation 3010 (adaptively displaying the view icon and the unlock icon.).

In some embodiments, if no user selection of the view message icon is detected within a predetermined period of time, the device ceases (3012) to display the incoming message on the touch screen display; and changes (3012) the view icon (e.g., 2214) back to the unlock icon (e.g., 306, FIG. 23A).

In response to detecting a user request (e.g., finger gesture 2213, FIG. 23B) to view the incoming message, the device immediately displays (3014) a set of messages between the user of the device and the party in a chronological order (e.g., UI 2300D FIG. 23D). The set of messages includes the incoming message (e.g., 2216).

In some embodiments, after the user sends a reply to the incoming message, the device automatically reverts to locked mode. In some other embodiments, after the user sends a reply to the incoming message, the device reverts to locked mode after a predefined period of time elapses.

In some embodiments, if no user request to view the incoming message is detected within a predetermined period of time, the device ceases (3016) displaying the incoming message on the touch screen display after the predetermined period of time. For example, in FIG. 23B, lithe device does not detect a request to view the incoming message (e.g., a finger gesture 2213 on the view icon 2214), the device ceases to display the message (e.g., 2212) on the touch screen display.

In some embodiments, after ceasing to display the incoming message, the device displays (3018) a message alert (e.g., 2302 FIG. 23C) on the touch screen display. In the example shown in FIG. 23C, the message alert 2302 includes an identifier of the party and a time indicator for the incoming message.

After ceasing to display the incoming message, in response to detecting a user request (e.g., a finger gesture 2304 on the "Slide to unlock" icon 306 FIG. 23C) to unlock the device, the device is unlocked (3020). Furthermore, in response to detecting a user selection of an instant messaging icon, the device displays (3022) a list of instant messaging conversations. The list includes an unread message indicia (e.g., 2267 FIG. 23F) adjacent to the conversation between the user of the device and the party.

In some embodiments, if no user request to view the incoming message is detected within the predetermined period of time, the device marks (3024) a conversation that includes the incoming message as containing at least one unread message. Operations 3018, 3020, 3024 may happen in any order.

Figure 31A:
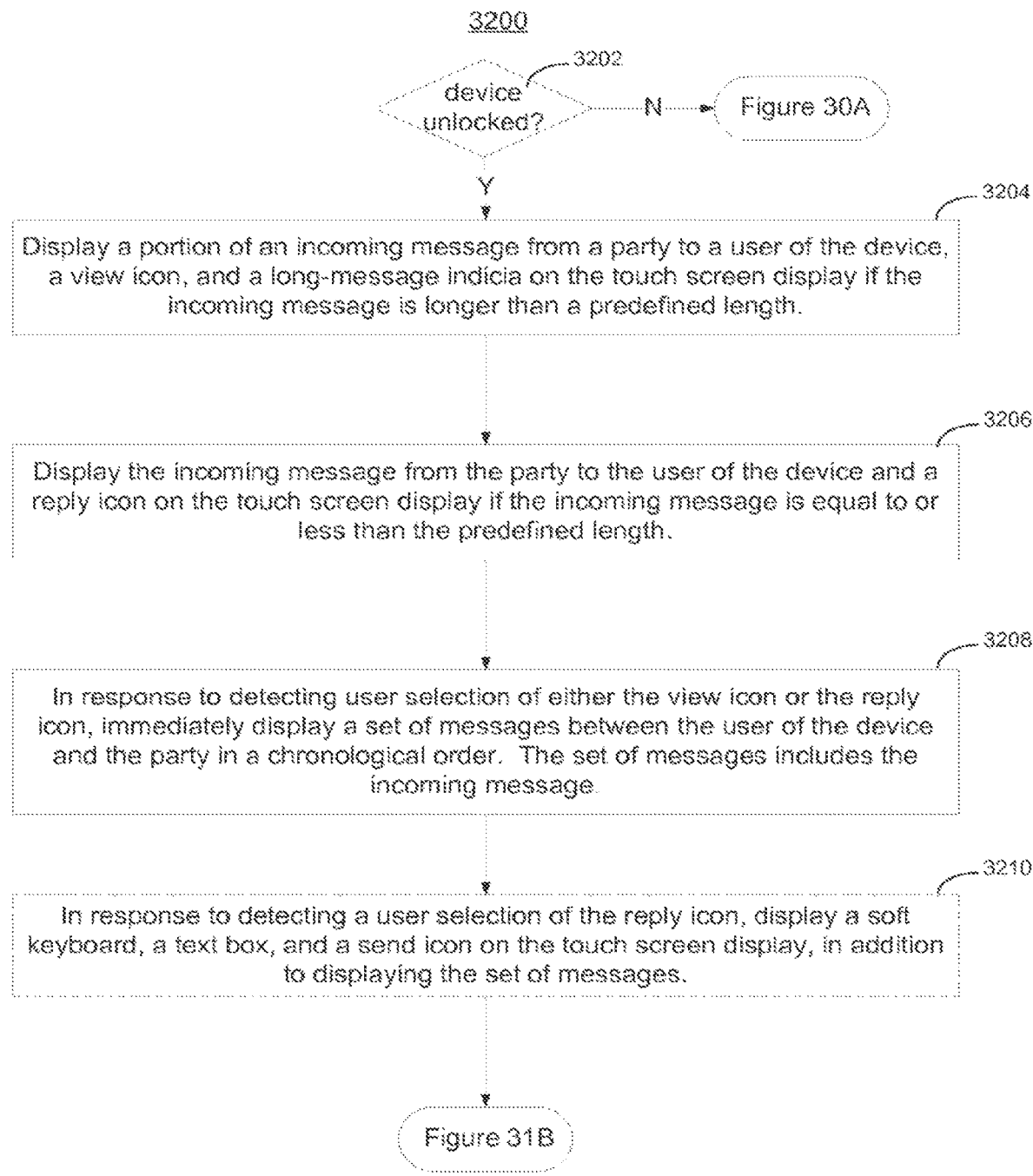
FIGS. 31A-31C are flow diagrams illustrating an exemplary process for displaying an incoming message to the user of the device when the device is unlocked in accordance with some embodiments.
Figure 31B:
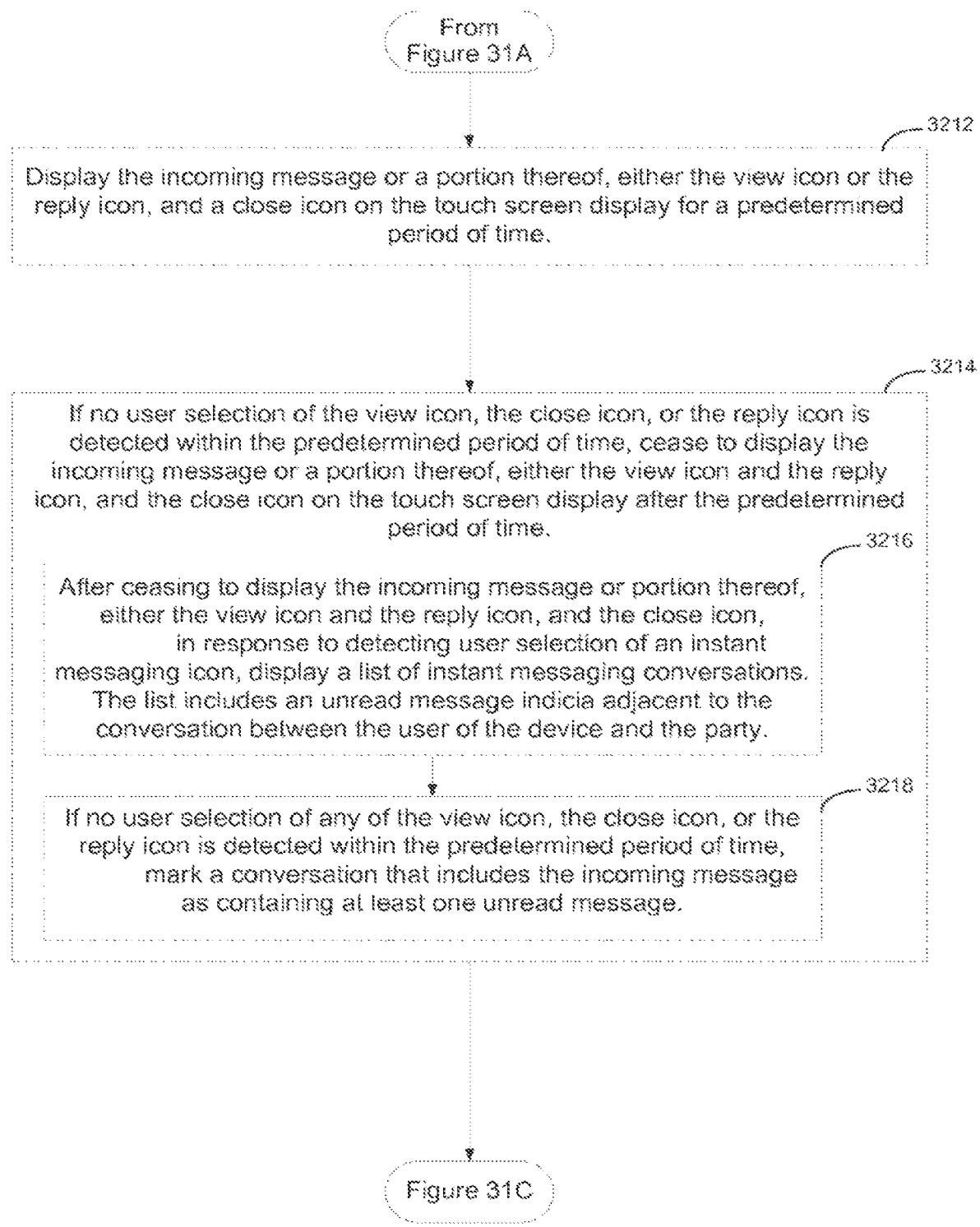
Figure 31C:
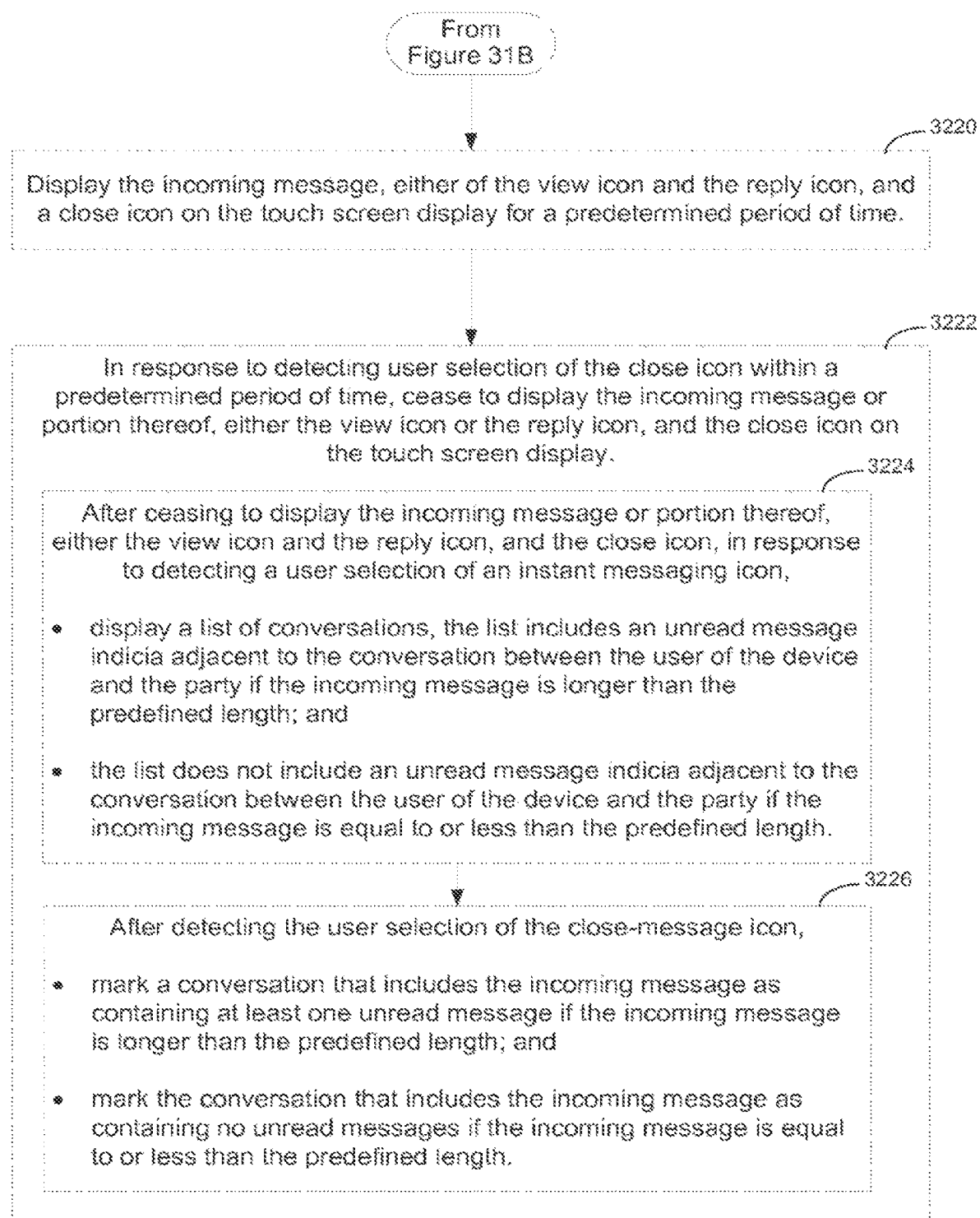

FIGS. 31A-31C are flow diagrams illustrating an exemplary process 3200 for displaying an incoming message to the user of the device when the device is unlocked (3202), in accordance with some embodiments. The device displays (3204) a portion of an incoming message from a party to a user of the device, a view icon (e.g., 2230 FIG. 23I), and a long-message indicia (e.g., " . . . " 2229) on the touch screen display if the incoming message is longer than a predefined length. In some embodiments, if the incoming message is longer than the predefined length the device also displays a scroll indicator (e.g., 2232 FIG. 23I) for viewing the entire message. There may also be a close icon (e.g., 2228) for closing the message.

The device displays (3206) the incoming message (e.g., 2218 FIG. 23E) from the party to the user of the device and a reply icon (e.g., 2222) on the touch screen display if the incoming message is equal to or less than the predefined length. For example, in UI 2300E, the entire message 2218 ("Hello! Free for lunch today?") is displayed. In some embodiments, there may also be a Close icon (e.g., 2220) in addition to the reply icon (e.g., 2222).

In response to detecting user selection of either the view icon (e.g., 2230 FIG. 23I) or the reply icon (e.g., 2222 FIG. 23E), the device immediately displays (3208) a set of messages between the user of the device and the party in a chronological order (e.g., 2223 FIG. 23H). The set of messages includes the incoming message (e.g., 2223-1).

In some embodiments, in response to detecting a user selection of the reply icon (e.g., 2222 FIG. 23E), the device displays (3210) a soft keyboard, a text box, and a send icon on the touch screen display, in addition to displaying the set of messages (e.g., 2223).

In some embodiments, the device displays (3212) the incoming message (e.g., 2218 FIG. 23E) or a portion thereof (e.g., 2225 FIG. 23I), either the view icon (e.g., 2230 FIG. 23I) or the reply icon (e.g., 2222 FIG. 23E), and a close icon (e.g., 2220 FIG. 23E, 2228 FIG. 23I) on the touch screen display for a predetermined period of time.

If no user selection of the view icon, the close icon, or the reply icon is detected within the predetermined period of time, the device ceases (3214) to display the incoming message or a portion thereof, either the view icon and the reply icon, and the close icon on the touch screen display after the predetermined period of time In some embodiments, after ceasing to display the incoming message or portion thereof, either the view icon and the reply icon, and the close icon, in response to detecting user selection of an instant messaging icon, the device displays (3216) a list of instant messaging conversations. The list includes an unread message indicia (e.g., 2206 next to the first conversation on FIG. 23J or 2206 next to the first conversation on FIG. 23F) adjacent to the conversation between the user of the device and the party.

In some embodiments, if no user selection of any of the view icon, the close icon, or the reply icon is detected within the predetermined period of time, the device marks (3218) a conversation that includes the incoming message as containing at least one unread message.

In some embodiments, the device displays (3220) the incoming message (e.g., 2218 FIG. 23E), either of the view icon (e.g., 2230 FIG. 23I) and the reply icon (e.g., 2222 FIG. 23E), and a close icon (e.g., 2220) on the touch screen display for a predetermined period of time.

In response to detecting user selection (e.g., a finger tap gesture) of the close icon (e.g., 2228 FIG. 23I) within a predetermined period of time, the device ceases (3222) to display the incoming message or portion thereof (e.g., 2225, FIG. 23I), either the view icon (e.g., 2230 FIG. 23I) or the reply icon (e.g., 2222 FIG. 23E), and the close icon (e.g., 2228 FIG. 23I) on the touch screen display.

In some embodiments, after ceasing to display the incoming message or portion thereof, either the view icon (e.g., 2230 FIG. 23I), and the reply icon (e.g., 2222 FIG. 23E), and the close icon (e.g., 2228), in response to detecting a user selection of an instant messaging icon (e.g., icon 141, FIG. 4, in a user interface that displays application icons), the device displays (3224) a list of conversations (e.g., FIG. 23J). The list includes an unread message indicia (e.g., 2206) adjacent to the conversation between the user of the device and the party if the incoming message is longer than the predefined length (e.g., 2229 FIG. 23J).

In some embodiments, after detecting the user selection of the close icon (e.g., 2228 FIG. 23I), the device marks (3226) a conversation that includes the incoming message as containing at least one unread message if the incoming message is longer than the predefined length (see FIG. 23J). Otherwise, if the incoming message is equal to or less than the predefined length (e.g., 2218, FIG. 23E), the device marks (3208) the conversation that includes the incoming message as containing no unread messages (see FIG. 23G).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a display;
   one or more processors;
   memory; and
   one or more programs, wherein the one or more programs are stored in the memory and configured to be executed by the one or more processors, the one or more programs including instructions for:
   displaying, on the display, a messaging application, wherein the messaging application includes a message conversation;
   while displaying the message conversation, detecting a first input corresponding to a request to send a new message;
   in response to detecting the first input:
   in accordance with a determination that the new message was not successfully sent, adding the new message to the message conversation, wherein adding the new message to the message conversation incudes displaying the new message in the message conversation with a first visual appearance; and
   in accordance with a determination that the new message was successfully sent, adding the new message to the message conversation, wherein adding the new message to the message conversation incudes displaying the new message in the message conversation with a second visual appearance different from the first visual appearance;
   while displaying the unsent new message in the message conversation, detecting a second input directed to resending the new message; and
   in response to detecting the second input:
   in accordance with a determination that the new message was not successfully sent, continue displaying the new message in the message conversation with the first visual appearance; and
   in accordance with a determination that the new message was successfully sent, cease displaying the new message in the message conversation with the first visual appearance, and displaying the new message in the message conversation with the second visual appearance.

2. The electronic device of claim 1, wherein the first visual appearance is a first color corresponding to the new message and the second visual appearance is a second color corresponding to the new message.

3. The electronic device of claim 1, wherein the first visual appearance is a first border style corresponding to the new message and the second visual appearance is a second border style corresponding to the new message.

4. The electronic device of claim 1, wherein displaying the new message in the message conversation with the first visual appearance includes displaying an error indicator associated with the new message and wherein displaying the new message in the message conversation with the second visual appearance without displaying the error indicator associated with the new message.

5. A computer-implemented method, comprising:
   at a device with a display:
   displaying, on the display, a messaging application, wherein the messaging application includes a message conversation;
   while displaying the message conversation, detecting a first input corresponding to a request to send a new message;
   in response to detecting the first input:
   in accordance with a determination that the new message was not successfully sent, adding the new message to the message conversation, wherein adding the new message to the message conversation incudes displaying the new message in the message conversation with a first visual appearance; and in accordance with a determination that the new message was sent, adding the new message to the message conversation, wherein adding the new message to the message conversation incudes displaying the new message in the message conversation with a second visual appearance different from the first visual appearance;

while displaying the unsent new message in the message conversation, detecting a second input directed to resending the new message; and in response to detecting the second input:
  in accordance with a determination that the new message was not successfully sent, continue displaying the new message in the message conversation with the first visual appearance; and
  in accordance with a determination that the new message was successfully sent, cease displaying the new message in the message conversation with the first visual appearance, and displaying the new message in the message conversation with the second visual appearance.

6. The method of claim 5, wherein the first visual appearance is a first color corresponding to the new message and the second visual appearance is a second color corresponding to the new message.

7. The method of claim 5, wherein the first visual appearance is a first border style corresponding to the new message and the second visual appearance is a second border style corresponding to the new message.

8. The method of claim 5, wherein displaying the new message in the message conversation with the first visual appearance includes displaying an error indicator associated with the new message and wherein displaying the new message in the message conversation with the second visual appearance without displaying the error indicator associated with the new message.

9. A storage device storing one or more programs configured to be executed by one or more processors of an electronic device with a display, the one or more programs including instructions for:

displaying, on the display, a messaging application, wherein the messaging application includes a message conversation;

while displaying the message conversation, detecting a first input corresponding to a request to send a new message;

in response to detecting the first input:
  in accordance with a determination that the new message was not successfully sent, adding the new message to the message conversation, wherein adding the new message to the message conversation incudes displaying the new message in the message conversation with a first visual appearance; and
  in accordance with a determination that the new message was sent, adding the new message to the message conversation, wherein adding the new message to the message conversation incudes displaying the new message in the message conversation with a second visual appearance different from the first visual appearance;

while displaying the unsent new message in the message conversation, detecting a second input directed to resending the new message; and in response to detecting the second input:
  in accordance with a determination that the new message was not successfully sent, continue displaying the new message in the message conversation with the first visual appearance; and
  in accordance with a determination that the new message was successfully sent, cease displaying the new message in the message conversation with the first visual appearance, and displaying the new message in the message conversation with the second visual appearance.

10. The storage device of claim 9, wherein the first visual appearance is a first color corresponding to the new message and the second visual appearance is a second color corresponding to the new message.

11. The storage device of claim 9, wherein the first visual appearance is a first border style corresponding to the new message and the second visual appearance is a second border style corresponding to the new message.

12. The storage device of claim 9, wherein displaying the new message in the message conversation with the first visual appearance includes displaying an error indicator associated with the new message and wherein displaying the new message in the message conversation with the second visual appearance without displaying the error indicator associated with the new message.

\* \* \* \* \*